United States Patent
Coenegracht et al.

(10) Patent No.: US 10,502,920 B2
(45) Date of Patent: Dec. 10, 2019

(54) TERMINAL ENCLOSURE WITH MODULAR ASPECTS AND MODULES FOR INTERFACING WITH THE TERMINAL ENCLOSURE

(71) Applicant: CommScope Connectivity Belgium BVBA, Kessel-Lo (BE)

(72) Inventors: Philippe Coenegracht, Hasselt (BE); Alexandre Caroline M. De Bie, Beauvechain (BE); Maddy Nadine Frederickx, Aarschot (BE); Paul Joseph Claes, Tremelo (BE); Geert Van Genechten, Vorselaar (BE); Mohamed Aznag, Scherpenheuvel (BE); Diederik Houben, Berbroek (BE); Patrick Jacques Ann Diepstraten, Heusden-Zolder (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/760,175

(22) PCT Filed: Sep. 14, 2016

(86) PCT No.: PCT/EP2016/071740
§ 371 (c)(1),
(2) Date: Mar. 14, 2018

(87) PCT Pub. No.: WO2017/046190
PCT Pub. Date: Mar. 23, 2017

(65) Prior Publication Data
US 2019/0170961 A1 Jun. 6, 2019

Related U.S. Application Data

(60) Provisional application No. 62/218,373, filed on Sep. 14, 2015, provisional application No. 62/218,307, (Continued)

(51) Int. Cl.
*G02B 6/44* (2006.01)
*G02B 6/38* (2006.01)

(52) U.S. Cl.
CPC ......... G02B 6/4472 (2013.01); G02B 6/4444 (2013.01); *G02B 6/3825* (2013.01); *G02B 6/3891* (2013.01); *G02B 6/3897* (2013.01)

(58) Field of Classification Search
CPC ............................ G02B 6/4444; G02B 6/4472
See application file for complete search history.

(56) References Cited

U.S. PATENT DOCUMENTS

| 5,835,658 A | 11/1998 | Smith |
| 7,013,074 B2 | 3/2006 | Battey et al. |

(Continued)

FOREIGN PATENT DOCUMENTS

| EP | 2 523 287 A1 | 11/2012 |
| WO | 01/41276 A2 | 6/2001 |

(Continued)

OTHER PUBLICATIONS

International Search Report and Written Opinion of the International Searching Authority for corresponding International Patent Application No. PCT/EP2016/071740 dated Mar. 24, 2017, 23 pages.

*Primary Examiner* — Omar R Rojas
(74) *Attorney, Agent, or Firm* — Merchant & Gould P.C.

(57) ABSTRACT

Aspects of the present disclosure relate to a modular fiber optic distribution system for enhancing installation flexibility and for facilitating adding components to a terminal housing over time so as to delay cost. The system is configured to allow components (e.g., inserts, add-on modules, etc.) to be readily added to the terminal housing over time to expand capacity, provide upgrades and to provide forward and backward compatibility.

20 Claims, 102 Drawing Sheets

Related U.S. Application Data filed on Sep. 14, 2015, provisional application No. 62/218,263, filed on Sep. 14, 2015, provisional application No. 62/218,317, filed on Sep. 14, 2015, provisional application No. 62/267,232, filed on Dec. 14, 2015, provisional application No. 62/267,120, filed on Dec. 14, 2015, provisional application No. 62/289,751, filed on Feb. 1, 2016, provisional application No. 62/289,712, filed on Feb. 1, 2016, provisional application No. 62/326,353, filed on Apr. 22, 2016, provisional application No. 62/327,871, filed on Apr. 26, 2016, provisional application No. 62/342,641, filed on May 27, 2016, provisional application No. 62/383,021, filed on Sep. 2, 2016.

(56) References Cited

U.S. PATENT DOCUMENTS

| | | |
|---|---|---|
| 7,512,304 B2 | 3/2009 | Gronvall et al. |
| 7,539,387 B2 | 5/2009 | Mertesdorf et al. |
| 7,558,458 B2 | 7/2009 | Gronvall et al. |
| 7,805,044 B2 | 9/2010 | Reagan et al. |
| 8,213,760 B2 | 7/2012 | Rudenick et al. |
| 8,648,258 B2 | 2/2014 | Drouard et al. |
| 8,837,940 B2 | 9/2014 | Smith et al. |
| 8,909,550 B2 | 12/2014 | Biedermann et al. |
| 9,348,096 B2 | 5/2016 | Kmit et al. |
| 2004/0042710 A1 | 3/2004 | Margalit et al. |
| 2005/0185895 A1 | 8/2005 | Keenum et al. |
| 2005/0271344 A1 | 12/2005 | Grubish et al. |
| 2007/0189692 A1* | 8/2007 | Zimmel ............... G02B 6/4452 385/135 |
| 2009/0290844 A1 | 11/2009 | Mullaney et al. |
| 2011/0038592 A1 | 2/2011 | Mudd |
| 2011/0217017 A1 | 9/2011 | Drouard et al. |
| 2011/0293277 A1 | 12/2011 | Bradea et al. |
| 2014/0199035 A1 | 7/2014 | Bunte |

FOREIGN PATENT DOCUMENTS

| | | |
|---|---|---|
| WO | 2014/005916 A2 | 1/2014 |
| WO | 2014/005918 A2 | 1/2014 |
| WO | 2014/133955 A1 | 9/2014 |
| WO | 2014/186433 A1 | 11/2014 |
| WO | 2015/028428 A1 | 3/2015 |
| WO | 2015/047508 A1 | 4/2015 |

* cited by examiner

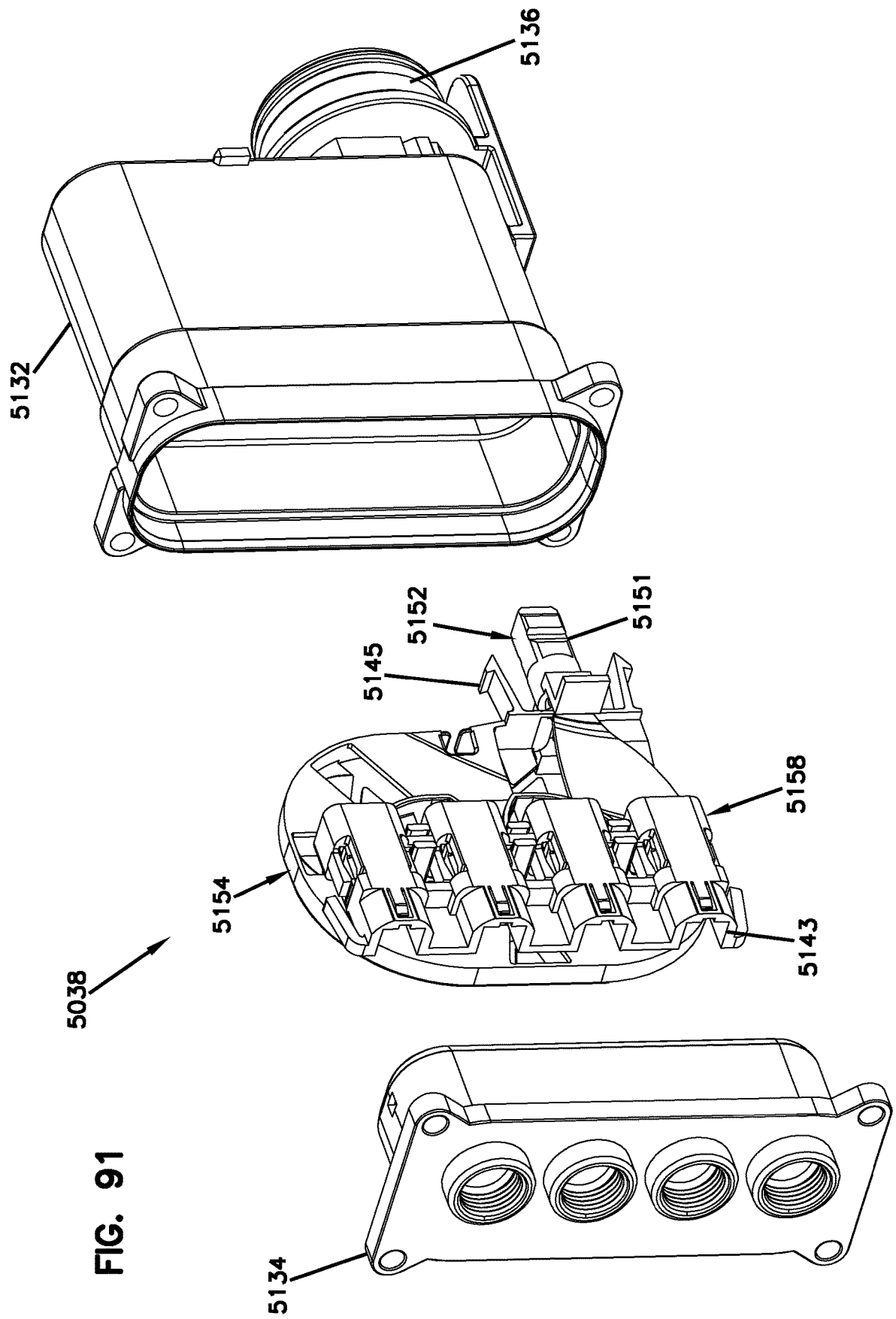

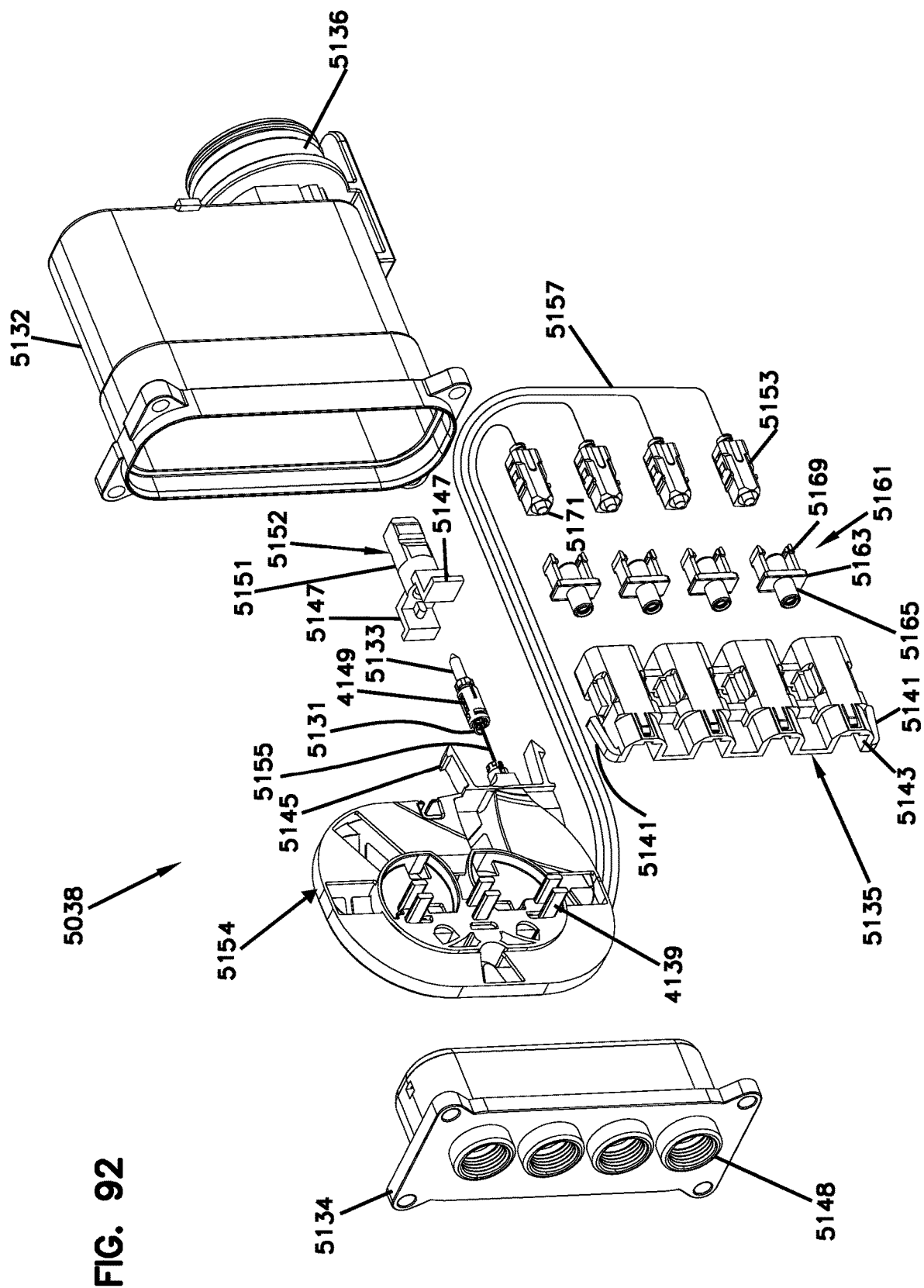

TERMINAL ENCLOSURE WITH MODULAR ASPECTS AND MODULES FOR INTERFACING WITH THE TERMINAL ENCLOSURE

CROSS-REFERENCE TO RELATED APPLICATIONS

This application is National Stage Application of PCT/EP2016/071740, filed on Sep. 14, 2016, which claims the benefit of U.S. Patent Application Ser. No. 62/218,373, filed on Sep. 14, 2015, and claims the benefit of U.S. Patent Application Ser. No. 62/267,232, filed on Dec. 14, 2015, and claims the benefit of U.S. Patent Application Ser. No. 62/289,751, filed on Feb. 1, 2016, and claims the benefit of U.S. Patent Application Ser. No. 62/342,641, filed on May 27, 2016. This application also claims the benefit of U.S. Patent Application Ser. No. 62/218,307, filed on Sep. 14, 2015, and claims the benefit of U.S. Patent Application Ser. No. 62/267,120, filed on Dec. 14, 2015, and claims the benefit of U.S. Patent Application Ser. No. 62/289,712, filed on Feb. 1, 2016, and claims the benefit of U.S. Patent Application Ser. No. 62/326,353, filed on Apr. 22, 2016 and claims the benefit of U.S. Patent Application Ser. No. 62/383,021, filed on Sep. 2, 2016. This application also claims the benefit of U.S. Patent Application Ser. No. 62/218,263, filed on Sep. 14, 2015. This application also claims the benefit of U.S. Patent Application Ser. No. 62/218,317, filed on Sep. 14, 2015. Finally, this application also claims the benefit of U.S. Patent Application Ser. No. 62/327,871, filed on Apr. 26, 2016. All of the disclosures of the above noted patent applications are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to enclosures and fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors and fiber optic enclosures are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment. Fiber optic enclosures are incorporated into fiber optic networks to facilitate providing access to optical fibers of fiber optic network cables. Fiber optic enclosures often house components such as splice trays, passive optical splitters, fiber optic adapters, fiber optic connectors, connector storage regions, connection fields/panels, connectorized pigtails, wavelength divisional multi-plexers and other components.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter. The fiber optic adapter can include an alignment sleeve for receiving and co-axially aligning the ferrules of the two mated connectors. The alignment sleeve can take the form of a cylindrical split sleeve having a resilient/elastic construction. Example fiber optic connectors are disclosed at U.S. Pat. No. 8,837,940.

Many fiber optic enclosures are designed to be installed in outside environments and are environmentally sealed. Example fiber optic enclosures for use in outside environments are disclosed by U.S. Pat. Nos. 7,512,304; 7,558,458; 8,213,760; 7,805,044; 7,539,387; and 7,013,074. A typical fiber optic enclosure of this type includes at least one sealed cable port for routing a fiber optic network cable into the enclosure. This type of enclosure can also include sealed connector ports for interfacing with connectorized drop cables. Optical fibers of the fiber optic network cable routed into the enclosure are often accessed within the enclosure and spliced to another cable such as a drop cable, directly connectorized or spliced to connectorized pigtails. When the fibers are connectorized, the connectorized ends can be plugged into inner ends of fiber optic adapters incorporated into the sealed connector ports. The fiber optic adapters can include alignment sleeves and are installed at the sealed connector ports at the time the enclosure is initially assembled. In the field, outer ends of the fiber optic adapters can be used to receive ruggedized fiber optic connectors corresponding to drop cables to provide optical connections between the drop cables and optical fibers of the fiber optic network cable without having to access an interior of the enclosure.

SUMMARY

One aspect of the present disclosure relates to telecommunications systems having modular configurations adapted to allow terminal housings to be readily upgraded, and/or expanded and/or enlarged and/or otherwise modified in the field.

Another aspect of the present disclosure relates to telecommunications systems having modular configurations for allowing a large number of different product configurations to be custom built/manufactured from a number of modular components.

Another aspect of the present disclosure relates to a modular system including a terminal housing defining a plurality of terminal ports each having a terminal port form factor. The modular system also includes a module including a module body including a plurality of ruggedized ports for receiving ruggedized fiber optic connectors. The module body includes an integrated form factor that matches the terminal port form factor such that the module is capable of being mated with one of the terminal ports.

A further aspect of the present disclosure relates to a modular system including a terminal housing defining a plurality of terminal ports each having a terminal port form factor. The system also includes a module including a module body including at least one ruggedized port for receiving a ruggedized fiber optic connector. The module body includes an integrated form factor that matches the terminal port form factor such that the module is capable of being mated with one of the terminal ports. The module is capable of being mated with one of the terminal ports from outside the terminal and is capable of being fastened to the terminal housing by a fastener that is accessible from outside the terminal housing when the terminal housing is closed.

Other aspects of the present disclosure relate to a modular system for making sealed enclosures having different port configurations. In certain examples, the sealed enclosures can include terminals having ports adapted for receiving any number of different inserts. Each of the inserts has a form factor compatible with a form factor of the terminal ports. The different inserts can include different connector ports that are compatible with different types of fiber optic connectors. Certain inserts can also be configured so as to define cable ports for sealing cables that pass into the terminals. Certain inserts can include multiple ports such as multiple connector ports. In certain, examples, the modularity of the design allows a given terminal style to have a wide variety of port configurations that are customized to meet consumer demands/requests. Also, in certain aspects, the modularity of the design allows port configurations of a given terminal to be changed in the field to accommodate unexpected field requirements. Further, in certain aspects, the modularity of the design allows a given terminal to be readily forwardly compatible with new connector styles and designs that may enter the marketplace.

Another aspect of the present disclosure relates to a modular system for making sealed enclosures having different port configurations. The modular system includes a terminal housing defining a plurality of terminal ports, each having a terminal port form factor. The modular system also includes a first insert configured to mate with the terminal ports. The first insert defines an insert form factor that matches the terminal port form factor. The first insert includes a first insert port compatible with a first type of ruggedized fiber optic connector. The modular system also includes a second insert configured to mate with the terminal ports. The second insert defines the insert form factor that matches the terminal port form factor. The second insert includes a second insert port that is either: (a) compatible with a second type of ruggedized fiber optic connector; or (b) defined by a cable sealing arrangement.

Another aspect of the present disclosure relates to an insert adapted to be loaded into a port of a terminal. The insert includes an insert main body defining at least two connector ports, each including a twist-to-lock interface (e.g., threaded interface or a bayonet style interface) for interconnecting with a mating ruggedized connector. The insert also includes a seal that surrounds an exterior of the insert main body for providing an environmental seal between the insert main body and the terminal. In this type of arrangement, a single seal between the insert main body and the terminal can provide terminal sealing for multiple ruggedized connector ports. Also, a single securement device between the insert main body and the terminal can provide terminal securement for multiple ruggedized connector ports. In certain examples, the design allows multiple ruggedized connector ports to be provided within one opening or port defined by the terminal housing.

Still another aspect of the present disclosure relates to an insert adapted to be loaded into a port of a terminal. The insert includes a main body carrying a cable sealing arrangement defining a cable port. The cable sealing arrangement includes a cable sealing gel and an actuator for pressurizing the cable sealing gel and for maintaining the cable sealing gel under spring pressure during cable sealing. The insert further includes a seal that surrounds an exterior of the insert main body for providing an environmental seal between the insert main body and the terminal. The seal is separate from the cable sealing gel. In certain examples, cable sealing can be accomplished off line from the terminal (i.e., cable sealing and seal pressurization can take place before the insert is loaded into the terminal).

Other aspects of the disclosure are directed to an enclosure including a base configured to hold cable loop storage for a pass-through cable, an intermediate housing that attaches to the base to form a combined interior of the base and intermediate housing, a seal disposed between the base and the intermediate housing to environmentally seal the combined interior at the intersection of the base and the intermediate housing; and a cover that attaches and environmentally seals to the intermediate housing. The base at least partially defines sealed ports through which a cable can enter and exit the base. The intermediate housing defines ports for mounting fiber optic adapters.

In certain implementations, the cover is pivotally coupled to the intermediate housing at a hinge. In certain examples, the cover is clamped to the intermediate housing.

In certain implementations, the base defining a plurality of additional ports structured and configured to provide a ruggedized connection between the base and a value-added module received from an exterior of the base.

In certain implementations, the ports of the intermediate housing are disposed in a plurality of rows. In certain examples, the plurality of rows includes a first row and a second row. The first row is located closer to the base and the second row is located closer to the cover. In an example, the ports of the first row are larger than the ports of the second row. In an example, the ports of the first row are elongated along a different orientation than the ports of the second row. In certain examples, the plurality of rows includes three rows.

In certain implementations, the cover attaches to the intermediate housing with a twist-to-lock connection. In certain examples, the twist-to-lock connection includes a threaded connection. In certain examples, the twist-to-lock connection includes a bayonet connection.

In certain examples, the cover is configured to twist no more than a full turn relative to the intermediate housing to lock to the intermediate housing. In certain examples, the cover is configured to twist no more than a half-turn relative to the intermediate housing to lock to the intermediate housing. In certain examples, the cover is configured to twist no more than a quarter-turn relative to the intermediate housing to lock to the intermediate housing.

In certain examples, the cover compresses a seal when twisted relative to the intermediate housing.

In certain examples, the cover defines receptacles configured to receive a handle or tool to enable an application of additional torque to the cover.

In certain implementations, a shroud is mounted to the intermediate housing, the shroud extending over the ports. In certain examples, a value-added module coupled to one of the ports. The shroud extends over at least part of the value-added module. In an example, the shroud inhibits access to at least one side of the value-added module.

In certain implementations, a bracket mounted to the intermediate housing; and a value-added module mounted to the bracket. The value-added module is environmentally sealed to one of the ports of the intermediate housing.

In certain implementations, at least one of the ports faces outwardly from the intermediate housing in a first direction and at least another of the ports faces outwardly from the intermediate housing in a second direction that is angled relative to the first direction.

In certain implementations, the intermediate housing includes a first portion and a second portion. The first portion is sized to interface with the base. The second portion is smaller than the first portion. The second portion defines the ports.

In certain examples, the intermediate housing has a stepped transition between the first and second portions. In certain examples, the ports face outwardly over a ledge defined by the first portion.

In certain examples, a value-added module is coupled to one of the ports, the value-added module extending at least partially across the ledge. In certain examples, the ledge inhibits access to the value-added module. In certain examples, the value-added module seats on the ledge.

In certain implementations, a splice tray arrangement is configured to mount within the combined interior. The splice tray arrangement includes at least one splice tray configured to pivot relative to the intermediate housing between a first position and a second position.

In certain examples, the splice tray blocks access to the cable loop storage when in the first position. The splice tray does not block access to the cable loop storage when in the second position.

In certain examples, the splice tray arrangement includes a frame that mounts to the intermediate housing. The splice tray pivotally mounts to the frame. In an example, additional splice trays mount to the frame.

The deployment of fiber optic networks often takes place in multiple phases. For example, during an initial installations phase, the fiber optic cables are installed and fiber optic enclosures are incorporated at various locations throughout the network. Typically, the enclosures are positioned at locations near anticipated future subscriber locations. In a later phase when specific subscribers are identified, the subscriber can quickly be connected to the network by coupling a drop cable to the enclosure. In many situations, a significant period of time passes between initial installation of the network and connection of the subscribers to the network. Taking this into consideration, it is desirable for the system to be configured to defer as many costs as possible while still allowing the subscriber to be rapidly connected to the network once the subscriber requests service. In this regard, aspect of the present disclosure relate to the features and designs that allow components such as fiber optic adapter components to be installed into the network in a delayed manner so as to defer costs as much as possible without interfering with the ability to rapidly connect a subscriber to the network upon demand.

Certain aspects of the present disclosure relate to an enclosure assembly that includes a terminal housing. A connector port is provided at the terminal housing. The connector port defines a connector insertion axis that extends through the connector port between an inner region and an outer region of the connector port. An inner fiber optic connector is fixed in place at the inner region of the connector port in alignment with the connector insertion axis. An outer fiber optic connector is configured to be received in the outer region of the connector port. A ferrule alignment sleeve is pre-mounted on a ferrule of the outer fiber optic connector prior to insertion of the outer fiber optic connector into the connector port. The ferrule alignment sleeve is configured to receive a ferrule of the inner fiber optic connector as the outer fiber optic connector is inserted into the connector port to provide co-axial alignment between the ferrules of the inner and out fiber optic connectors. It will be appreciated that the outer fiber optic connector can be mounted at the end of a drop cable optically connected to a subscriber location. Typically, the connector port will be sealed with a dust plug until it is desired to use the connector port to provide a subscriber connection. When a subscriber connection is requested, the dust plug is removed and the outer fiber optic connector is inserted into the connector port to provide an optical connection between the drop cable and the network. In this design, the ferrule alignment sleeve is not incorporated into the terminal housing at the time that the terminal housing is initially deployed. In contrast, the ferrule alignment sleeve is mounted on the outer fiber optic connector corresponding to the drop cable. In this way, costs associated with the ferrule alignment sleeve and other fiber optic adapter components are deferred until the subscriber is actually connected to the network through the connector port. The pre-mounted configuration of the ferrule alignment sleeve on the outer fiber optic connector allows the ferrule alignment sleeve to be rapidly deployed in the field in the time the subscriber is connected to the fiber optic network.

Some aspects of the disclosure are directed to a modular system for making sealed enclosures having different configurations. The modular system includes a first terminal housing defining a plurality of ports, a cover piece, and an enlargement housing. The first terminal housing has an open back. The cover piece mates with the first terminal housing to close the open back such that the mated cover piece and the first terminal housing define a stand-alone terminal having a first volume. The enlargement housing mates with the first terminal housing at the open back such that the mated enlargement housing and the first terminal housing define an enlarged terminal having a second volume larger than the first volume.

In certain implementations, a second terminal housing defines a plurality of ports. A coupling element mounts to one of the ports of the first terminal housing and one of the ports of the second terminal housing to mechanically couple the first and second terminal housings together.

In certain examples, the first and second terminal housings are connected end-to-end along an axis.

In certain implementations, the first terminal housing is elongated along an axis and includes first and second ends separated by a length of the first terminal housing that extends along the axis. The first terminal housing defines end ports at the first and second ends of the first terminal housing. The first terminal housing defines a plurality of side ports spaced-apart from one another along the length of the first terminal housing between the first and second ends of the first terminal housing.

In certain examples, ruggedized and sealed fiber optic adapter mounted in at least some of the ports. The fiber optic adapter is configured to receive a ruggedized connector from outside the first terminal housing.

In certain examples, cable pass-through seals are mounted within at least one of the ports.

Other aspects of the disclosure are directed to a modular system for making sealed enclosures having different configurations. The modular system includes a first enclosure, a second enclosure, and a conduit arrangement. The first enclosure defines a first interior. The first enclosure has a first end port leading to the first interior, a second end port leading to the first interior, and side ports leading to the first interior. The first end port is coaxially aligned with the second end port. The side ports are unaligned with the first and second end ports. The second enclosure defines a second interior. The second enclosure has a first end port leading to the second interior, a second end port leading to the second interior, and side ports leading to the second interior. The first end port of the second enclosure is coaxially aligned with the second end port of the second enclosure. The side ports of the second enclosure are unaligned with the first and second end ports of the second enclosure. The conduit arrangement is configured to connect the second end port of the first enclosure to the first end port of the second enclosure. The conduit arrangement includes a conduit defining a passage extending between first and second ends of the conduit. The conduit also includes a flange disposed intermediate the first and second ends. The conduit arrangement also includes a first gasket and first fastener configured to seal the first end of the conduit at the second end port of the first enclosure. The conduit arrangement also includes a second gasket and second fastener configured to seal the second end of the conduit at the first end port of the second enclosure.

In certain implementations, the first and second fasteners include nuts. In certain implementations, the first and second gaskets include O-rings.

In certain implementations, the first end of the conduit is inserted into the second end port of the first enclosure. The second end of the conduit is inserted into the first end port of the second enclosure.

In certain implementations, at least one end plug is configured to fit into any of the first and second end ports of the first and second enclosures. Each end plug is configured to sealingly engage any of the end ports.

In certain implementations, a closure defines a closure interior. The closure defines an opening at which the first enclosure mounts and an opening at which the second enclosure mounts to form an enlarged closure.

In certain implementations, the openings are defined in a cover of the closure.

In certain implementations, the closure defines a sealed cable port at which a cable enters the closure.

In certain implementations, the side ports of the enclosures face in a different direction from the sealed cable ports.

Other aspects of the disclosure are directed to a method of customizing a closure assembly. The method including providing a closure defining an interior and a sealed cable port; providing a terminal enclosure including two coaxially aligned end ports, a plurality of side ports, and an open rear; positioning the terminal enclosure at an opening defined in the closure so that the open rear of the terminal enclosure aligns with the opening; and sealingly mounting the terminal enclosure to the closure at the opening.

In certain implementations, the method includes routing a cable into the closure through the sealed cable port; breaking out a media segment from the cable; and routing the media segment to one of the side ports of the terminal enclosure.

In some implementations, the method includes forming the opening at the closure in a factory. In other implementations, the method includes forming the opening at the closure in the field.

In certain implementations, end caps seal the end ports of the terminal enclosure shut.

In certain implementations, the method includes positioning a plurality of the terminal enclosures at respective openings defined in the closure. In certain examples, the terminal enclosures are joined together.

Another aspect of the present disclosure relates to a fiber optic adapter assembly that can be installed within an enclosure port without the use of tools.

Another aspect of the present disclosure relates to a fiber optic adapter assembly that is configured to snap-fit within a corresponding enclosure port.

A further aspect of the present disclosure relates to a fiber optic adapter assembly that can be loaded into an enclosure port in an outboard-to-inboard direction. As used herein, "in-board" means closer to an interior of the enclosure defining the enclosure port while "outboard" means further from the interior of the enclosure defining the enclosure port. In certain examples, the fiber optic adapter assembly can be loaded into the enclosure port in an outboard-to-inboard direction and can be secured within the enclosure port by a snap-fit connection. In certain examples, the fiber optic adapter assembly can be loaded into the enclosure port in an outboard-to-inboard direction and can be secured within the enclosure port without the use of tools.

Another aspect of the present disclosure relates to a fiber optic adapter assembly having two housing pieces that are interconnected by a sliding interface. One of the housing pieces includes a port defining body that defines first and second connector ports aligned along a connector insertion axis. A spring is captured between the housing pieces and biases the housing pieces apart from one another in an orientation that extends along the connector insertion axis. One of the housing pieces can include an anchoring structure for anchoring the fiber optic adapter assembly within a port. In one example, a ferrule alignment sleeve can be provided within the port defining body. In one example, the anchoring structure can include a flexible latch.

A further aspect of the present disclosure relates to a fiber optic adapter assembly including an inboard housing piece and an outboard housing piece that are interconnected by a connection interface that allows relative sliding movement between the inboard and outboard housing pieces along a connector insertion axis. In certain examples, the inboard and outboard housing pieces can telescope relative to one another. In certain examples, at least one spring is captured between the inboard and outboard housing pieces for biasing the inboard and outboard pieces apart from one another in an orientation along the connector insertion axis. In certain examples, at least one of the inboard and outboard housing pieces includes a port defining body that defines an outboard connector port and an inboard connector port that are aligned along the connector insertion axis. In certain examples, the port defining body can be configured for aligning single-fiber fiber optic connectors. In certain other examples, the port defining body can be configured for aligning multi-fiber fiber optic connectors (e.g., fiber optic connectors having multi-fiber ferrules). In certain examples, the port defining body can be configured for aligning ruggedized fiber optic connectors with non-ruggedized fiber optic connectors. In certain examples, a cylindrical ferrule alignment sleeve (e.g., an elastic split-sleeve) can be mounted within the port defining body for aligning the ferrules of two fiber optic connectors desired to be optically and mechanically coupled together. In certain examples, the ferrule alignment sleeve is mounted within a barrel portion of an alignment sleeve housing that snap-fits within the port defining body.

Still another aspect of the present disclosure relates to a fiber optic adapter assembly adapted to be mounted within an enclosure port of an enclosure. The enclosure port has an inboard end closest to an interior of the enclosure and an outboard end furthest from the interior of the enclosure. The fiber optic adapter assembly is configured to be loaded into the enclosure port in an upward-to-inboard direction. The fiber optic adapter assembly includes an inboard housing piece defining an inboard end of the adapter assembly. The fiber optic adapter assembly also includes an outboard housing piece defining an outboard end of the adapter assembly. The outboard housing piece includes a port defining body that defines an outboard connector port and an inboard connector port that are aligned along a connector insertion axis. The inboard housing piece and the outboard housing piece are interconnected by a connection interface that allows relative sliding movement between the inboard and outboard housing pieces along the connector insertion axis. The fiber optic adapter assembly further includes at least one spring captured between the inboard and outboard housing pieces for biasing the inboard and outboard housing pieces apart from one another in an orientation along the connection insertion axis. The fiber optic adapter assembly further includes an anchor arrangement for securing either the inboard housing piece or the outboard housing piece at a fixed location along the connector insertion axis within the enclosure port.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 91 is an exploded view of the multi-port module of FIGS. 89 and 90;

FIG. 92 is a further exploded view of the multi-port module of FIGS. 89 and 90;

DETAILED DESCRIPTION

Figure 1:
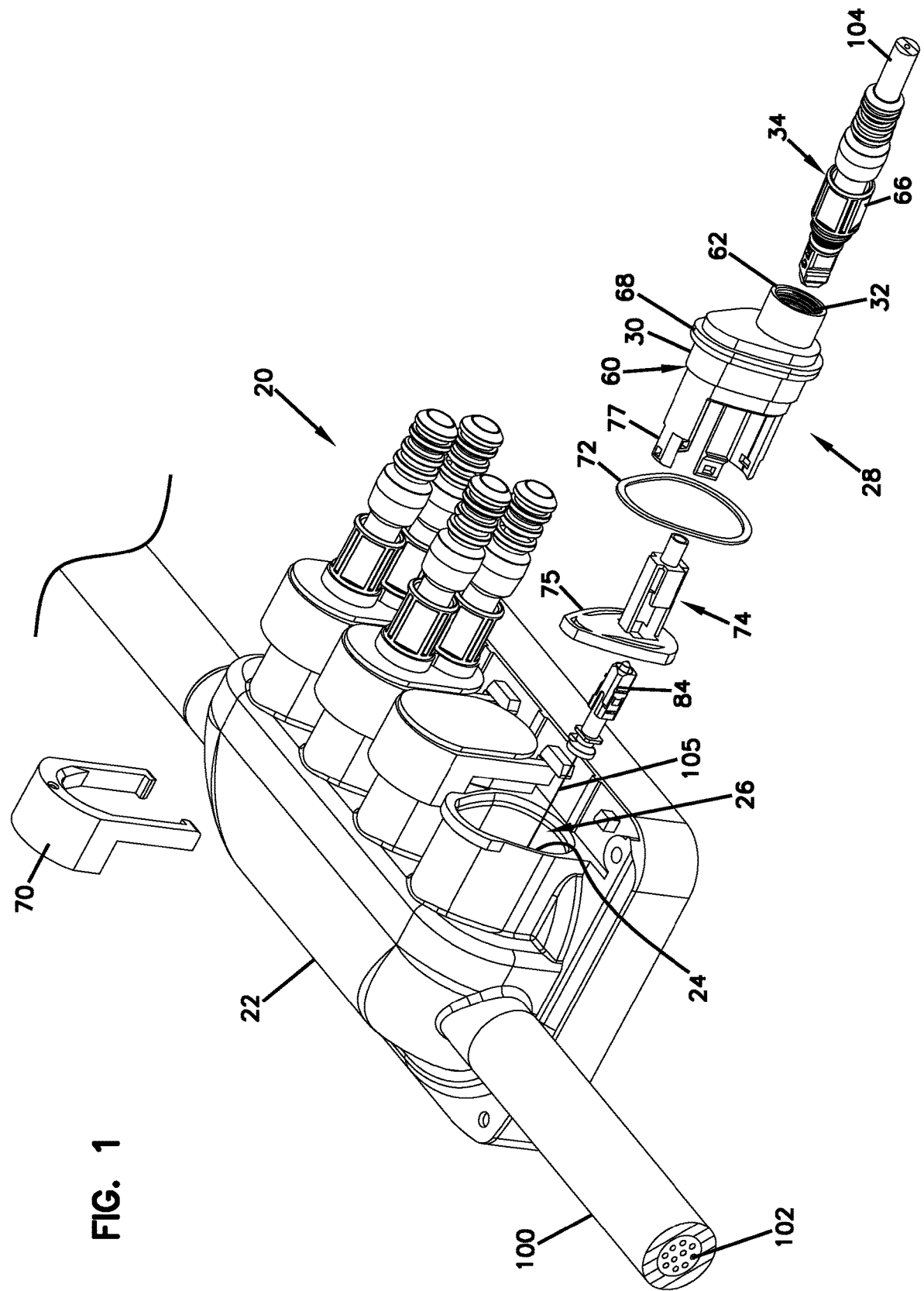
FIG. 1 illustrates a modular system in accordance with the principles of the present disclosure for making sealed enclosures having different port configurations, the modular system is depicted with a first insert in the process of being installed in a terminal, the first insert defines a connector port compatible with a first style of ruggedized fiber optic connector.
Figure 8:
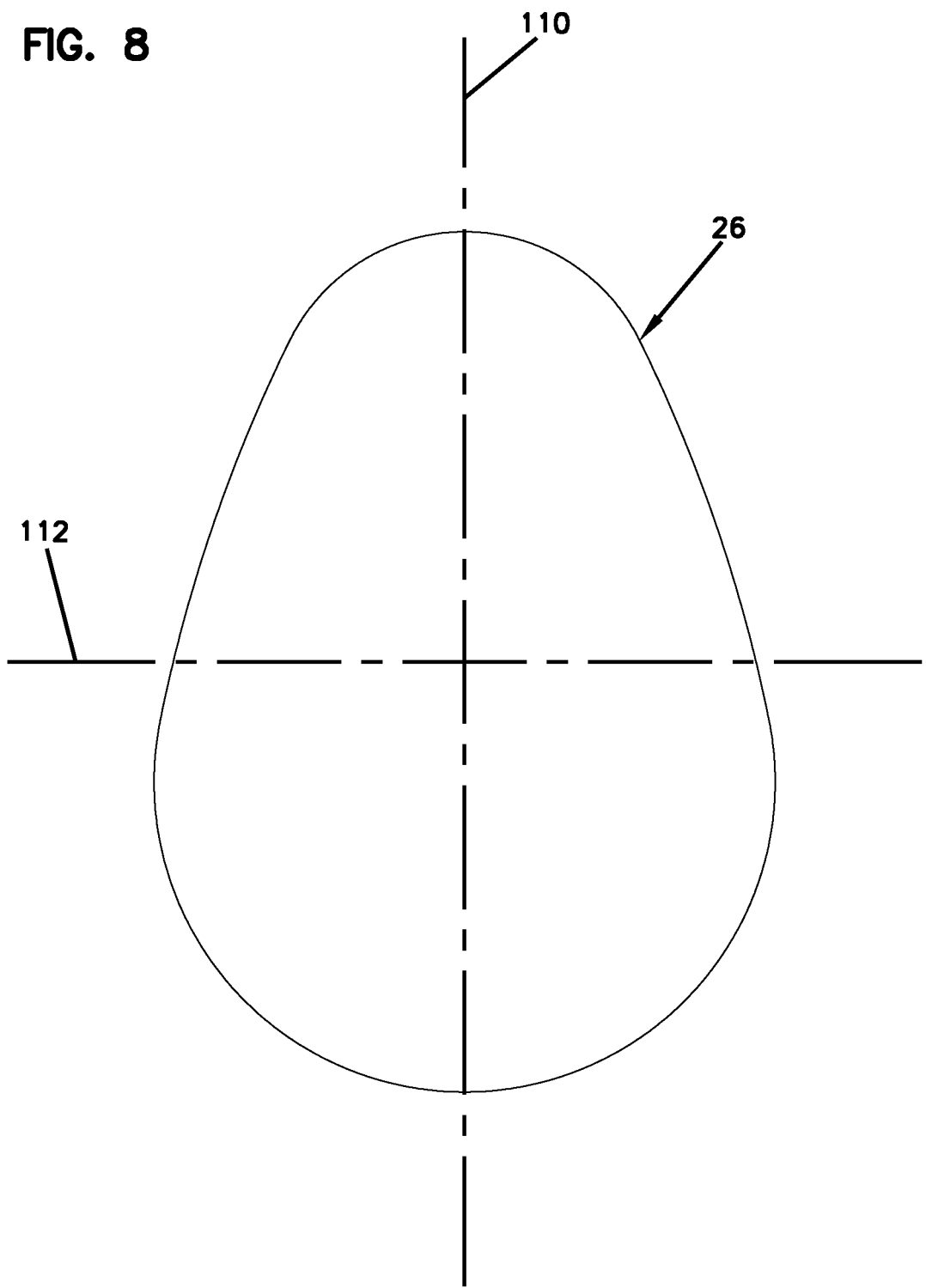
FIG. 8 illustrates a terminal port form factor of one of the terminal ports of the terminal housing shown at FIGS. 1, 4 and 7.

FIG. 1 illustrates a modular system 20 in accordance with the principles of the present disclosure for assembling or otherwise manufacturing sealed enclosures having different port configurations. The modular system 20 includes a terminal housing 22 defining a plurality of terminal ports 24 each having a terminal port form factor 26 (i.e., a transverse cross-sectional shape/profile). One example terminal port form factor 26 for the modular system 20 is shown at FIG. 8, but others are contemplated as well. The modular system 20 also includes a first insert 28 configured to mate with the terminal ports 24. The first insert 28 defines an insert form factor 30 that matches the terminal port form factor 26. The first insert 28 includes a first insert port 32 (i.e., a first connector port having a first port configuration) compatible with a first type of ruggedized fiber optic connector 34. The modular system 20 further includes a second insert 36 (see FIG. 3) configured to mate with the terminal ports 24. The second insert defines the insert form factor 30 that matches the terminal port form factor 26. The second insert 36 includes a second insert port 38 (i.e., a second connector port having a second port configuration) that is compatible with a second type of ruggedized fiber optic connector 40. The modular system further includes a third insert 42 (see FIG. 4) configured to mate with the terminal ports 24. The third insert 42 defines the insert form factor 30 that matches the terminal form factor 26. The third insert 42 includes a third insert port 44 (i.e., a cable port) that is defined by a cable sealing arrangement 46 including a cable sealant such as a gel composition. The modular system 20 further includes a fourth insert 48 (see FIG. 6) configured to mate with the terminal ports 24. The fourth insert 48 defines the insert form factor 30 that matches the terminal port form factor 26. The fourth insert 48 includes a multi-connector port arrangement 50. In one example, the multi-connector port arrangement 50 includes two connector ports forming a dual-port arrangement, but more than 2 ports can also be provided (e.g., 3, 4, 5, 6 or more ports).

It will be appreciated that the modular system 20 provides greater flexibility for allowing the terminal housing 22 to be customized to satisfy customer demands. By selecting different insert configurations, the terminal housing 22 can be equipped with many different port configurations. The configuration of the modular system 20 also allows port configurations to be changed in the field by substituting different inserts for one another. Additionally, the modular system 20 allows for forward compatibility with new connector designs through the use of inserts that have the same generic insert form factor compatible with the terminal port form factor and that also have integrated connector ports designed to be compatible with the new connector designs.

Figure 3:
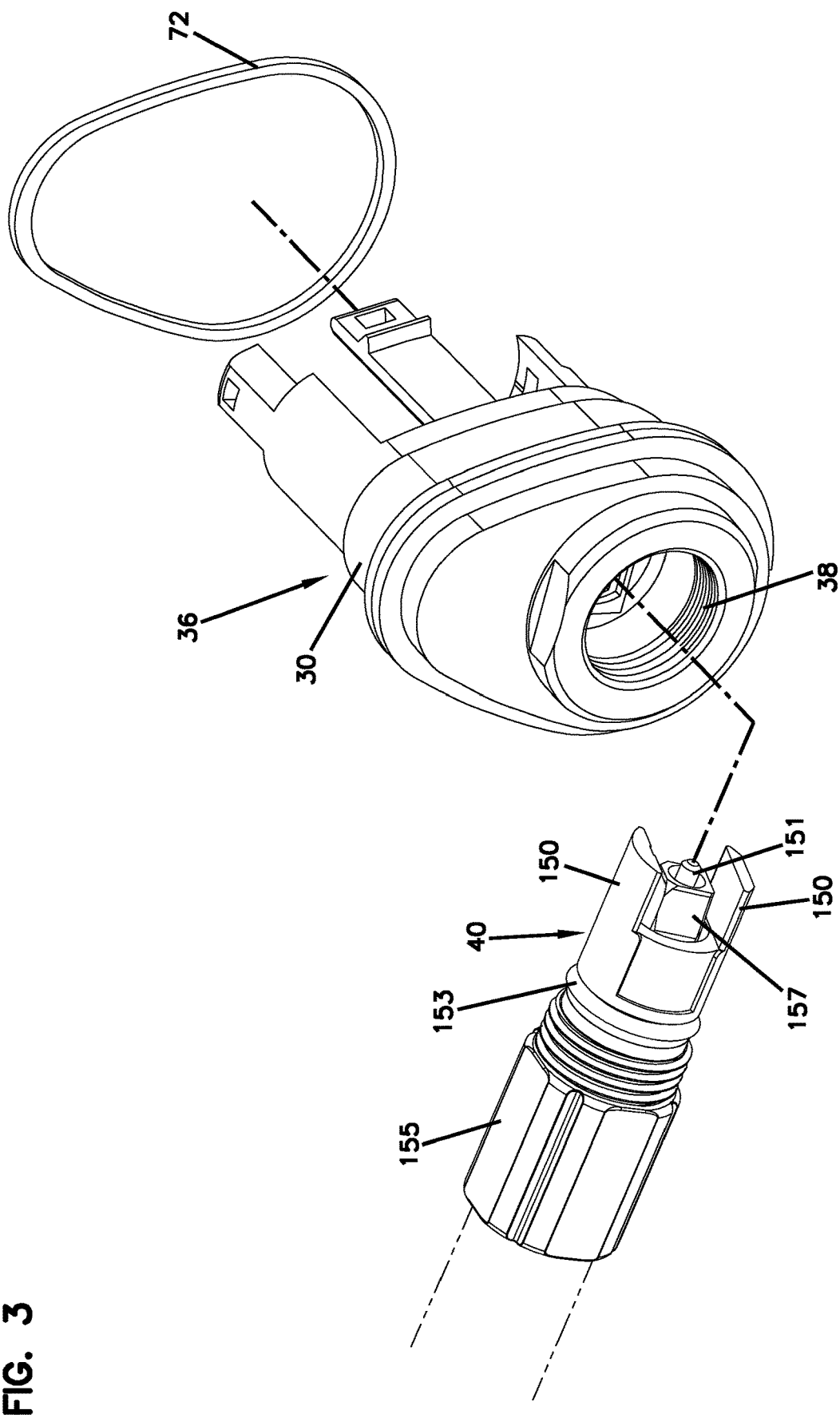
FIG. 3 illustrates a second insert that can be installed into the terminal of the modular system of FIG. 1, the insert of FIG. 3 is adapted for receiving second style of ruggedized fiber optic connector.

As is apparent from FIGS. 1 and 3, the first and second inserts 28, 36 are compatible with ruggedized fiber optic connectors having twist-to-lock coupling elements in the form of threaded couplers (e.g., coupling nuts with external threads). It will be appreciated that other inserts adapted for use in the modular system 20 can be compatible with ruggedized fiber optic connectors having other types of twist-to-lock coupling elements. For example, additional inserts compatible with the modular system 20 can be adapted to receive ruggedized connectors having bayonet-style couplers or couplers including internal threads. In other examples, the inserts may be compatible with ruggedized connectors having snap-fit couplers/latches, sliding retention clips or other retention elements.

Figure 4:
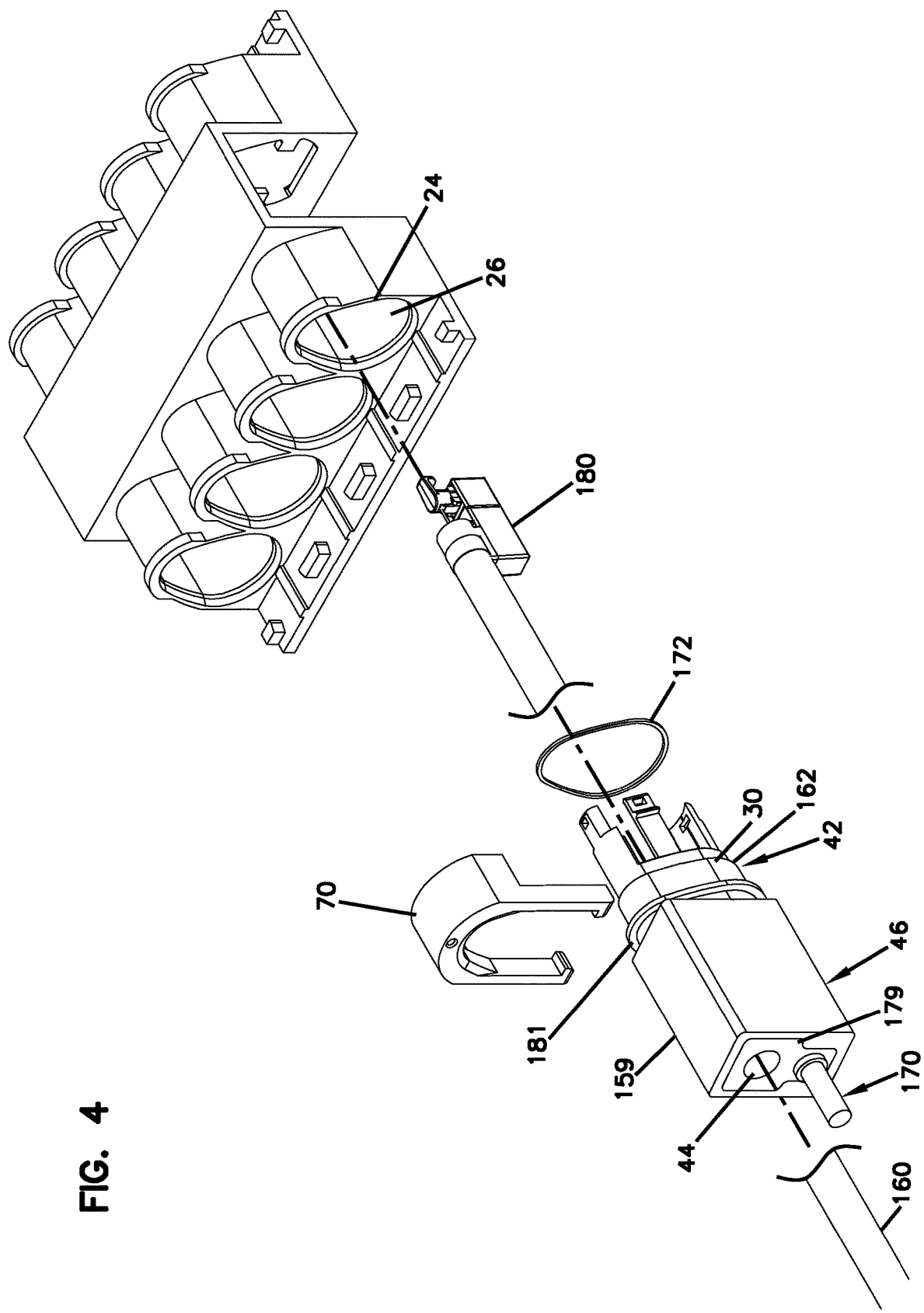
FIG. 4 illustrates a cable-sealing insert that can be installed in the terminal of the modular system of FIG. 1.
Figure 6:
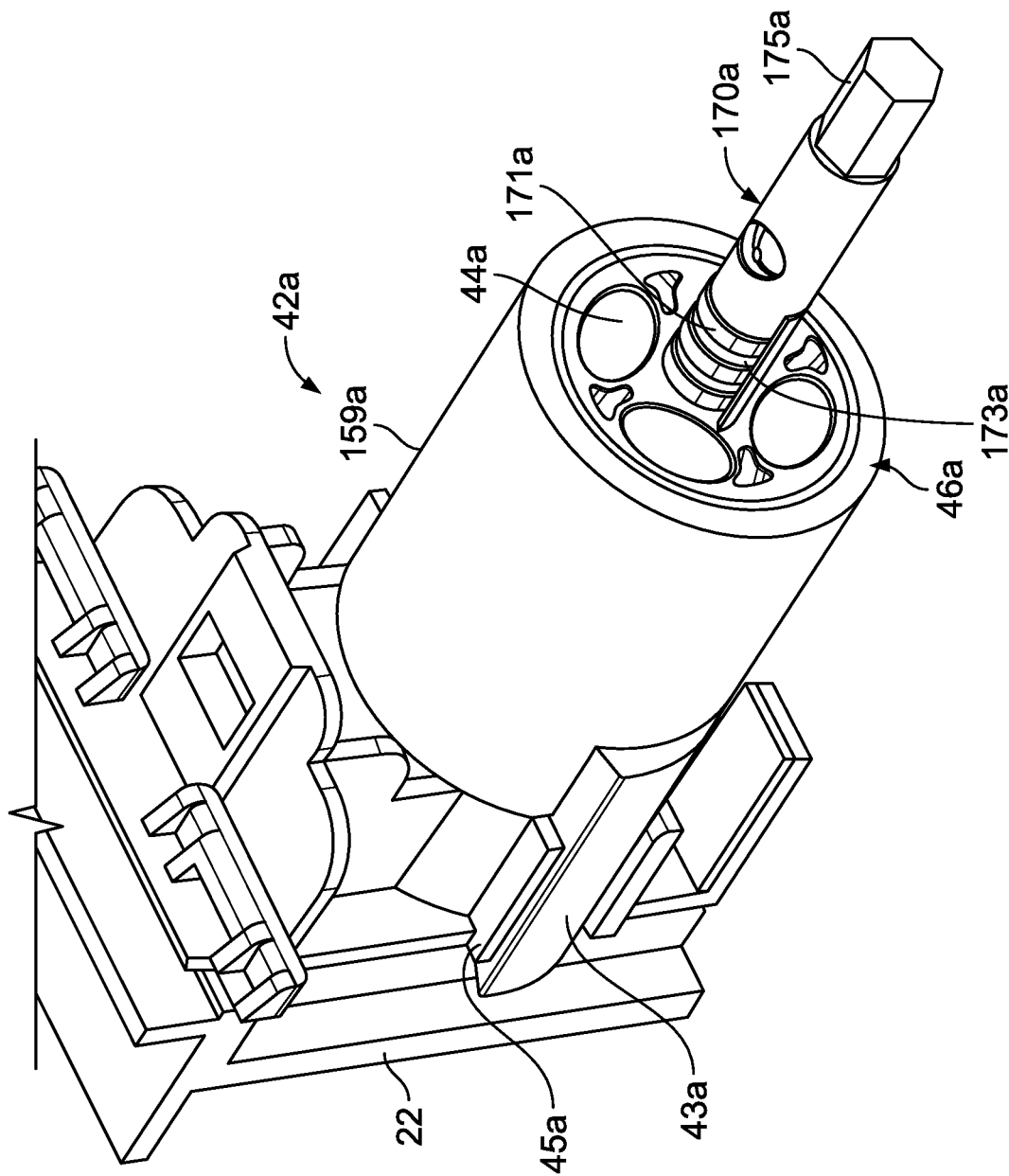
FIG. 6 illustrates a cable-sealing insert cable of receiving and sealing a plurality of cables (e.g., flat drop cables)

As is apparent from FIG. 4, the third insert 42 is depicted as being suitable for receiving a single cable. It will be appreciated that other inserts compatible with the modular system 20 can be adapted to receive multiple cables (i.e., such inserts can define multiple cable ports as shown at FIG. 6). Additionally, other inserts compatible with the modular system 20 can have cable ports of different shapes and sizes. For example, inserts having cable ports suitable for receiving flat drop cables, butterfly cables, or round cables of different outer diameters.

Figure 7:
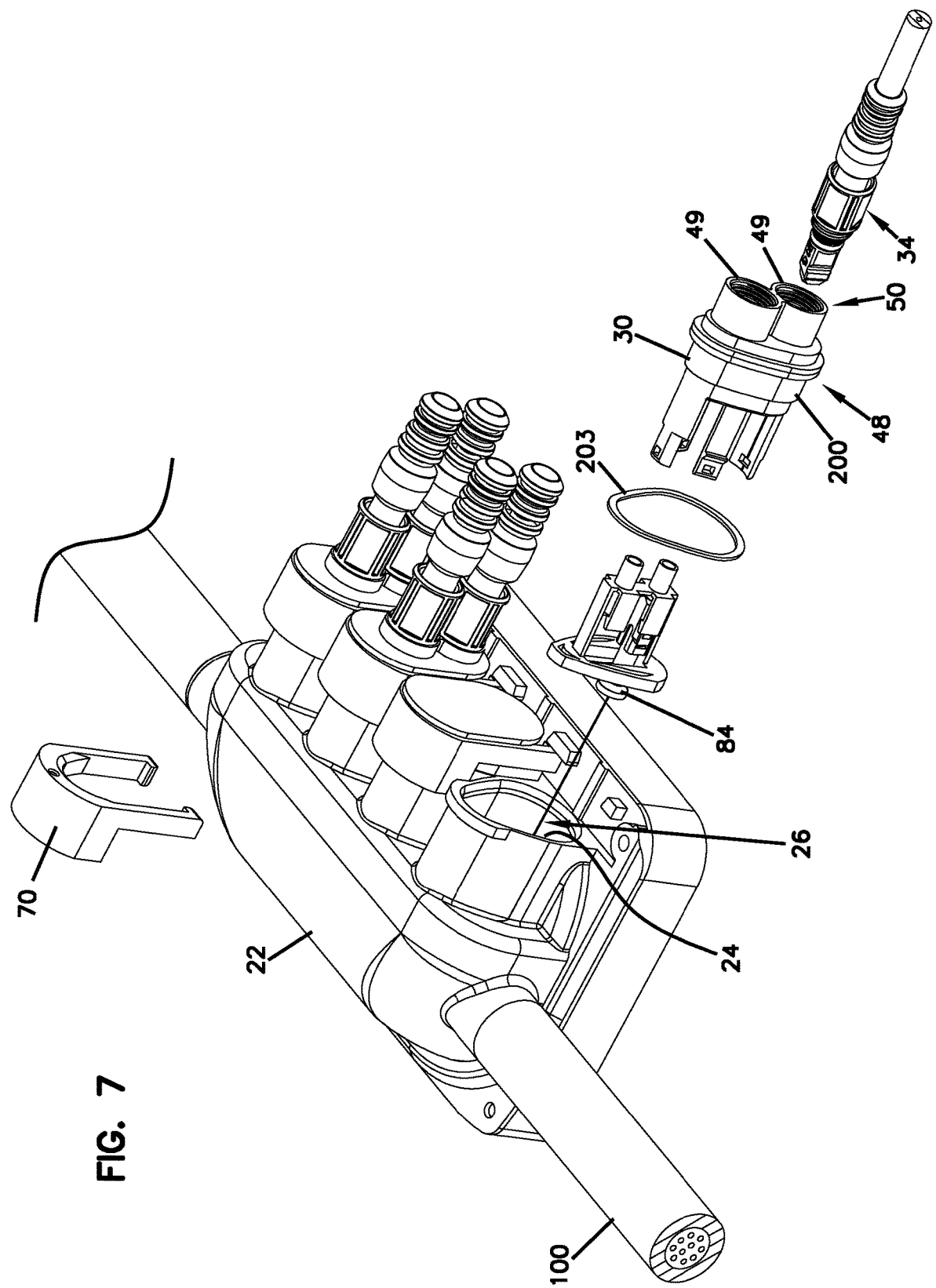
FIG. 7 illustrates the modular system of FIG. 1 with a multi-port insert in the process of being installed.

As is apparent from FIG. 7, the fourth insert 48 is depicted including two ruggedized connector ports. It will be appreciated that other inserts compatible with the modular system 20 can be provided that have more than two ruggedized connector ports.

As used herein, a ruggedized fiber optic connector is a fiber optic connector that is more robustly designed than a traditional indoor fiber optic connector such as a SC style fiber optic connector or an LC style fiber optic connector. Ruggedized fiber optic connectors are typically suitable for outdoor use. Certain ruggedized fiber optic connectors in accordance with the principles of the present disclosure are designed to be capable of withstanding pull-out loads greater than 25 pounds or greater than 50 pounds when secured within their corresponding connector ports. Certain ruggedized fiber optic connectors in accordance with the principles of the present disclosure can include rotatable (i.e., twist-to-lock) coupling elements (i.e., couplers, fasteners, retainers, etc.) for securing the ruggedized connectors within their corresponding connector ports. Example rotatable coupling elements include threaded elements and bayonet-style elements. Certain ruggedized connectors may also include snap-fit coupling elements and sliding locking clips that function as coupling elements. Ruggedized fiber optic connectors in accordance with the principles of the present disclosure can also include seals for sealing with their respective connector ports.

Referring to FIG. 1, the first insert 28 includes a plastic main body 60 defining the insert form factor 30. The plastic main body 60 also defines the first insert port 32 which is configured to receive the first type of ruggedized fiber optic connector 34. The first insert port 32 includes internal threads 62 configured to engage with corresponding external threads 64 defined by a twist-to-lock coupling element 66 of the first type of ruggedized fiber optic connector 34. The plastic main body 60 also includes an outer flange 68 that extends around a periphery of the plastic main body 60. The first insert 28 is secured in one of the terminal ports 24 by inserting the plastic main body 60 into the terminal port 24, and then sliding a locking clip 70 into engagement with the outer flange 68 such that the main plastic body 60 is axially fixed in place relative to the terminal housing 22. The first insert 28 can further include an exterior seal 72 mounted about a periphery of the plastic main body 60. When the first insert 28 is loaded within one of the terminal ports 24, the seal 72 provides peripheral sealing between the portion of the terminal housing 22 defining the terminal port 24 and the exterior surface of the plastic main body 60. Further details about the ruggedized fiber optic connector 34 are disclosed in U.S. Pat. No. 7,744,288, which is hereby incorporated by reference in its entirety.

In certain examples, the first insert 28 can also include an internal fiber optic adapter 74 fixed relative to the plastic main body 60. For example, the fiber optic adapter 74 can be connected to a plate 75 or other structure that connects to the plastic main body 60 by a snap-fit connection, an integral connection, a fastened connection, or other type of connection. As depicted, the plastic main body 60 includes retention arms 77 that fasten to the plate 75 by snap-fit connections.

Figure 2:
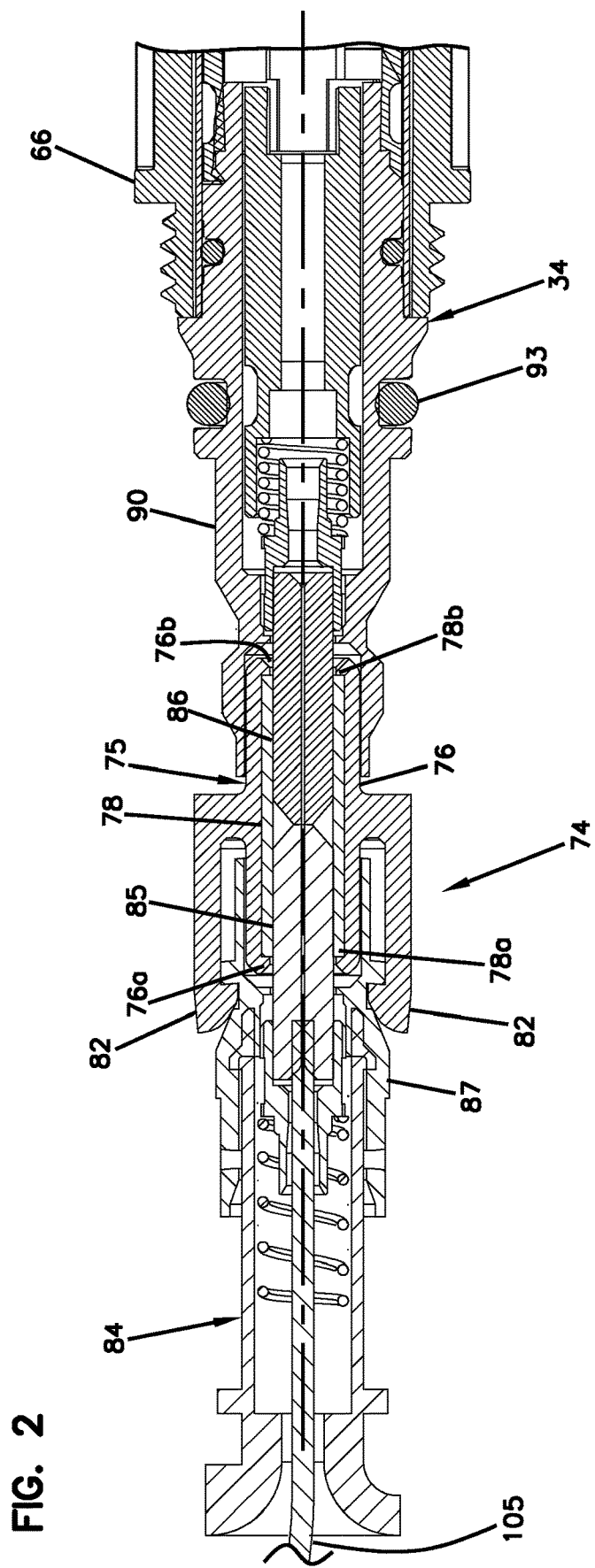
FIG. 2 is a cross-sectional view illustrating a fiber optic adapter that may be incorporated within inserts having connector ports in accordance with the principles of the present disclosure.

As shown at FIG. 2, fiber optic adapter 74 includes an adapter housing 75 having a barrel portion 76 containing a ferrule alignment sleeve 78. The barrel portion 76 has open inner and outer ends 76a, 76b for providing ferrule access to the ferrule alignment sleeve 78. Flexible latches 82 are positioned adjacent to the inner end 76a of the barrel portion 76. The ferrule alignment sleeve 78 is configured to facilitate providing an optical connection between the first type of ruggedized fiber optic connector 34 and a fiber optic connector 84 positioned within the terminal housing 22. The ferrule alignment sleeve 78 has inner and outer ends 78a, 78b. The fiber optic connector 84 includes a ferrule 85 that is received in the inner end 78a of the ferrule alignment sleeve 78 and the first type of ruggedized fiber optic connector 34 includes a ferrule 86 that is received in the outer end 78b of the ferrule alignment sleeve 78. The ferrule alignment sleeve 78 aligns the ferrules 85, 86 such that optical fibers supported by the ferrules 85, 86 are coaxially aligned with one another and typically held in physical contact with one another. In this way, optical signals can be conveyed between the fiber optic connectors 34, 84.

The flexible latches 82 of the fiber optic adapter 74 can snap within corresponding recesses or against shoulders provided on a connector body 87 of the fiber optic connector 84. In this way, latches 82 function to retain the fiber optic connector 84 in an axial position in which its corresponding ferrule 85 is retained within the ferrule alignment sleeve 78. The first type of ruggedized fiber optic connector 34 also has a connector body 90 in which its corresponding ferrule 86 is supported. The connector body 90 is retained within the first insert port 32 by the coupling element 66. This way, the coupling element 66 maintains the axial position of the connector body 90 within the first insert port 32 such that the ferrule 86 remains in proper axial position within the ferrule alignment sleeve 78. In other examples, the adapter can also include a second set of latches for engaging the connector body 90. The ruggedized fiber optic connector 34 includes an exterior seal 93 that engages an interior of the plastic main body 60.

In other examples, the plastic body 60 and the adapter 74 can be pre-mounted in the terminal at a location where the adapter 74 aligns with the terminal port. The pre-mounting can take place in the field at the time the terminal is initially installed or in factory at the time the terminal is assembled. The fiber optic connector 84 can also be pre-installed within the inner port of the adapter 74. In this type of arrangement, when the insert is installed at the terminal port at a later date to provide an upgrade or port re-configuration, the pre-installed adapter is automatically positioned with the ferrule alignment sleeve co-axially aligned with the ruggedized connector port of the insert. In this way, when the insert is added in the field at a time after initial installation, the insert can be installed in the terminal port and properly aligned with the adapter 74 and the connector 84 without requiring the interior of the terminal to be accessed (i.e., the terminal cover does not need to be removed; all necessary access is provide through the terminal port). As used herein, "access to the interior of the terminal" means access to the interior of the terminal housing via means other than a terminal port.

Referring to FIG. 1, a network fiber optic cable 100 can be routed through the terminal housing 22. The network fiber optic cable 100 can include a plurality of optical fibers 102. Selected ones of the optical fibers 102 can be accessed within the terminal housing 22. At least one of the optical fibers 102 can be coupled to the internal fiber optic connector 84. For example, the fiber optic connector 84 can be directly terminated to one of the optical fibers 102. Alternatively, the fiber optic connector 84 can be mounted at the end of a fiber pigtail 105 that is spliced to one of the optical fibers 102. In certain examples, the first type of ruggedized fiber optic connector 34 can be mounted at the end of a cable 104 such as a drop cable. In certain examples, the cable 104 can be optically connected either directly or indirectly to a subscriber location.

As described above, in certain examples, the internal fiber optic adapter 74 is pre-mounted within one of the terminal ports 24 by a skilled artisan at the time the terminal is initially installed. During initial installation, the optical fiber 102 can be accessed from the feeder cable (i.e., the pass-through cable) and the fiber optic connector 84 can be coupled to the optical fiber 102 (e.g., via a splice). The connector 84 can be pre-installed within the fiber optic adapter 74 such that its ferrule is received within the inner end 78a of the alignment sleeve 78. When it is desired to install one of the inserts 28, 36 at a later date, the dust cap of the corresponding terminal port 24 can be removed and replaced with the given insert 28, 36 from outside the terminal. As the insert 28, 36 is loaded into the given terminal port 24, the fiber optic adapter 24 is positioned at a desired location within the insert 28, 36. The insert is then secured to the terminal from outside the terminal. This type of arrangement is advantageous because it allows the modular system 20 to be upgraded or for extra capacity to be added without having to access the interior of the terminal. In this way, a skilled artisan is not required at the later date. All work can be finalized from outside the terminal. Thus, in certain examples, both mechanical attachment of the insert to the terminal and appropriate positioning of the connector 84 and adapter 74 relative to the connector port of the inert are accomplished without having to access the interior of the terminal at the time of the upgrade.

Referring to FIG. 8, the terminal port form factor 26 has a non-circular configuration. This type of configuration is advantageous because it provides a "keying" function that ensures the inserts are inserted within the terminal ports in the proper rotational orientation. In the depicted example, the terminal port form factor 26 defines a major axis 110 and a minor axis 112. The terminal port form factor 26 is asymmetric relative to at least one of the major and minor axes 110, 112. For example, as depicted, the terminal port form factor 26 is symmetric about the major axis 110 and asymmetric about the minor axis 112. In the depicted example, the terminal port form factor 26 is generally pear-shaped.

FIG. 3 shows the second insert 36 that is compatible with the second type of ruggedized fiber optic connector 40. It will be appreciated that the second insert port 38 of the second insert 36 is larger in diameter than the first insert port 32. Similar to the first insert port 32, the second insert port 38 is internally threaded. Additionally, similar to the first insert 28, the second insert 36 is configured to fit within the terminal ports 24 and can contain an internal fiber optic adapter. The second type of ruggedized fiber optic connector 40 includes opposing paddles 150 for protecting a ferrule 151 of the second type of ruggedized fiber optic connector 40. The paddles 150 also provide a "keying" function that ensures proper relative rotational positioning of the fiber optic connector 40 within the second insert port 38. The second type of ruggedized fiber optic connector 40 also includes an exterior seal 153, a threaded coupler 155 for engaging the threads of the second insert port 38 and a connector body 157 forming a plug end at which the ferrule 151 is supported. With the exception of the specific ruggedized connector interface provided at the second insert port 38, the second insert 36 can have the same general configuration described with respect to the first insert 28.

Figure 5:
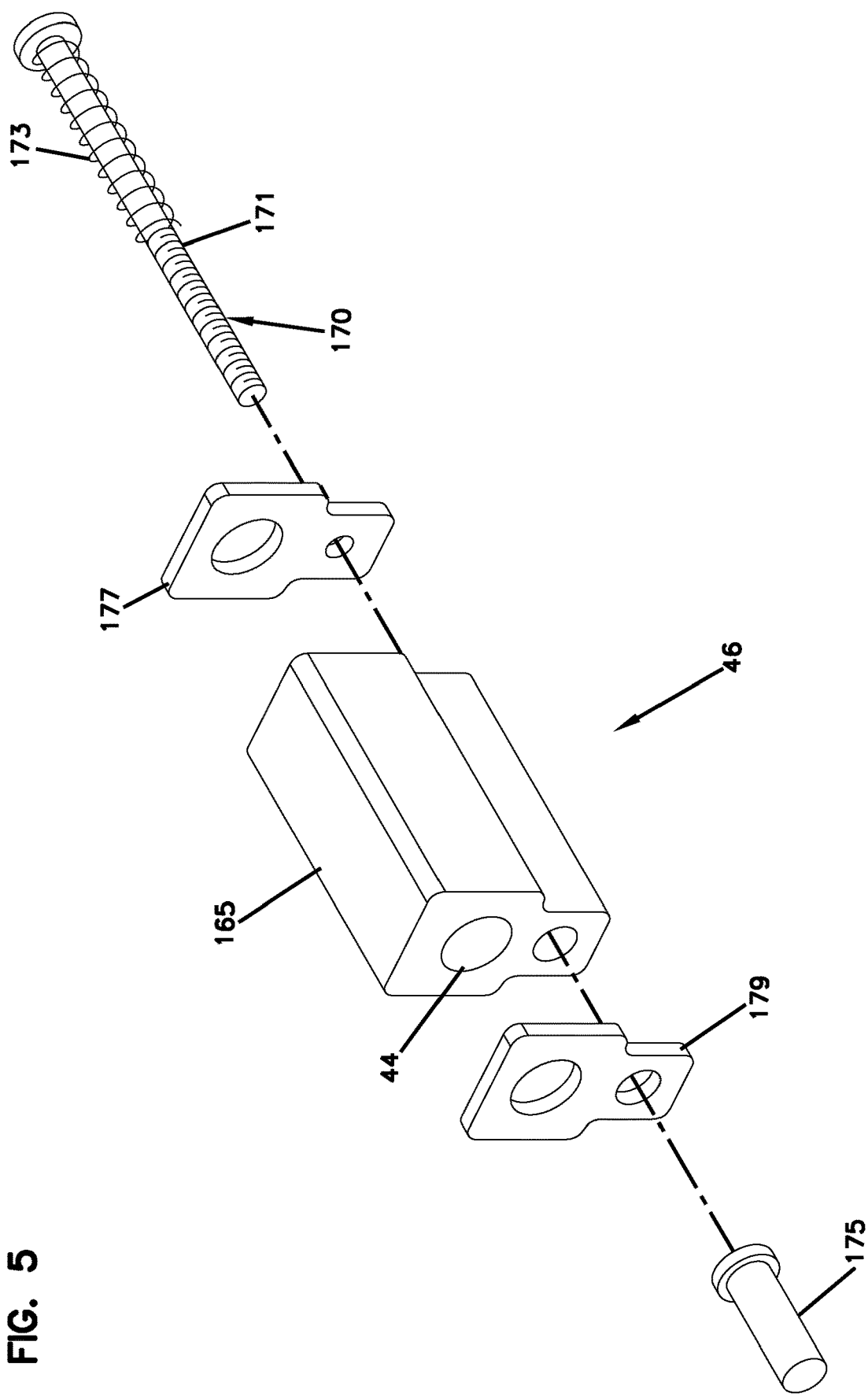
FIG. 5 is an exploded view of a portion of the cable sealing insert of FIG. 5.

Referring to FIG. 4, the third insert 42 is configured for providing a seal directly about a fiber optic cable 160. Thus, the third insert port 44 is a cable port rather than a connector port. The third insert 42 includes an insert main body 162 that carries the cable sealing arrangement 46. The cable sealing arrangement 46 includes a cable sealing housing 159 that contains a cable sealing block 165 (i.e., a cable sealant see FIG. 5) that defines the third insert port 44. The cable sealing housing 159 can be connected to or integrated with the insert main body 162. In certain examples, the cable sealing block 165 has a cable sealing composition that includes a cable sealing gel such as an oil extended polymer. The polymer may, for example, comprise an elastomer, or a block copolymer having relatively hard blocks and relatively elastomeric blocks. Example copolymers include diene, butadiene, or styrene isoprene di-block or tri-block copolymers. In still other examples, the polymer of the gel may include one or more styrene ethylene propylene styrene block copolymers. Example extender oils used in example gels may, for example, include hydrocarbon oils.

The cable sealing arrangement 46 can include an actuator 170 for pressurizing the cable sealing block 165 within the cable sealing housing 159 and for maintaining the cable sealing block 165 under spring pressure during cable sealing. The actuator 170 can include a shaft 171, a spring 173 and an actuation member 175 that is threaded on the shaft 171 to compress the spring 173 and apply spring load to the cable sealing block 165 to pressurize the cable sealing block 165. In certain examples, the cable sealing block 165 is mounted between inner and outer 177, 179 plates that are forced together by the actuator 170 to place the cable sealing block 165 under pressure during sealing.

An exterior seal 172 can be mounted about an exterior of the insert main body 162 for providing an environmental seal between the insert main body 162 and the terminal housing 22 within one of the terminal ports 24. The exterior seal 172 is separate from the cable sealing block 165 and is not pressurized by the actuator 170. Instead, the seal 172 is compressed when the main insert body is inserted into the terminal port 24. A cable anchoring structure 180 can also be provided for fixing (i.e., clamping or otherwise axially retaining) the cable 160 within the terminal 22. In certain examples, the cable anchoring structure 180 can allow a jacket of the cable to be clamped in place. In other examples, strength members of the cable (e.g., reinforcing yarn such as aramid or fiber reinforced plastic rods) can be tied, crimped or otherwise secured to the anchoring structure 180. In still other examples, cable tie-downs can be used. In certain examples, the cable anchoring structure 180 can be coupled to or incorporated as part of the insert 46.

In certain examples, the third insert 42 can be configured such that the cable 160 can be routed through the cable sealing block 165 and the cable sealing block 165 can be pressurized within the cable sealing housing 159 before the third insert 42 is loaded into one of the terminal ports 24 of the terminal 22. The cable sealing operations and sealant actuation can take place offline from the terminal housing 22. After cable sealing has been accomplished, the insert 42 can be loaded into one of the terminal ports 24 where sealing between the insert main body 162 and the terminal housing 22 is provided by the separate exterior seal 172 about the exterior of the insert main body 162.

In certain examples, the third insert 42 includes only a single cable port. In certain examples, the insert main body 162 defines a non-circular form factor. In certain examples, the insert main body 162 defines a form factor that matches the terminal port form factor 26 described with respect to FIG. 8. In certain examples, the third insert 42 is secured within one of the terminal ports 24 by one of the locking clips 70. The locking clip 70 can engage a flange 181 defined on the insert main body 162. In certain examples, locking clip 70 can slide between a retaining position and a non-retaining position. In certain examples, locking clip 70 allows any of the inserts to be secured within the terminal housing 22 and released from the terminal housing without the use of a tool.

FIG. 6 shows another cable sealing insert 42a that is configured for receiving and sealing a plurality of fiber optic cables. The insert 42a defines a plurality of cable sealing insert ports 44a. The insert 42a includes an insert main body that carries a cable sealing arrangement 46a. The cable sealing arrangement 46a includes a cable sealing housing 159a that contains a cable sealing block (e.g., a cable sealant such as gel similar to that disclosed with respect to the example of FIG. 5) that defines the insert ports 44a. The cable sealing housing 159a can be connected to or integrated with the insert main body.

The cable sealing arrangement 46a can include an actuator 170a for pressurizing the cable sealing block within the cable sealing housing 159a and for maintaining the cable sealing block under spring pressure during cable sealing. The actuator 170a can include a shaft 171a, a spring 173a and an actuation member 175a that is threaded on the shaft 171a to compress the spring 173a and apply spring load to the cable sealing block to pressurize the cable sealing block. In certain examples, the cable sealing block is mounted between inner and outer plates that are forced together by the actuator 170a to place the cable sealing block under pressure during sealing.

An exterior seal can be mounted about an exterior of the insert main body for providing an environmental seal between the insert main body and the terminal housing 22 within one of the terminal ports 24. The exterior seal is separate from the cable sealing block and is not pressurized by the actuator 170a. Instead, the seal is compressed when the main insert body is inserted into the terminal port 24. A cable anchoring structure, as described above with respect to the example of FIGS. 4 and 5, can also be provided for fixing (i.e., clamping or otherwise axially retaining) the cables within the terminal 22.

Figure 9:
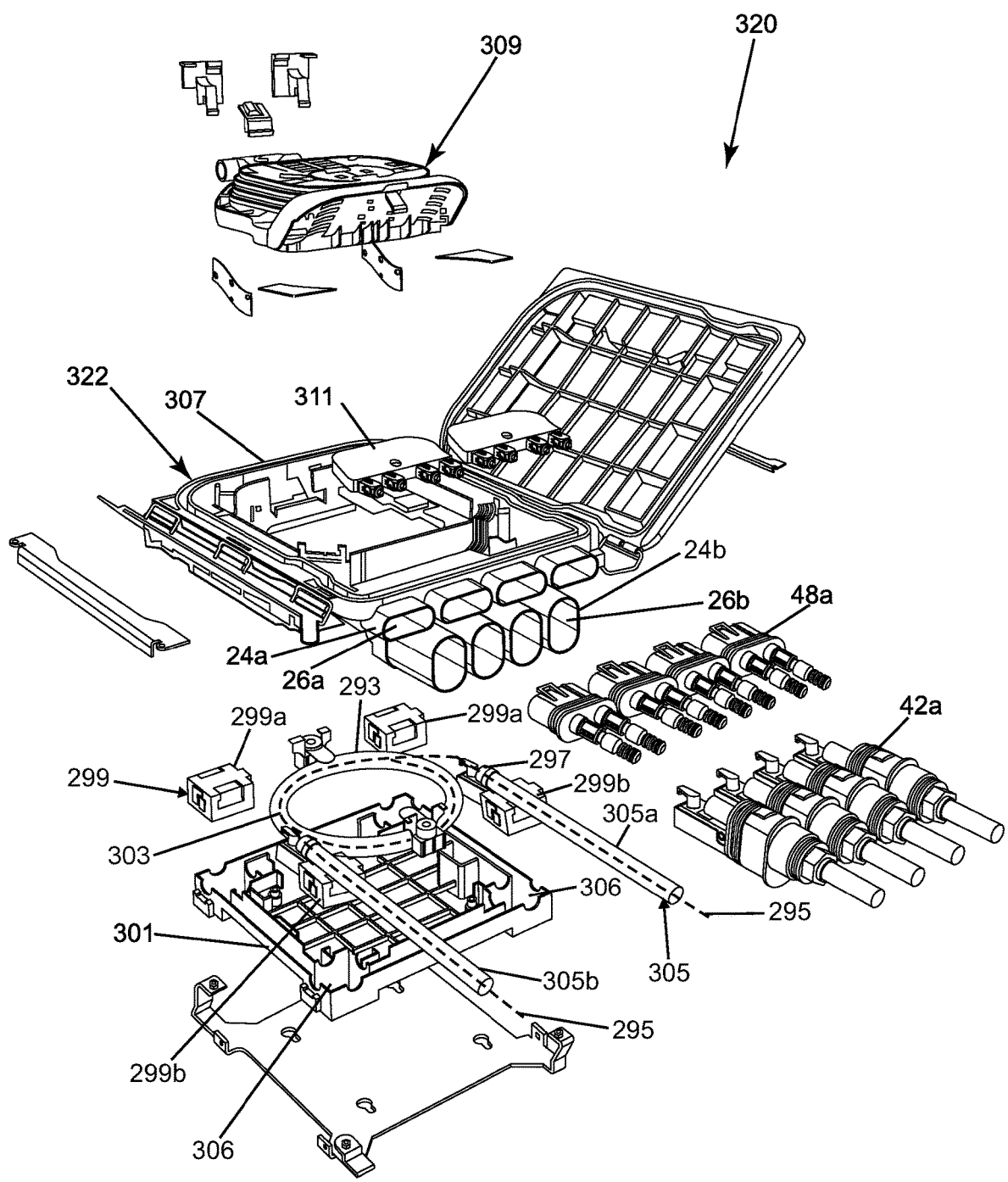
FIG. 9 is an exploded view of a modular system in accordance with the principles of the present disclosure.
Figure 24:
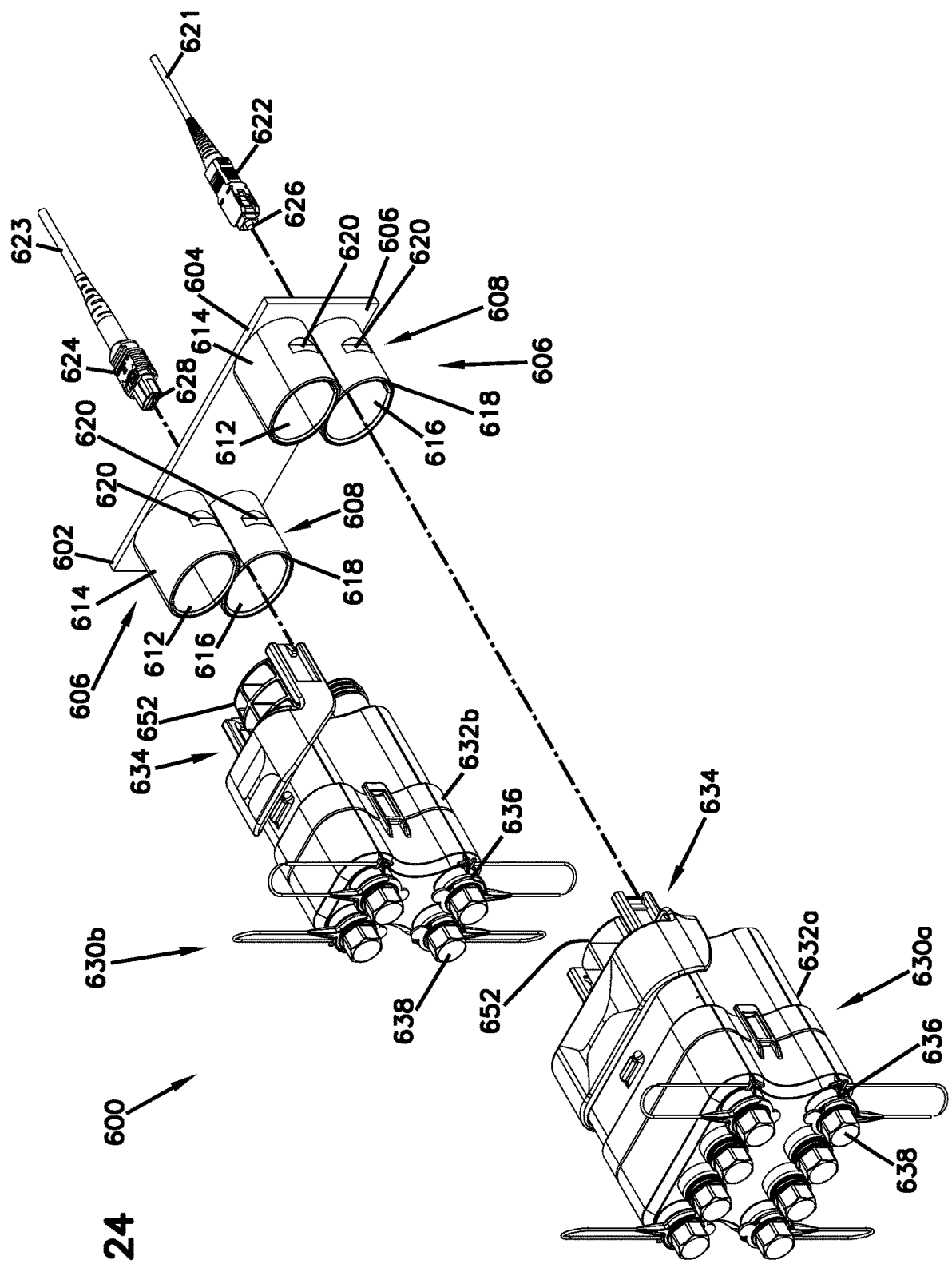
FIG. 24 is a perspective view of a further modular system in accordance with the principles of the present disclosure, the modular system includes a terminal housing and add-on modules that mount to the terminal housing.

In certain examples, the insert 42a can be configured such that the cables can be routed through the cable sealing block and the cable sealing block can be pressurized within the cable sealing housing 159a before the insert 42a is loaded into one of the terminal ports 24 of the terminal 22. The cable sealing operations and sealant actuation can take place offline from the terminal housing 22. After cable sealing has been accomplished, the insert 42a can be loaded into one of the terminal ports 24a where sealing between the insert main body and the terminal housing is provided by the separate exterior seal about the exterior of the insert main body. It will be appreciated that the insert main body and the seal of the insert 42a can have the same configuration as the insert body 162 and the seal 172 or the insert 42. Rather than a slide clip, the insert 42a include flexible latch arms 43a for securing the insert 42a to the terminal 22. The depicted terminal of FIG. 6 has been modified to include catches 45a (i.e., shoulders, lips, etc.) to engage with or otherwise accommodate and mechanically interface with the latch arms 43a. It will be appreciated the insert main body can also include other form factors so as to be compatible with other terminal port form factor shapes (e.g., racetrack shaped as shown in the example of FIG. 9 or more oval, elliptical or obround as shown in the example of FIG. 24).

The fourth insert 48 of FIG. 7 defines a plurality of insert ports 49. In certain examples, the insert ports can include two connector ports each adapted for receiving a ruggedized fiber optic connector (e.g., the first type of ruggedized connector 34). In certain examples, each of the insert ports 49 includes structure for interfacing with a twist-to-lock coupler of a mating ruggedized fiber optic connector. Example constructions can include internal threads within the ports, external threads around exteriors of the ports, and bayonet-style interface structures. The insert ports 49 are defined by an insert main body 200. The insert main body 200 can include an exterior flange 201 configured to interface/engage with the locking clips 70. The insert main body 200 can support or carry multiple fiber optic adapters of the type previously described that respectively coaxially align with each of the insert ports 49. The insert main body 200 is configured to fit within the terminal ports 24 and has a form factor that matches the terminal port form factor 26. An exterior seal 203 can be mounted about an exterior of the main insert body 200. The seal 203 functions to provide sealing between the main insert body 200 and the portion of the terminal housing 22 defining the terminal ports 24. In certain examples, the configuration of the fourth insert 48 allows multiple fiber optic connector ports to be provided for each individual terminal port 24 in the terminal housing 22. This is advantageous because one exterior sealing member (e.g., seal 203) and one fastening element (e.g., a locking clip 70) can be used to secure and seal more than one ruggedized connector port with respect to the terminal housing 22. In the depicted example, two of the connector ports are defined by the insert main body.

In various examples disclosed herein, seals are provided about the various insert bodies or interface portions of add-on modules to provide sealing with the corresponding terminal housing. It will be appreciated that the seals can be a radial seals or a face seals (i.e., axial seals). Radial seals are compressed radially relative to an insertion axis when the inserts are inserted into the terminal ports. Face seals are compressed axially when the inserts are inserted into the terminal ports. In certain examples, the seals are carried with the inserts. In other examples, the seals may be incorporated into the terminal or mounted at or within the terminal ports.

In the embodiments described above, slidable locking clips 70 are used to secure the inserts within the terminal ports 24. The clips can slide in a direction perpendicular to axes of the terminal ports. In other examples, the inserts can include snap-fit structures such as latches that engage corresponding catches on the terminal to secure the inserts within the terminal ports 24. In still other examples, latches can be provided on the terminal for engaging corresponding catches on the inserts. In still other examples, rotatable couplers such as threaded couplers or bayonet-style couplers can be used.

Aspects of the present disclosure relate to a modular system that allows for a delayed deployment model used to build out a fiber optic network. In certain examples, a time-phased construction can be used in which the installation of certain telecommunications components (e.g., fiber optic adapters, optical power splitters, wavelength division multiplexers (e.g., coarse or dense), break-out modules, indexing components, etc.) is delayed until such components will be used to provide service to an actual customer. The components can take the form of add-on modules that are added to the terminal either inside or outside the terminal. In this way, the cost associated with certain optical components can be delayed until it is required by consumer demand. Additionally, the modular configuration allows the system to provide both backward and forward compatible. For example, by utilizing a standard insert form factor, inserts having new technology or new types of connector configurations can be easily integrated into existing field installed terminal boxes without requiring the terminal boxes to be changed out. Moreover, aspects of the present disclosure allow the system to be readily adapted to be compatible with different geo-demographic characteristics. For example, different sections of a given network can be customized to match the customer density of the surrounding geographic area. Furthermore, the modularity of aspects of the present disclosure enable scalability to topology, take-rate, geo-demographics and installer skill level.

As indicated herein, certain components can provide indexing functionality. In this regard, example components that provide indexing functionality are disclosed at U.S. patent application Ser. No. 14/285,949, which is hereby incorporated by reference in its entirety.

Figure 10:
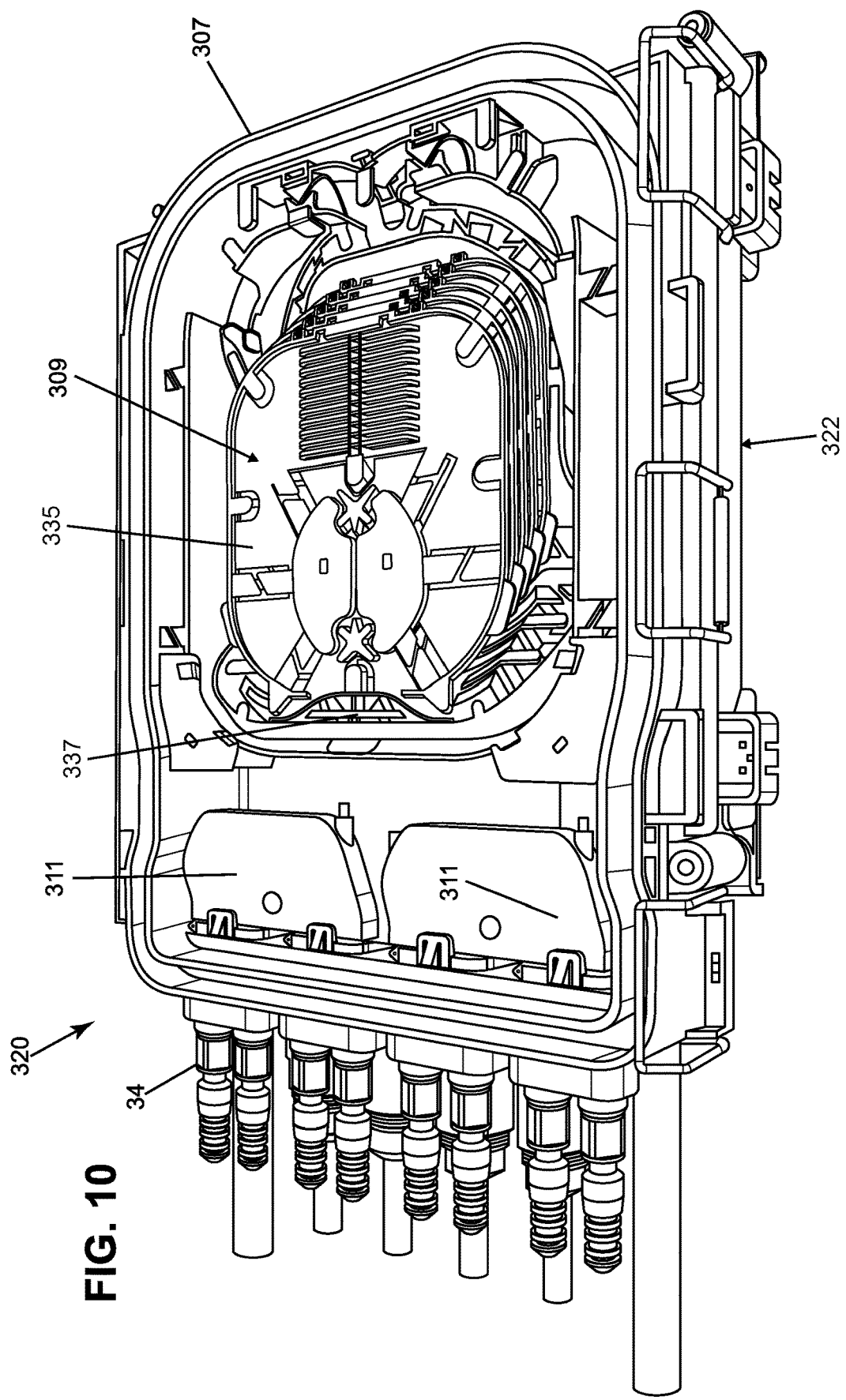
FIG. 10 is a partially assembled view of the modular system of FIG. 9 with a tray assembly shown in a stowed/closed position.
Figure 11:
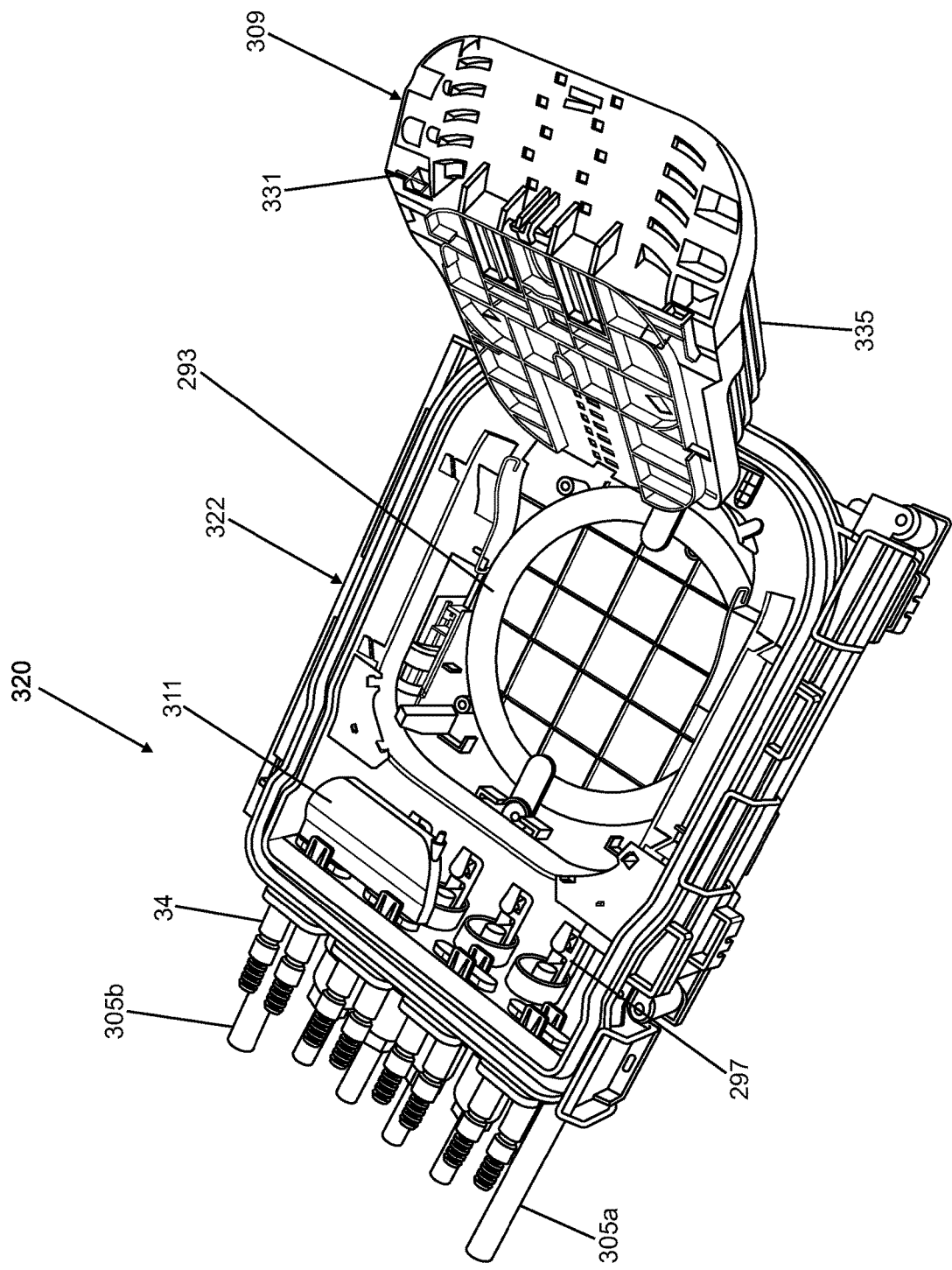
FIG. 11 shows the modular system of FIG. 10 with the tray assembly pivoted to an open position.

FIG. 9-11 illustrate another modular system 320 including a terminal housing 322 defining a first plurality of terminal ports 24a each having a first terminal port form factor 26a and second plurality of terminal ports 24b each having a terminal port form factor 26b. The form factors 26a, 26b are both generally race-tracked shape. The terminal port form factors 26a, 26b are each longer along a major axis and shorter along a minor axis. Additionally, the terminal port form factors 26a, 26b are symmetric about their major axis and their minor axis. The terminal port form factors 26a, 26b differ in that the terminal port form factor 26b is larger than the terminal port form factor 26a.

In certain examples, the first terminal ports 24a can be configured to receive both single port and multi-port inserts. As shown, inserts 48a each having two ruggedized ports (i.e., duplex inserts) are shown installed in the ports 24a. It will be appreciated that the inserts can have insert form factors that match the terminal port form factor 26a. The ruggedized ports defined by the inserts can be configured to engage corresponding fastening elements of ruggedized connectors such as threaded nuts, threaded sleeves, bayonet-style or other types of couplers. Except for the shape of the insert form factor, inserts compatible with the ports 24a can have similar constructions as any of the first, second and fourth inserts 28, 36, and 48. Inserts having the form factor compatible with the ports 24 can also define ruggedized ports compatible with other types and style of connectors including both single fiber ruggedized connectors and multi-fiber ruggedized connectors.

The terminal ports 24b are adapted to receive cable sealing inserts 42a adapted for providing a seal directly about a fiber optic cable. It will be appreciated that such inserts 42a, can have a configuration similar to the third insert 42, but can define an insert form factor compatible with the port form factor 26b.

The terminal housing 322 includes a base 301 for managing a fiber loop 303 of a pass-through cable 305 (i.e., feeder cable). Entrance and exit points of the pass-through cable 305 can be sealed by sealing units 299 that mount at sealing locations 306 defined between the base 301 and a mid-housing 307 (i.e., an intermediate housing piece). A first perimeter seal can be provided between the base and the mid-housing and a second perimeter seal can be provided between the mid-housing and a cover. The cover can be opened to provide access to a primary access opening defined at the top of the mid-housing 397. The cover can be pivotally connected to the mid-housing by a hinge. The sealing units 299 preferably include gel and each optionally have a wrap-around configuration that can optionally include two separate volumes 299a, 299b of sealant between which the section of cable desired to be sealed is routed. The sealing locations 306 can include sealing units including gel or other sealant. The enclosure can also include cable anchoring structures 297 (e.g., cable clamps, clips, tie-downs, fasteners, cable strength member anchors, etc.) for anchoring the pass-through cable adjacent the entrance and exit points. The terminal ports 24a, 24b are defined by the mid-housing 307, but could also be defined elsewhere also. A fiber management tray assembly 309 mounts within the terminal housing 322. The tray assembly 309 can include trays for managing optical fibers accessed from the pass-through cable 305 and routed to optical components such as optical splices, optical splitters, wavelength division multiplexers, etc. supported on the trays. In the trays, the optical fibers can be spliced to connectorized pigtails routed to the terminal ports 24a.

The pass-through cable 305 includes first and second cable sections 305a, 305b that can be or are routed into the enclosure preferably each through a separate sealing unit 299. The cable sections 251, 253 can be arranged in a butt style (where both enter/exit the enclosure at the same side of the enclosure), an in-lines style (where the cable sections are in-line and enter/exit the enclosure though opposite side of the enclosure), and an offset style (where the cable sections are offset (i.e., not co-axially aligned from each other and enter/exit the enclosure through opposite sides of the enclosure). Optical fibers 295 of the pass-through cable 305 that extend between the cable sections 305a, 305b can be managed and stored within the enclosure. The optical fibers can be routed in along a storage loop 293 within the enclosure. The storage loop 293 can be defined by a defined loop structure (e.g., a fixed-shaped ring, housing or tube defining a continuous path such as generally circular shape, race-track shape, elliptical shape, obround shape, etc.), by a spooling or coiling structure, by bend radius limiters or by other fiber guide structures. Preferably, the cable jacket has been removed from the optical fibers 295 in the region between the sections 305a, 305b. Some of the optical fibers 295 can be accessed within the enclosure for splicing or connectorization. The remainder of the fibers 295 can pass through the enclosure and run uninterrupted between the first and second cable sections 305a, 305b. The cable sections 305a, 305b can be anchored or fixed to the enclosure (preferably to the base) adjacent to the sealing units. For example, the cable sections can be clamped, strapped or fastened to cable fixation structures 297 that preferably attach or mount to the housing of the enclosure such as to the base, for example. Preferably the fixation structures 297 attach to the housing via snap-fit connections. For ease of access, the cable sections can be secured to the cable fixation structures 297 before the fixation structures 297 are secured to the housing, and the cable fixation structures 297 can be secured to the housing after the cable sections have been secured to the cable fixation structures 297. Sealing units have not been shown for the two back sealing unit mounts.

The mid-housing 307 attaches to the base 301 to form a combined interior of the enclosure. As indicated above, a perimeter seal is disposed between the base and the mid-housing to environmentally seal the combined interior. When the mid-hosing 307 is attached to the base 301, the cable loop storage is accessible through the mid-housing 307. The cover attaches and environmentally seals to the mid-housing 307 to inhibit access to the combined interior. In certain implementations, the cover is pivotally coupled to the mid-housing at a hinge. In certain examples, the cover is clamped to the mid-housing 307.

The mid-housing housing 307 defines one or more terminal ports that provide access to an interior of the enclosure. In certain implementations, the terminal ports face in a common direction as the cable ports through which the cable portions of the pass-through cable extend. In some implementations, the terminal ports of the mid-housing 307 are disposed in a plurality of rows. In certain implementations, the rows of terminal ports include a first row and a second row. The first row can be located closer to the base and the second row can be located closer to the cover. In an example, the ports of the first row are larger than the ports of the second row. In another example, the ports of the first row are elongated along a different orientation than the ports of the second row.

Figure 41:
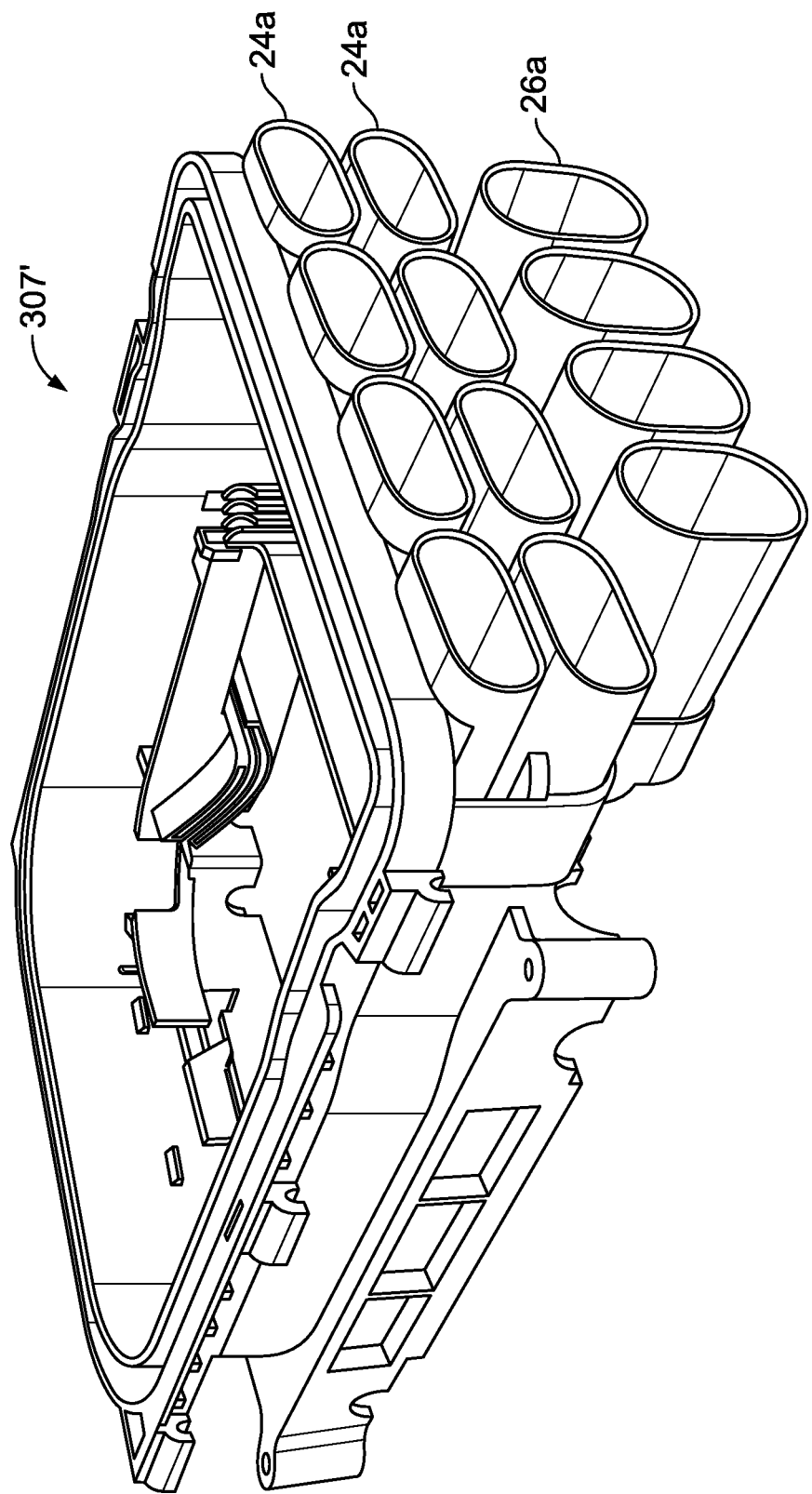
FIG. 41 shows another terminal housing in accordance with the principles of the present disclosure with the cover removed.
Figure 42:
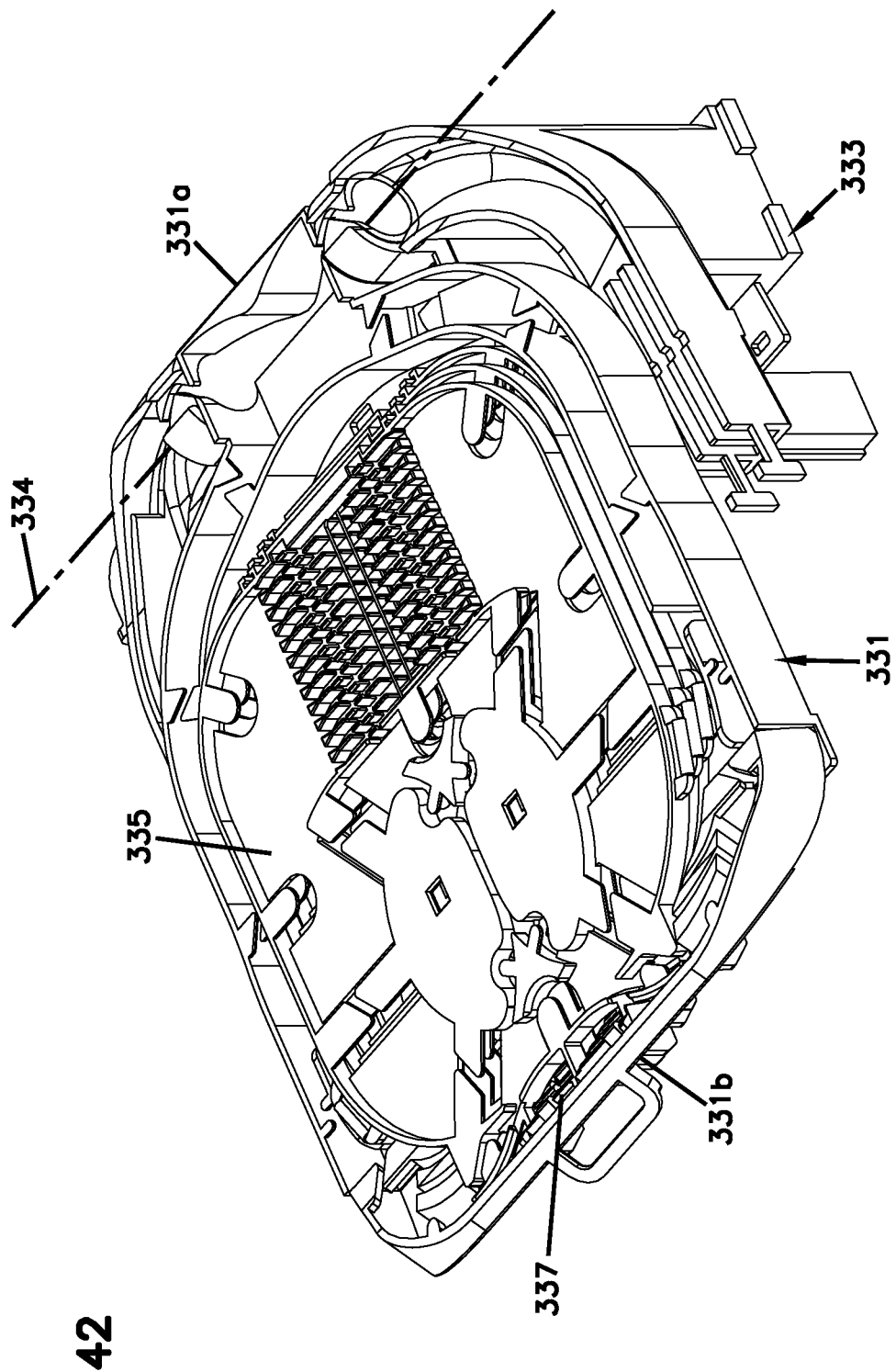
FIG. 42 depicts a fiber management tray assembly in accordance with the principles of the present disclosure.
Figure 43:
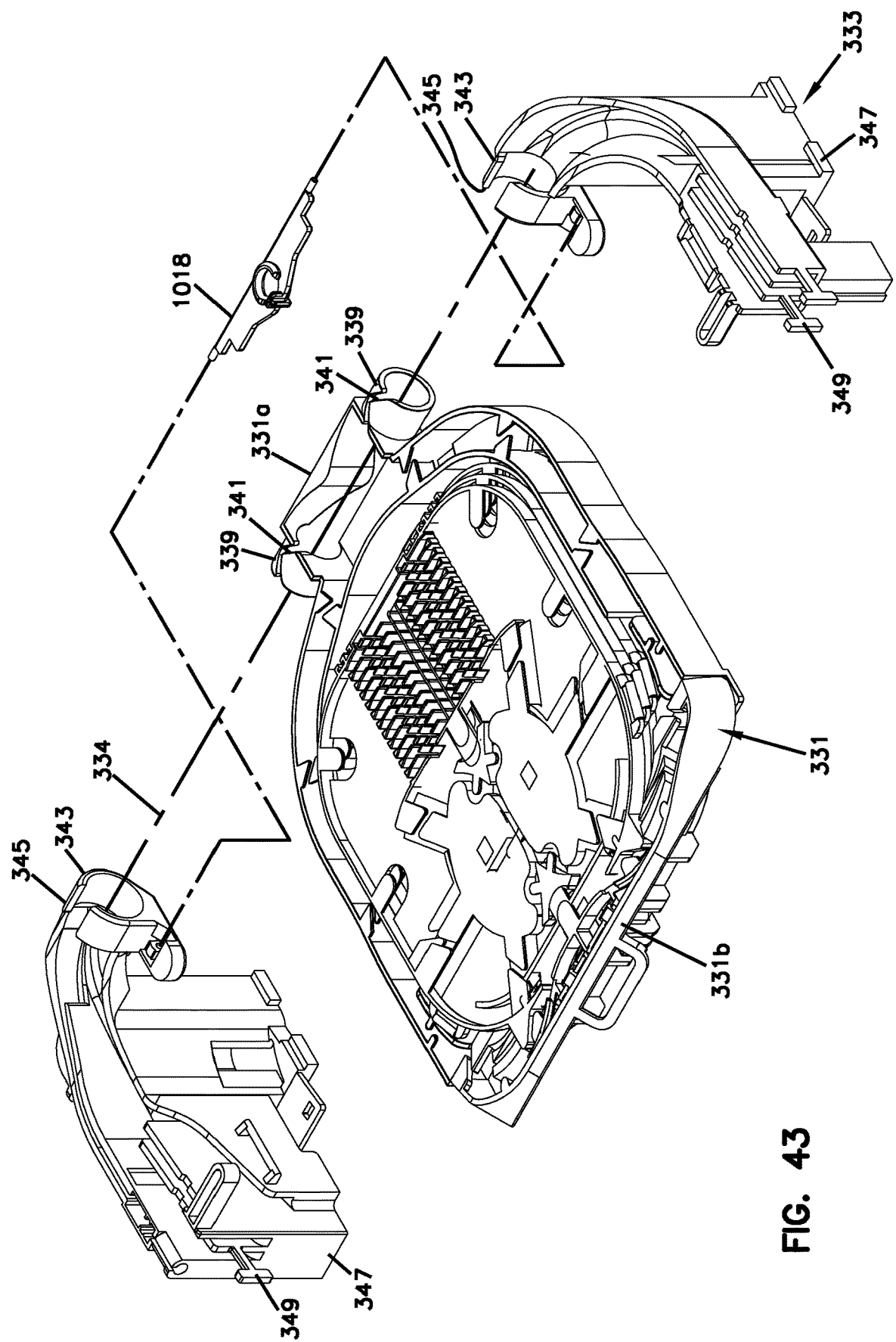
FIG. 43 is an exploded view of the fiber management tray assembly of FIG. 42.
Figure 44:
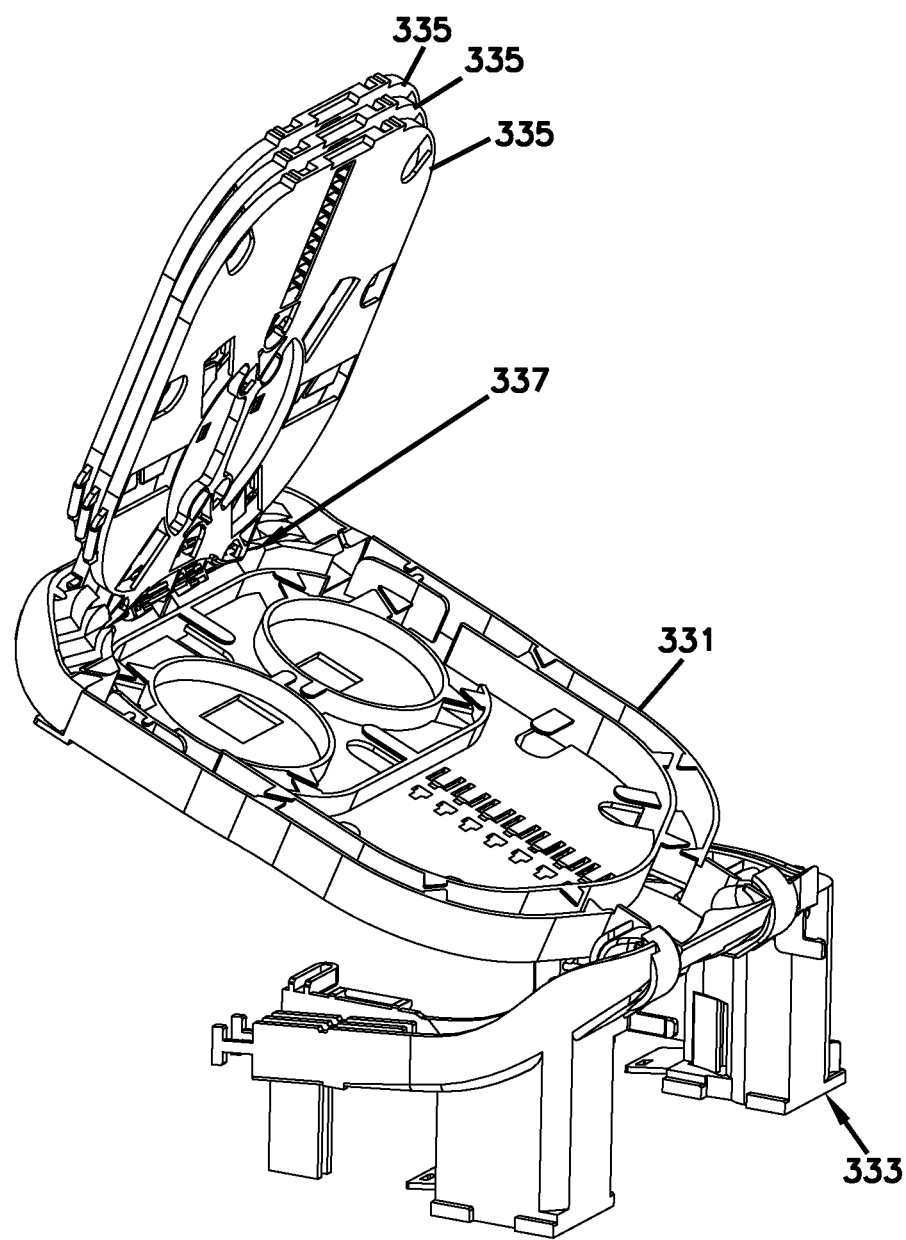
FIG. 44 shows the fiber management tray assembly of FIG. 42 in a pivoted orientation.
Figure 45:
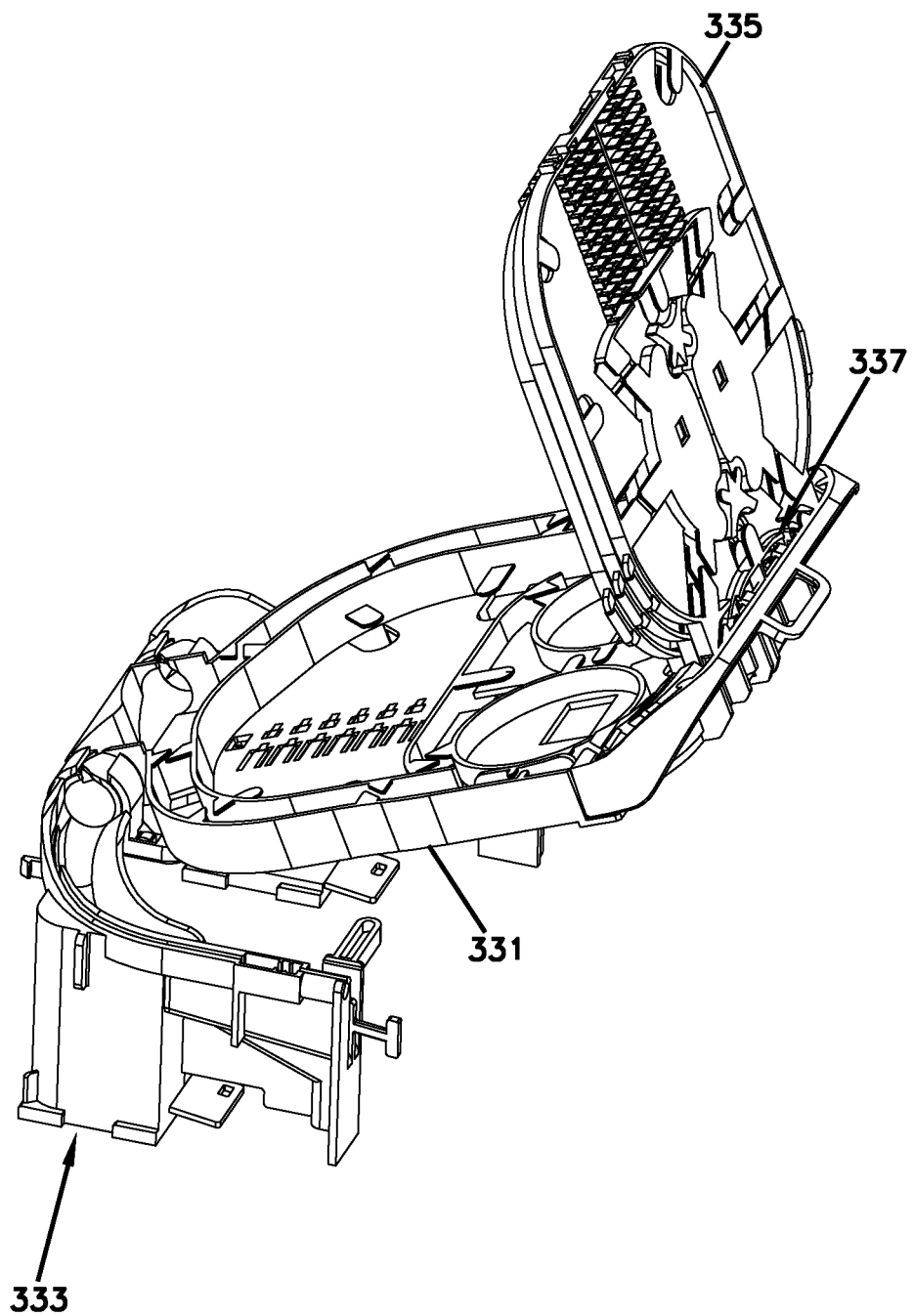
FIG. 45 is another view of the fiber management tray assembly of FIG. 42 in the pivoted orientation of FIG. 44.
Figure 46:
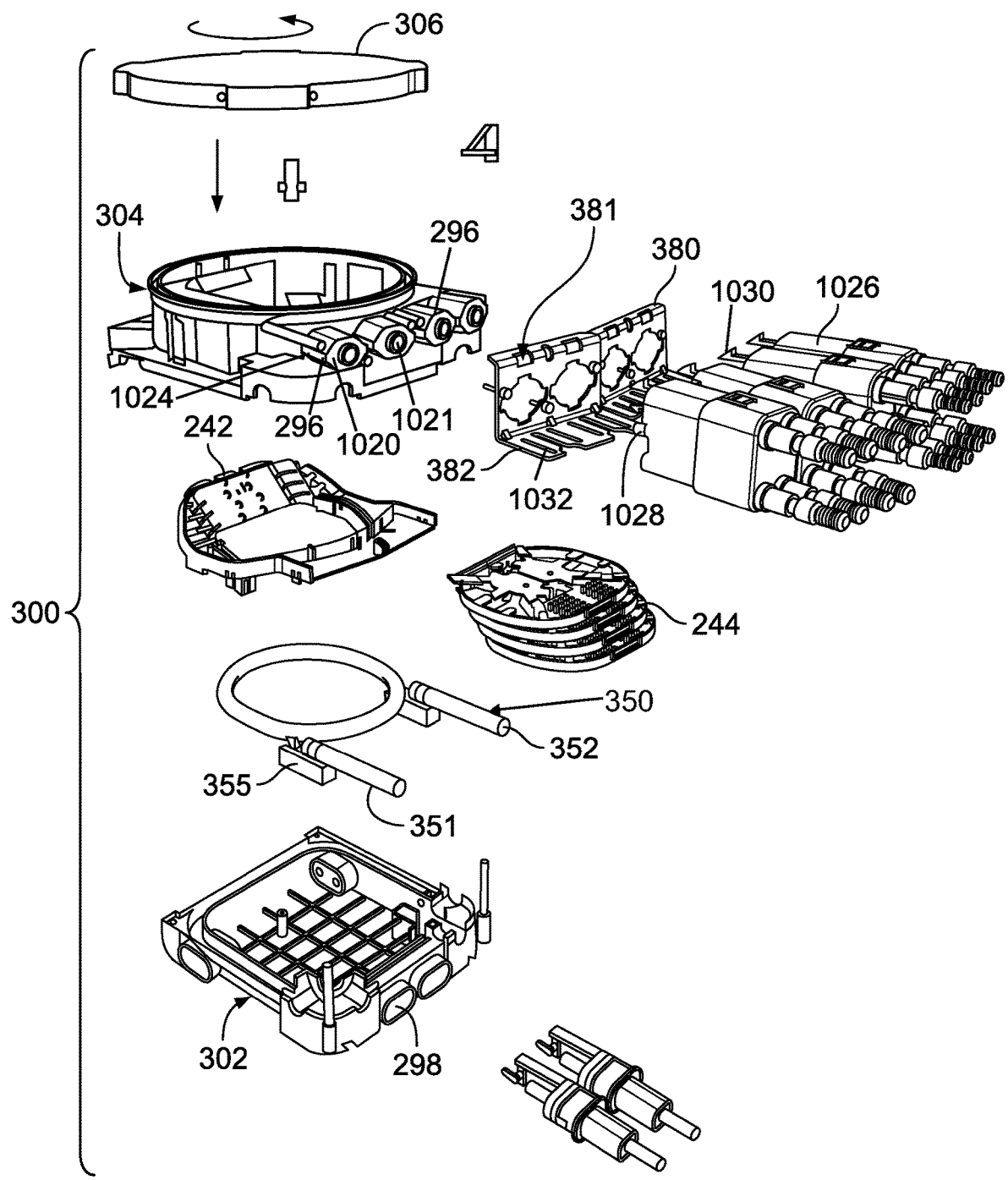
FIG. 46 is a perspective view of another example enclosure including a base, an intermediate housing, and a cover shown exploded away from each other.
Figure 47:
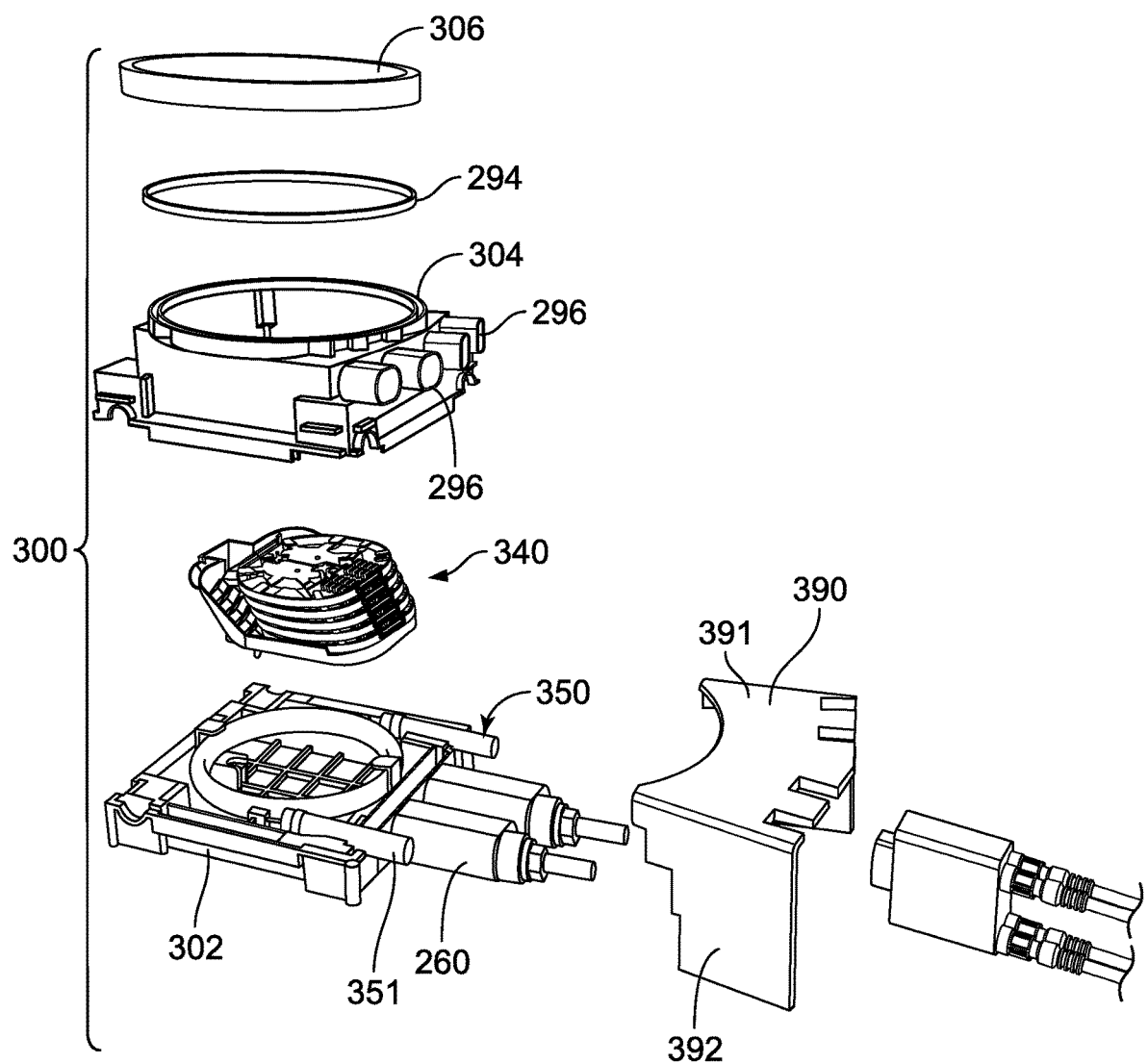
FIG. 47 is a perspective view of the enclosure of FIG. 46 with the cable loop shown mounted to the base, and a shroud shown exploded away from the intermediate housing.
Figure 48:
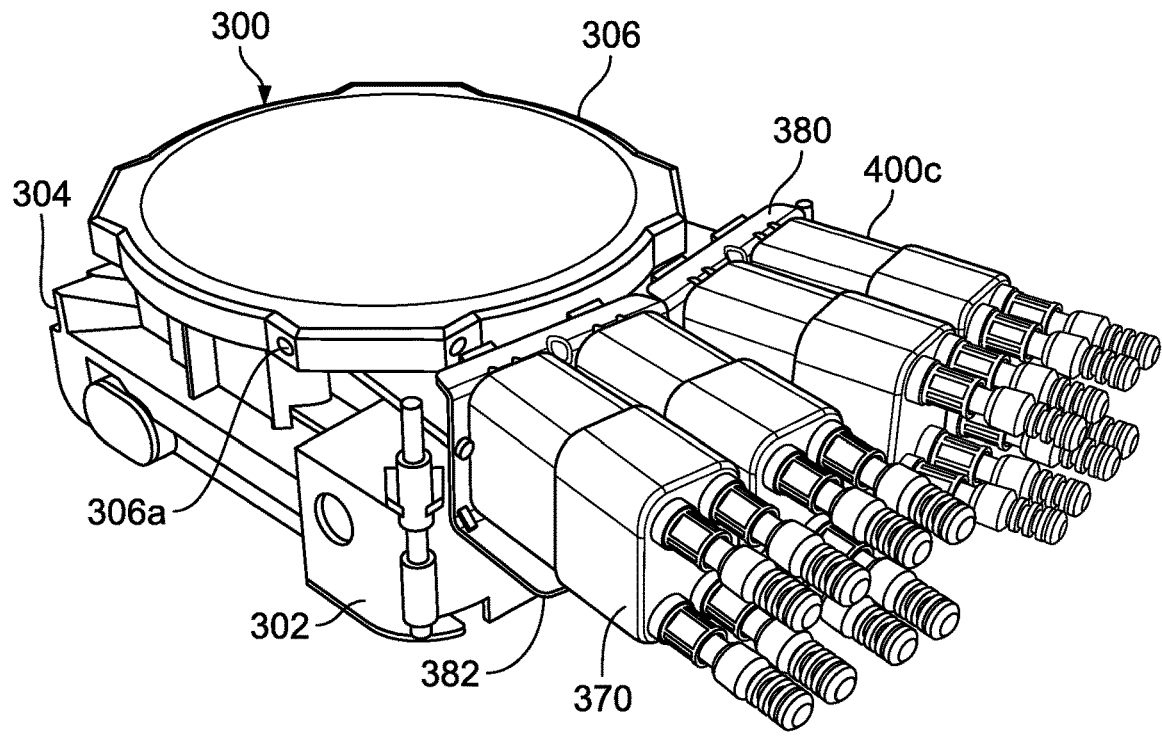
FIG. 48 is a perspective view of the enclosure of FIG. 46 assembled with four value-added modules mounted at ports using brackets.
Figure 49:
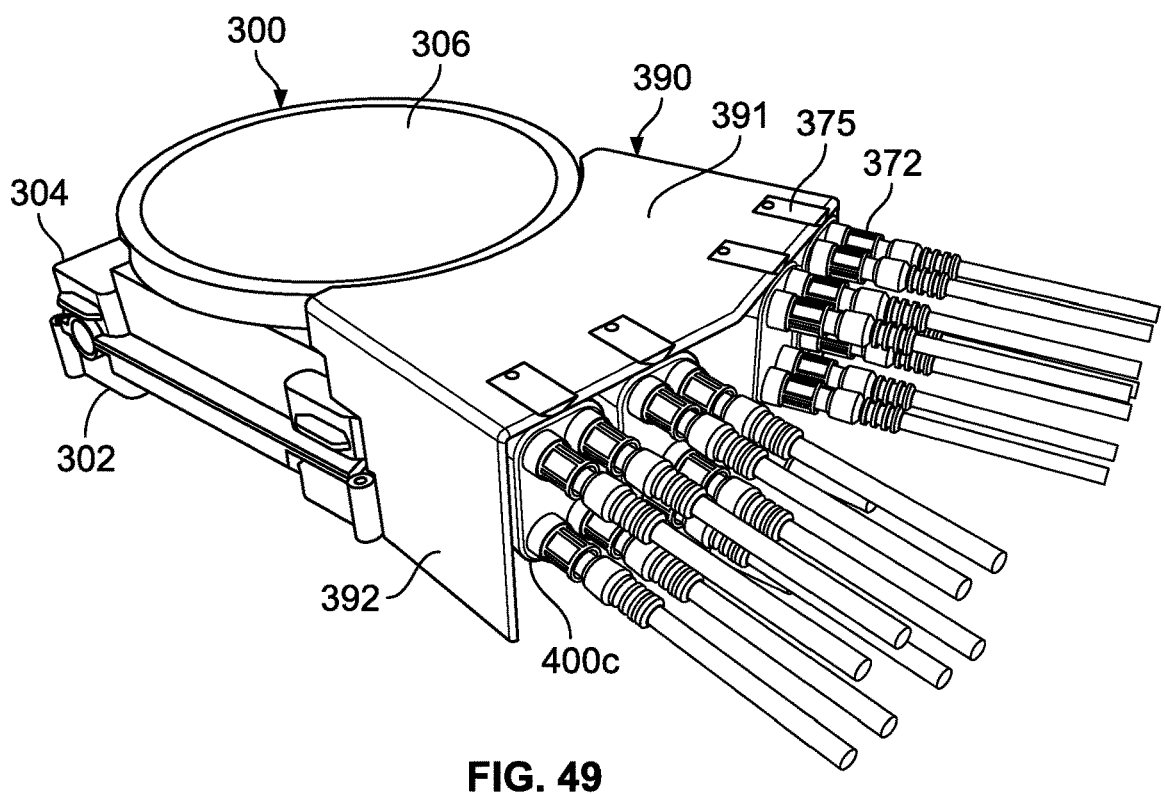
FIG. 49 is a perspective view of the enclosure of FIG. 46 with the shroud of FIG. 47 shown mounted over the value-added modules.

FIG. 41 illustrates an alternative intermediate housing 307' that defines three rows of terminal ports. In the example shown, the housing 307' includes two rows of the terminal ports 24a and one row of the terminal ports 26a. In certain implementations, the bottom row of terminal ports 26a overlaps the base. For example, a portion of the ports 26a may be laterally aligned with the cable ports through which the first and second portions of the pass-through cable.

FIGS. 9-11 illustrate the splice tray arrangement 309 that is configured to mount within the combined interior of the base 301 and mid-housing 307 (i.e., within the interior of the terminal housing). In certain implementations, the splice arrangement 309 includes a pivotal tray carrier 331 pivotally mounted to the terminal housing 322 by a frame 333 which offsets (e.g., spaces, elevates, etc.) the splice tray arrangement 309 form the base of the terminal housing 322. In one example, the frame 33 can snap into the base of the terminal housing 322 or can otherwise be fastened or secured to the terminal housing 322. The splice tray arrangement 309 can be accessed when the cover of the terminal housing 322 has been opened or removed (see FIGS. 10 and 11). The tray carrier 331 can pivot relative to the frame 333 between a closed position (see FIG. 10) where the splice tray arrangement 309 covers the underlying fiber loop of the pass-through cable 305 and an open position (see FIG. 11) where the underlying fiber loop can be accessed through the open top of the terminal housing 322. A holder or strand 1018 can be provided for temporarily holding the tray carrier 331 in the open position when a technician is accessing the fiber look at the base of the terminal housing. The tray carrier 331 has a first end 331a and an opposite second end 331b. The splice tray arrangement 309 can block access to the fiber loop when in the closed position. The tray carrier 331 pivots relative to the frame 333 about an axis 334 at the first end 331a. A plurality of splice trays 335 is pivotally connected to the tray carrier 331 via a tray mount 337 at the second end 331b of the carrier 331. The splice trays 335 can individually pivot relative to the tray carrier 331 via pivotal connections at the tray mount 337. The splice trays 335 may include splice holders and fiber management structures for guiding optical fibers along fiber paths and storing fiber storage loops without violating fiber bend radius requirements. The tray carrier 331 includes pivot members 339 aligned along the axis 334. The pivot members 339 are hollow and define fiber insertion slots 341. The fiber insertion slots 341 may be V-shaped.

As shown at FIGS. 42-45, pivot members 339 fit within pivot collars 343 of the frame 333 to provide the pivotal connection between the frame 333 and the tray carrier 331. The pivot collars 343 define top slots 345. When the tray carrier 331 is in the closed position, the fiber insertion slots 341 align with the top slots 345 to allow optical fibers to be inserted into the pivot members 339 so that the fibers can be routed onto the tray carrier 331 through the hinge along the pivot axis 335. The frame 333 can include two separate carrier supports 347 which each define one of the pivot collars 343. Lower portions of the carrier supports 347 can connect to the base of the terminal housing 322 (e.g., by a snap-fit connection). Constructing the frame 331 with separate carrier supports 347 facilitates installing the pivot members 339 into the pivot collars 343. The carrier supports 347 can include fiber guides for routing optical fibers to the carrier hinge and onto the tray carrier. The fiber guides can include ramps for directing optical fibers up from the pass-through cable loop to the tray carrier. The carrier supports 347 can include fixation locations 349 for attaching (e.g., tying, strapping) fiber buffer or furcation tubes to the frame 333. In use, optical fibers from the pass-through cable 305 can be routed from the base of the terminal housing 322 in buffer tubes to the frame 333. The fibers then can be routed without buffer tubes along the fiber guides of the frame to the carrier hinge location. The fibers then extend along the carrier 331 (e.g., around a perimeter of the carrier) the tray pivot mount. The optical fibers enter the spice trays along the locations where the splice trays pivotally connect to the tray carrier 331. At the splice trays 335 the optical fibers from the pass-through cable 305 can be spliced to optical fibers (e.g., drop fibers) corresponding to (e.g., routed to) terminal ports of the terminal housing. The fibers corresponding to the terminal ports can be routed to the trays 335 in a similar fashion as the optical fibers of the pass-through cable 305.

Figure 12:
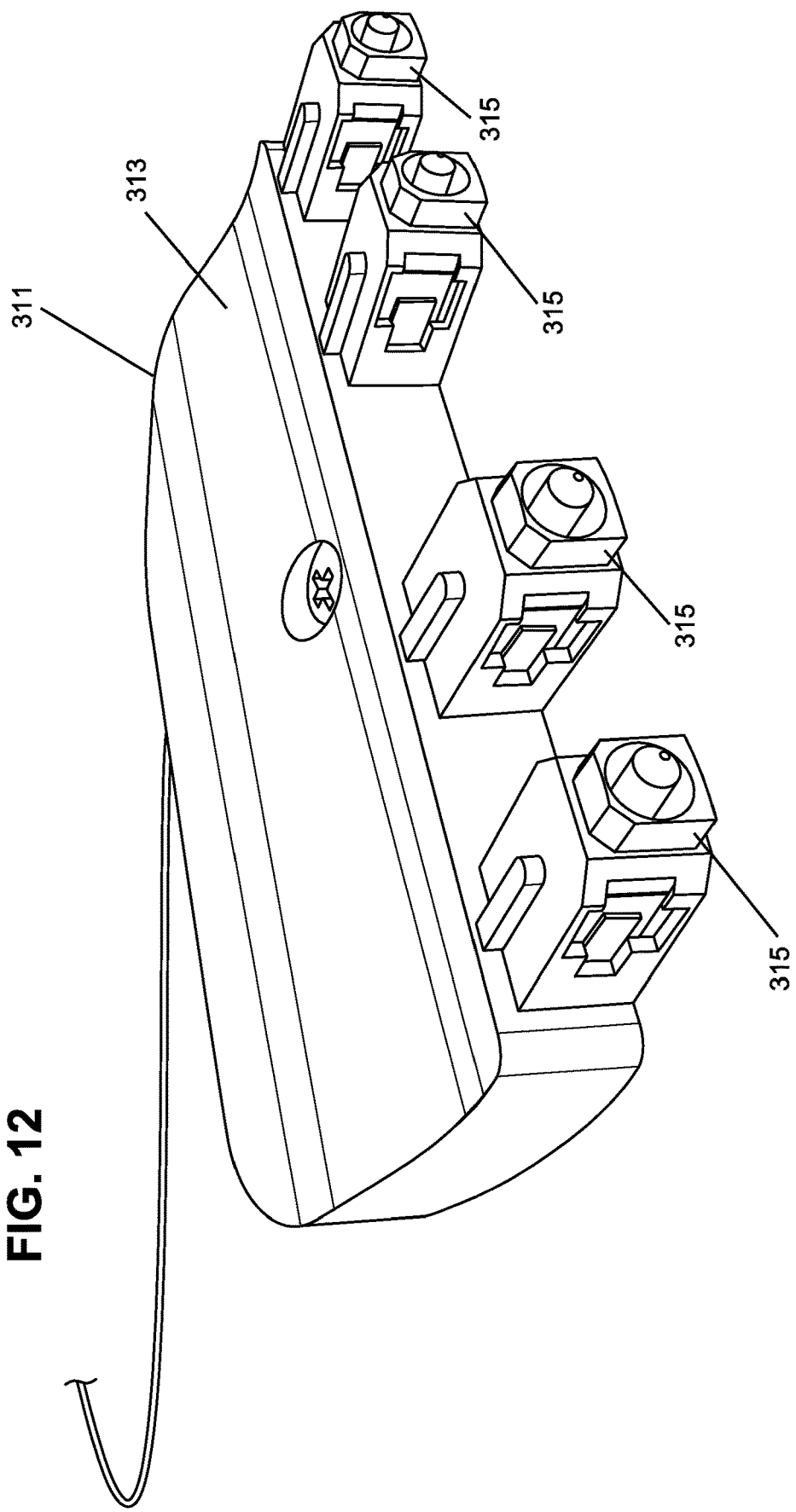
FIG. 12 shows an interior add-on module that can be mounted in the terminal housing of the modular system of FIGS. 9-11.
Figure 13:
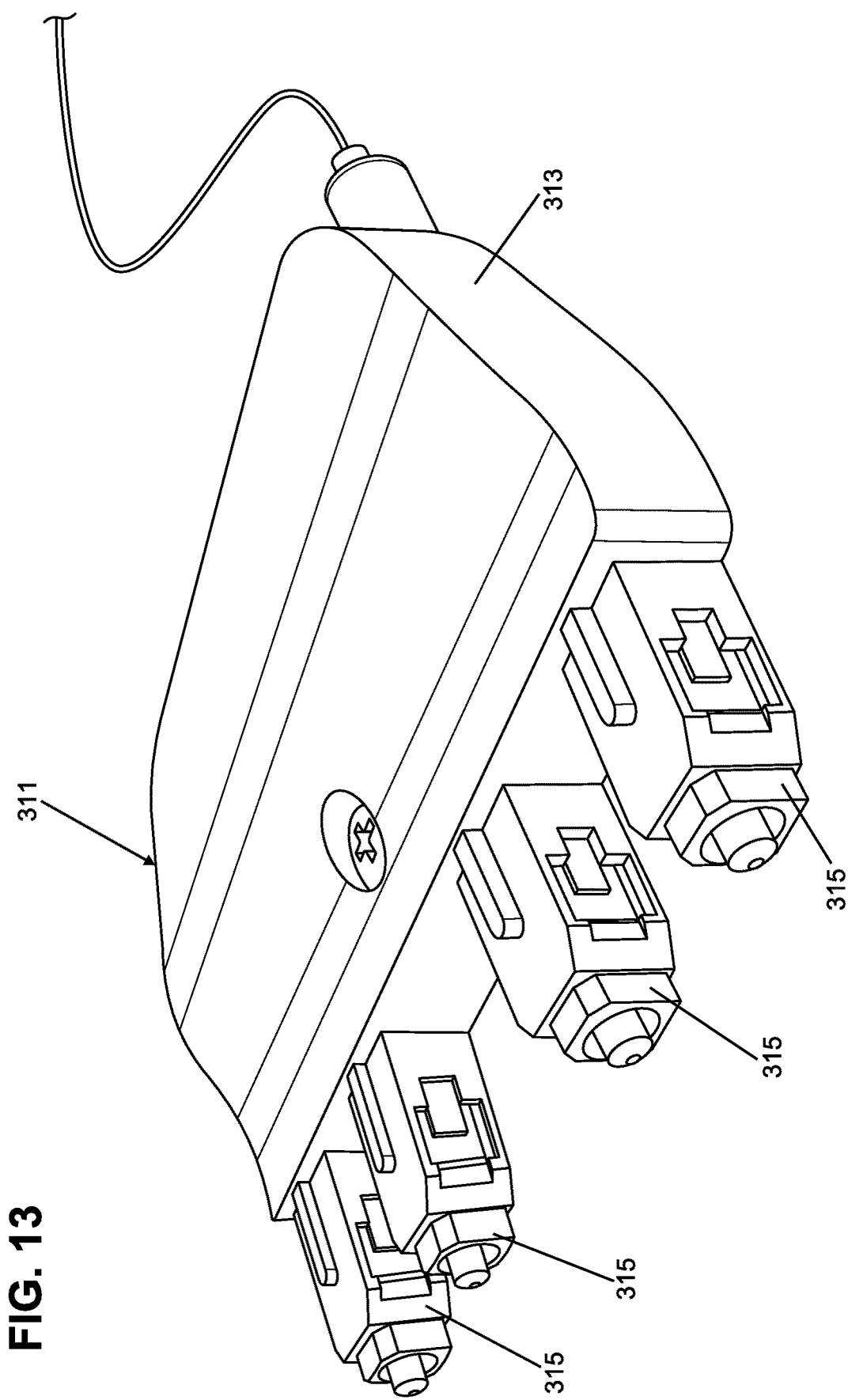
FIG. 13 is another view of the interior add-on module of FIG. 12.

In other examples, the optical fibers accessed from the pass-through cable 305 can be spliced to pigtails routed to internal add-on modules such as optical splitter modules 311, wavelength division multi-plexer modules, indexing modules or break-out modules. As shown at FIGS. 12 and 13, each of the optical splitter modules 311 can include a housing 313 containing an optical splitter having an input optically coupled to one of the optical fibers accessed from the pass-through cable 305. In certain examples, the optical splitter can be a 1×4 splitter, a 1×8 splitter, 1×16 splitter, 1×32 splitter, or splitters having other split ratios. In the depicted example, the splitter is a 1×4 splitter. The outputs of the optical splitter are routed to fiber optic connectors 315 supported at a front end of the housing of the housing 313. The connectors 315 are affixed to the housing 313 and held at a fixed spacing relative to one another. The fixed spacing of the connectors 315 corresponds to the spacing between the ruggedized ports defined by duplex inserts 48a installed in the ports 24a. Thus, the configuration of the splitter module 311 facilitates inserting the connectors 315 into adapters supported within the terminal ports 24a. In this way, all of the connectors 315 can be plugged into their corresponding terminal ports simultaneously. In a wavelength division multi-plexer module, the splitter can be replaced with a wavelength division multiplexer that splits the input signal to different outputs based on wavelength.

It will be appreciated that the modular system 320 can also include additional add-on modules that interface with the terminal ports 24a or the terminal ports 24b. The add-on modules can interface directly with the terminal ports 24a, 24b or indirectly with the terminal ports 24a, 24b through the use of intermediate inserts which define ruggedized ports (e.g., inserts 28, 36 and 48 having a suitable form factor).

In certain examples, terminals in accordance with the principles of the present disclosure can have fiber optic connectors pre-installed (i.e., positioned, staged, parked, loaded, etc.) within or near at least some of the terminal ports. With this type of configuration, when an insert is loaded into a terminal port with the pre-installed fiber optic connector, the pre-installed fiber optical connector automatically fits into the insert as part of the insert loading process. Thus, a technician does not need to access the interior of the terminal to load the pre-installed fiber optic connector into the insert. Once the pre-installed fiber optic connector is positioned within the insert, the pre-installed fiber optic connector is ready to mate with a corresponding fiber optic connector from outside the terminal in a plug-and-play manner where no access is needed to the interior of the terminal to connect an exterior fiber optic connector with the pre-installed fiber optic connector. Similarly, when an add-on module is coupled to a port of the terminal, the add-on module can interconnect with a pre-installed fiber optic connector within the port automatically as part of the coupling process without requiring the technician to access the interior of the terminal. Thus, add-on module can be optically and mechanically coupled to the terminal in a plug-and-play manner.

It will be appreciated that the modular system 320 can also include various add-on modules that can readily interface with the terminal housing 22 to provide different functionality or capacity. The add-on modules can include components such as passive optical power splitters, wavelength division multi-plexers, break-out components, indexing components or other components.

Figure 14:
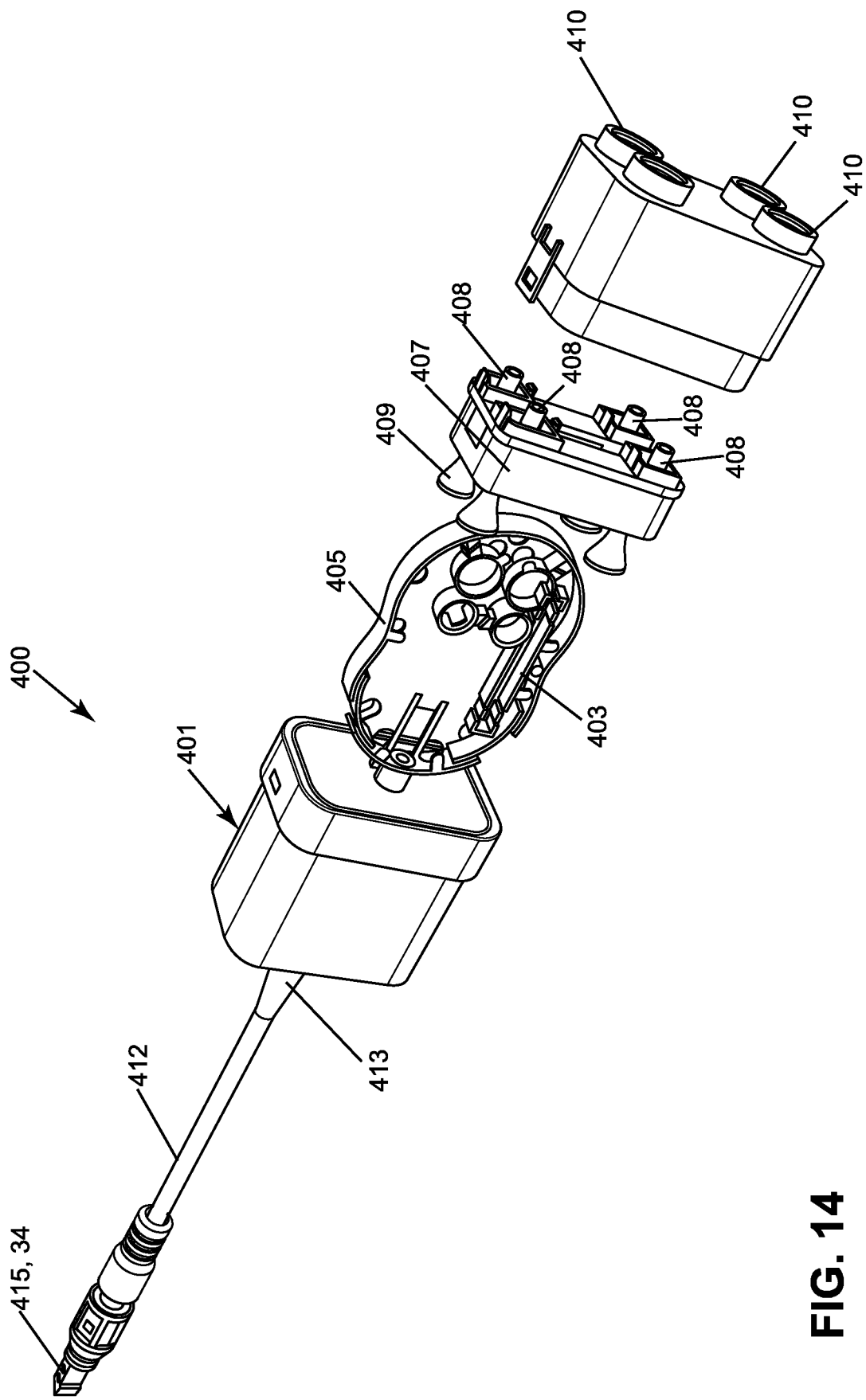
FIG. 14 is an exploded view of an exterior add-on module that can interface within the terminal housing of the modular system of FIGS. 9-11.
Figure 15:
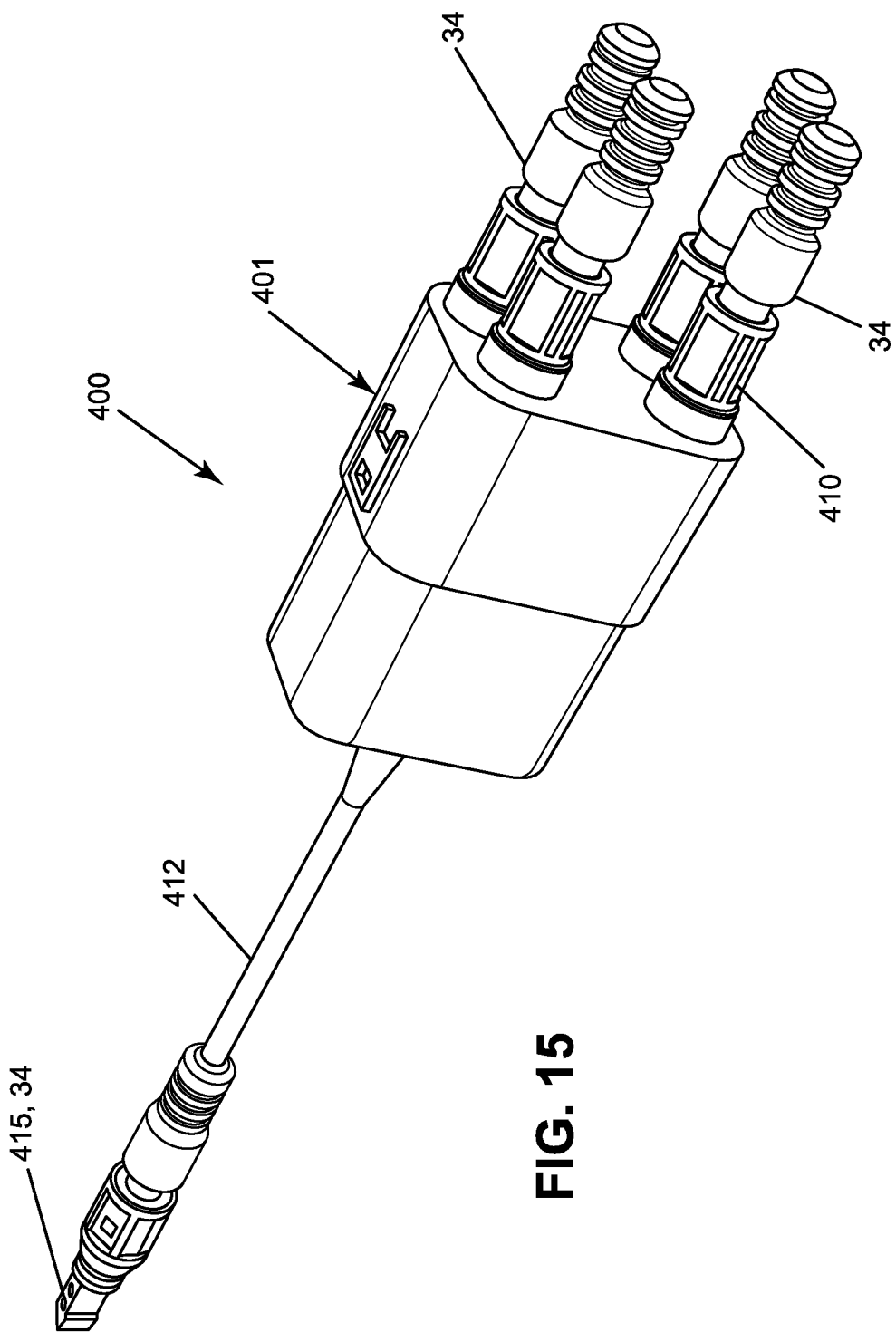
FIG. 15 is an assembled view of the exterior add-on module of FIG. 14.

FIGS. 14 and 15 show an example exterior add-on module in the form of an add-on splitter unit 400 adapted to interface indirectly with one of the terminal ports 24a. The splitter module unit 400 includes a splitter housing 401 containing a splitter 403 such as a 1×4 splitter. Other split ratios of the type described above can also be used. The optical splitter 403 can be held on a tray 405 contained within the housing 401. The tray 405 can be coupled to an adapter mount 407. The adapter mount 407 can hold a plurality of fiber optic adapters 408 at a desired spacial configuration relative to one another. Each of the fiber optic adapters 408 can include a ferrule alignment sleeve of the type described above held within an alignment sleeve housing of the type described above. The adapter mount 407 holds the adapters 408 in alignment with ruggedized ports 410 defined by the splitter housing 401. The splitter has outputs that are terminated by fiber optic connectors 409 loaded into the adapters 408. The ruggedized ports 410 can receive ruggedized connectors 34 terminating the ends of drop cables such that the drop cables are optically coupled to the outputs of the splitter. FIG. 15 shows the splitter module unit 400 with the ruggedized connectors 34 installed in the ruggedized ports 410. FIG. 14 shows the ruggedized ports 410 open. When not being used, the ruggedized ports 410 can be closed by sealed dust caps/plugs. It will be appreciated that the splitter can be a passive optical power splitter. In the case where the add-on module provides wavelength divisional multiplexing, the passive optical power splitter can be replaced with a wavelength division multiplexer. In such as system, signals are split based on wavelength with different signal wavelengths or wavelength ranges being output to each of the fiber optic connectors 409. In this way, each output can be assigned a specific different wavelength or range of wavelengths.

The splitter module unit 400 also includes a tether 412 (e.g., an exterior tether) formed by an optical fiber cable containing at least one optical fiber. The optical fiber can be terminated by a ruggedized fiber optic connector 415 that may have the same configuration as the fiber optic connector 34 or the fiber optic connector 40 or other type of ruggedized connector. The end of the optical fiber of the tether 412 opposite from the connector 415 can be coupled to the input of the splitter. A boot 413 can be used to provide cable bend radius protection at the location where the tether 412 enters the housing 401. The ruggedized ports 410 face in a direction diametrically opposite from the direction the tether 412 extends away from the housing 401. In certain examples, the tether 412 can be eliminated such that the connector 415 is coupled or integrated directly with the housing 401.

To install the splitter module unit 400, an insert such as the insert 48a is mounted within one of the terminal ports 24a so that the terminal port 24a is converted as to be compatible with the ruggedized fiber optic connector 415. The insert 48a can function to change or convert the form factor of the terminal port 24a. Thus, the form factor defined by the port of the insert 24a becomes the new form factor for the terminal 24a. The ruggedized fiber optic connector 415 is plugged into the ruggedized port of the insert 48a such that the splitter module unit 400 is optically connected to an optical fiber corresponding to the pass-through cable 305.

Figure 16:
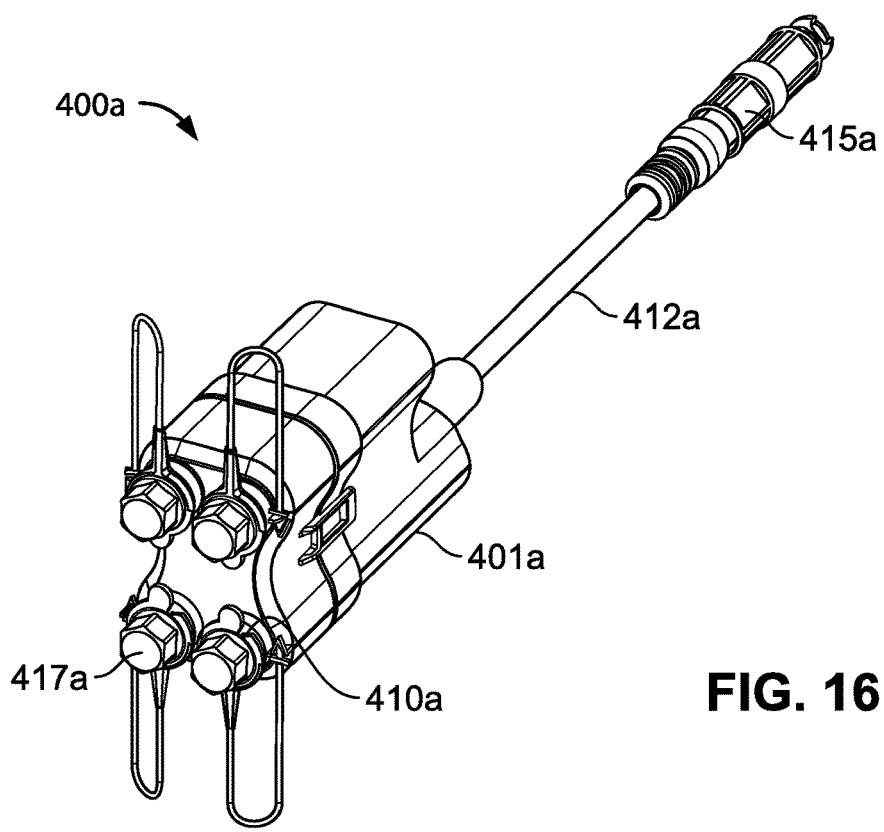
FIG. 16 is an assembled view of another exterior add-on module in accordance with the principles of the present disclosure having a four port output configuration.
Figure 17:
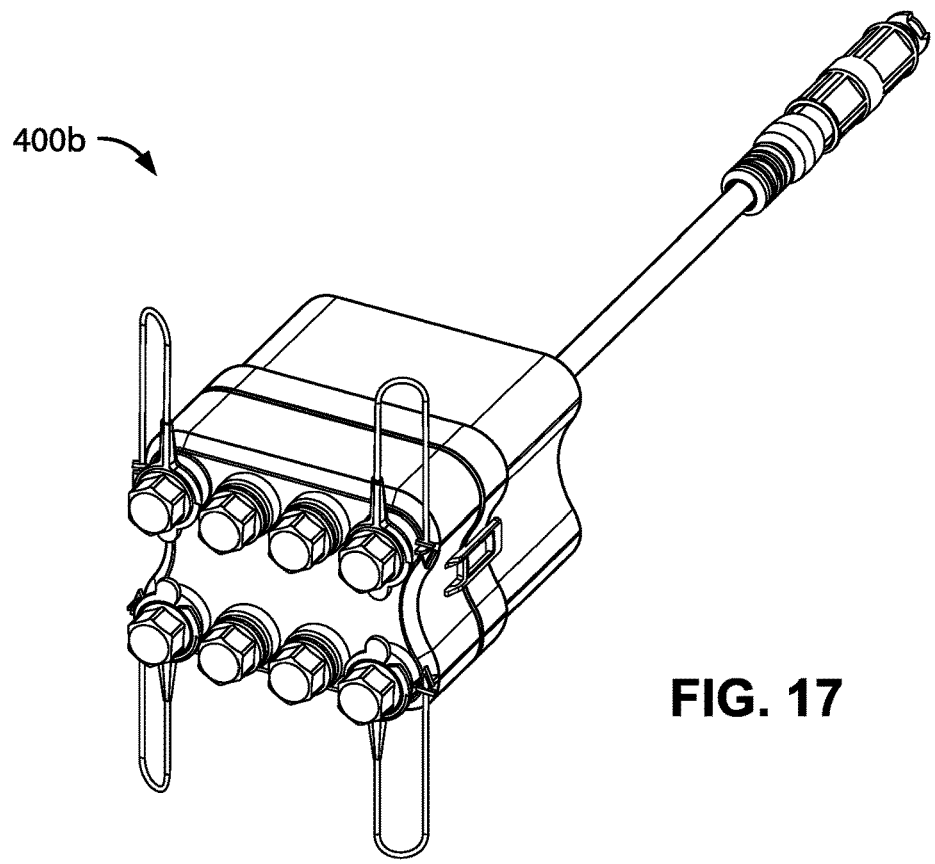
FIG. 17 is an assembled view of exterior add-on module in accordance with the principles of the present disclosure having an eight port output configuration.

FIG. 16 shows an add on module 400a including an exterior module housing 401a and an exterior tether 412a. The exterior module housing 401a is depicted as defining four exterior ruggedized connector ports 410a shown closed by removable, sealed dust plugs 417a. In one example, the ports 410a are defined by a side of the housing 401a that is opposite from the side of the housing where the tether 412a enters the housing 401a. A free end of the tether 412a is terminated by a ruggedized fiber optic connector 415a. In one example, the tether 412a is a single fiber tether, the ruggedized fiber optic connector 415a is a single fiber connector, and the single fiber is optically coupled to the input of an optical component such as a passive optical power splitter or a wavelength division multiplexer housed within the housing 401a. Outputs of the optical component are optically coupled to the ruggedized ports 410a. In another example, the tether 412a is a multi-fiber tether, the ruggedized fiber optic connector 415a is a multi-fiber connector, and the fibers are routed to a fan-out within the housing 401a where the fibers are fanned out and then directed to the ruggedized ports 410a. The add-on module 400a can be installed in the same manner described with respect to the add-on module 400. FIG. 17 shows another add-on module 400b having the same construction as the add-on module 400b except the add-on module 400b has eight ruggedized ports instead of four. In the case where the modules house components such as optical power splitters or wavelength division multi-plexers, the split ratios of the components can correspond to the number of ruggedized connector ports provided.

Figure 18:
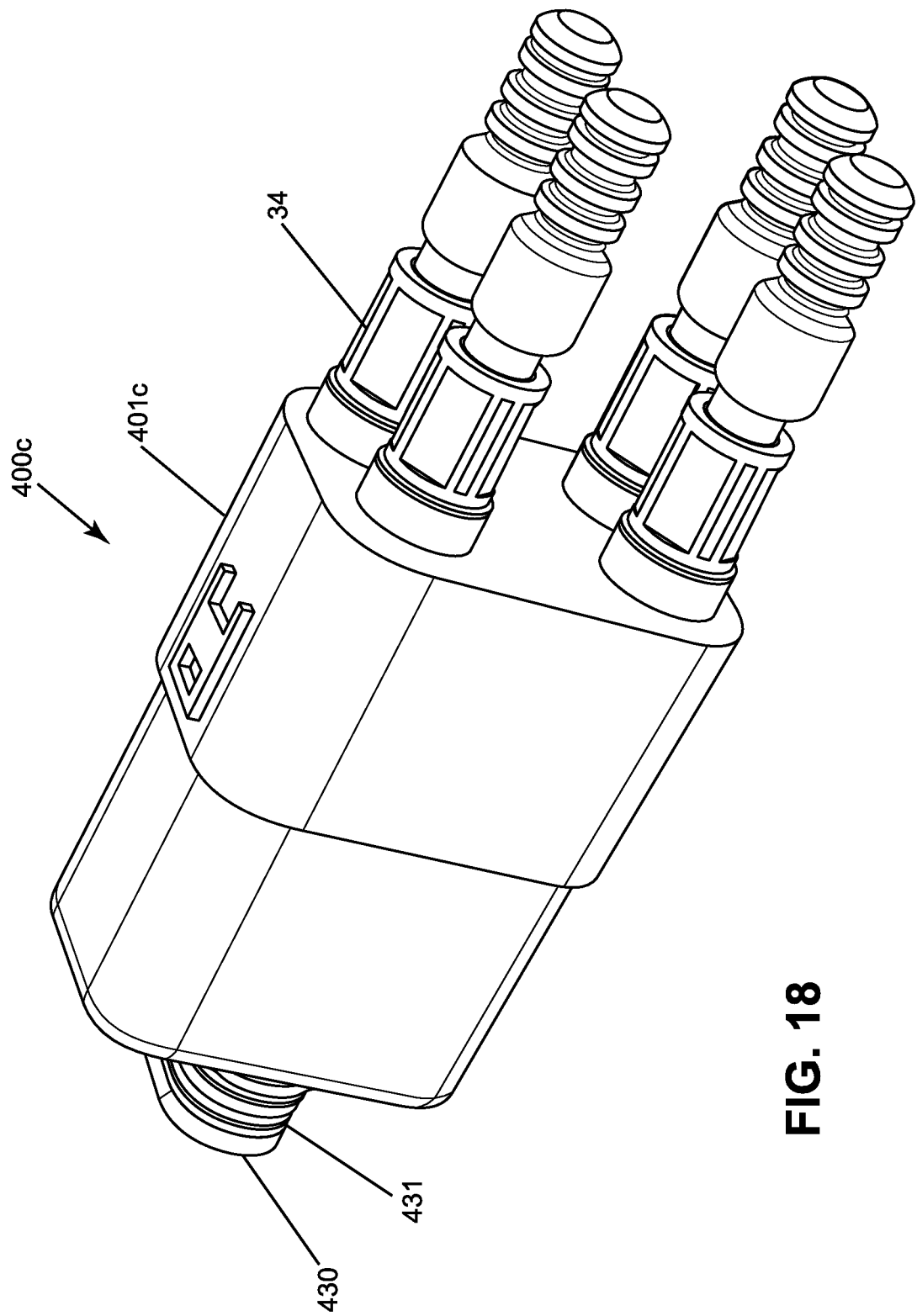
FIG. 18 is an assembled view of another exterior add-on module in accordance with the principles of the present disclosure that can interface with the terminal housing of the modular system of FIGS. 9-11.
Figure 19:
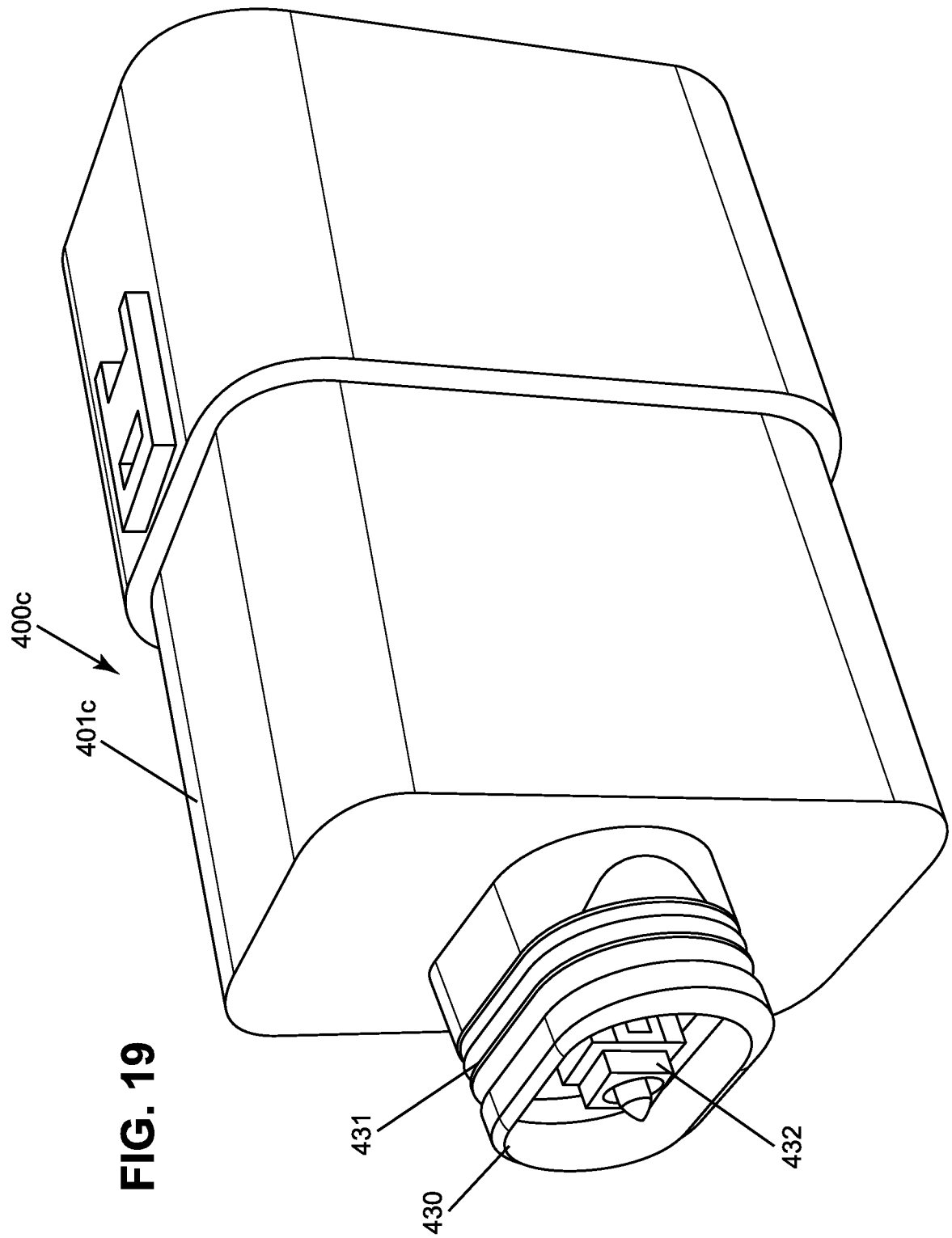
FIG. 19 illustrates a connection interface of the exterior add-on module of FIG. 18.

FIGS. 18 and 19 show an exterior add-on module in the form of a splitter module unit 400c that can interface directly with one of the terminal ports 24a of the terminal housing 322 without requiring an intermediate insert to convert the form factor of the terminal port 24a. The splitter module unit 400c includes an extension 430 having a form factor compatible with the form factor of one of the ports 24a. The extension 430 projects outwardly from the main body of an exterior module housing 401c of the splitter module unit 400c. The extension 430 is positioned on a diametrically opposite side of the module housing 401c from a plurality of ruggedized connector ports 410c. The ruggedized connector ports 410c face in an opposite direction from the direction the extension 430 projects from the main body of the module housing 401c. The extension 430 is an example of a mechanical connection interface or mechanical coupling interface and is also an example of a fiber optic connector housing that is integrated or unitary with the main body of the module housing 401c of the module unit 400c. The extension is also an example of a connection interface portion. A seal 431 can be provided on the extension 430 for forming a seal (e.g., a radial seal) within the port 24a. The splitter module unit 400c has a similar configuration as the splitter module unit 400 except the splitter input fiber (i.e., the optical fiber optically coupled to the input of the optical power splitter) has been terminated within a connector 432 (e.g., a single fiber connector) located within the splitter housing. Similar to the module unit 400, outputs of the splitter are routed to the ruggedized connector ports 410c (shown with ruggedized connectors loaded inserted therein at FIG. 18). The connector 432 can be mounted (e.g., secured, held, retained) at a staged position (e.g., a fixed position, a predetermined position, a set position, etc.) within the extension 430. When the extension 430 is inserted within the port 24a, the connector 432 mates with a corresponding fiber optic adapter provided within the terminal port. The fiber optic adapter can be pre-staged within the terminal port. The extension can be secured within the terminal port of the terminal housing by mechanical connection/coupling interfaces such as snap-fit structures, clips, flexible latches, latching arms, collars, sleeves, slide couplers, bayonet couplers, threaded couplers or other structures. The mechanical connection interfaces also function to secure the entire module unit 400c to the terminal housing 322. The module unit can be optically and mechanically connected to the terminal in a plug-and-play play manner. The connector 432 can be a single fiber connector or a multi-fiber connector. The connector 432 can be ferrule-less, can include a single fiber ferrule or can include a multi-fiber ferrule.

It will be appreciated that the structure of the splitter module unit 400c (i.e., the connection interface) is also applicable to other add-on modules such as wavelength division multiplexing modules and break-out modules. In the case of a wavelength division multiplexing module, the module housing would house a wavelength division multiplexer instead of a passive optical power splitter. In the case of a break-out module, the connector could include a multi-fiber connector and the passive optical splitter can be replaced with a fiber fan-out structure.

Figure 20:
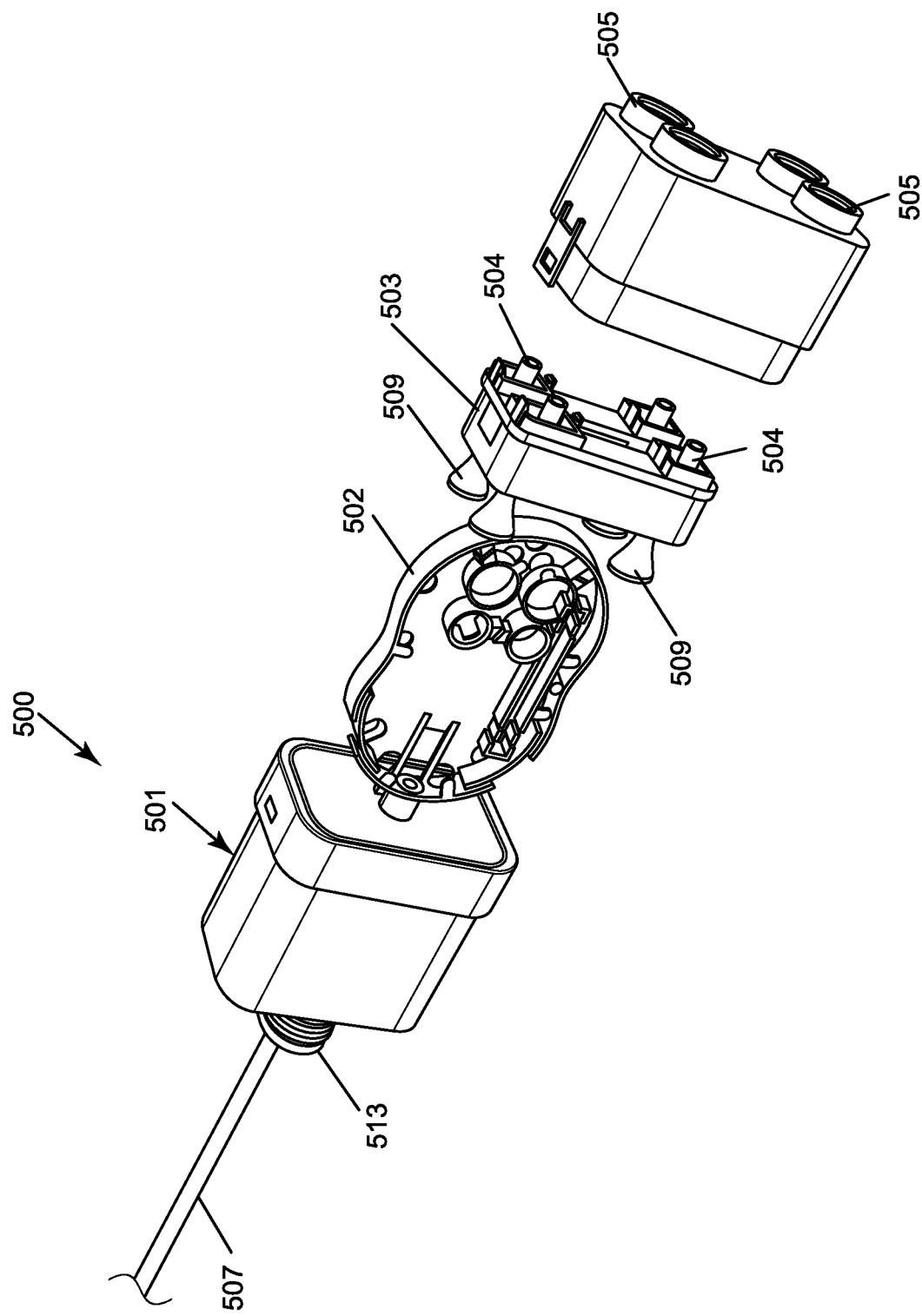
FIG. 20 is an exploded view of another exterior add-on module that can interface within the terminal housing of the modular system of FIGS. 9-11.
Figure 21:
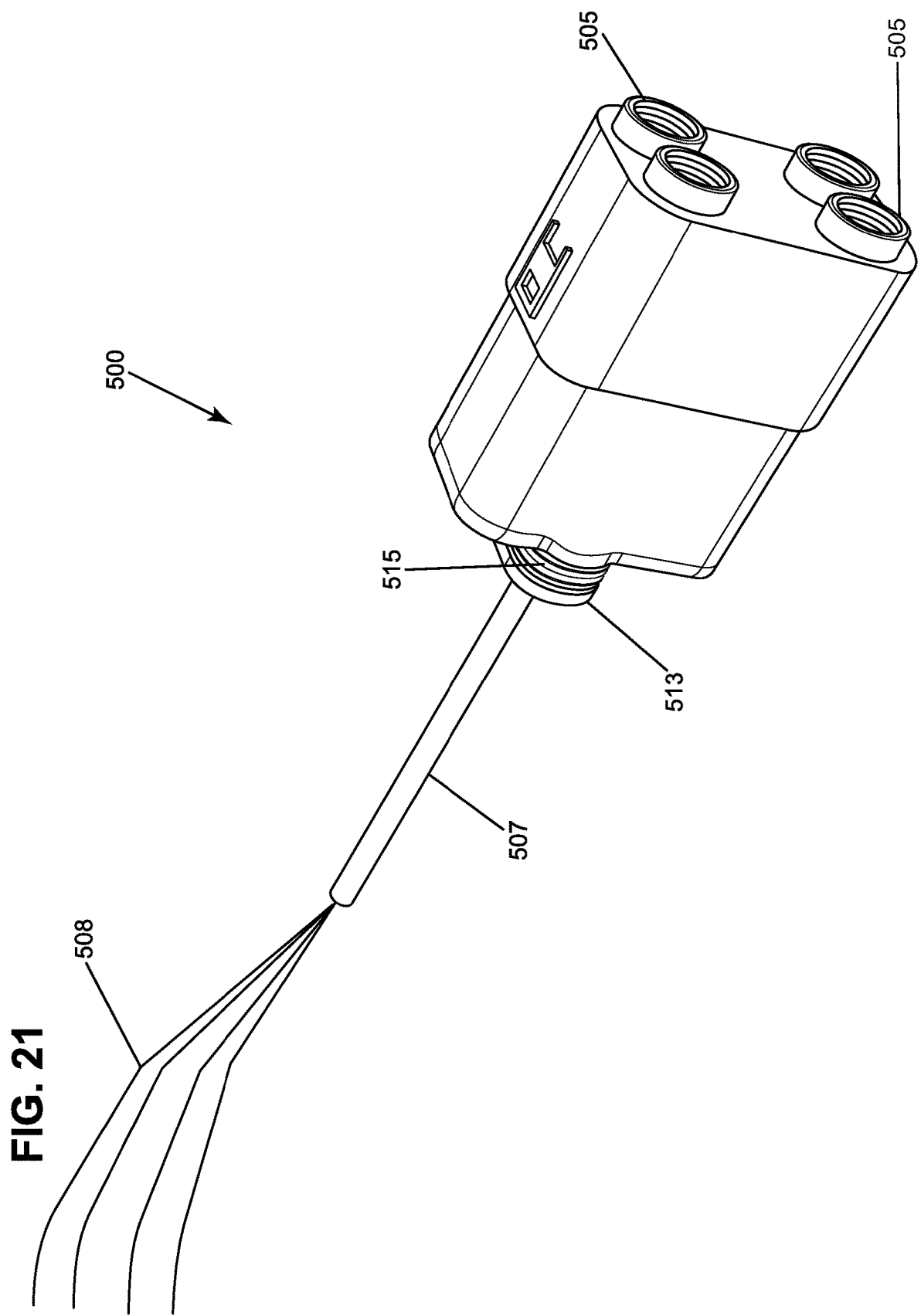
FIG. 21 is an assembled view of the exterior add-on module of FIG. 20.
Figure 22:
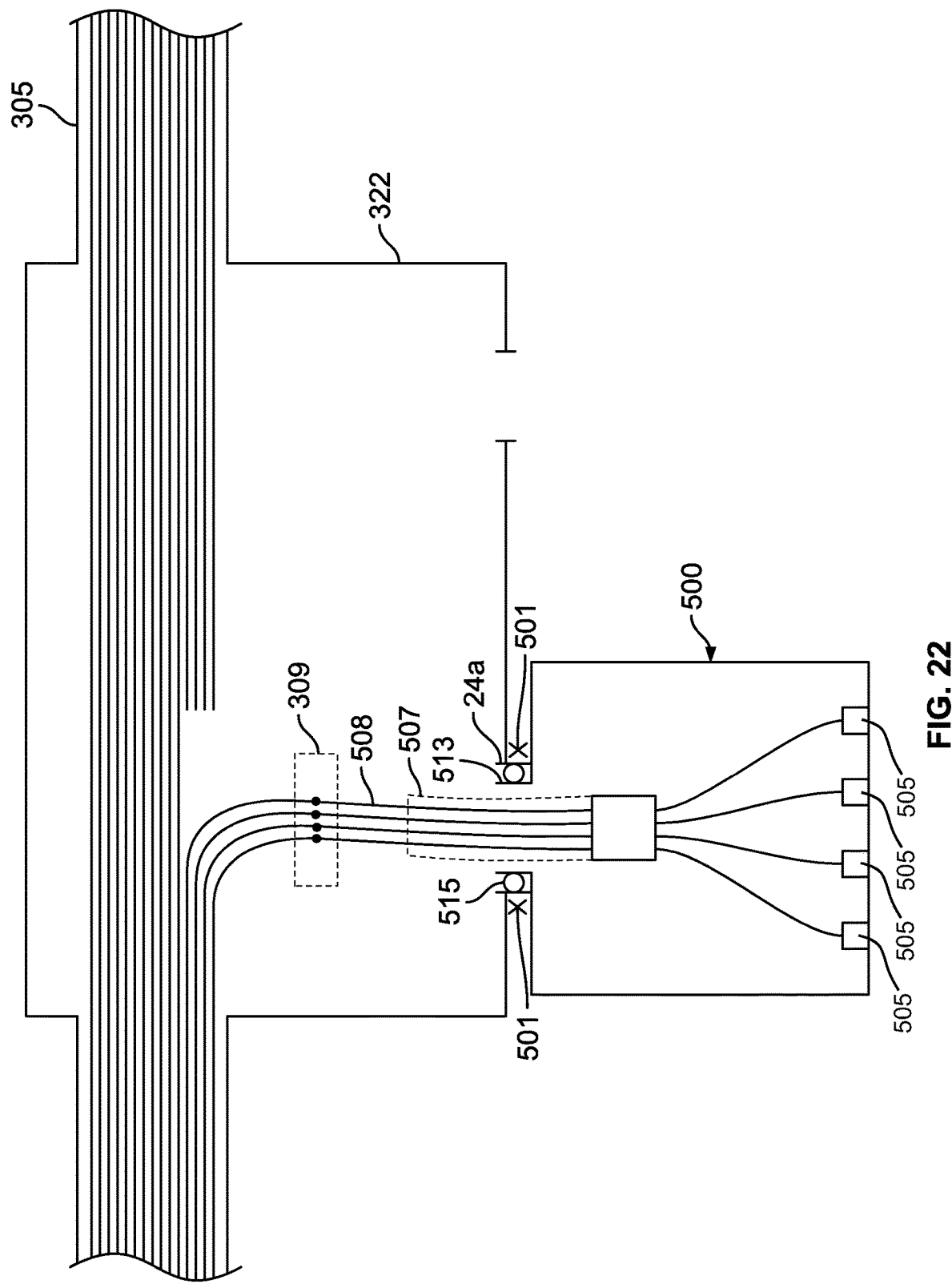
FIG. 22 is a schematic view showing the add-on module of FIGS. 19 and 20 interfacing with the terminal housing of the modular system of FIGS. 9-11.

FIGS. 20 and 21 show an add-on module in the form of a break-out module 500 adapted to interface directly with one of the terminal ports 24a of the terminal housing 322. The break-out module unit 500 includes a housing 501 enclosing a fiber management tray 502 coupled to a fiber optic adapter holder 503. The tray 502 includes a plurality of routing paths for managing excess length of optical fiber. The optical fibers can be routed to fiber optic connectors 509 inserted within fiber optic adapters 504 held in position by the adapter holder 503. The adapter holder 503 holds the fiber optic adapters 504 in alignment with ruggedized ports 505 defined by the housing 501. The break-out module unit 500 also includes a multi-fiber tether 507 (e.g., an internal or interior tether) including a plurality of optical fibers mechanical. The optical fibers are routed into the housing 501 and managed on the tray 502. The optical fibers can be terminated by the fiber optic connectors 509 inserted within ports defined by the fiber optic adapters 504. The housing 501 includes an insert interface 513 (e.g., a connection interface portion, a mechanical interface, a coupling interface, a projection, an extension, etc.) having an insert form factor that matches the terminal port form factor 26a and that can carry a seal 515. Thus, the insert form factor allows the insert interface 513 of the break-out module unit 500 to be inserted into one of the terminal ports 24a to provide a mechanical connection between the terminal housing 322 and the break-out module unit 500. Additionally, the seal 515 provides a sealed relationship between the module housing and the terminal housing 322. Once inserted, the breakout module unit 500 can be further secured to the terminal housing by a mechanical coupling/retention structure 521 (see schematically at FIG. 22) such as clips, a snap-fit connection, fasteners, mechanical fastening arrangement, or other type of securement arrangement of the type described elsewhere herein. The optical fibers of the multi-fiber tether 507 can extend through the insert interface 513 and thus through the terminal port 24a into the terminal housing 22 (see schematically at FIG. 22). The optical fibers of the tether 507 can be spliced individually to optical fibers accessed from the pass-through cable 305 of the terminal housing 322. This splicing can take place at the main tray arrangement 309 within the terminal housing 322. In this way, one of the terminal ports 24a can be used to provide a significantly larger number of ports. While four terminal ports have been depicted, other embodiments, the break-out module unit 500 may include two, four, six, eight, sixteen, thirty two or more ports. In other examples, the tether 507 can be terminated by a multi-fiber connector that can be connected (e.g., via an adapter) to a multi-fiber connector terminating accessed fibers from the pass-through cable 305.

Figure 23:
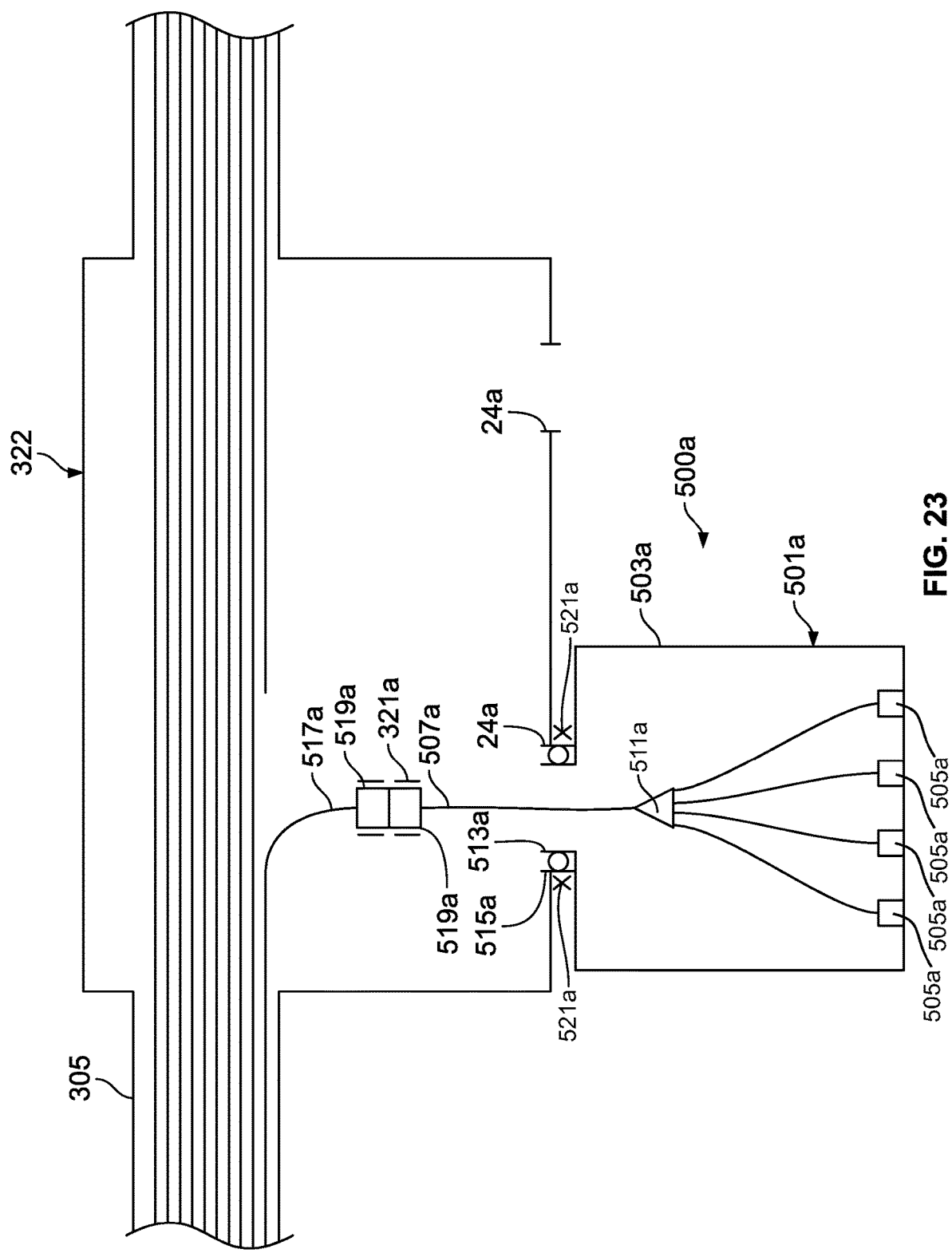
FIG. 23 is a schematic view showing another exterior add-on module in accordance with the principle of the present disclosure interfacing with the terminal housing of the modular system of FIGS. 9-11.

FIG. 23 shows an add-on module 500a adapted to interface directly with one of the terminal ports 24a of the terminal housing 322. The add-on module 500a includes a module housing 501a including a main housing body 503a and an extension 513a (e.g., an insert interface, a connection interface portion, a mechanical interface, a coupling interface, a projection, a hollow sleeve, etc.) that projects from the main housing body 503a. An optical component 511a is housed within the main housing body 503a. The optical component 511a can include a structure such as a passive optical power splitter or a wavelength division multiplexer. The extension 513a is configured to mate with one of the terminal ports 24a of the terminal housing 22. In one example, the extension 513a is a hollow sleeve having an exterior form factor that matches the form factor of the terminal port 24a. Thus, the extension 513a is configured to mate within the terminal port 24a. A seal 515a can provide environmental sealing between the extension 513a and the terminal housing 322 when the add-on module 500a is coupled with the terminal housing 322. Referring still to FIG. 23, outputs of the optical component 505a are routed to ruggedized exterior ports 505a of the add-on module 500a. The ruggedized exterior ports 505a are preferably integrated with the main housing body 503a. A fiber optic tether 507a is shown optically connecting an input of the optical component 505a to one of the optical fibers 517a of the fiber optic cable 305 that passes through the terminal housing 322. The tether 507a and the optical fiber 517a can be terminated by fiber optic connectors 519a such as SC style fiber optic connectors or LC style fiber optic connectors. A fiber optic adapter 321a can be used to mechanically and optically couple the fiber optic connectors 519a together. A mechanical coupling/retention structure 521a can cooperate with the extension 513a to provide a secure mechanical coupling interface between the add-on module 500a and the terminal housing 322. In certain examples, the fastening arrangement can include structures such as flexible latches, fasteners (e.g., screws, bolts), coupling sleeves, slide clips, coupling clips, threaded couplers, bayonet-style couplers, snap-fit structures or other fastening arrangements.

FIG. 24 shows components of a modular fiber optic distribution system 600 in accordance with the principles of the present disclosure. The fiber optic distribution system 600 includes a terminal housing 602 defining an enclosed interior 604 and an exterior 606. The terminal housing 602 can include at least one exterior module mounting location. In the depicted example, the terminal housing 602 includes a plurality of exterior module mounting locations 606. The module mounting locations 606 each include mechanical connection interfaces 608. The mechanical connection interfaces 608 can include various structures that cooperate to securely affix add-on modules to the terminal housing 602 at the module mounting location 606. As shown at FIG. 24, the mechanical connection interfaces 608 can include sets of terminal ports each including an upper port 612 defined by an upper sleeve 614 and a lower port 616 defined by a lower sleeve 618. It will be appreciated that the upper and lower sleeves 614, 618 are shown projecting outwardly from a main body of the terminal housing 602. It will also be appreciated that the upper and lower ports 612, 616 can be referred to as terminal ports. Similar to previous examples, terminal ports define terminal port form factors. As depicted, terminal port form factors are shown as being generally elliptical in shape. The mechanical connection interfaces 608 can also include retention structures that cooperate with the upper and lower ports 612, 616 to retain add-on modules in fixed relation relative to the terminal housing 602 at a desired module mounting location 606. As depicted, the retention structures can include interlock structures 620 (e.g., notches, shoulders, recesses, lips, ribs or other structures) provided on exteriors of the upper and lower sleeves 614, 618.

Figure 25:
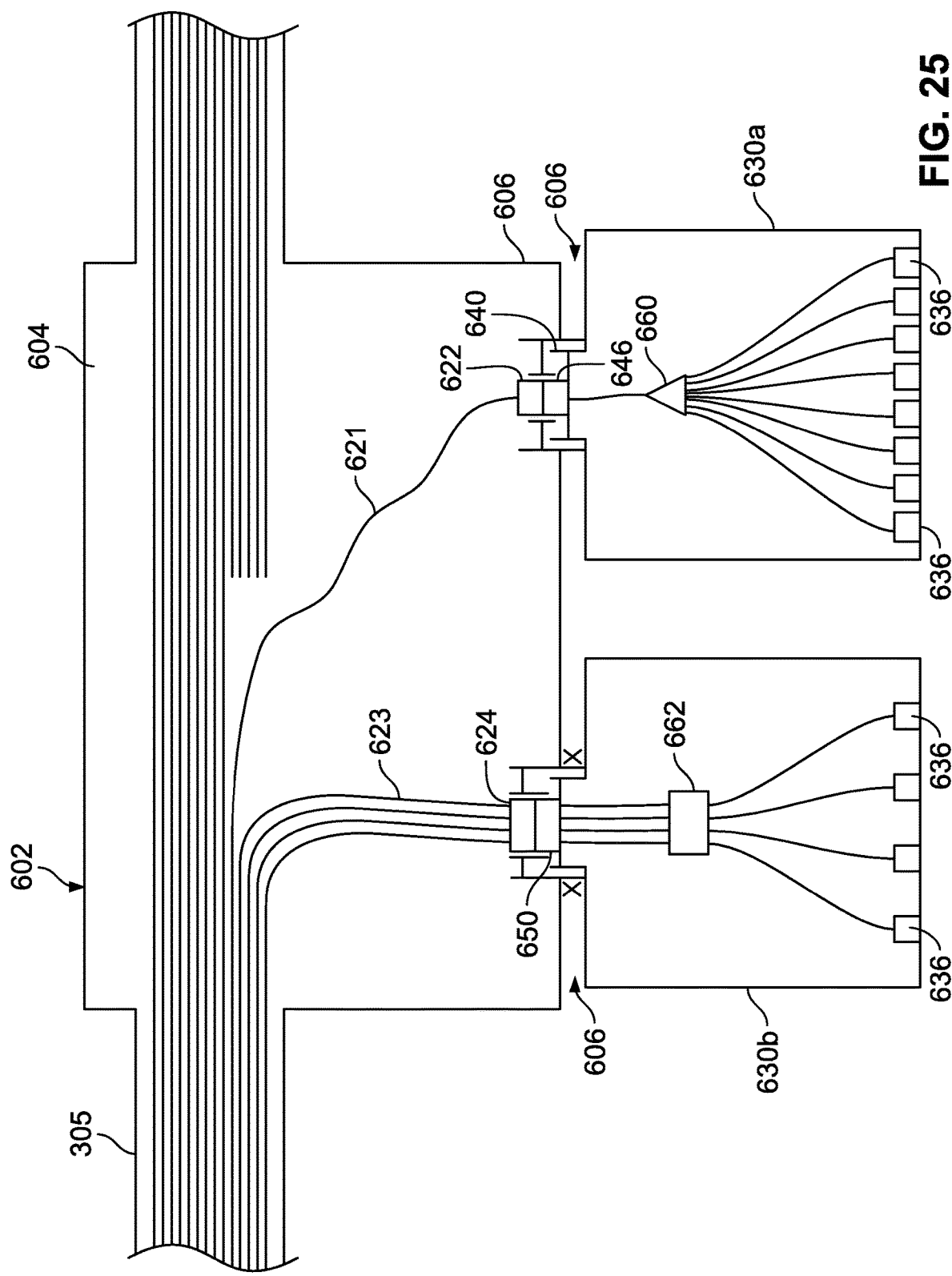
FIG. 25 is a schematic view of the modular system of FIG. 24 showing the add-on modules mounted to the terminal housing.
Figure 26:
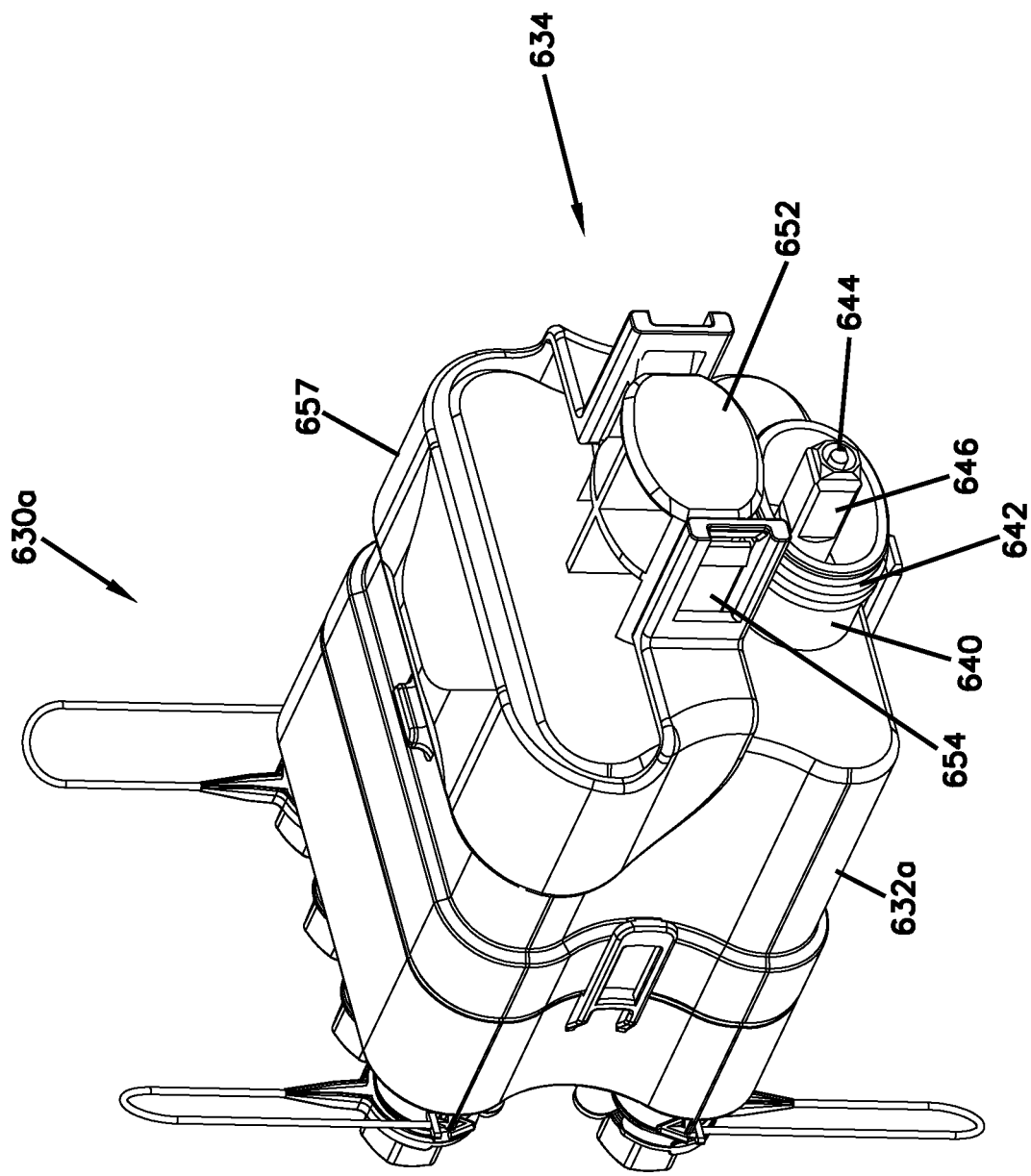
FIG. 26 is a perspective view of one of the add-on modules of FIG. 24.
Figure 27:
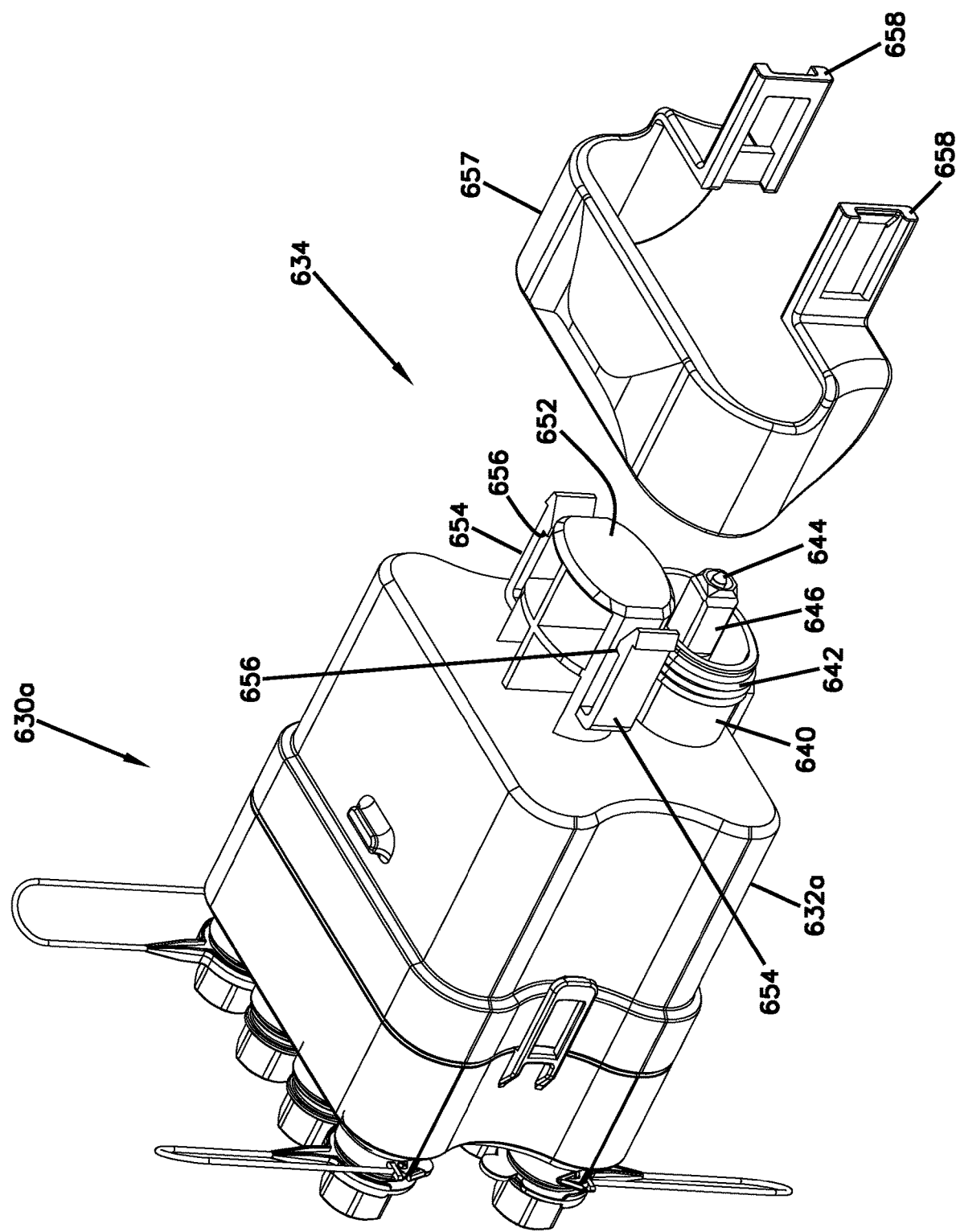
FIG. 27 is a partially exploded view of the add-on module of FIG. 26.
Figure 28:
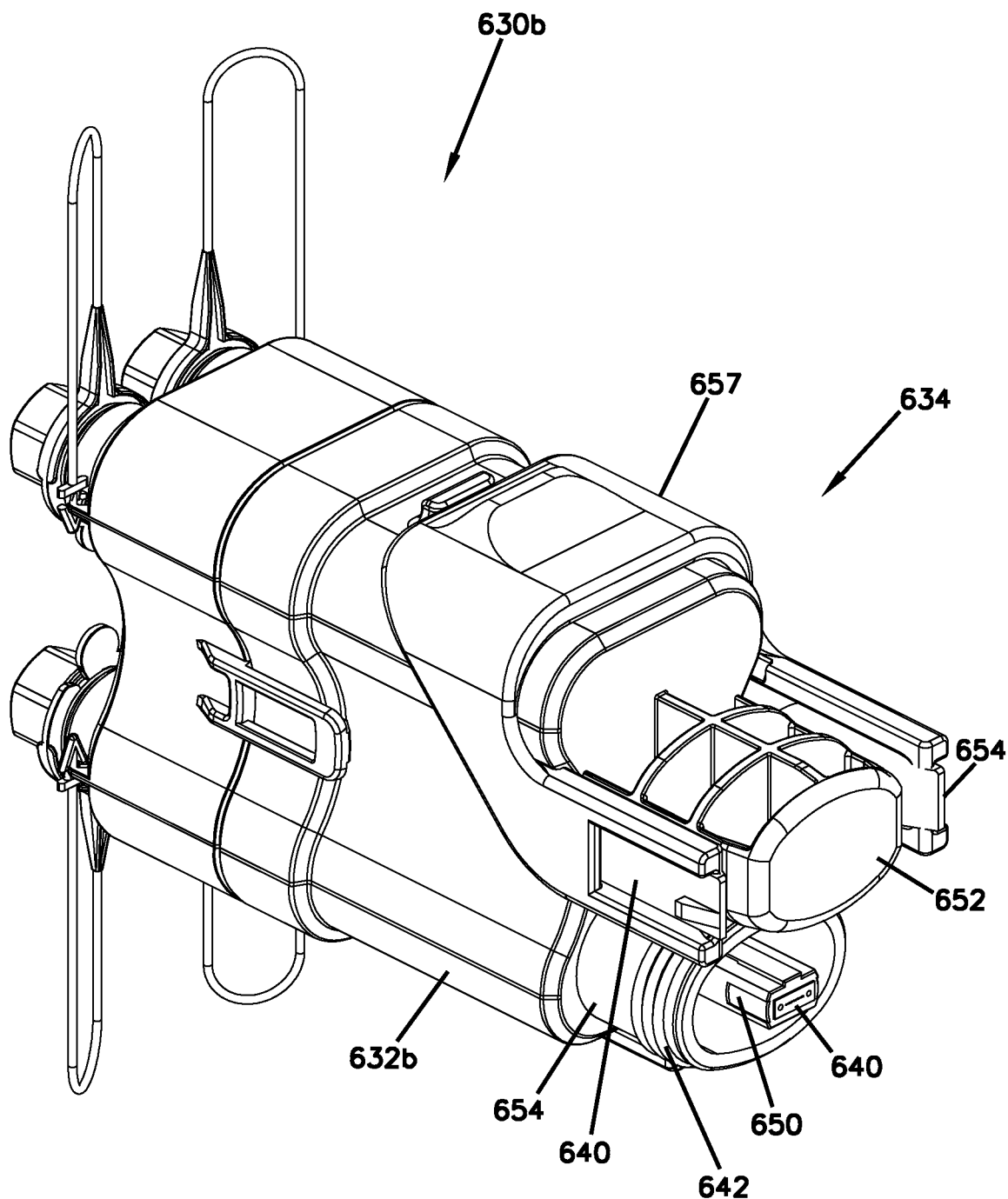
FIG. 28 is a perspective view of the other add-on module of FIG. 24.
Figure 29:
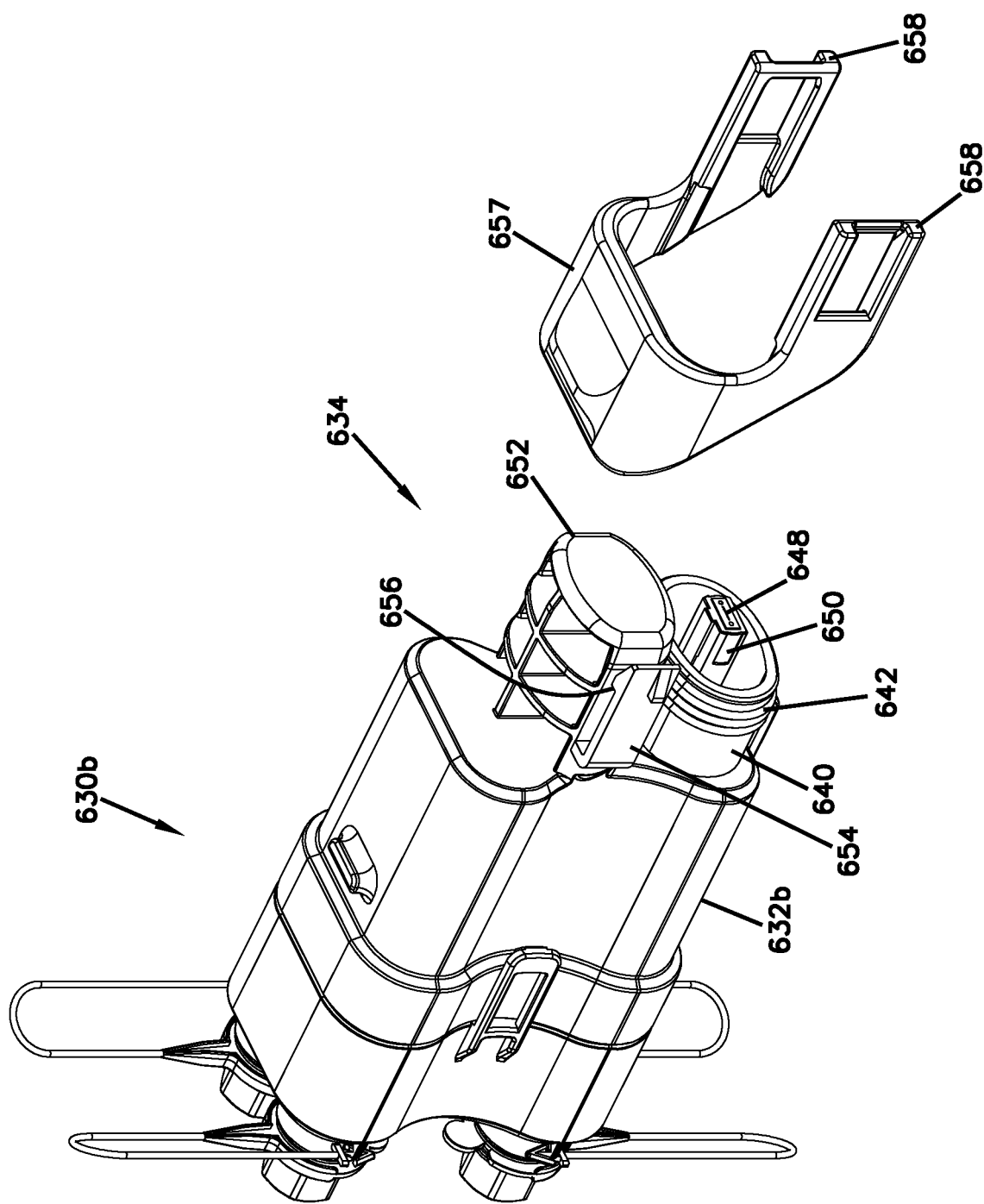
FIG. 29 is a partially exploded view of the add-on module of FIG. 28.

It will be appreciated that the terminal housing 602 can have a similar construction and can contain the same components as the terminal housing 322. For example, a multi-fiber pass-through cable 305 can be routed through the enclosed interior 604 of the terminal housing 602. Various optical fibers of the pass-through cable 305 can be accessed within the terminal housing 602. In certain examples, the optical fibers can be coupled to fiber optic connectors that are staged at the lower ports 616. For example, referring to FIGS. 24 and 25, optical fiber 621 is coupled to a single-fiber fiber optic connector 622 mounted or staged at one of the lower ports 616 and four optical fibers 623 are optically connected to a multi-fiber fiber optic connector 624 mounted or staged at the other lower port 616. As shown at FIG. 24, the fiber optic connector 622 is depicted as an SC-type fiber optic connector having a single fiber ferrule 626 and the fiber optic connector 624 is depicted as an MPO style connector having a multi-fiber ferrule 628. While only two module mounting locations 606 are shown in FIGS. 24 and 25, it will be appreciated that more than two module mounting locations may be provided or in certain circumstances only a single module mounting location may be provided. Additionally, it will be appreciated that the terminal housing 602 can include terminal ports having different sizes and profiles to accommodate different inserts and different add-on modules. Moreover, similar to the terminal housing 322 of FIG. 9-11, cable sealing and anchoring structures for accommodating the pass-through cable 305 can be provided along with other structures such as fiber management trays, splice trays or other components.

Referring still to FIGS. 24 and 25, the fiber optic distribution system 600 also includes add-on modules 630a, 630b configured to be mounted (e.g., affixed, attached, secured, coupled, connected, integrated, fastened, etc.) at the module mounting locations 606 of the terminal housing 602. The add-on modules 630a, 630b include module housings 632a, 632b carrying second mechanical connection interfaces 634 configured to mechanically couple (e.g., mechanically interlock, mechanically mate, mechanically engage, etc.) with the first mechanical connection interface 608 to mount the module housings 632a, 632b in place relative to the terminal housing 602 at the module mounting location 606. The first and second mechanical connection interfaces 608, 634 can be configured such that the first and second mechanical connection interfaces 608, 634 can be coupled without requiring the terminal housing 602 to be disassembled. The module housings 632a, 632b are shown including at least one and preferably a plurality of exterior connector ports 636 for receiving exterior fiber optic connectors. In certain examples, the exterior connector ports 636 are ruggedized connector ports of the type previously described configured for receiving ruggedized fiber optic connectors of the type previously described. As depicted, exterior connector ports 636 are shown temporarily closed with removable dust plugs 638. The exterior connector ports 636 are capable of receiving the exterior fiber optic connectors from outside the module housings 632a, 632b and the terminal housing 602 when the add-on modules 630a, 630b are integrated with the terminal housing 602. The add-on modules 630a, 630b also include optical connection structures for providing an optical connection between at least one optical fiber of the terminal housing 602 and the exterior connector ports 636. In certain examples, the terminal housing 602 forms a main terminal that is substantially larger in volume than any one of the individual add-on modules.

It will be appreciated that fiber optic adapters of the type previously described herein can be mounted within the lower terminal ports 612, 616 for receiving and staging the fiber optic connectors 622, 624 in their respective ports. It will be appreciated that the fiber optic adapter corresponding to the fiber optic connector 622 can be configured for receiving single-fiber fiber optic connectors such as SC fiber optic connectors, and the fiber optic adapter corresponding to the multi-fiber fiber optic connector 624 can be configured for accommodating multi-fiber fiber optic connectors such as an MPO fiber optic connectors.

In certain examples, the upper ports 612 can be blind ports having internal ends that are closed. In contrast, the lower ports 616 can be open ports that provide communication between the terminal housing interior 64 and the exterior when not being closed by a dust plug, insert, add-on module or other structure.

Referring to FIGS. 26-29, the second mechanical connection interfaces 634 can include hollow extensions 640 that project from the module housings 632a, 632b and that have interior regions in communication with interior regions of the module housings 632a, 632b. The hollow extensions 640 can be referred to as connector housings and in certain examples are unitarily or integrally formed with back walls of the module housings 632a, 632b. It will be appreciated that the exterior connector ports 636 can be provided at front walls of the module housings 632a, 632b. The hollow extensions 640 have outer form factors that preferably match the inner form factors of the lower ports 616. Thus, when the first and second mechanical connection interfaces 608, 634 are coupled together, the hollow extensions 640 preferably mate within the lower ports 616. Sealing elements 642 can be provided around the hollow extensions 640. The sealing elements 642 are configured to provide environmental seals between the hollow extensions 640 and the lower sleeves 618 when the hollow extensions 640 are inserted within the lower ports 616. Such sealing elements 642 prevent moisture or other material from entering the interior of the terminal housing 602 and the interiors of the module housings 632a, 632b.

The optical connection structures can be provided within the hollow extensions 640. In certain examples, the optical connection structures can include single-fiber ferrules or multi-fiber ferrules. In certain examples the optical connection structures can include single-fiber connectors or multi-fiber connectors. In the depicted examples, the add-on modules 630a includes an optical connection structure in the form of a single-fiber ferrule 644 supported within the hollow extension 640 of the module housing 632a by a connector body 646. In one example, connector body 646 is an SC-type connector body. It will be appreciated that the single fiber ferrule 644 and/or the connector body 646 are staged or otherwise mounted at a predetermined position within the hollow extension 640 of the add-on module 630a. When the add-on module 630a is coupled to the terminal housing 602, the hollow extension 640 of the add-on module 630a fits within the lower port 616 at which the single-fiber connector 622 has been pre-staged. During the insertion process, an optical fiber supported by the single-fiber ferrule 644 becomes coaxially aligned with a corresponding optical fiber supported by the single-fiber ferrule 626 of the single-fiber fiber optic connector 622 such that an optical connection is made. This alignment can be facilitated through the use of a fiber optic adapter within the port 616.

The optical connection structure for the add-on module 630b can be provided within the hollow extension 640 of the add-on module 630b. For example, the optical connection structure can include a ferrule such as a multi-fiber ferrule 648 mounted within the hollow extension 640 of the module housing 632b. In one example, the multi-fiber ferrule 648 can be a MPO ferrule. In certain examples, the multi-fiber ferrule 648 can be supported by a connector body 650 positioned within the hollow extension 640 of the module housing 632b. In one example, the connector body 650 can include an MPO connector body. It will be appreciated that the multi-fiber ferrule 648 and its corresponding connector body 650 can be staged or otherwise positioned in the hollow extension 640 of the module housing 632b such that when the module housing 632b is coupled to the terminal housing 602, the hollow extension 640 fits within the lower port 616 corresponding to the multi-fiber fiber optic connector 624. As previously indicated, the multi-fiber fiber optic connector 624 can be pre-loaded into the lower port 616 and supported within a fiber optic adapter or other structure mounted within the lower port 616. Thus, when the hollow extension 640 of the module housing 632b mates with the corresponding lower port 616, the multi-fiber ferrule 648 automatically fits within the fiber optic adapter within the lower port 616 such that optical fibers supported by the multi-fiber ferrule 648 are coaxially aligned with corresponding optical fibers supported by the multi-fiber ferrule 628 of the multi-fiber fiber optical connector 624 pre-positioned at the lower port 616.

It will be appreciated that the second mechanical connection interfaces 634 can also include additional structures for enhancing the robustness and stability of the mechanical connection made between the first and second mechanical connection interfaces 608, 634. For example, the second mechanical connection interfaces 634 can include stabilization elements configured to mate or otherwise engage with the upper ports 612 of the mechanical connection interfaces 608 at the module mounting locations 606 of the terminal housing 602. The stabilization elements can include stabilizing projections 652 having exterior form factors that match the interior form factors of the upper ports 612. When the add-on modules 630a, 630b are mounted at the module mounting locations 606 of the terminal housing 602, the stabilizing projections 652 mate with and are received within the upper ports 612 of the mounting locations 606 to provide the coupled mechanical connection interfaces 608, 634 with enhanced stability and strength.

The second mechanical connection interfaces 634 can further include retention or attachment structures adapted for preventing the first and second mechanical connection interfaces 608, 634 from unintentionally disengaging from one another. Example types of attachment or retention structures can include flexible latches, clips, snap-fit connections, retaining collars, rotatable couplers, threaded couplers, bayonet-style couplers, fasteners, or other structures. As depicted, the second mechanical connection interfaces 634 include attachment and retention structures in the form of flexible latching arms 654 having catches 656 that interlock with the retention structures 620 provided on the upper sleeves 614 so as to lock or otherwise affix the module housings 632a, 632b in place when the first and second mechanical connection interfaces 608, 634 are inter-mated. The second mechanical connection interfaces 634 also include slide elements 657 used to enhance the robustness of the attachment provided by the latching arms 654. The slide elements 657 are slideably mounted on the module housings 632a, 632b and are slideably moveable relative to the module housings 632a, 632b between a locking position and a release position. When the slide elements 656 are in the locking position, extensions 658 of the slide element 656 cover the latching arms 654 to prevent the latching arms 654 from being able to flex outwardly. For example, retaining portions of the extensions 657 can align with ramped outer projections of other structures of the latching arms 654. In contrast, when the slide elements 656 are in the release position, the extensions 658 are displaced from the latching arms 654 (e.g., recesses or openings in the extensions can be positioned to provide clearance that allows the retention arms to flex outwardly) such that the latching arms 654 are permitted to flex outwardly. It will be appreciated that the latching arms 654 can have a resilient, flexible configuration that allows the latching arms 654 to flex relative to their corresponding module housing 632a, 632b. Base ends of the latching arms 654 can be integrally formed with the module housings 632a, 632b. The latching arms 654 can be positioned on opposite sides of the stabilization projections 652 such that each stabilization projection 652 is positioned between two of the latching arms 654. The latching arms 654 can include inwardly projecting catches that interlock with the retention structure 620 on the lower sleeve 618 when the first and second mechanical connection interfaces 608, 634 are interlocked.

To interlock the mechanical connection interfaces 608, 634 together, a module desired to be coupled to one of the module mounting locations 606 is aligned with the module mounting location 606. The slide element 657 is preferably slid to the release position. In the aligned orientation, the stabilization projection 652 coaxially aligns with the upper port 612 of the module mounting location 606 and the extension 640 coaxially aligns with the lower port 616 of the module mounting location 606. The module housing is then moved towards the module mounting location 606 such that the stabilization projection 652 is received within the upper port 612 and the extension 640 is received within the lower port 616. As the module housing is moved toward the module mounting location 606, the stabilizing projection 652 and the extension 640 mate and slide within their corresponding ports. As the insertion process continues, ramps on the latching arms 654 cause the latching arms 654 to flex apart from one another until retaining catches or surfaces on the latching arms move past the retention structures 620 on the lower sleeve 618. When this occurs, the latching arms 654 snap inwardly to a retention position where the latching arms 654 interlock with the retention structures 620 such that the module housing is locked in place. The slide element 657 can then be slid from the release position to the locking position. In the locking position, portions of the extensions 658 cover the latching arms 654 to prevent the latching arms from flexing outwardly. In this way, the latching arms 654 are prevented from disengaging from the retention structure 620. To remove the module housing from the mounting location 606, the slide element 657 is moved to the release position in which the slide element 656 no longer prevents the latching arms 654 from flexing outwardly. The module housing is then pulled axially away from the module mounting location 606 with sufficient force to cause the latching arms 654 to flex outwardly and disengage from the retention structure 620. In this way, the module housing can be de-coupled from its corresponding mounting location 606.

Referring to FIG. 25, the add-on module 630*a* is shown housing an optical component 660 that provides splitting functionality such as a passive optical power splitter or wavelength division multiplexer. Outputs of the optical component 660 are routed to fiber optic connectors positioned at the exterior connector ports 636. In certain examples, the fiber optic connectors at the outputs can be similar to or the same as the fiber optic connector 84 positioned within the ruggedized port 32 of FIG. 1. The connectors can be mounted for connection to exterior connectors such as ruggedized fiber optic connectors (e.g., connector 34, connector 40 or other type of ruggedized connector) that are mated with the exterior connector ports 636. As previously indicated, the exterior connector ports 636 can be ruggedized connector ports that are adapted to form seals with the exterior fiber optic connectors and are also adapted to provide a relatively robust mechanical connection with the exterior fiber optic connectors. An input of the optical component 660 is routed to the single-fiber ferrule 644 of the connector body 646 staged at the hollow extension 640.

Referring still to FIG. 25, the module housing 632*b* houses a fan-out 662 that fans out optical fibers routed from the multi-fiber ferrule 648 supported by connector body 650 and routes the optical fibers to fiber optic connectors supported at the exterior connector ports 636. The exterior connector ports 636 of the module housing 632*b* can have the same configuration as those described with respect to the module housing 632*a*.

Figure 30:
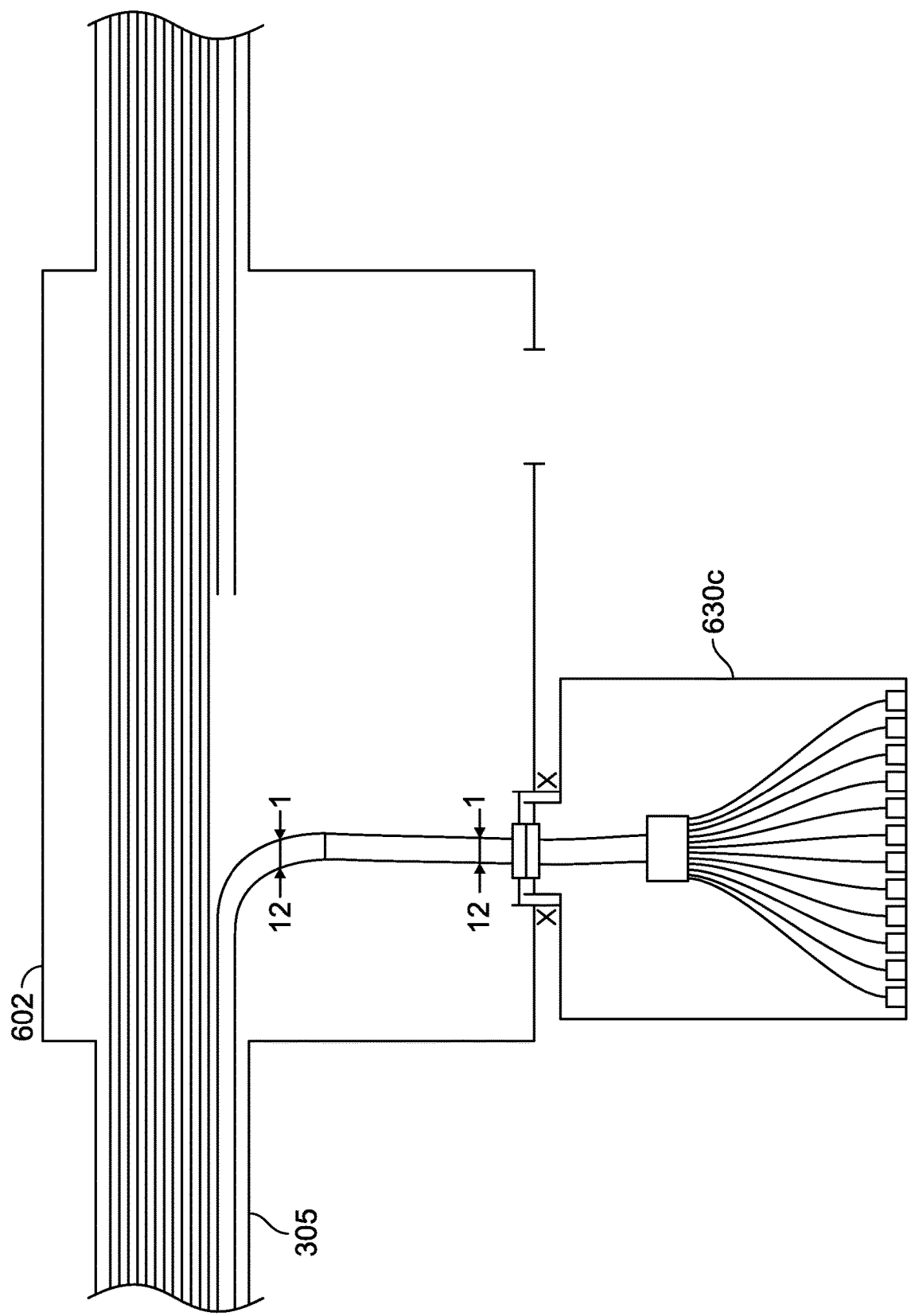
FIG. 30 is a schematic view of another modular system in accordance with the principles of the present disclosure.

FIG. 30 shows another add-on module 630*c* in accordance with the principles of the present disclosure. The add-on module 630*c* has the same configuration as the add-on module 630*b* except the add-on module 630*c* is configured to fan out twelve fibers instead of only four.

Figure 31:
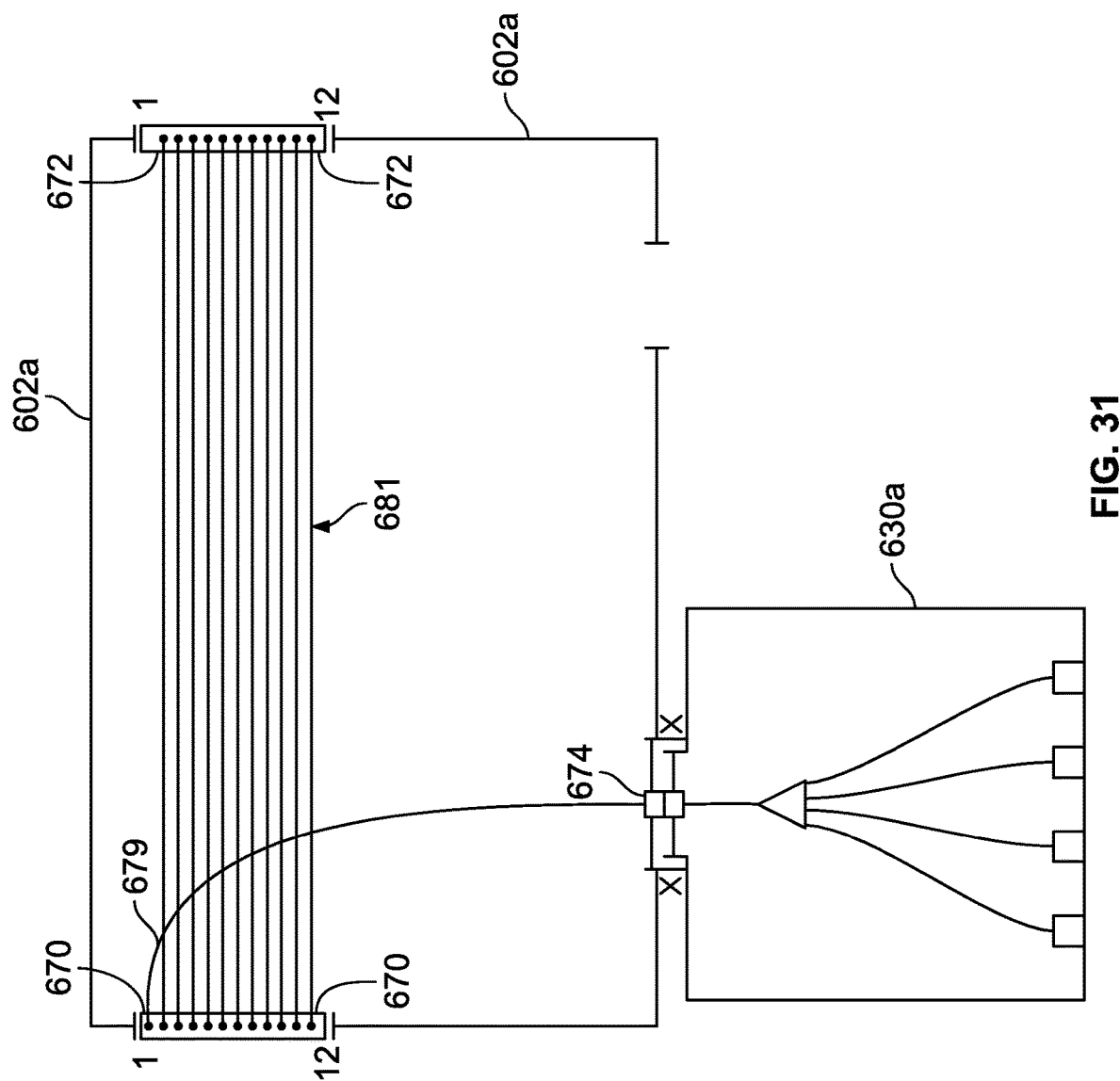
FIG. 31 is a schematic view of another modular system in accordance with the principles of the present disclosure.

FIG. 31 schematically shows the add-on module 630*a* coupled to a terminal housing 602*a* having an alternative configuration. As depicted, the terminal housing 602*a* is configured to function as an indexing terminal in which optical fibers are indexed in position from a first multi-fiber ferrule 670 to a second multi-fiber ferrule 672. As depicted, the multi-fiber ferrules 670, 672 are shown as twelve-fiber ferrules such as MPO ferrules. It will be appreciated that the ferrules 670, 672 can be provided in ruggedized multi-fiber connectors in, non-ruggedized multi-fiber connectors, in ruggedized ports, or on tethers associated with the terminal 602*a*. As depicted, the first fiber 679 of the ferrule 670 is dropped and optically connected to a connector 674 that is optically connected to the add-on module 630*a* at a terminal port. Optical fibers 681 corresponding to positions 2-12 of the first ferrule 670 are routed to positions 1-11 of the second multi-fiber ferrule 672. In this way, the remaining optical fibers are pass-through fibers that are routed between the first ferrule 670 and the second ferrule 672 to allow signals to be passed through the terminal. It will be appreciated that other indexing patterns in addition to the ones shown can also be used. Additionally, more than one optical fiber can be dropped from the first ferrule 670.

Figure 32:
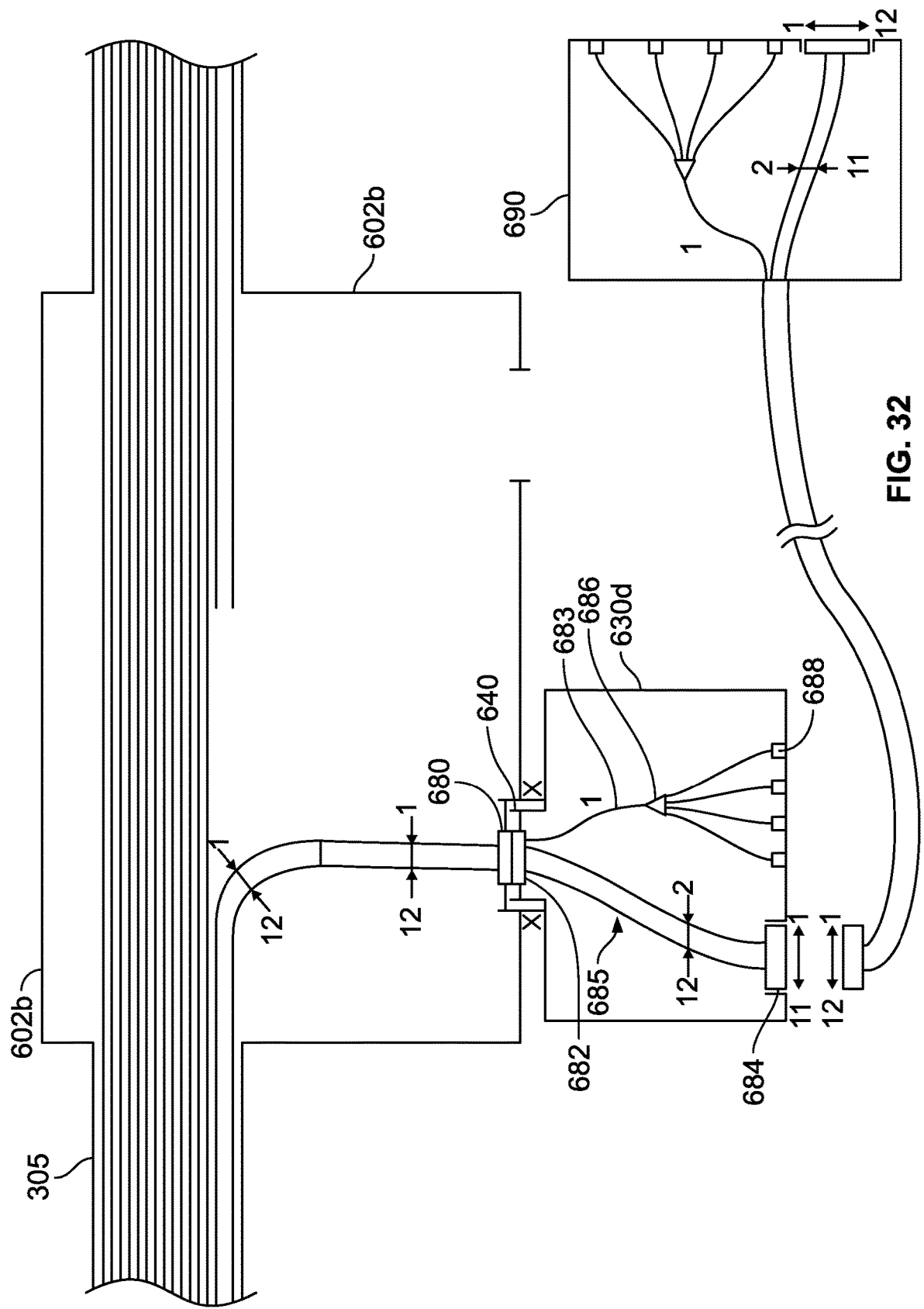
FIG. 32 is a schematic view of another modular system in accordance with the principles of the present disclosure.

FIG. 32 shows another fiber distribution system in accordance with the principles of the present disclosure. The fiber distribution system includes a terminal housing 602*b* where twelve optical fibers are accessed from a pass-through cable 305 routed through the terminal housing 602*b* and optically connected to a multi-fiber ferrule 680. The multi-fiber ferrule 680 is mounted at a terminal port positions at a module mounting location of the terminal housing 602*b*. An add-on module 630*d* is shown mounted at the module mounting location. The add-on module 630*d* is depicted as an indexing module. The indexing module 630*d* includes a first ferrule 682 positioned within a sleeve 640 forming a connector housing of the add-on module 630*d*. The add-on module 630*d* also includes a second multi-fiber ferrule 684 positioned at a ruggedized port of the add-on module 630*d*. In one example, the ferrules 682, 684 are twelve-fiber ferrules. As depicted, one fiber 683 is dropped from the first ferrule 682 and routed to an optical splitting component 686. Outputs of the optical splitting component 686 are routed to ruggedized ports 688 of the add-on module 630*d*. Optical fibers 685 connected to positions 2-12 of the first ferrule 682 are routed to positions 1-11 of the second ferrule 684. As described above, it will be appreciated that different indexing patterns and different drop rates could be used. As shown at FIG. 32, an additional indexing terminal 690 can be coupled to the ruggedized port including the second ferrule 684. It is contemplated that plurality of indexing terminals can be daisy-chained together to provide an extended fiber optic network.

Figure 33:
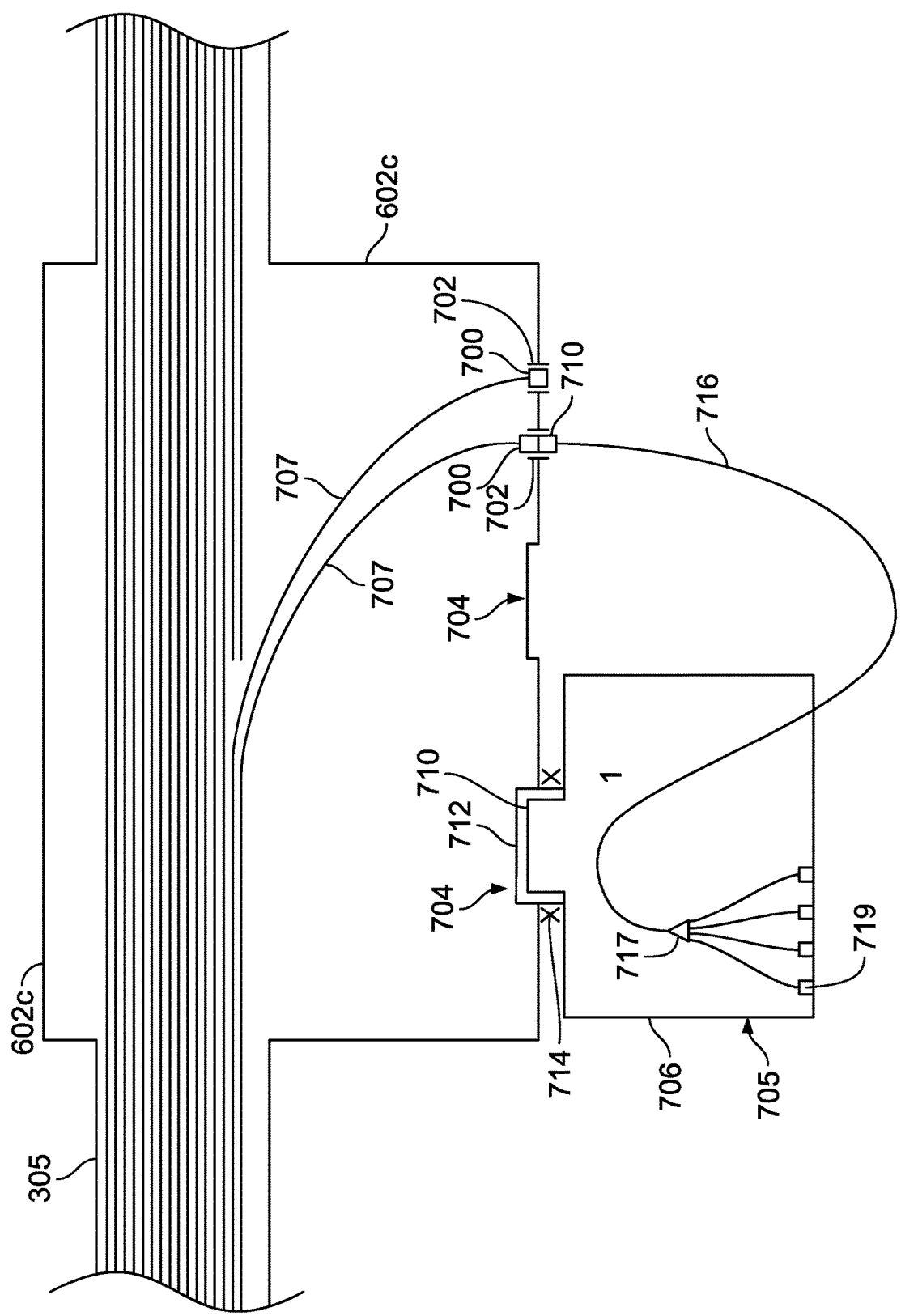
FIG. 33 is a schematic view of another modular system in accordance with the principles of the present disclosure.
Figure 34:
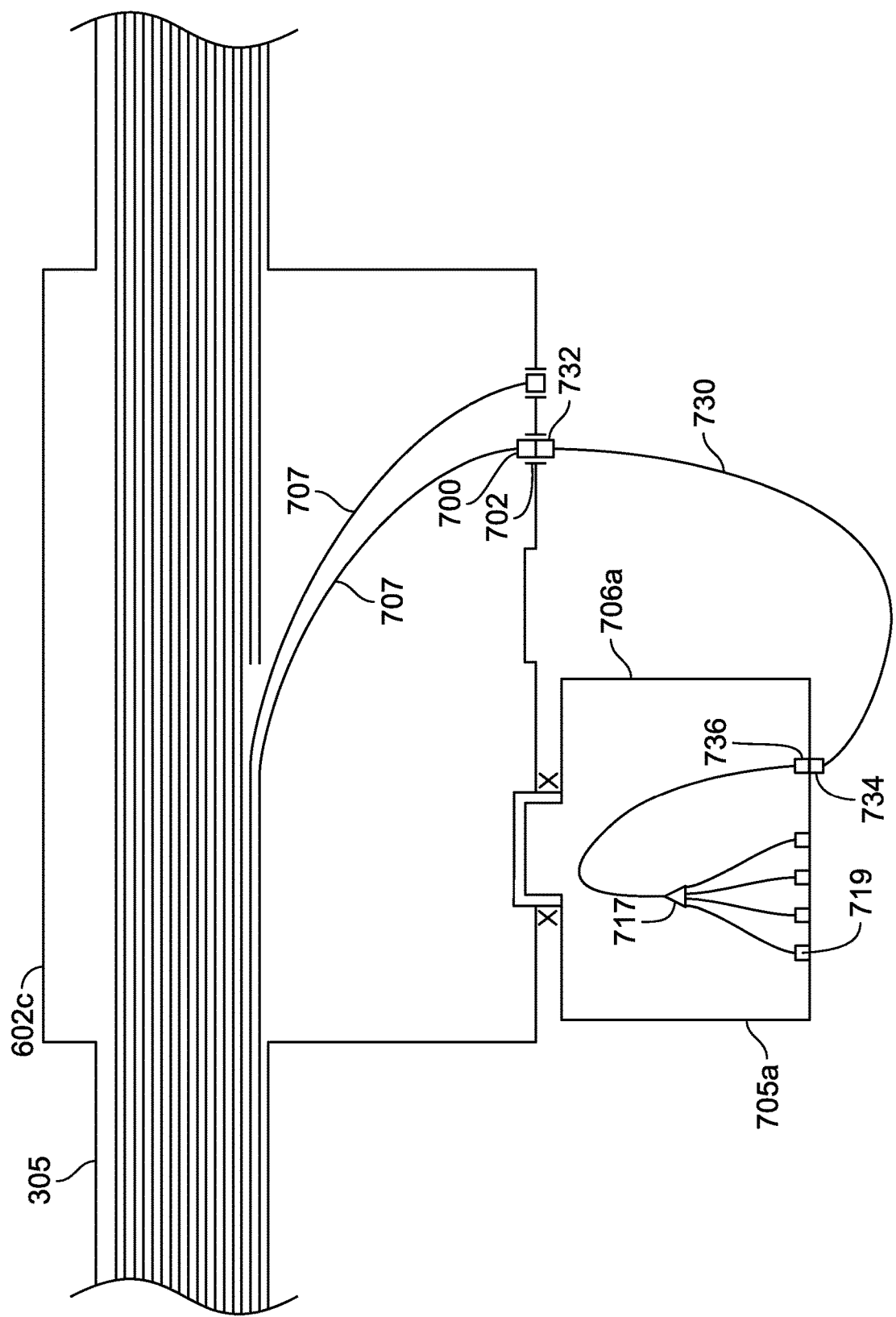
FIG. 34 is a schematic view of another modular system in accordance with the principles of the present disclosure.

FIGS. 33 and 34 show a further fiber distribution system in accordance with the principles of the present disclosure that includes a terminal housing 602*c*. Similar to previous examples, the terminal housing 602*c* can include structure for routing a pass-through cable 305 therethrough. Optical fibers 707 from the pass-through cable 305 can be accessed and optically connected to fiber optic connectors 700 associated with terminal ports 702. The terminal housing 602*c* can also include module mounting locations 704 at which module housings of add-on modules can be mechanically attached to the terminal housings 602*c* such that the module housings are integrated with the terminal housing 602*c*. The module housing mounting locations 704 are depicted as being offset from the terminal ports 702. A module 705 having a module housing 706 is shown mechanically coupled to one of the module housing mounting locations. It will be appreciated that a variety of mechanical connection interfaces can be utilized to interconnect the module housing 706 to the module housing location 704. Example mechanical interfaces can include latch arrangements, snap-fit arrangements, mating interfaces, interlocking latches, threaded couplers, bayonet-style couplers, slide clips or other structures. In one example, the module housing 706 can include a stabilizing projection 710 that mates with a corresponding receptacle 712 defined by the terminal housing 602*c*. Additionally an attachment arrangement 714 (e.g., latching arms such as latching arms 654 or other type of retention or latching mechanism of the type previously described) can be used to prevent the stabilizing projection 710 from unintentionally disengaging from the receptacle 712. As depicted at FIG. 33, the add-on module includes an optical connection structure in the form of an exterior tether 716 that optically connects the interior of the module housing 706 with one of the optical fibers accessed within the terminal housing 602c. This optical connection occurs at one of the terminal ports 702 offset from the module housing mounting locations 704. As depicted, the tether is a single-fiber tether with a connectorized end 718 coupled with the connector 700 at one of the terminal ports 702. The tether 716 is optically connected to an input of an optical splitting component 717 within the add-on module housing 706. Outputs of the splitting component 717 can be coupled to ruggedized ports 719. In other examples, the tether 716 can be a multi-fiber tether terminated by a multi-fiber ferrule that couples to a multi-fiber ferrule positioned at one of the terminal ports 702. While the add-on module 706 is shown including a splitting component (e.g., a passive optical power splitter, wavelength division multiplexer, etc.), it will be appreciated that other types of add-on modules such as break-out modules and indexing modules can also be used.

FIG. 34 shows the terminal housing 602c coupled to an alternative add-on module 705a having an alternative module housing 706a. The add-on module 705a is the same as the add-on module 705 except a patch cord 730 is used instead of the tether 716 as the optical connection structure. The patch cord 730 has fiber optic connectors 732, 734 mounted at each of its ends. The connector 732 interfaces with the connector 700 of the terminal port 702 while the connector 734 interfaces with a corresponding connector 736 integrated within a port of the module housing 706a. The connector 736 is optically connected to an input of the optical splitting component. In other examples, multi-fiber patch covers terminated by multi-fiber connectors could be used (e.g., for indexing, splitting or breakout modules).

Figure 35:
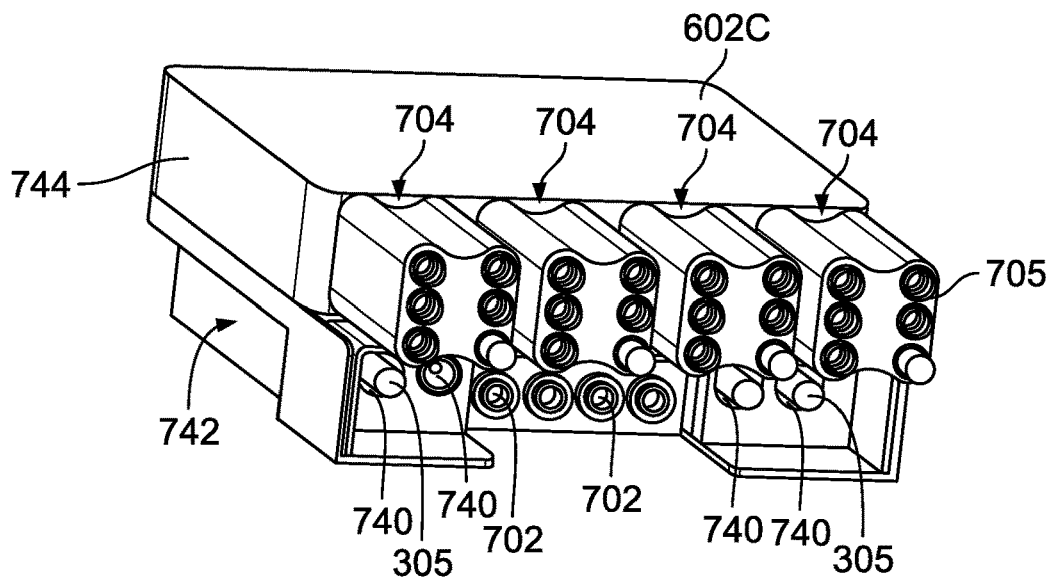
FIG. 35 is another view of the modular system of FIG. 34.

FIG. 35 shows a more detailed version of the terminal housing 602c. As depicted, the terminal housing 602c includes four cable ports 740 for accommodating and sealing cables such as pass-through cables 305 or drop cables. The terminal housing 602c can include a lower portion 742 for accommodating loop storage of a pass-through cable. And an upper portion 744 at which the module housing mounting locations 704 are provided. Four of the add-on modules 705 are shown mounted at the module housing locations 704. The terminal ports 702 are shown oriented in a row position below the module housing mounting locations 704.

Figure 36:
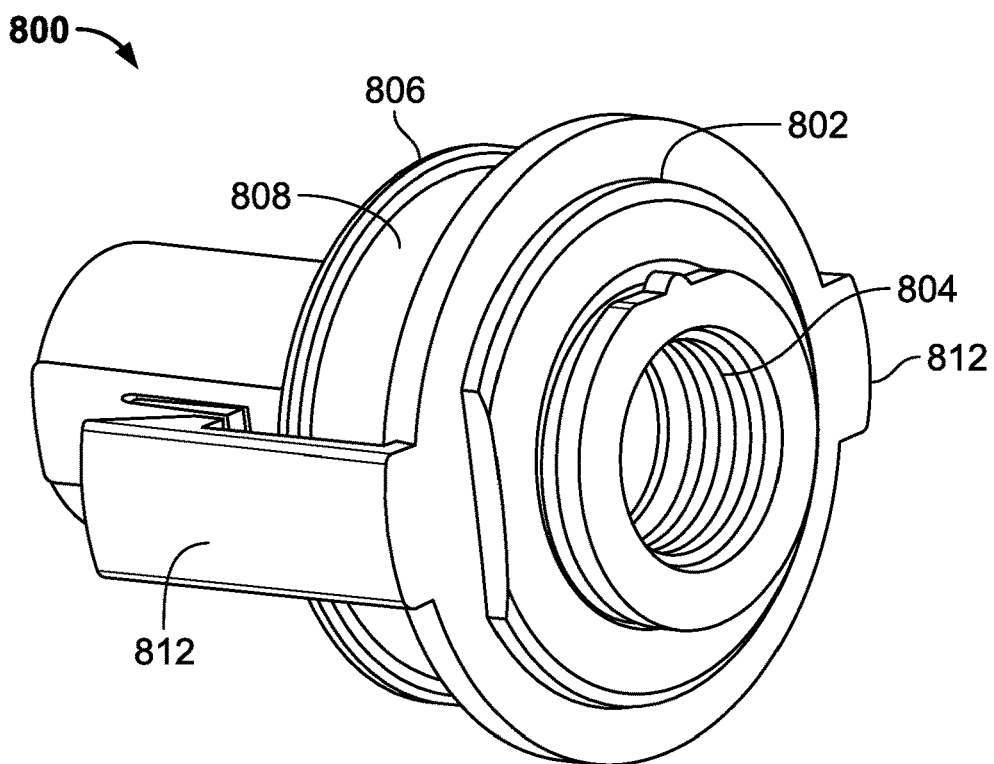
FIG. 36 illustrates an insert in accordance with the principles of the present disclosure.
Figure 37:
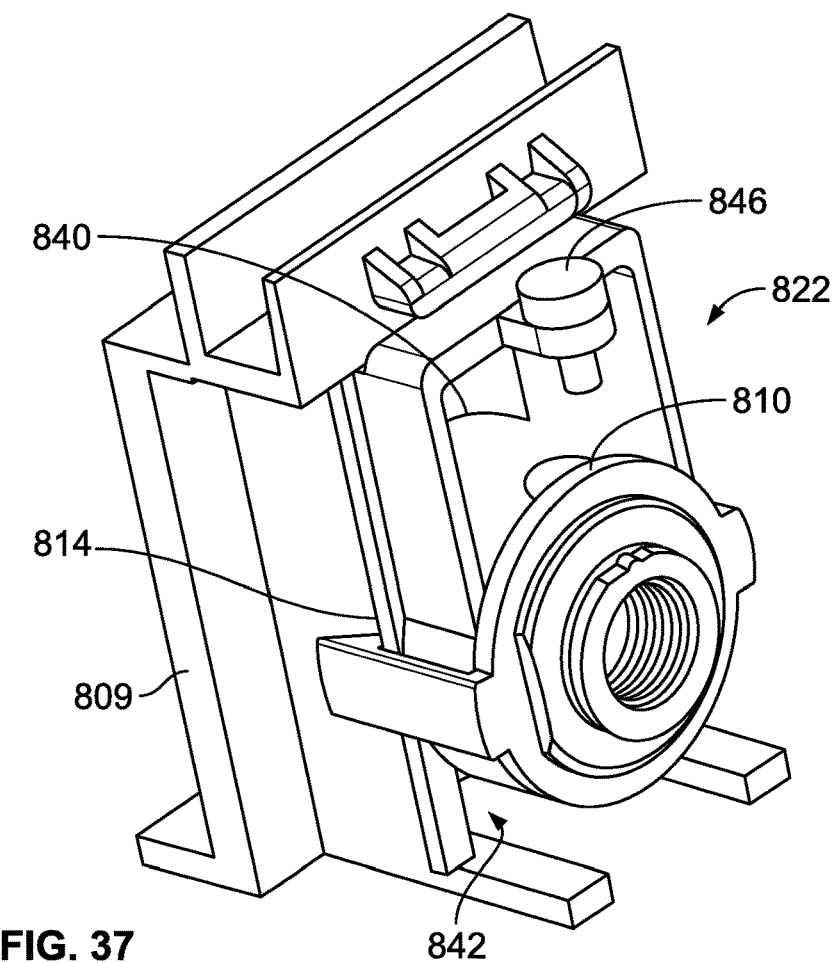
FIG. 37 illustrates the insert of FIG. 36 mounted in a terminal port of a terminal housing.

FIG. 36 shows another configuration for an insert 800 in accordance with the principles of the present disclosure. The insert 800 can include an outer housing 802 defining a ruggedized port 804. The outer housing 802 can contain an internal fiber optic adapter arrangement such as the one described with respect to the insert 28. The outer housing 802 can define an insert form factor 806 at which a seal 808 is mounted. The insert form factor 806 can be configured to match a corresponding terminal port form factor defined by a terminal port 810 (see FIG. 37) of a terminal housing 809. The outer housing 802 further includes integrated latches 812 that engage corresponding catches 814 on the terminal housing 809 to retain the insert 800 within the insert port 810. It will be appreciated that the ruggedized port 804 can be configured to receive a ruggedized fiber optic connector such as the ruggedized fiber optic connector 34.

Figure 38:
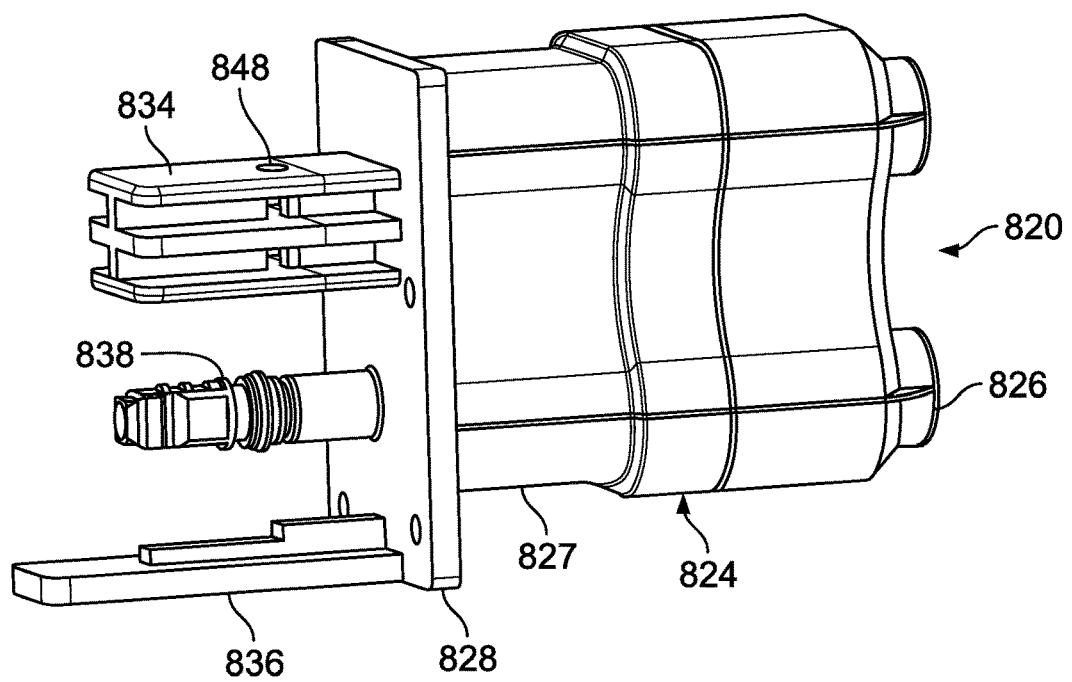
FIG. 38 shows an add-on module compatible with the terminal housing and insert of FIG. 37.

FIG. 38 shows an add-on module 820 configured to optically and mechanically couple to the terminal housing 809 at a module mounting location 822. Rather than interfacing directly with the terminal port 810, the add-on module 802 is configured to interface with the insert 800 loaded within the terminal port 810. Thus, the insert 800 functions to define a modified form factor of the terminal port 810 and essentially becomes the terminal port for the purpose of mating with the add-on module 820.

Figure 39:
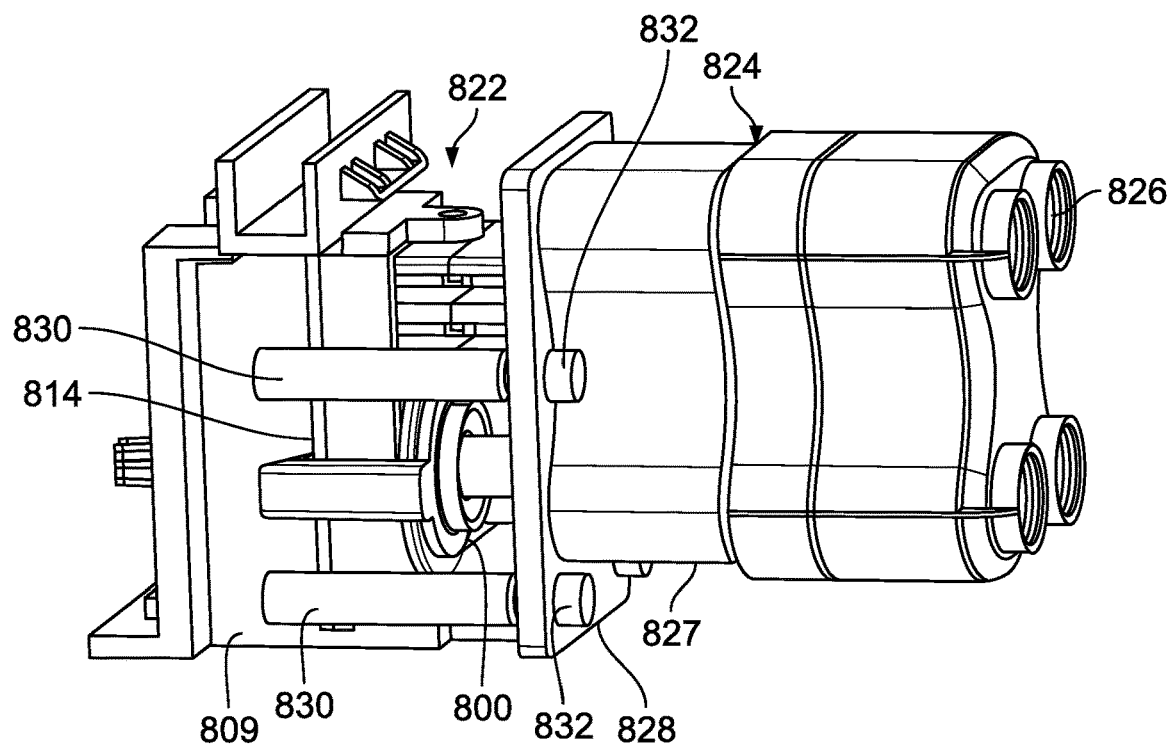
FIG. 39 shows the add-on module of FIG. 38 coupled to the terminal housing and insert of FIG. 37.

Referring to FIGS. 38 and 39, the add-on module 820 includes a module housing 824 at which a plurality of ruggedized ports 826 of the type previously described are provided. The module housing 824 includes a main body 827 coupled to an end plate 828. Latching arms 830 are coupled to the plate 828. As depicted, fasteners 832 secure the latching arms 830 to the plate 828. However, in other examples, the latching arms 830 may be integral with the plate 828 or another part of the module housing. The module housing 824 also includes first and second stabilization elements 834, 836 that project from the plate 828. In certain examples, the stabilization elements 834, 836 can include projections having one or more ribs or other structures that project outwardly from a main body of the projections so as to define more complex form factors that provide enhanced stabilization when inter-mated with the terminal housing at the module mounting location 822. A fiber optic connector housing 838 is coupled to the module housing 824. The connector housing 838 is positioned between the stabilization elements 834, 836. In one example, the connector housing 838 can support a ferrule such as a single-fiber ferrule. In one example, the connector housing 838 can define a plug configured to mate with the ruggedized port 804 defined by the insert 800. When the add-on module 802 is coupled to the module mounting location 822, the first and second stabilization elements 834, 836 are received within corresponding receptacles 840, 842 defined by the terminal housing 809 above and below the terminal port 810. Also, the connector housing 838 fits within the ruggedized port 804 so as to be optically connected to corresponding fiber optic connectors supported within the insert 800. The latching arms 830 can be configured to interlock with the corresponding retention structure 814 provided on the terminal housing 809. Additionally, pin 846 can engage an opening 848 defined by the first stabilization element 834 to further fix the add-on module 820 in place relative to the terminal housing 809. By removing the pin 846 and flexing the latching arms 830 apart, it is possible to disengage the add-on module 820 from the module mounting location 822 of the terminal housing 809.

Figure 40:
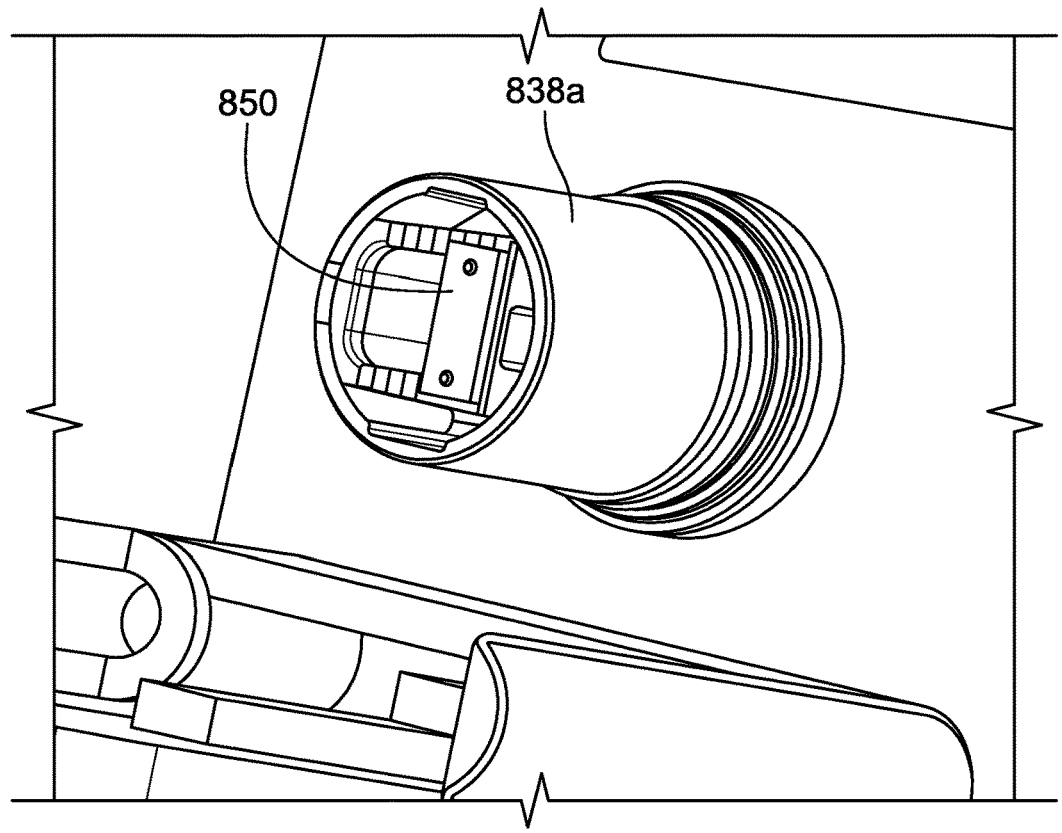
FIG. 40 shows an alternative integrated connector configuration for the add-on module of FIG. 38.

FIG. 40 shows an alternative connector housing 838a that can be used in place of the connector housing 838 to accommodate a multi-fiber ferrule 850. It will be appreciated that the connector housing 838a would not be compatible with the insert 800, but instead would be used with an insert having a form factor or profile that matches the connector housing 838a and that supports a multi-fiber ferrule.

FIGS. 46-49 illustrate another example enclosure 300 including a first housing piece (e.g., a base) 302, a second housing piece (e.g., an intermediate housing) 304, and a third housing piece (e.g., a cover) 306. The base 302 is configured to hold cable loop storage for a pass-through cable 350. A first portion 351 and a second portion 352 of the cable 350 passes between an interior of the base 302 and an exterior of the base 302 through respective sealed cable ports. For example, one or more cable sealing units 115 (FIG. 4) may be disposed at cable sealing mounts 110 (FIG. 1) at the base 302 to seal the cable 350 in the same way as described above with respect to FIGS. 1-9. In certain implementations, cable anchors 355 also can be disposed in the base 302 to axially retain the first and second portions 351, 352 of the cable 350.

In some implementations, the base 302 also defines one or more additional ports 298 that provide access to an interior of the base 302. The additional ports 298 are in addition to the cable ports through which the first and second portions 351, 352 of the cable 350 extend. In some implementations, the additional ports 298 are configured to receive the cable modules, multi-port modules, single port modules, value-added modules, or other modules of the type disclosed above.

The intermediate housing 304 attaches to the base 302 to form a combined interior of the base 302 and the intermediate housing 304. A seal is disposed between the base 302 and the intermediate housing 304 to environmentally seal the combined interior of the base 302 and intermediate housing 304 at the intersection of the base 302 and the intermediate housing 304. When the intermediate housing 304 is attached to the base 302, the cable loop storage is accessible through the intermediate housing 304.

The cover 306 attaches and environmentally seals to the intermediate housing 304 to inhibit access to the combined interior. In certain implementations, the cover 306 attaches to the intermediate housing 304 with a twist-to-lock connection. In some examples, the twist-to-lock connection includes a threaded connection. In other examples, the twist-to-lock connection includes a bayonet connection. The cover 306 compresses and releases a seal 294 (FIG. 47) when twisted relative to the intermediate housing 304 in first and second rotational directions, respectively. Accordingly, the cover 306 can be quickly and easily installed on the intermediate housing 304.

In some implementations, the cover 306 is configured to twist no more than a full turn relative to the intermediate housing 304 to lock to the intermediate housing 304. In certain implementations, the cover 306 is configured to twist no more than a half-turn relative to the intermediate housing 304 to lock to the intermediate housing 304. In certain examples, the cover 306 is configured to twist no more than a quarter-turn relative to the intermediate housing 304 to lock to the intermediate housing 304. In certain implementations, the cover 306 defines receptacles 306a (e.g., see FIG. 48) configured to receive a handle or tool to enable an application of additional torque to facilitate twisting of the cover 306 relative to the intermediate housing 304.

In some implementations, the intermediate housing 304 includes a single row of terminal ports 296. In other implementations, however, the intermediate housing can include multiple rows of ports 296. In some implementations, the ports 296 of the intermediate housing 304 are the same. In other implementations, at least one of the ports 296 of the intermediate housing has a different shape, size, and/or orientation than another of the ports 296. In certain implementations, one of the ports 296 faces in a different direction from another of the ports 296. In examples, each of the ports 296 is angled relative to the other ports 296. In the example shown, the ports 296 face outwardly from a rounded or curved portion of the intermediate housing 304. In some implementations, the base 302 defines the additional ports 298 and the ports 296 are smaller than the additional ports 298. The terminal ports 296 are configured to receive inserts or modules. At FIG. 46, the ports 296 have inserts 1020 inserted therein. Similar to previously described inserts, the inserts can include form factors that match the form factors of the terminal ports 296 and can be sealed relative to the terminal ports. The inserts 1020 define ruggedized ports 1021. In one example, the inserts 1022 can include snap-fit latches 1024 for retaining the inserts in the terminal ports 296 (similar to the insert 800).

Modules 1026 can also interface with the terminal ports 296. The modules can include form factors that mate directly within the terminal ports 296 (when the inserts 1020 have been removed), or can include integrated connectors that mate with the ruggedized ports of the inserts 1020 when the inserts 1020 are mated with the terminal ports 296. In the depicted example, the modules 1026 optionally include latches 1028 for interlocking with the terminal ports 296, and include form factors that mate directly with the terminal ports 296. Thus, in the depicted example, the inserts 1020 would be removed from the terminal ports 296 before modules 1026 are mated with the terminal ports 296. The modules can include a plurality of ruggedized ports and can be any of the module types described above (e.g., splitter modules, fan-out or break-out modules, WDM modules, indexing modules, multi-port modules, etc.).

In some implementations, a bracket 380 is mounted to the intermediate housing 304 at the ports 296. The bracket 380 is configured to aid in mounting at least one value-added module 1026 at the ports 296. In some implementations, the value-added module 1026 is robustly held at the bracket 380 and environmentally sealed to the port 296. As the term is used herein, a module is robustly held if the module can remains attached despite a pull-out force of at least about forty pounds. In certain implementations, the bracket 380 defines a aperture 381 at which the value-added module 1026 can latch (e.g., via latches 1030 integrated with the modules). In certain implementations, the bracket 380 includes a ledge 382 that extends along a bottom of the value-added module 1026 to provide support and/or alignment therefore. Optionally, the ledge 382 can include guide structures 1032 (e.g., rails, tracks, projections) that interface with the modules for guidance during insertion and for enhanced stability. It will be appreciated that brackets can be mounted to any of the terminal housings of the present disclosure to provide enhanced reinforcement at the module interface locations.

In some implementations, the enclosure 300 can include a shroud 390 that extends over the ports 296. For example, the shroud 390 can mount to the intermediate housing 304. The shroud 390 includes at least a top surface 391 that may define structures (e.g., notches, tabs, latches, snap-fit structures, friction-fit structures, etc.) that mechanically engage and optionally interlock with the modules. In certain examples, the shroud 390 can include guides or other alignment features for guiding insertion of the modules 1026 to their respective terminal ports. In certain examples, the shroud aids in aligning the value-added modules or other modules/inserts. In certain examples, the shroud aids in holding the value-added modules at the ports 296. For example, the shroud 390 may protect against torqueing of the value-added modules. In other examples, the shroud 390 can inhibit accidental and/or unauthorized removal of the value-added modules. In the example shown, the shroud 390 includes sides 392 extending downwardly from opposite sides of the top surface 391. The sides 392 also may inhibit torqueing of or access to the value-added modules. In a non-limiting example, the top surface 391 and side surfaces 392 are monolithically formed.

Figure 50:
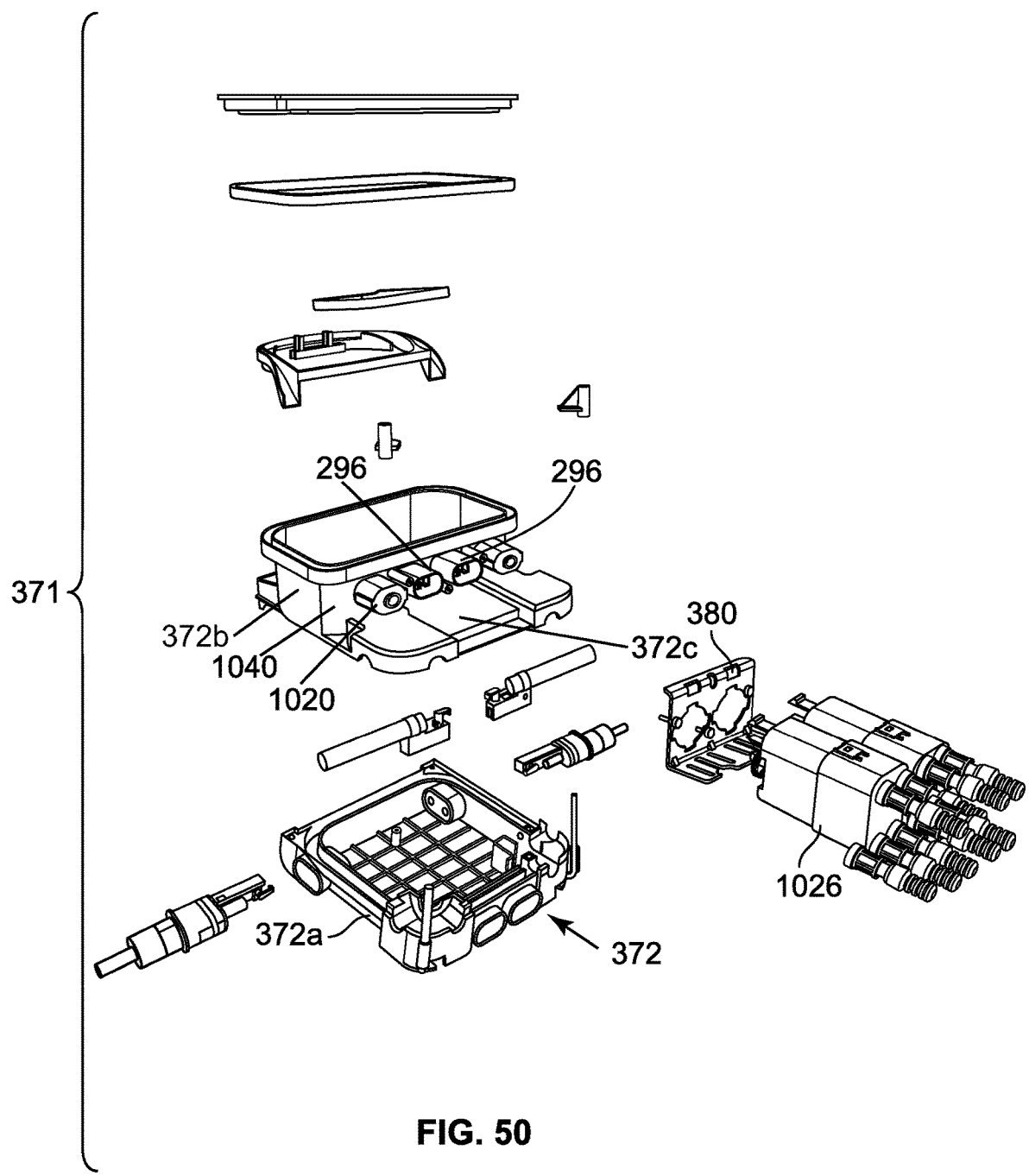
FIG. 50 is a perspective view of another example enclosure including a base, an intermediate housing, and a cover shown exploded away from each other.
Figure 51:
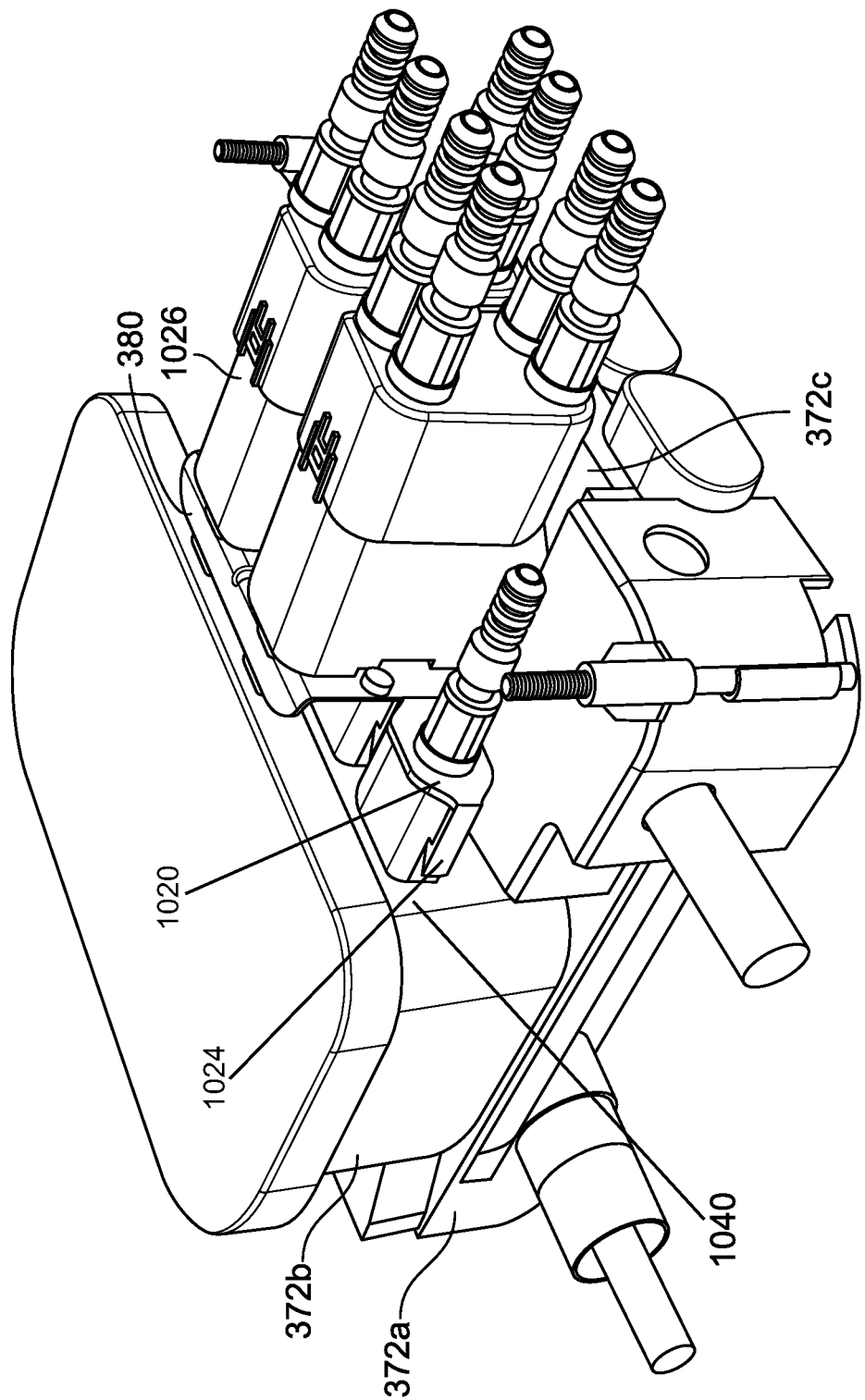
FIG. 51 shows the enclosure of FIG. 50 assembled with some of the ports populated with value-added modules and a ruggedized optical adapter.

FIGS. 50 and 51 illustrate another example enclosure 371 in accordance with the principles of the present disclosure. The enclosure 371 includes a terminal housing 372 which optionally can accommodate a pass-through cable (e.g., provide loop storage for a pass-through cable). The terminal housing 372 also defines at least one terminal port 296. In a preferred example, the terminal housing 372 defines a plurality of terminal ports 296. The terminal ports 296 can be configured to interface with inserts/modules (e.g., modules 1026 and inserts 1020).

In some implementations, the terminal housing 372 includes a first portion 372a and a second portion 372b. The first portion 372a can correspond to (e.g., form or interface with) a base of the terminal housing 372. The second portion 372b is smaller than the first portion 372a. The second portion 372b defines the ports 296. For example, the second portion 372b can include an upright structure 1040 (e.g., surface, shoulder, stepped structure, etc.) which defines the ports 296 and therefore functions as a module/insert interface. In certain implementations, the terminal housing 372 has a stepped transition between the first and second portions 372a, 372b. In certain implementations, the first portion 372a defines a ledge 372c that extends outwardly from the second portion 372b. The ports 296 face outwardly toward or over the ledge 372c.

When a module is mounted at one of the ports 296 of the terminal housing 372, module extends at least partially across the ledge 372c. In some implementations, the ledge 372c shields and protects the module. In some examples, the module seats on the ledge 372c. In one example, the ledge 372c shields the mounted modules in a first orientation and the upright structure 1040 of the second portion 372b shields the mounted modules from a second orientation that is perpendicular to the first orientation. The ledge 372c and the upright structure 1040 can be angled (e.g., perpendicular) relative to one another. In some implementations, the bracket 380 can be used to reinforce the connections between the terminal housing and the modules. The ledge 372c can include a recess for receiving and positioning the bracket 380.

In FIGS. 50 and 51, it can be appreciated that at least 50% of a length of one or more of the mounted modules module 1026 coincides with the ledge 372c. In many embodiments, at least 75% of a length of one or more of the mounted modules coincides with the ledge 372c. Further, it can be seen how the first housing portions 372a defines a perimeter footprint, which is the outermost boundary or perimeter of the first housing portions 372a (e.g., the base) when viewed from the top (i.e., viewed in top plan). The ledge 404c functions as a shelf to protect and optionally support the mounted modules. Optionally, the ledge 372c can extend at least 25% of a length of the footprint of the first housing portion 372a. In some cases, at least 75%, and in some cases all of the length of the one or more modules can oppose the shelf or ledge 372c.

The second housing portion 372b is smaller than the first housing portion 372a such that the second housing portion 372b and a majority of the module footprint defined by each of the mounted one or more modules are within the footprint of the first housing portion 372a, when viewed from above. In some cases, the second housing portion 372b and at least 75% of the module footprint defined by each of the mounted modules is within the footprint of the first housing portion 372a. In some cases, the second housing portion 372b and the entire module footprint of each of the one or more modules is within the footprint of the first housing portion 372a when viewed from above.

In reviewing FIGS. 50 and 51, a system is illustrated in which there is a terminal housing having an outer perimeter defining a footprint, which is the outermost boundary contained in a first plane, when viewed from above, in top plan. The terminal housing also has a profile, which is the side view contained in a second plane, when viewed in side plan. The footprint is viewed from one direction and the profile is viewed from a perpendicular direction. The second plane is orthogonal to the first plane. The terminal housing has an interface for receiving and connecting with add-on modules.

In some embodiments, a majority (i.e., greater than 50%) of a module footprint and module profile is within the footprint and the profile of the terminal housing when the module is mounted to the terminal housing. In some embodiments, at least 75% of a module footprint and module profile is within the footprint and the profile of the terminal housing when the module is mounted to the terminal housing. In some embodiments, an entirety of a module footprint and module profile is within the footprint and the profile of the terminal housing when the module is mounted to the terminal housing.

As indicated elsewhere herein, certain aspects of the present disclosure provide the ability to add features and components to a system over time as needed such that certain costs can be delayed or deferred. In this regard, certain aspects can relate to systems and components that allow internal fiber optic adapter components to be easily added to terminal ports in a delayed manner after initial installation of a terminal. FIGS. 52-56 show an example of a system having such features.

Figure 52:
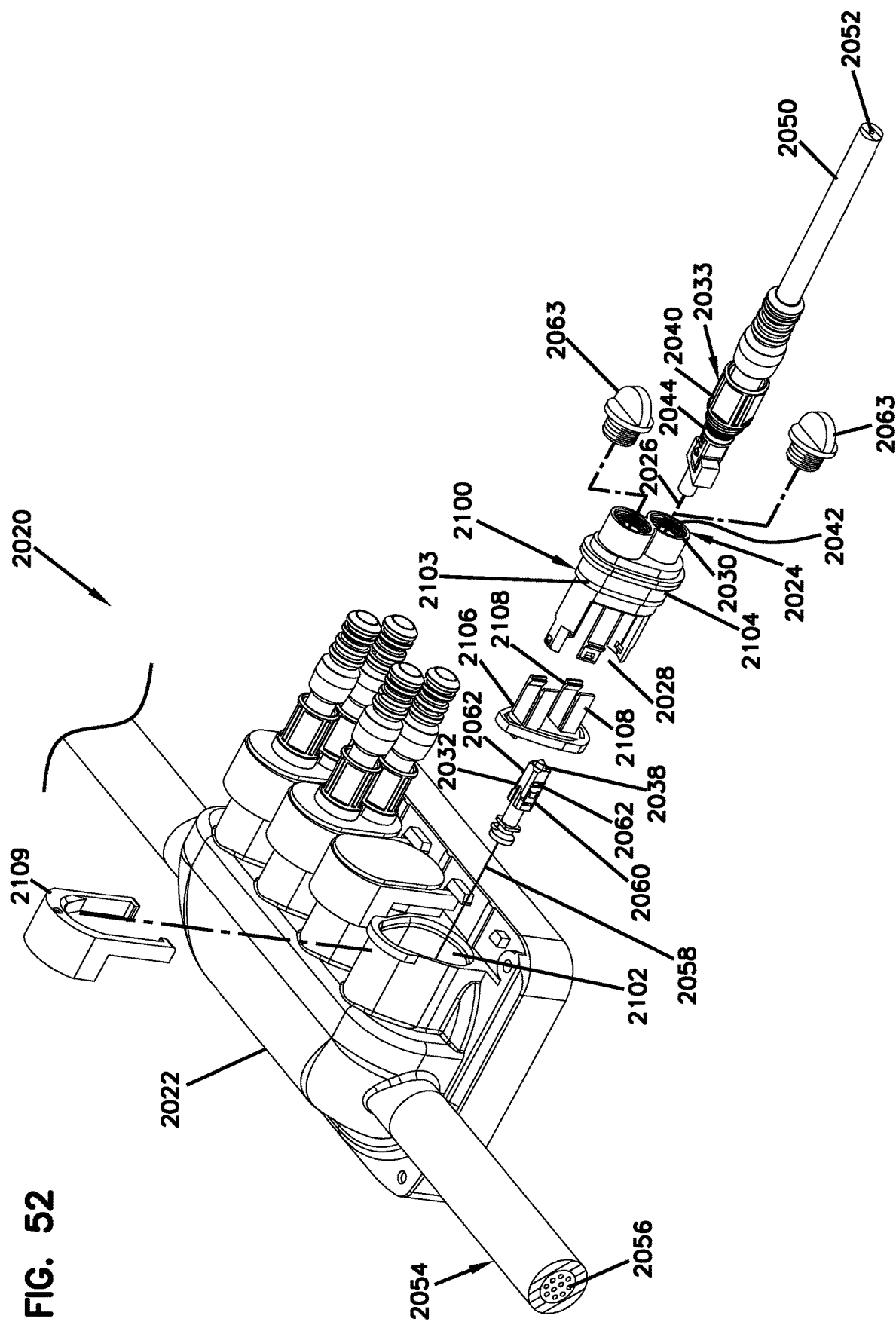
FIG. 52 illustrates another enclosure assembly in accordance with the principles of the present disclosure.

FIG. 52 illustrates an enclosure assembly 2020 in accordance with the principles of the present disclosure. The enclosure assembly 2020 includes a terminal housing 2022. The terminal housing 2022 can be adapted for outdoor use and can be environmentally sealed. The enclosure assembly 2020 also includes a connector port 2024 (e.g., a sealed connector port) provided at the terminal housing 2022. The connector port 2024 defines a connector insertion axis 2026 that extends through the connector port 2024 between an inner region 2028 and an outer region 2030 of the connector port 2024. The enclosure assembly 2020 also includes an inner fiber optic connector 2032 fixed in place (see FIG. 2) at the inner region 2028 of the connector port 2024 in axial alignment with the connector insertion axis 2026. The enclosure assembly 2020 further includes an outer fiber optic connector 2033 configured to be received in the outer region 2030 of the connector port 2024. An outer fiber optic connector 2033 is inserted into the connector port 2024 along the connector insertion axis 2026. The enclosure assembly 2020 also includes a ferrule alignment sleeve 2034 (See FIG. 56) pre-mounted on a ferrule 2036 (See FIG. 56) of the outer fiber optic connector 2033 prior to insertion of the outer fiber optic connector 2033 into the connector port 2024. The ferrule alignment sleeve 2034 is configured to receive a ferrule 2038 of the inner fiber optic connector 2032 as the outer fiber optic connector 2033 is inserted into the connector port 2024. In this way, the ferrule alignment sleeve 2034 provides co-axial alignment between the ferrules 2036, 2038 of the inner and outer fiber optic connectors 2032, 2033 such that optical connection is made between the optical fibers corresponding to the inner and outer fiber optic connectors 2032, 2033.

In certain examples, the outer fiber optic connector 2033 is a ruggedized connector. As depicted, the outer fiber optic connector 2033 includes a coupling element in the form of a threaded fastener 2040 having external threads that engage corresponding internal threads 2042 of the connector port 2024. In other examples, the threaded fastener could have internal threads that engage corresponding external threads of the connector port. Additionally, other types of twist-to-lock interfaces can be used such as bayonet-style interfaces.

In certain examples, a sealed interface is provided between the outer fiber optic connector 2033 and the connector port 2024 when the outer fiber optic connector 2033 is mounted within the connector port 2024. In the depicted example, the outer fiber optic connector 2033 can carry an external seal 2044 (e.g., an O-ring type seal) that seals between the fiber optic connector 2033 and the connector port 2024 when the fiber optic connector 2033 is mounted within the connector port 2024.

Figure 54:
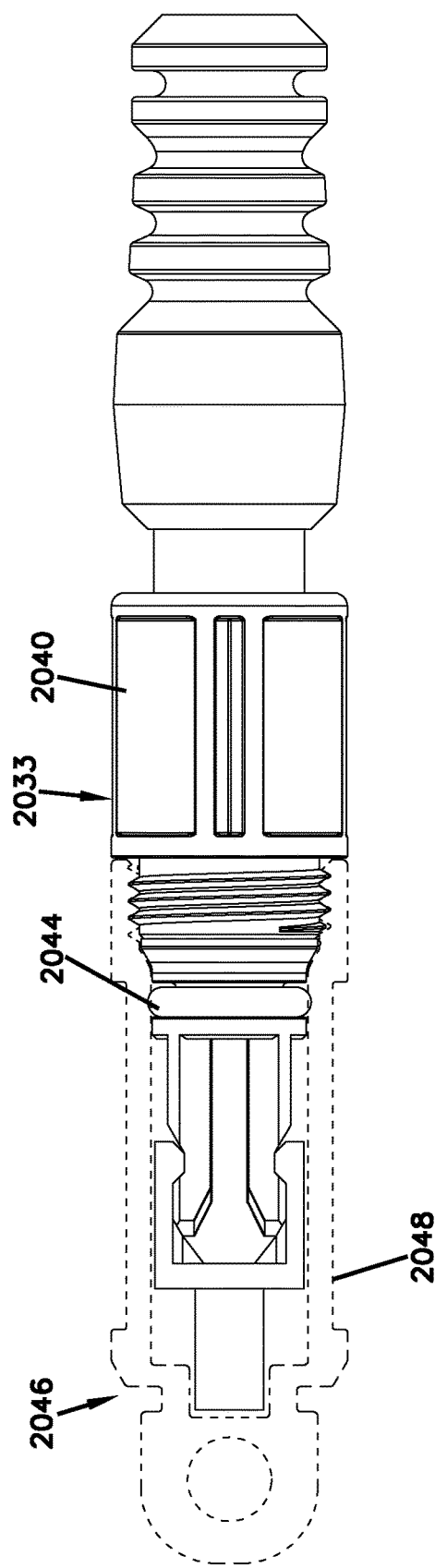
FIG. 54 is a top view of an outer fiber optic connector of the enclosure assembly of FIGS. 52 and 53.
Figure 55:
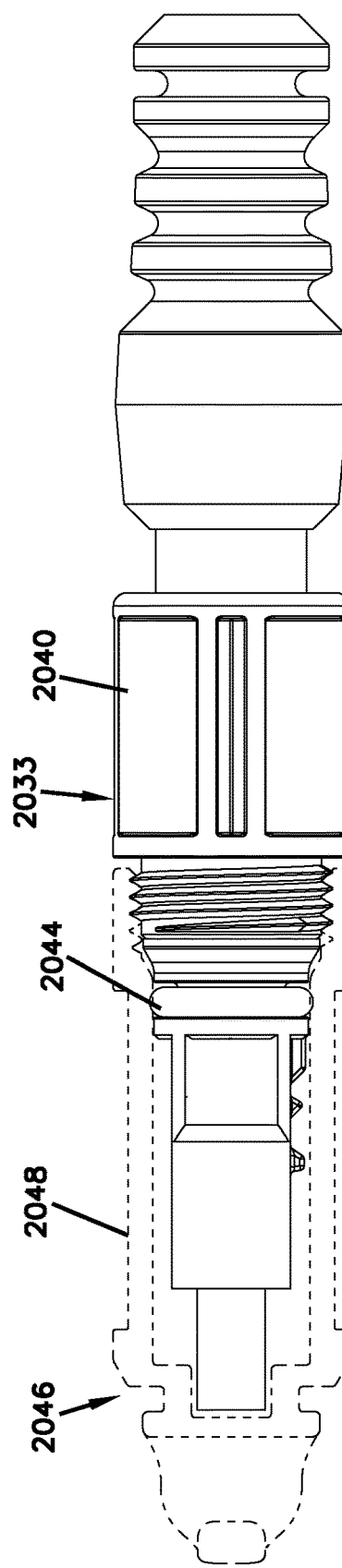
FIG. 55 is a side view of the outer fiber optic connector of FIG. 54.
Figure 56:
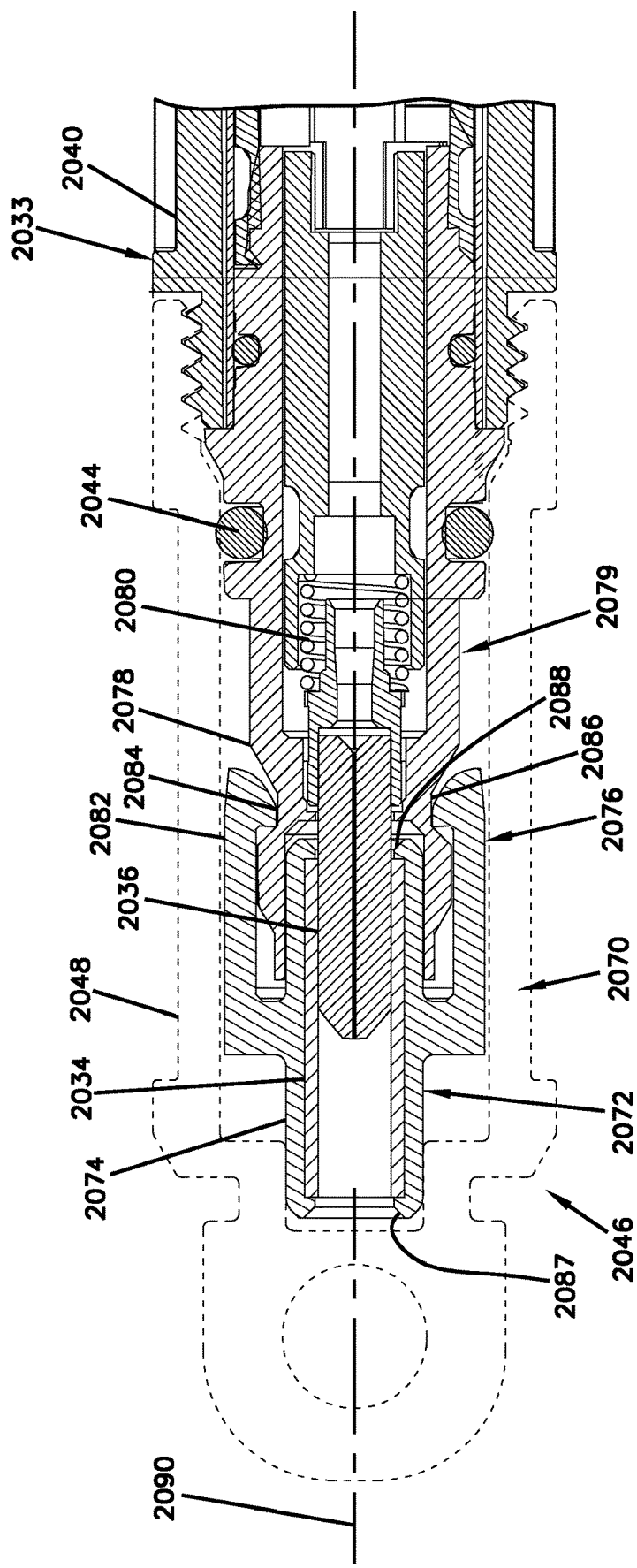
FIG. 56 is a cross-sectional view of the outer fiber optic connector of FIGS. 54 and 55.

Prior to insertion of the outer fiber optic connector 2033 into the connector port 2024, a distal end 2046 of the outer fiber optic connector 2033 can be covered and protected by a dust cap 2048 (see FIGS. 54 and 55). In certain examples, the dust cap 2048 can be retained over the distal end 2046 of the fiber optic connector 2033 by the fastener 2040. In certain examples, the dust cap 2048 can have internal threads that mate with corresponding external threads of the fastener 2040. As shown at FIG. 56, the ferrule 2036 of the outer fiber optic connector 2033 as well as the ferrule alignment sleeve 2034 are housed within the dust cap 2048 when the dust cap is mounted over the distal end 2046 of the outer fiber optic connector 2033. In certain examples, the dust cap 2048 engages the seal 2044 such that the interior of the dust cap 2048 is sealed from intrusion by the outside environment.

Figure 53:
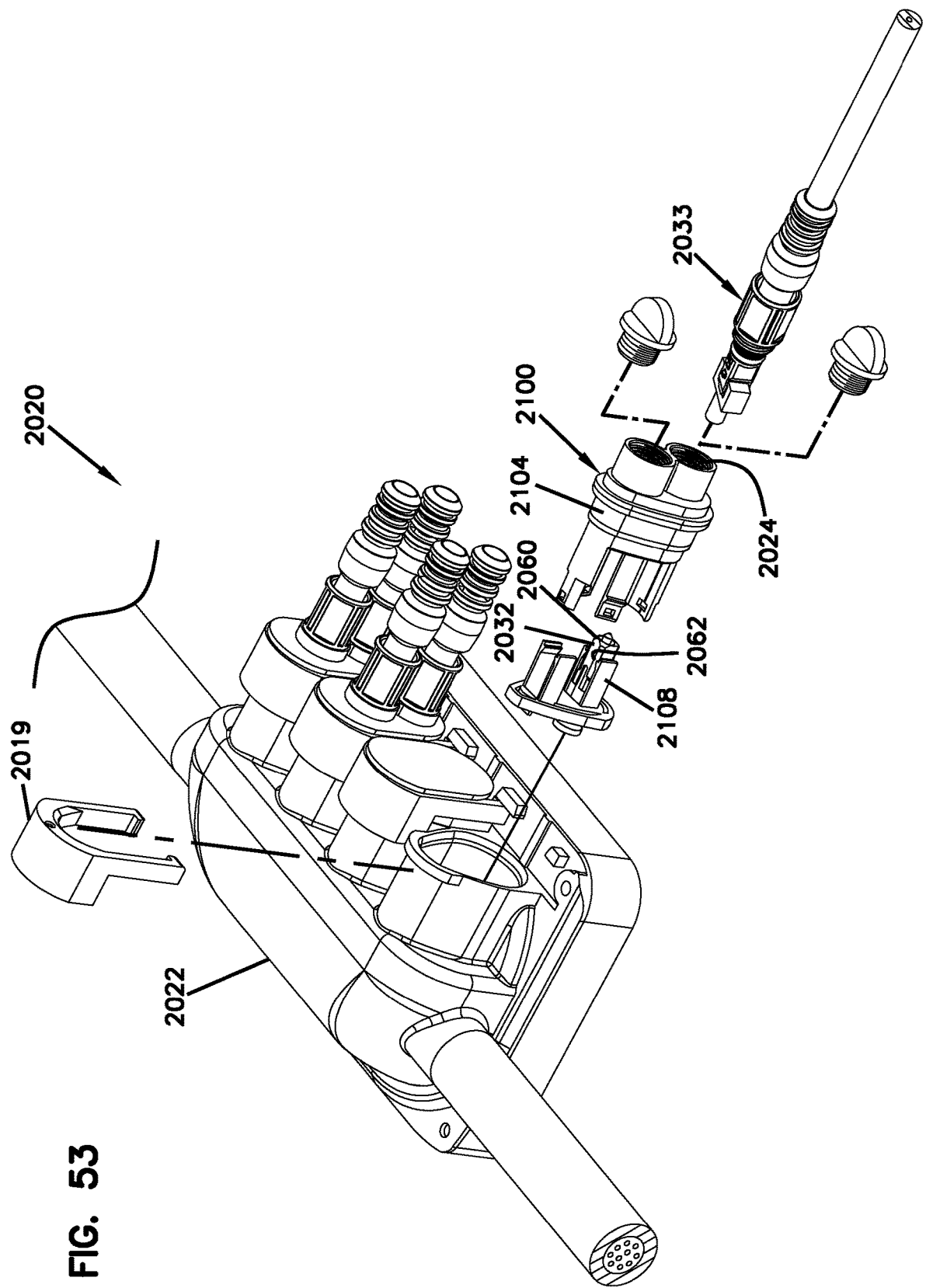
FIG. 53 illustrates the enclosure assembly of FIG. 52 with an inner connector mounted in a secured position.

As shown at FIGS. 52 and 53, the outer fiber optic connector 2033 can be mounted on the end of a cable 2050 such as a drop cable. In certain examples, the cable 2050 is optically connected to a subscriber location either directly or indirectly. The cable 2050 can include an optical fiber 2052 having a polished end portion supported within the ferrule 2036.

Referring back to FIG. 53, a network fiber optic cable 2054 is shown routed through the terminal housing 2022. The network fiber optic cable 2054 includes a plurality of optical fibers 2056. One or more of the optical fibers 2056 can be accessed within the interior of the terminal housing 2022. In certain examples, one of the optical fibers 2056 can be coupled to the inner fiber optic connector 2032. For example, the inner fiber optic connector 2032 can be directly terminated to the end of one of the optical fibers 2056. Alternatively, the inner fiber optic connector 2032 can be mounted at the end of a pigtail 2058 spliced to one of the optical fibers 2056.

As depicted, the inner fiber optic connector 2032 is shown as a non-ruggedized fiber optic connector including a connector body 2060 forming a connector plug. In certain examples, a connector plug can have a standard form-factor such as a standard SC-type form factor. The ferrule 2038 of the inner fiber optic connector 2032 is supported at the plug end of the connector body 2060. The optical fiber of the pigtail 2058 can be supported within the ferrule 38. The connector body 2060 can define notches 2062 or other structures for facilitating securing the connector body 2060 at a predetermined location. In certain examples, the connector port 2024 can initially be enclosed and sealed by a structure such as a dust cap 2063. During initial installation of the terminal housing 2022, the dust cap 2063 can seal the connector port 2024 such that the terminal housing 2022 is environmentally sealed. When it is desired to use the connector port to provide a subscriber connection, the dust cap 2063 can be removed from the connector port 2024 and replaced with the outer fiber optic connector 2033.

The ferrule alignment sleeve 2034 is configured to provide coaxial alignment between the ferrules 2036, 2038 so that the optical fibers held by the ferrules 2036, 2038 are coaxially aligned with one another. In this way, when the ferrules 2036, 2038 are received within the ferrule alignment sleeve 2034, an optical connection is made between the optical fibers supported by the ferrules 2036, 2038. It will be appreciated that the ferrule alignment sleeve 2034 can have a cylindrical configuration. In certain examples, the ferrule alignment sleeve 2034 can be formed by a cylindrical split-sleeve. In certain examples, the cylindrical split-sleeve can be made of a resilient or elastic material such as spring steel that allows the ferrule alignment sleeve 2034 to flex resiliently opened to receive and retain the ferrules 2036, 2038 therein.

Referring to FIG. 56, the ferrule alignment sleeve 2034 is part of a fiber optic adapter assembly 2070 including an adapter housing 2072. The adapter housing 2072 includes a barrel portion 2074 that houses the ferrule alignment sleeve 2034 and a clip portion 2076 that clips onto a plug portion 2078 of the outer fiber optic connector 2033. The plug portion 2078 is part of a connector body 2079 of the outer fiber optic connector 2033. The connector body 2079 at least partially houses the ferrule 2036 and can also house an internal spring 2080 that biases the ferrule 2036 in a distal direction. The fastener 2040 mounts over an exterior of the connector body 2079 and the seal 2044 can mount within a circumferential groove defined by the connector body 2079.

Referring still to FIG. 56, the clip portion 2076 of the adapter housing 2072 includes a pair of resilient latches 2082 having retention tabs 2084 that snap within corresponding recesses 2086 defined on opposite sides of the connector body 2079 to retain the adapter housing 2072 at the distal end of the outer fiber optic connector 2033.

Referring still to FIG. 56, the barrel portion 2074 of the adapter housing 2072 includes inner and outer open ends 2087, 2088. The ferrule alignment sleeve 2034 is mounted between the inner and outer open ends 2087, 2088 and is axially retained within the barrel portion 2074 by shoulders provided at the inner and outer open ends 2087, 2088. The ferrule alignment sleeve 2034 defines a sleeve axis 2090 that extends lengthwise along the barrel portion 2074 through the inner and outer open ends 2087, 2088. The inner open end 2087 is sized to receive the ferrule 2038 of the inner optic connector 2032 and the outer open end 2088 is sized to receive the ferrule 2036 of the outer fiber optic connector 2033. The clip portion 2076 is provided at the outer open end 2088 of the barrel portion 2074. The adapter housing 2072 has an asymmetric configuration in which the clip portion 2076 is only provided at the outer open end 2088 of the barrel portion 2074 and no corresponding clip portion is provided at the inner open end 2086 of the barrel portion 2074. Thus, the adapter housing 2072 includes only a single clip portion, with the single clip portion being configured to clip onto the plug portion 2078 of the outer fiber optic connector 2033.

No corresponding structure is provided at the adapter housing 2072 for clipping onto the inner fiber optic connector 2032. Instead, the inner fiber optic connector 2032 is held in place relative to the connector port 2024 and the terminal housing 2022 by a retention arrangement separate from the adapter housing 2072. It will be appreciated that the retention arrangement can be configured to retain the inner fiber optic connector 2032 in a staged position in which the inner fiber optic connector 2032 is fixed within the terminal housing 2022 at the inner region 2028 of the connector port 2024 in coaxial alignment with the connector insertion axis 2026. When retained at the staged position, the inner fiber optic connector 2032 is positioned so that its ferrule 2038 is automatically received within the inner open end 2087 of the barrel portion 2074 of the adapter housing 2072 when the outer fiber optic connector 2033 is inserted along the connector insertion axis 2026 into the connector port 2024. Suitable alignment structures can be provided between the outer fiber optic connector 2033 and the connector port 2024 to ensure that the ferrule 2038 is readily received within the ferrule alignment sleeve 2034 during insertion of the outer fiber optic connector 2033 into the connector port 2024. In this way, the fiber optic adapter assembly 2070 can readily be deployed in the field at a date subsequent to initial deployment of the terminal housing 2022.

Referring back to FIGS. 52 and 53, the connector port 2024 is defined by an insert 2100 that mounts in sealed relation within a terminal port 2102 defined by the terminal housing 2022. The terminal port 2102 has a terminal form factor (i.e., a transverse cross-sectional shape) that matches an insert form factor defined by the insert 2100. A seal 2103 can be provided between the terminal housing 2022 and the insert 2100 at the terminal port 2102. The insert 2100 can include a main insert body 2104 that defines the insert form factor corresponding to the terminal port form factor. The seal 2103 can be mounted about an exterior of the main insert body 2104. The insert 2100 can also include a connector holder 2106 for holding the inner fiber optic connector 2032 at the staged position in alignment with the connector insertion axis 2026. The connector holder 2106 can be secured to the main insert body 2104 by a mechanical connection such as a snap-fit connection, a fastened connection or an integral connection. As depicted at FIGS. 52 and 53, the connector holder 2106 includes latches 2108 that snap within the side notches 2062 (See FIG. 53) of the connector body 2060 of the inner fiber optic connector 2032 to retain the inner fiber optic connector 2032 in the staged position. A slideable retention clip 2109 can be used to attain the main insert body 2104 and the connector holder 2106 within the terminal port 2102. In certain examples, the clip 2109 allows for main insert body 2104 to be secured to the terminal and released from the terminal without the use of tools.

In use of the enclosure assembly 2020, the network fiber optic cable 2054 and the terminal housing 2022 can initially be deployed in the field. During initial deployment, the inner fiber optic connector 2032 can be coupled to one of the optical fibers 2056 of the network fiber optic cable 2054 and can be secured at the staged position by the connector holder 2106. The main insert body 2104 of the insert 2100 can be retained within the terminal port 2102 by the clip 2108. The connector ports 2024 can initially be closed by the dust caps 2063. When it is desired to connect a subscriber to the network responding to the network fiber optic cable 2054, one of the dust caps 2063 is removed and replaced with the outer fiber optic connector 2033. It will be appreciated that the enclosure assembly 2020 was initially installed without any fiber optic adapters contained therein. Instead, structure corresponding to a fiber optic adapter has been incorporated onto the outer fiber optic connector 2033. Such structures are not provided in the terminal housing 2022 until the time a subscriber is actually connected to the network. The fiber optic adapter component (e.g., the ferrule alignment sleeve 2034) is carried with the outer fiber optic connector 2033 and is installed in the terminal housing 2033 simultaneously with the insertion of the outer fiber optic connector 2033 into the connector port 2024. In this way, costs associated with the ferrule alignment sleeve 2034 or other fiber optic adapter components can be deferred until the time a subscriber is actually connected to the network.

Aspects of the present disclosure relate to modular constructions for telecommunications enclosures such as terminal housings. Terminal housings in accordance with the principles of the present disclosure preferably include at least one terminal port or a plurality of terminal ports such as at least two terminal ports, at least three terminal ports, at least four terminal ports, and greater number of terminal ports. Examples of terminal housings can include drop terminals, cable pass-through terminals, break-out terminals, fan-out terminals, optical network terminals, splice terminals, splitter terminals, WDM terminals and other terminals. Terminal housings can optionally include one or more cable sealing locations for receiving and sealing about cables that enter the terminal housing. Terminal housings can optionally include at least two pass-through cables sealing locations. Pass through cable sealing locations can be configured to accommodate butt-style pass-through configurations, and/or in-line style pass-through configurations and/or off-set pass through configurations. Terminal ports can be provide at one or more sides of a terminal housing. Cable sealing ports can be positioned at one or more sides of a terminal housing.

Aspects of the present disclosure relate to modular systems adapted to allow modules to be added to a terminal housing, and/or for multiple terminal housings to be coupled together and/or for multiple modules to be coupled together. In certain examples, a fixed mechanical interface is used to couple a module to a terminal housing, and/or a module to a module, and/or a terminal housing to a terminal housing. The modules and terminal housings can each include more than one ruggedized port and typically do each include more than one ruggedized port. As used herein, a fixed mechanical interface is an interface where the components coupled together (e.g., module to module; module to terminal housing; terminal housing to terminal housing) are not moveable relative to each other without uncoupling the mechanical interface. A drop terminal having tether cable terminated by a ruggedized connector that plugs into a ruggedized port of a terminal housing is an example of a connection interface that is not fixed since the drop terminal can be moved relative to the terminal housing without disconnecting the ruggedized connector of the tether from the ruggedized port of the terminal housing.

Aspects of the present disclosure relate to a system including first and second housings each including at least two ports. In certain examples, the ports are ruggedized and are adapted for receiving ruggedized connectors. In certain examples, the first and second housings can be and/or are coupled together by a fixed mechanical interface. The fixed mechanical interface provides sealing between the first and second housings such that interiors of the housings are sealed from the outside environment, and/or provides an open fluid connection between the first and second housings, and/or defines an open interior passage for allowing one or more optical fibers to be routed through the mechanical interface between the two housings, and/or includes an internal optical connection or optical pathway between optical fibers contained within the coupled first and second housings, and/or includes a mechanical coupler that mounts between the first and second housings. In certain examples, the mechanical coupler includes a first portion secured within an opening of the first housing (e.g., mated with the opening) and a second portion secured within an opening in the second housing (e.g., mated with the opening). In certain examples, seals are provided at the first and second portions for forming seals with the first and second housings around the openings. In certain examples, the coupler has an open or hollow interior that defines a fiber passage between the first and second housings. In certain examples, the first and second housings are each separately identifiable enclosures (e.g., module or terminals) In certain examples, the fixed mechanical interface can be uncoupled. In certain examples more than 2 housings can be and/or are coupled together.

Aspects of the present disclosure are also directed to a modular system for making sealed enclosures having different configurations (see FIGS. 57-65). The sealed enclosures have multiple sealed cable ports through which cables or media segments thereof (e.g., optical fibers, electrical wires, etc.) can enter and exit the enclosures. The sealed enclosures can begin with a terminal enclosure defining coaxially aligned sealed end ports and a plurality of sealed side ports. In some implementations, the terminal enclosure is used by itself. In other implementations, the terminal enclosure can be daisy-chained together with one or more additional terminal enclosures. In still other implementations, the terminal enclosure can be added to or combined with an enlargement housing. For example, an open rear of the terminal enclosure can be aligned with an opening in the enlargement housing so that the terminal enclosure and the enlargement housing form a combined housing.

Figure 57:
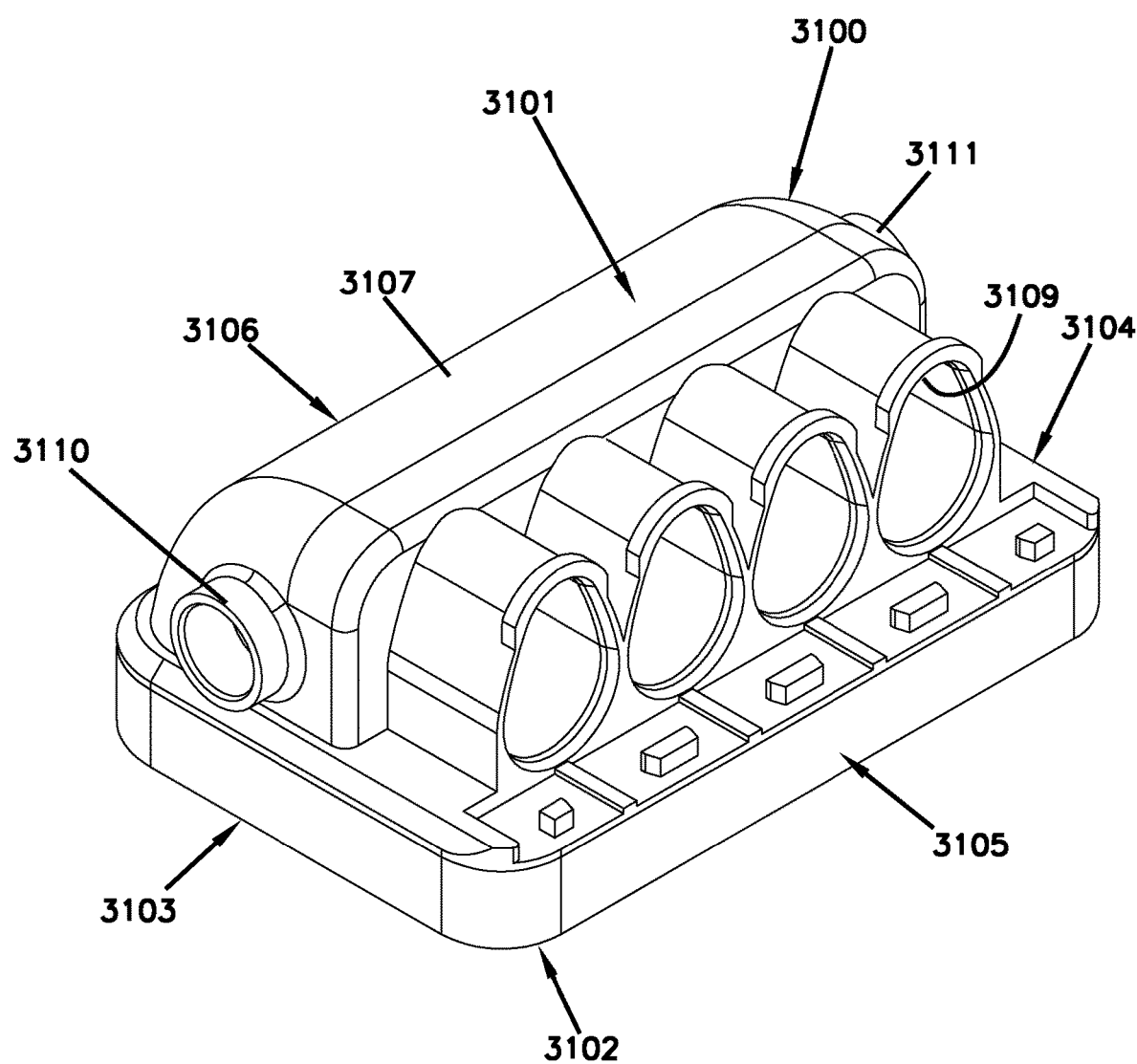
FIG. 57 is a front perspective view of an example terminal enclosure configured as a stand-alone unit.

FIG. 57 illustrates an example terminal enclosure 3100 having a front 3101, a rear 3102, a first end 3103, a second end 3104, a first side 3105, and a second side 3106. The terminal enclosure 3100 has a first end port 3110 at the first end 3103 and a second end port 3111 at the second end 3104. In certain examples, the first and second end ports 3110, 3111 are coaxially aligned. In certain implementations, the terminal enclosure 3100 is elongated along the axis extending between the first and second end ports 3110, 3111.

The terminal enclosure 3100 also includes multiple side ports 3109 that are not coaxially aligned with the end ports 3110, 3111. In certain implementations, the side ports 3109 face in a generally orthogonal direction from the end ports 3110, 3111. In certain examples, the side ports 3109 are laterally aligned along the axis extending between the first and second end ports 3110, 3111. In the example shown, four side ports 3109 face outwardly at the first side 3105 of the terminal enclosure 3100.

Figure 63:
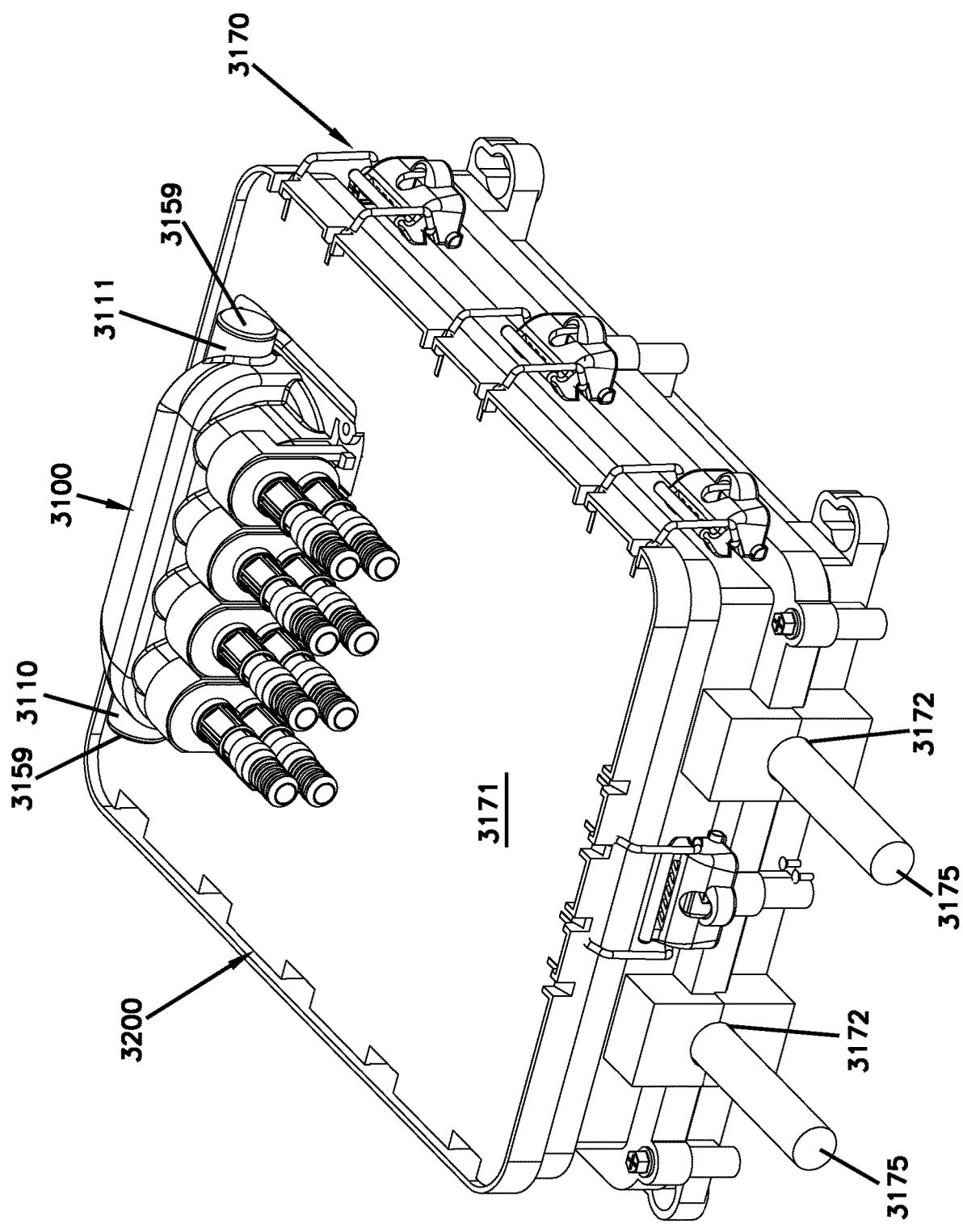
FIG. 63 is a perspective view of an example enlarged closure including a closure and a terminal enclosure mounted thereto.
Figure 64:
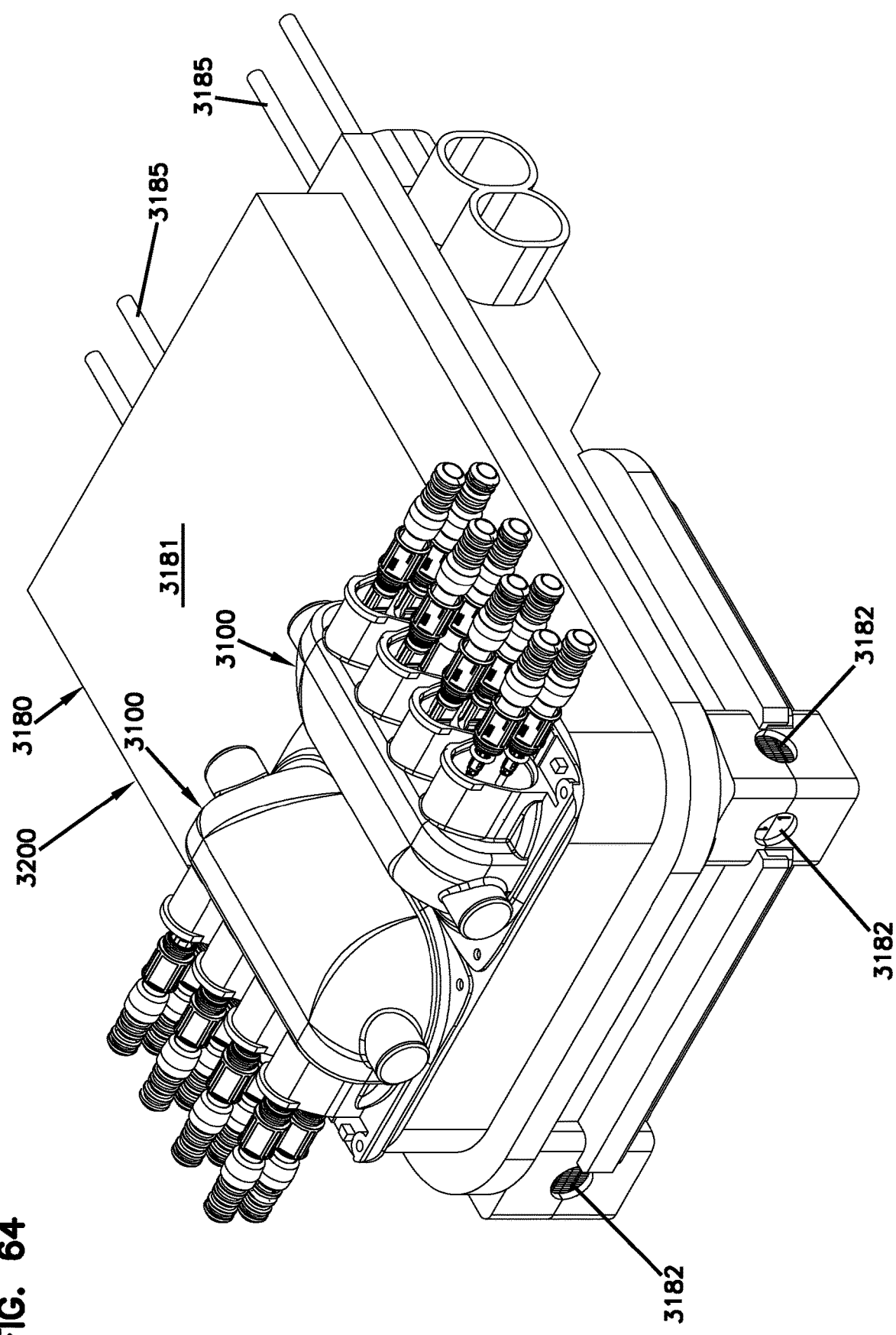
FIG. 64 is a perspective view of another example enlarged closure including a closure and two terminal enclosure mounted thereto in opposite directions.
Figure 65:
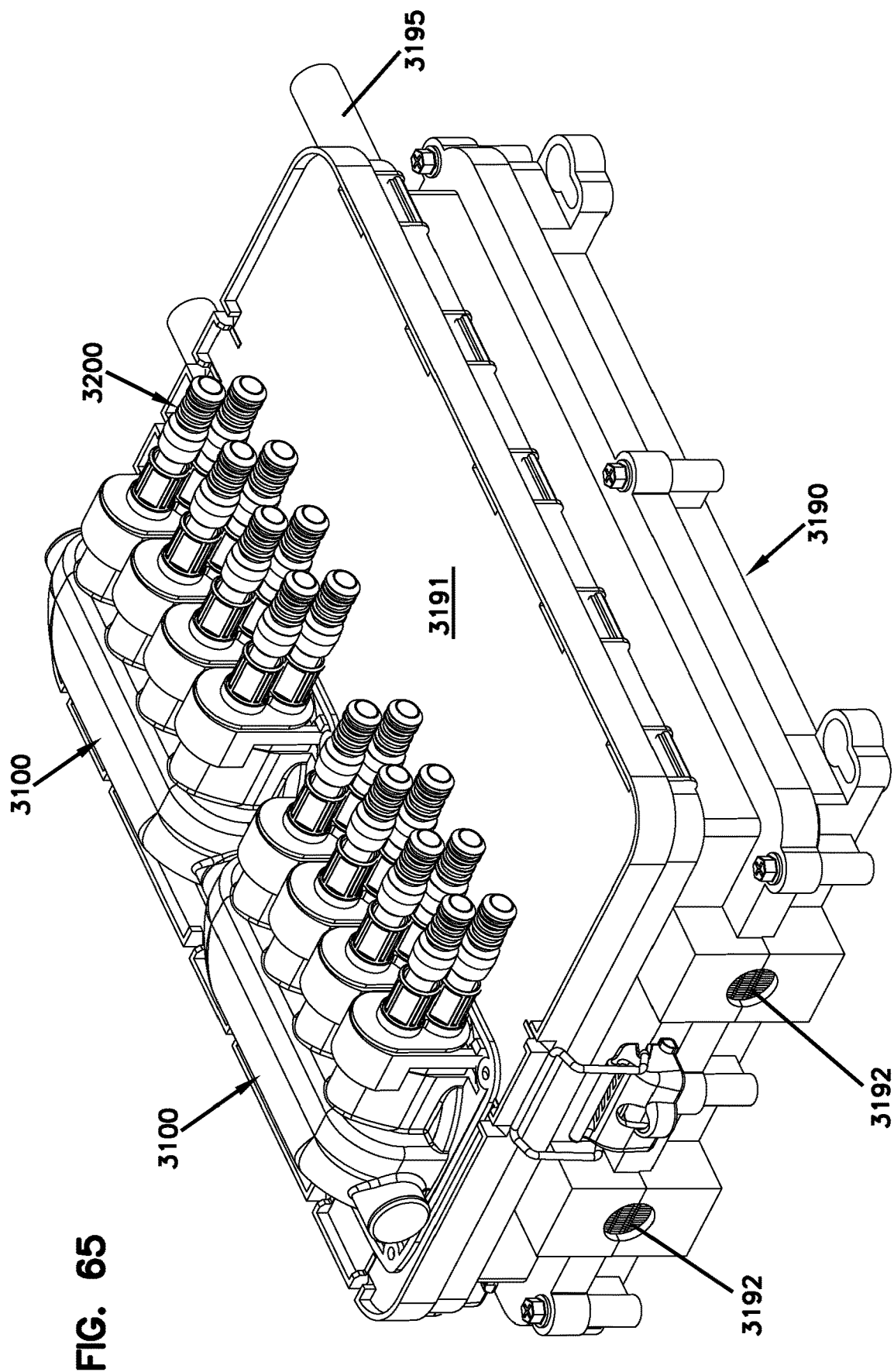
FIG. 65 is a perspective view of an enlarged closure including a closure and two terminal enclosures mounted thereto in a side-by-side configuration.

In some implementations, sealed dust caps can be mounted to any unused ports 3109-3111 to inhibit dust, water, or other environmental contaminants from entering the enclosure interior 3130. In some implementations, a sealed dust cap 3159 (FIGS. 63-65) is mounted to one of the end ports 3110, 3111. In such implementations, media segments of a cable entering through the other end port 3110, 3111 can be routed to the side ports 3109. In other implementations, sealed dust caps 3159 can be mounted to both end ports 3110, 3111 (FIGS. 63-65). In such implementations, cables or media segments thereof can be routed into the enclosure through an open rear 3131 and to the side ports 3109. In still other implementations, sealed dust caps can be mounted to the side ports 3109 and a cable can pass through the end ports 3110, 3111. Still other configurations are possible.

Figure 58:
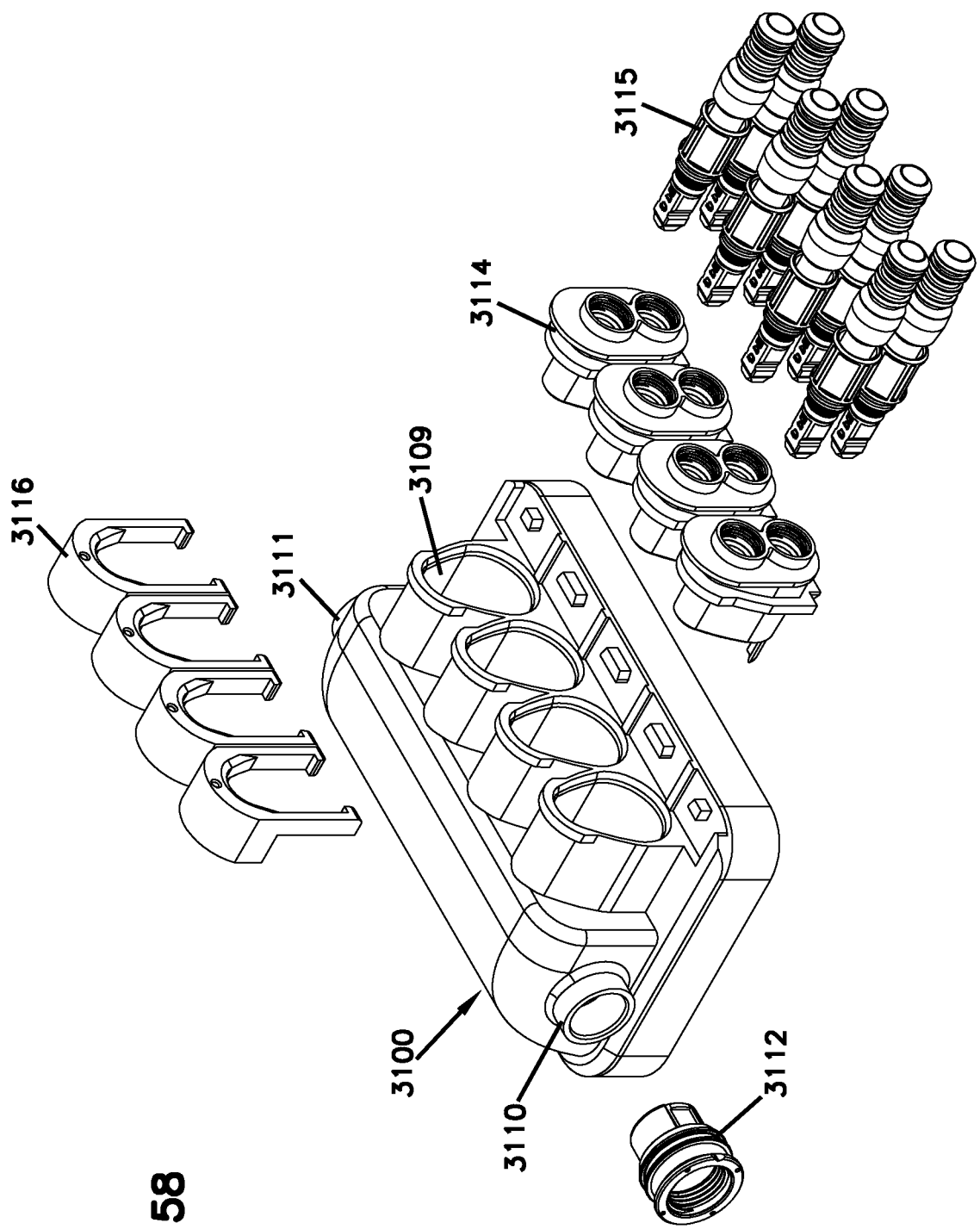
FIG. 58 shows port modification equipment and connectors exploded away from the ports of the terminal enclosure of FIG. 57.

As shown in FIG. 58, various types of port modification equipment (e.g., optical adapters, sealed cable pass-throughs, etc.) can be coupled to the terminal enclosure 3100 at the ports 3109-3111. In certain implementations, the port modification equipment can be structured to form a ruggedized connection at the port 3109-3111. For example, FIG. 58 shows a ruggedization component 3112 configured to be coupled to the first end port 3110 to enable a ruggedized connection between a connector arrangement and the enclosure 3100.

In some implementations, optical adapters 3114 can be secured to the side ports 3109 using clips 3116. In certain examples, the optical adapters 3114 are ruggedized optical adapters. In the example shown, the optical adapters 3114 are each configured to receive a pair of DLX connectors. In other examples, the optical adapters can be configured to receive one or more connector arrangements of various types (e.g., DLX, MPO, SC, LC, ST, LX.5, etc.). In other implementations, sealed cable pass-throughs can be secured to the side ports 3109 (e.g., using the clips 3116). A sealed cable pass-through defines a passage along which a cable can extend and includes sealant (e.g., gel seal, rubber gasket, etc.) to provide environmental sealing between the cable and the enclosure 100.

Figure 59:
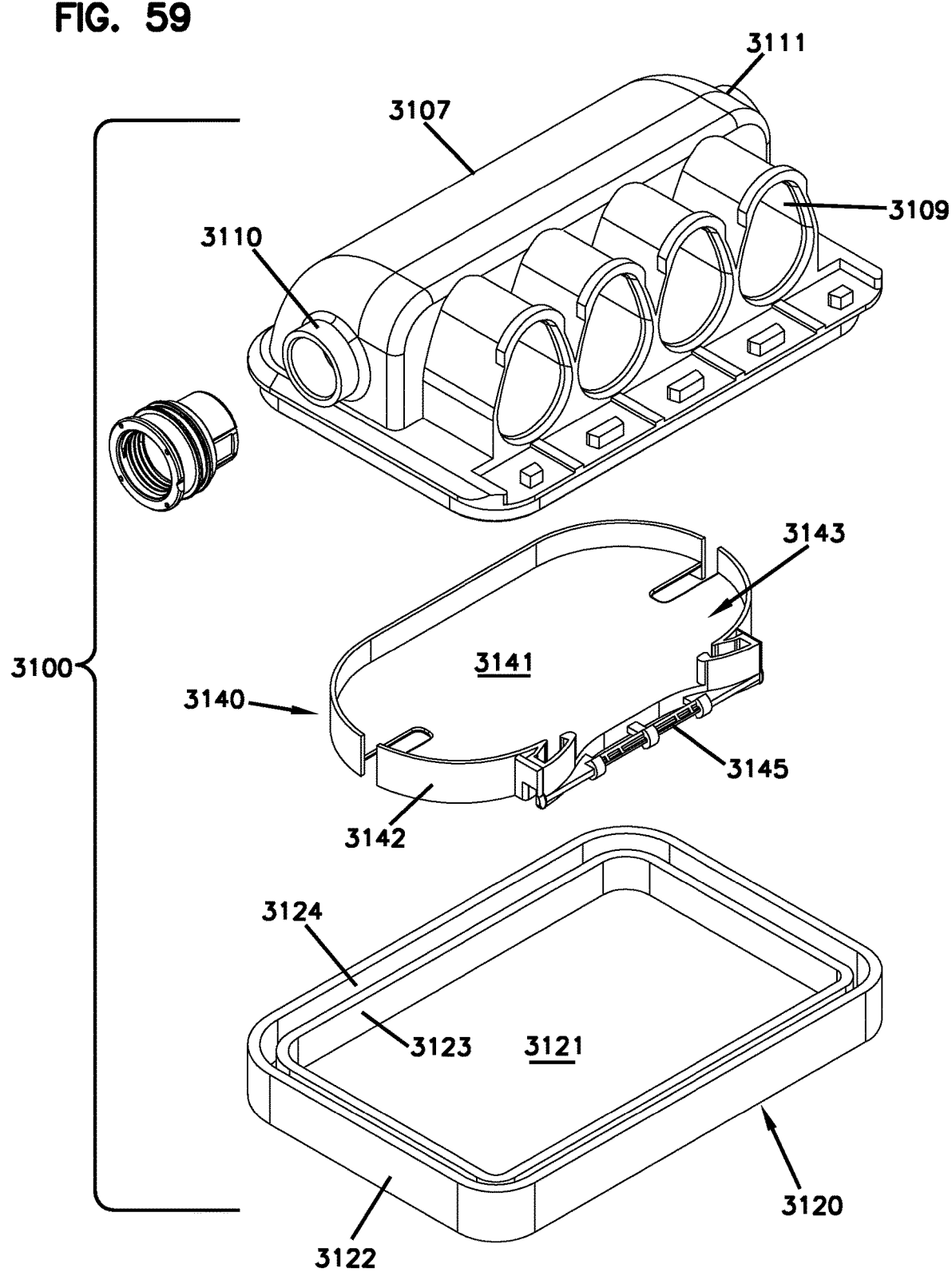
FIG. 59 is a top perspective view of the terminal enclosure of FIG. 57 with a terminal housing and cover exploded away from each other.
Figure 60:
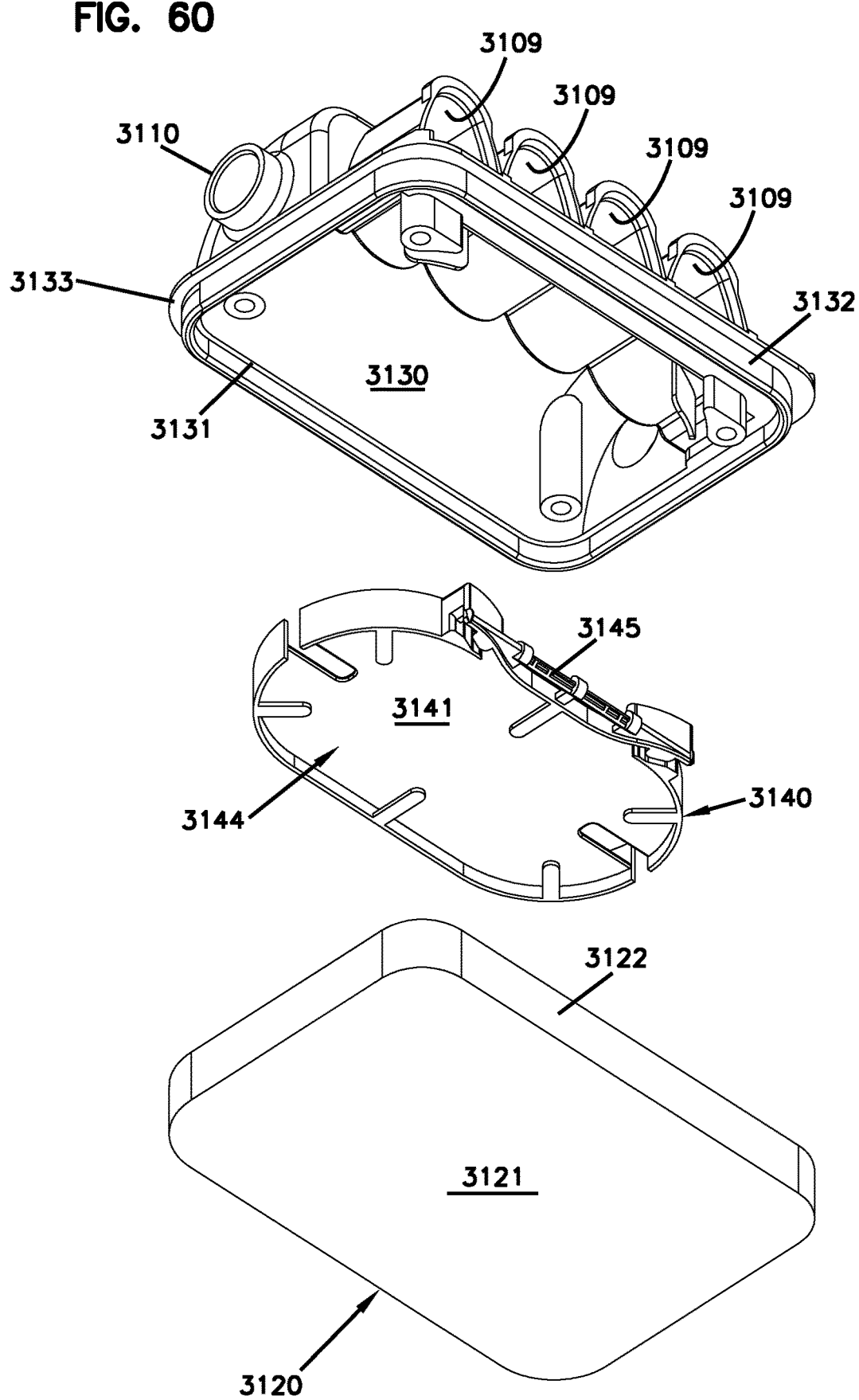
FIG. 60 is a bottom perspective view of the exploded terminal enclosure of FIG. 59.

In some implementations, the terminal enclosure 3100 can be used as a stand-alone unit (e.g., see FIGS. 59-60). In other implementations, multiple terminal enclosures 3100 can be coupled together to form a larger stand-alone unit (e.g., see FIGS. 61-62). In still other implementations, one or more terminal enclosures 3100 can be mounted to different types of closures to enlarge and/or add functionality to those closures (e.g., see FIGS. 65-67). Each of these configurations will be discussed in more detail herein.

FIGS. 59 and 60 are perspective views of an example terminal enclosure 3100 including a terminal housing 3107 and a cover piece 3120 exploded away from each other for ease in viewing. The terminal housing 3107 defines the end ports 3110, 3111 and the side ports 3109. The terminal housing 3107 also defines a majority of the interior 3130 of the enclosure 3100. The terminal housing 3107 defines an open rear 3131 leading to the interior 3130. The cover piece 3120 is configured to mount to the terminal housing 3107 at the open rear 3131 to close the interior 3130 (e.g., see FIG. 57). Mounting the cover piece 3120 to the terminal housing 3107 forms the terminal enclosure 3100, which can function as a stand-alone unit.

In some implementations, the terminal housing 3107 is sealingly coupled to the cover piece 3120. For example, the cover piece 3120 includes a sidewall 3122 extending upwardly from a base 3121. A gasket or other seal can be disposed on the base 3121 along an inside of the sidewall 3122. A sealing flange 3132 can extend outwardly from the open rear 3131 of the terminal housing 3107 to engage the gasket or other seal.

In certain implementations, the cover piece 3120 includes an inner wall 3123 that extends upwardly from the base 3121 inside the sidewall 3122. The gasket or other seal can be disposed within a channel 3124 formed between the sidewall 3122 and inner wall 3123. In certain examples, the sealing flange 3132 can extend into the channel 3124 and compress the gasket or other seal when the cover piece 3120 is mounted to the terminal housing 3107. In certain implementations, the terminal housing 3107 includes a radial flange 3133 extending radially outwardly from a periphery of the open rear 3131. The radial flange 3133 is sized to extend over the sidewall 3122 of the cover piece 3120 to further aid in environmentally sealing the interior 3130 of the enclosure 3100.

In some implementations, a cable can be routed into the enclosure 3100 through one or both end ports 3110, 3111. One or more media segments (e.g., optical fibers, conductive wires, etc.) can be broken out from the cable within the enclosure 3100 and routed to the side ports 3109. In certain implementations, management structures can be disposed within the interior 3130 of the enclosure 3100 to guide and/or store the media segments. In certain implementations, other types of equipment also can be disposed within the interior 3130 to process or modify the signals carried over the media segments.

In the example shown in FIGS. 59 and 60, a management tray 3140 can be disposed within the enclosure interior 3130. The management tray 3140 includes a base 3141 surrounded by a sidewall 3142. The sidewall 3142 extends upwardly from the base 3141 to form an upper tray 3143 and extends downwardly from the base 3141 to form a lower tray 3144. In certain examples, one or more optical splices holders can be disposed in the upper tray 3143 and cable routing and/or storage structures can be disposed in the lower tray 3144. In certain examples, the management tray 3140 includes a hinge pin 3145 so that the tray 3140 can be rotatably mounted within the enclosure 3100. In other examples, cable spools, optical splitters, wave division multiplexers, optical couplers, an optical fanout, a hydra-cable, optical-to-electrical converters, or other such equipment can be disposed on the management tray 3140 or otherwise disposed within the enclosure interior 3130.

Figure 61:
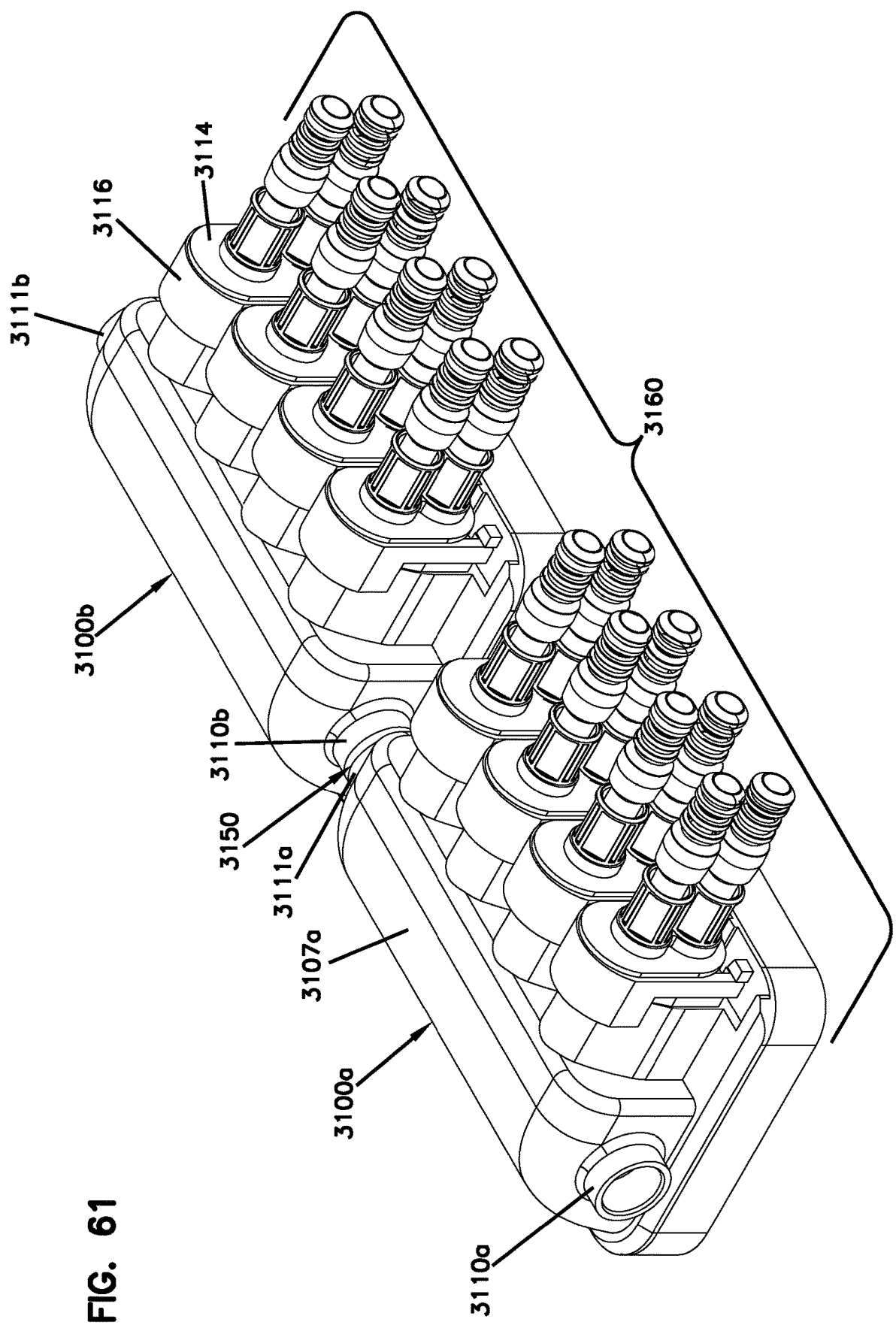
FIG. 61 illustrates two terminal enclosures of FIG. 57 daisy-chained together.
Figure 62:
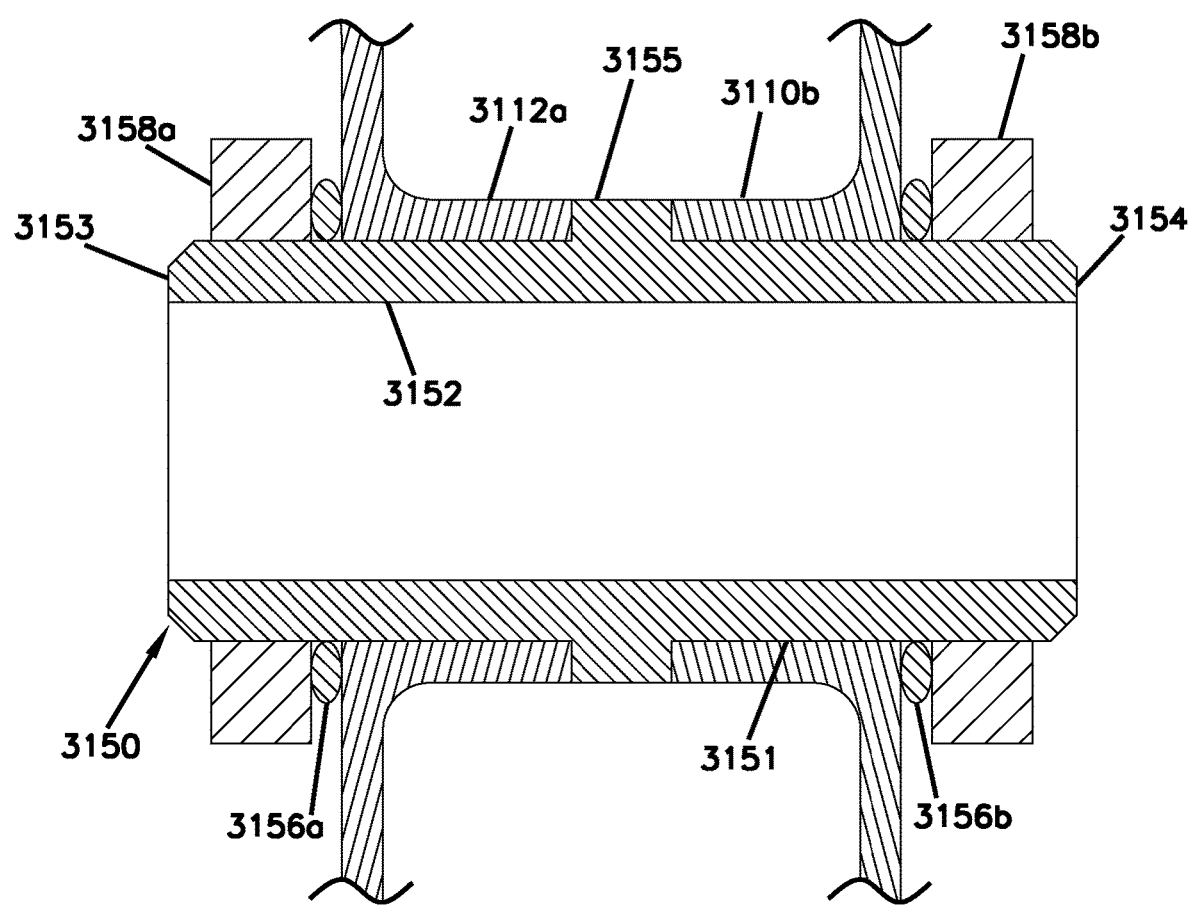
FIG. 62 is a cross-sectional view of an example intermediate coupler such as conduit arrangement suitable for daisy-chaining together the terminal enclosures of FIG. 61.

As shown in FIGS. 61 and 62, two or more terminal enclosures 3100 can be daisy-chained together to form a larger terminal enclosure 3160. For example, a first terminal enclosure 3100a can be coupled to a second terminal enclosure 3100b using a conduit arrangement 3150. In certain implementations, the conduit arrangement 3150 couples together the second end port 3111a of the first terminal enclosure 3100a to the first end port 3110b of the second terminal enclosure 3100b.

As shown in FIG. 62, the conduit arrangement 3150 includes a conduit 3151 defining a passage 3152 extending between a first end 3153 of the conduit 3151 and a second end 3154 of the conduit 3151. The conduit 3151 also includes a flange 3155 disposed intermediate the first and second ends 3153, 3154. The conduit arrangement 3150 also includes a first gasket (e.g., an O-ring) 3156a and a first fastener (e.g., a nut) 3158a configured to mount at the first end 3153 of the conduit 3151 and a second gasket (e.g., and O-ring) 3156b and a second fastener (e.g., a nut) 3158b configured to mount at the second end 3154 of the conduit 3151.

To chain the terminal enclosures 3100a, 3100b, the first end 3153 of the conduit 3151 is inserted into the second end port 3111a of the first enclosure 3100a and the second end 3154 of the conduit 3151 is inserted into the first end port 3110b of the second enclosure 3100b. The first gasket 3156a and the first fastener 3158a are mounted onto the first end 3153 of the conduit 3151 within the first terminal enclosure interior. The first fastener 3158a compresses the first gasket 3156a against an interior surface of the first terminal enclosure 3100a to create an environmental seal between the conduit arrangement 3150 and the terminal enclosure 3100a. The second fastener 3158b compresses the second gasket 3156b against an interior surface of the second terminal enclosure 3100b to create an environmental seal between the conduit arrangement 3150 and the terminal enclosure 3100b. Accordingly, the interior of the first terminal enclosure 3100a and the interior of the second terminal enclosure 3100b are connected by the conduit passage 3152 to define a combined interior volume of the larger terminal enclosure 3160.

In some implementations, two or more of the terminal enclosures 3100 can be daisy-chained together as described above to form a larger terminal enclosure 3160 from the series of terminal enclosures 3100. In certain implementations, the second end port 3111 of the last terminal enclosure 3100 in the series can be plugged to inhibit access to the combined interior volume of the larger terminal enclosure 3160. For example, a sealed end cap 3159 (e.g., see FIG. 63) can be mounted to the end port 3111. In some implementations, a cable can sealingly enter the first terminal enclosure through the first end port 3110. In other implementations, a connectorized end of a cable can be connected to one or more internal media segments (or one or more cables) within the enclosure interior 3130 using a ruggedized adapter 3112 at the first end port 3110. Internal media segments or media segments broken out from the cable can be routed within a combined interior of the larger terminal enclosure 3160 to any of the side ports 3109 defined by any of the terminal enclosures 3100 in the chain.

As shown in FIGS. 63-65, one or more terminal enclosures 3100 can be mounted to a closure 3170, 3180, 3190 to form an enlarged closure 3200. In some implementations, the terminal enclosure 3100 can add functionality to the closure 3170, 3180, 3190. In some implementations, the example closures 3170, 3180, 3190 define interior volumes in which cables or media segments can be disposed. In certain implementations, each of the closures 3170, 3180, 3190 defines an opening leading to the interior volume. The open rear of the terminal enclosure 3100 can be positioned over the opening so that the interior 3130 of the terminal enclosure 3100 joins with the interior of the closure 3170, 3180, 3190 to form a combined interior volume. Accordingly, cables and/or media segments can be routed between the interior of the closure 3170, 3180, 3190 and the interior 3130 of the terminal enclosure 3100.

Connection needs vary based on location and use within a network. Accordingly, the number of connections desired at any particular closure can vary by customer, deployment sites, time, etc. The modular nature of the terminal enclosure 3100 enables manufacturing of closures customized to suit the needs of the customer. For example, FIG. 63 shows one example closure 3170 at which a single terminal enclosure 3100 is mounted. A cable 3175 is routed into the closure 3170 at sealed cable ports 3172. One or more media segments of the cable 3175 are routed from the closure 3170, into the terminal enclosure 3100 (through the open rear 3131), and to ruggedized connectors at the side ports 3109. In the example shown, the side ports 3109 face in a common direction with the closure cable ports 3172.

FIG. 64 shows another example closure 3180 at which two terminal enclosures 3100 are mounted. In the example shown, the terminal enclosures 3100 face away from each other. In other examples, however, the terminal enclosures 3100 can face in any desired directions relative to each other. In the example shown, the terminal enclosures 3100 face in different directions from the closure cable ports through which cables 3185 enter the closure 3180. In other examples, a cable 3185 can be routed into the closure 3180 through a sealed cable port 3182 facing in a common direction with the side ports 3109 of one of the terminal enclosures 3100.

FIG. 65 shows another example closure 3190 at which two terminal enclosures 3100 are mounted. In the example shown, the terminal enclosures 3100 face in a common direction. In other examples, however, the terminal enclosures 3100 can face in any desired directions relative to each other. In the example shown, the terminal enclosures 3100 are disposed side-by-side. In some examples, the terminal enclosures 3100 can be joined together using a conduit arrangement 3150. In other examples, the terminal enclosures 100 can be separately connected to the closure 3190 (e.g., with end caps disposed at the facing ports 3110, 3111). In the example shown, the terminal enclosures 3100 face in different directions from the closure cable ports through which cables 3195 enter the closure 3190.

During manufacturing, an enlarged closure 3200 can be manufactured by adding one or more terminal enclosures 3100 to a closure 3170, 3180, 3190. A number of terminal enclosures 3100 to be added to a closure 3170, 3180, 3190 is determined based on the number of connections or sealed cable pass-throughs are desired to be provided at the closure. The terminal enclosures 3100 are then added to the closure so that the closure interior becomes continuous with the interior(s) of the terminal enclosure(s).

In some implementations, a cover 3171, 3181, 3191 having an appropriate number of openings is selected for the closure 3170, 3180, 3190. In certain implementations, the cover 3171, 3181, 3191 will have one opening for each terminal enclosure 3100 to be added. For example, each closure 3170, 3180, 3190 may have a plurality of cover options that differ in the number of openings defined therein. In other implementations, each closure cover 3171, 3181, 3191 may define multiple covered openings that may be selectively uncovered in the field to provide a mounting location for the terminal enclosures 3100. In still other implementations, the openings in the cover 3171, 3181, 3191 can be made in the field. In yet other implementations, the openings can be formed in other portions of the closure 3170, 3180, 3190.

In some implementations, the terminal enclosure(s) 3100 in installed on the cover 3171, 3181, 3191 at the factory. In other implementations, the openings defined in the cover 3171, 3181, 3191 are temporarily covered until the terminal enclosure(s) 3100 are installed in the field. In still other implementations, openings can be punched out of the covers 3171, 3181, 3191 in the field as desired. In yet other implementations, the terminal enclosure openings can be formed in other parts of the closure 3170, 3180, 3190.

For many applications of the present disclosure, it is desirable to mount or position a fiber optic adapter within a terminal port. In certain examples, the fiber optic adapter can be loaded into and secured within the terminal port from outside the terminal housing, and/or the fiber optic adapter snaps into the terminal port from outside the terminal housing, and/or the terminal port includes one or more springs for allowing a ferrule alignment portion of the fiber optic adapter to float to absorb alignment mismatches. The ability of the adapter to float is particularly advantageous for making optical connections with expansion modules. FIGS. 66-76 show an example fiber optic adapter arrangement configured to be loaded into a terminal port of a terminal housing.

Figure 66:
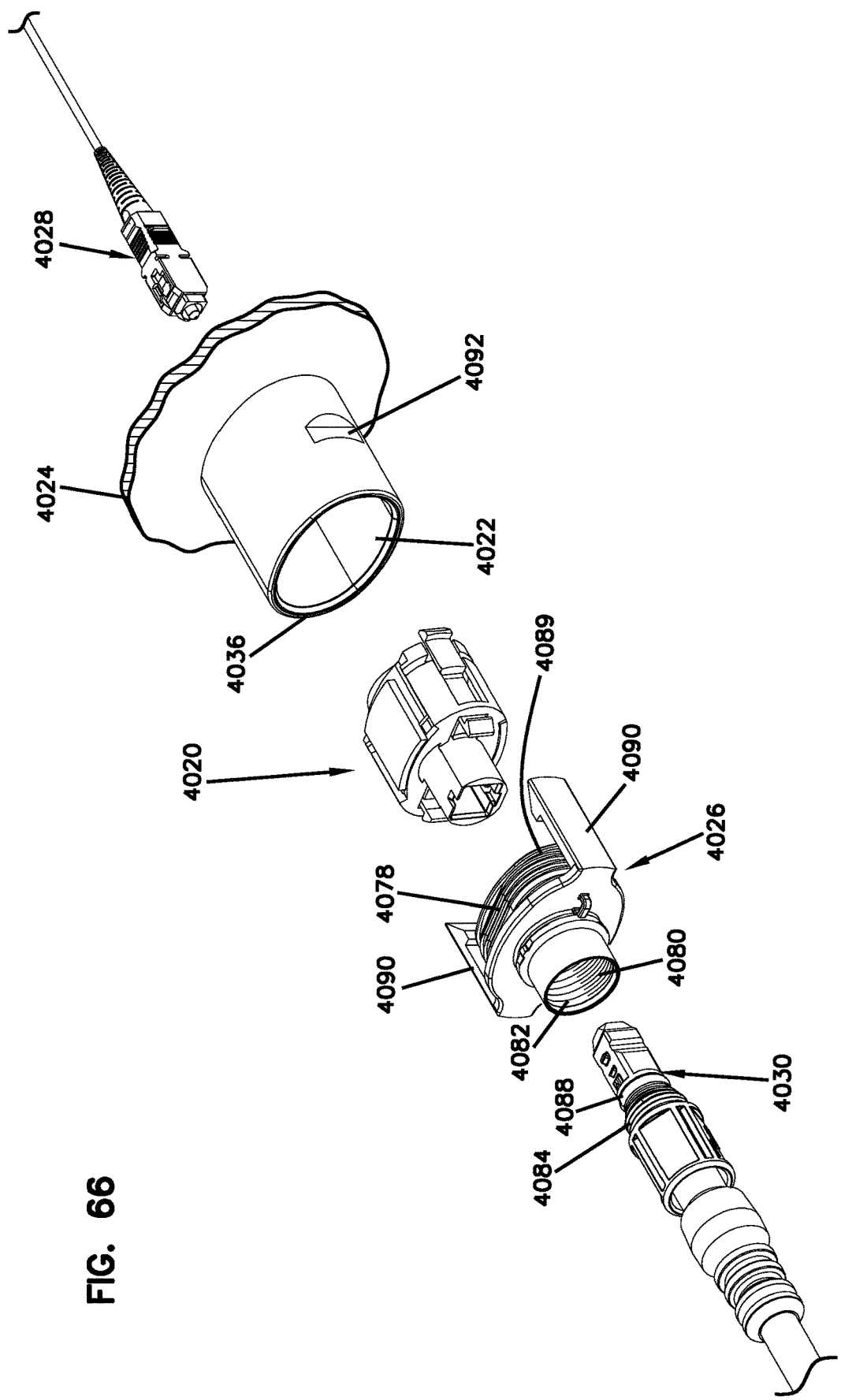
FIG. 66 is an exploded view showing a fiber optic adapter assembly in accordance with the principles of the present disclosure in alignment with a corresponding enclosure port, fiber optic connectors desired to be optically and mechanically coupled together by the fiber optic adapter assembly are also shown.

FIG. 66 illustrates a fiber optic adapter assembly 4020 in accordance with the principles of the present disclosure. The fiber optic adapter assembly 4020 is adapted to be mounted within an enclosure port 4022 (i.e., a terminal port) of an enclosure 4024 (i.e., a terminal housing). The fiber optic adapter assembly 4020 can be used in combination with a ruggedized interface component 4026 that also mounts at the enclosure port 4022. In certain examples, the fiber optic adapter assembly 4020 is configured for optically and mechanically coupling together first and second fiber optic connectors 4028, 4030. In certain examples, the first fiber optic connector 4028 can be positioned within the interior of the enclosure 4024 and can be a non-ruggedized fiber optic connector. In certain examples, the second fiber optic connector 4030 can be positioned outside the enclosure 4024 and can be configured as a ruggedized fiber optic connector. In certain examples, fiber optic adapter assemblies in accordance with the principles of the present disclosure can be used to interconnect non-ruggedized to non-ruggedized fiber optic connectors, ruggedized to non-ruggedized fiber optic connectors, and ruggedized to ruggedized fiber optic connectors. Additionally, fiber optic adapter assemblies in accordance with the principles of the present disclosure are applicable for systems that couple two single-fiber optic connectors together, and is also applicable to systems that couple two multi-fiber fiber optic connectors together.

Figure 67:
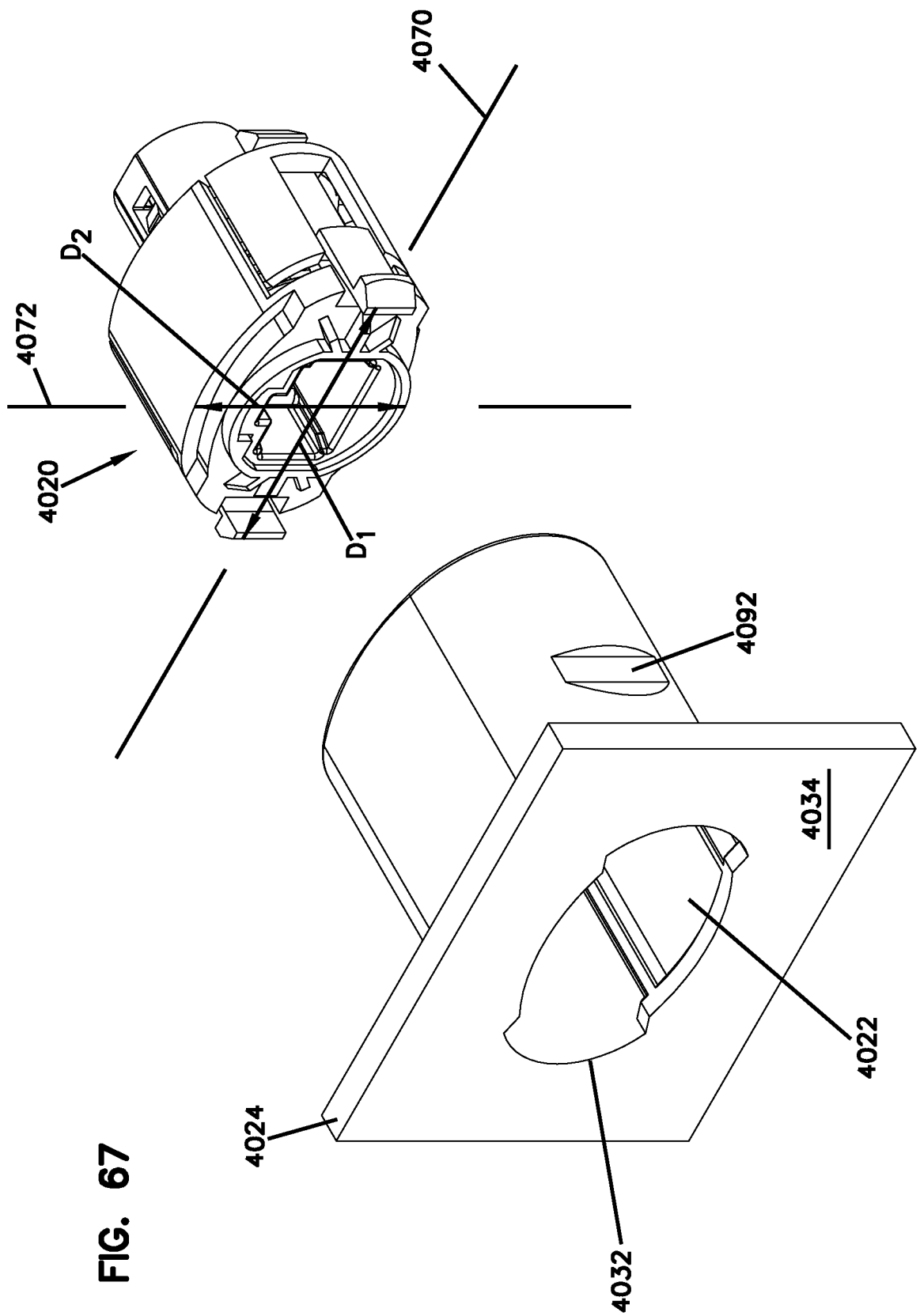
FIG. 67 is a perspective view showing the fiber optic adapter assembly in coaxial alignment with the corresponding enclosure port.

In certain examples, fiber optic adapter assemblies in accordance with the principles of the present disclosure can be configured to be loaded into the enclosure port 4022 in an outboard-to-inboard direction. As used herein, the term "inboard" means closer to an interior of the enclosure 4024 while the term "outboard" means further from the interior of the enclosure 4024. Thus, an outboard-to-inboard direction extends toward an interior of the enclosure while an inboard-to-outboard direction extends away from an interior of the enclosure. As shown at FIG. 67, the enclosure port 4022 has an inboard end 4032 that is closest to an interior 4034 of the enclosure 4024. As shown at FIG. 66, the enclosure port 4022 has an outboard end 4036 that is furthest from the interior 4034 of the enclosure 4024.

Figure 68:
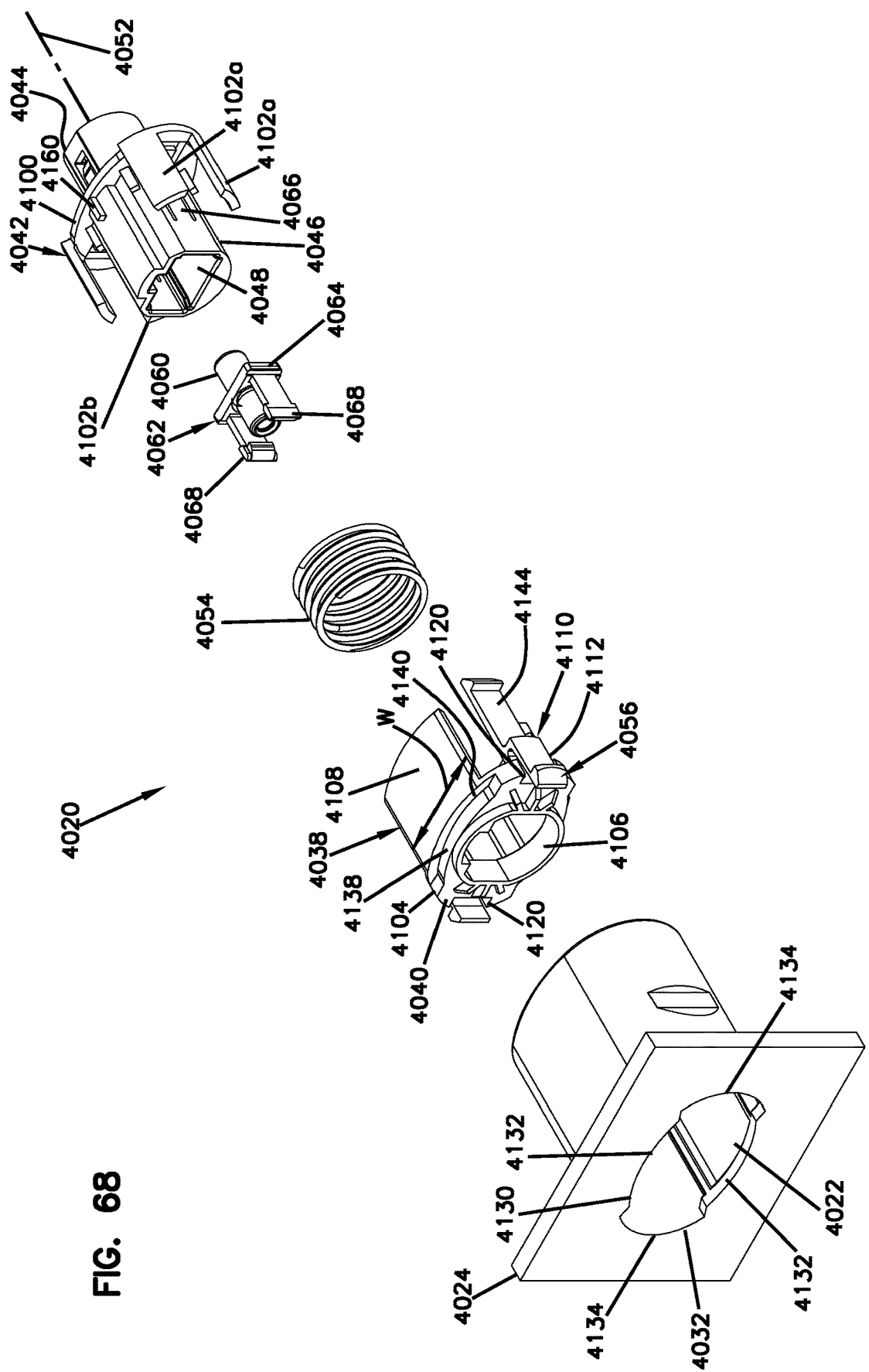
FIG. 68 is an exploded view of the fiber optic adapter assembly of FIG. 67 with the view looking in an outboard direction.
Figure 69:
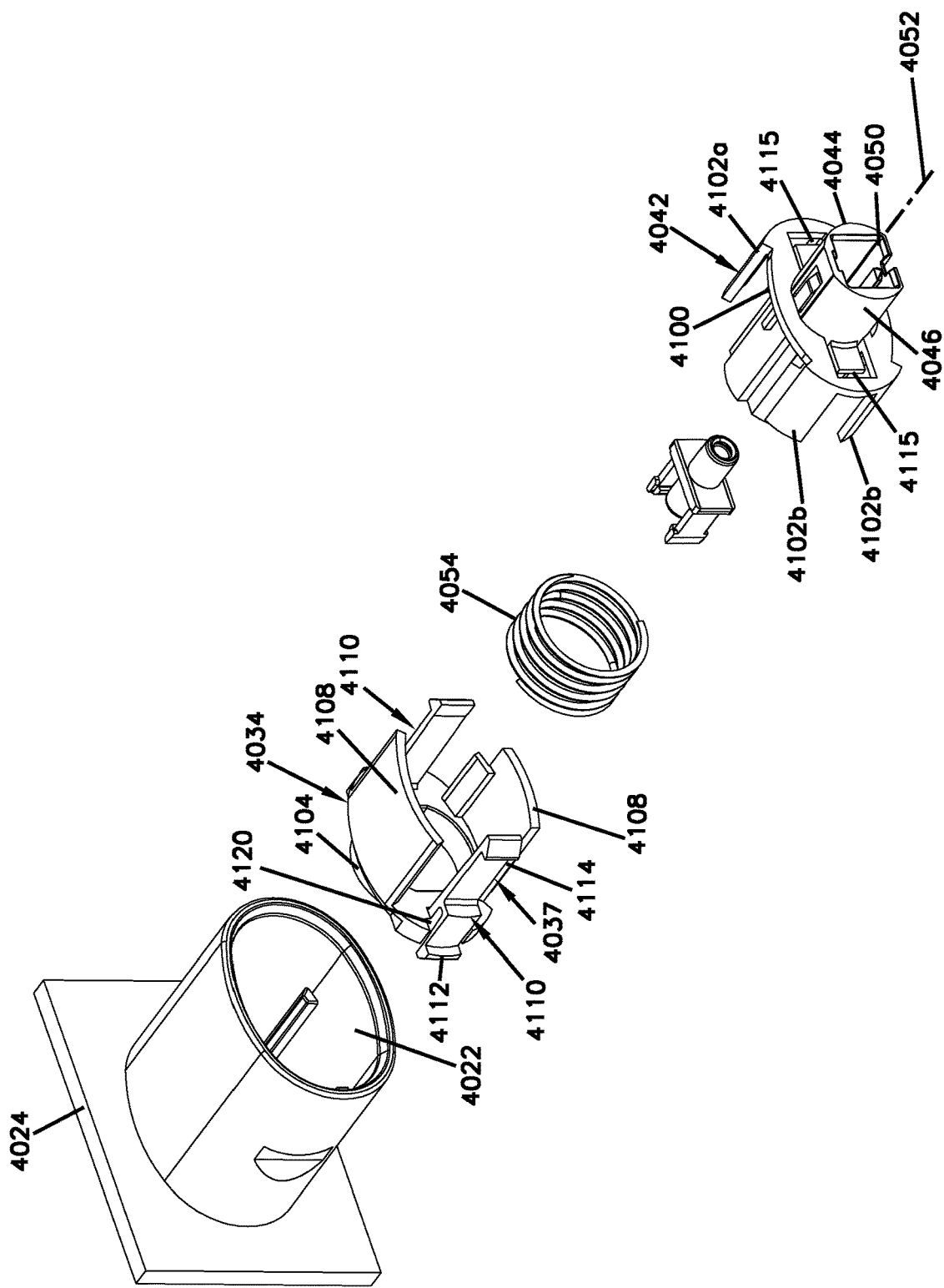
FIG. 69 is an exploded view of the fiber optic adapter assembly of FIG. 68 with the view looking in an inboard direction.

Referring to FIGS. 68 and 69, the fiber optic adapter assembly 4020 includes an inboard housing piece 4038 defining an inboard end 4040 of the fiber optic adapter assembly 4020, and an outboard housing piece 4042 defining an outboard end 4044 of the fiber optic adapter assembly 4020. The outboard housing piece 4042 includes a port defining body 4046 that defines an inboard connector port 4048 (see FIG. 68) and an outboard connector port 4050 (see FIG. 69) that are aligned along a connection insertion axis 4052. The inboard and outboard housing pieces 4038, 4042 are interconnected by a connection interface 4037 that allows relative sliding movement between the inboard and outboard housing pieces 4038, 4042 along the connector insertion axis 4052. The fiber optic adapter assembly 4020 further includes at least one spring 4054 captured between the inboard and outboard housing pieces 4038, 4042 for biasing the inboard and outboard housing pieces 4038, 4042 apart from one another in an orientation along the connector insertion axis 4052. The fiber optic adapter assembly 4020 further includes an anchor arrangement 4056 for securing the inboard housing piece 4038 at a fixed location along the connector insertion axis 4052 within the enclosure port 4022. In other embodiments, the anchor arrangement 4056 can be integrated with the outboard housing piece 4042 instead of the inboard housing piece 4038 and can be used to fix the outboard housing piece 4042 in place relative to the enclosure 4024.

Figure 70:
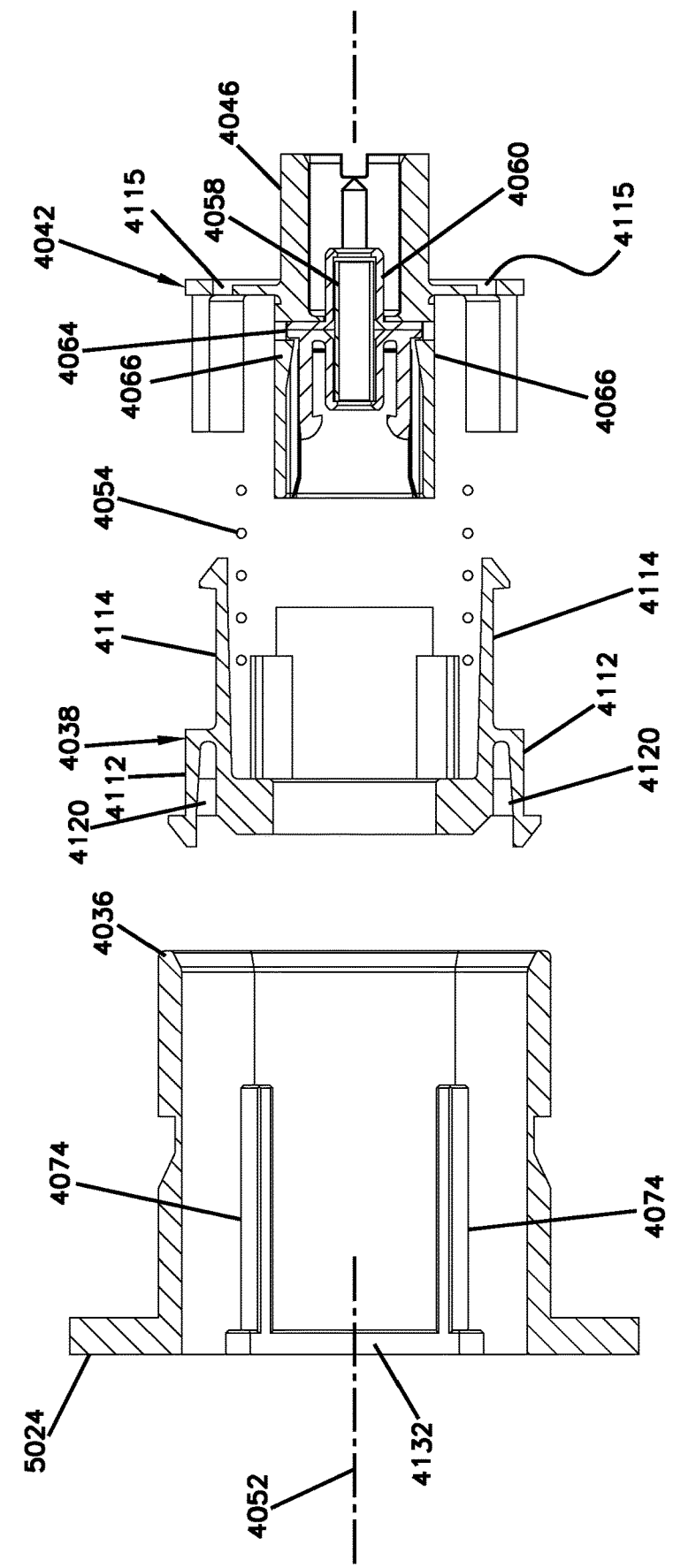
FIG. 70 is an exploded, cross-sectional view of the fiber optic adapter assembly of FIGS. 66-69.

In certain examples, a structure for co-axially aligning the ferrules of two fiber optic connectors desired to be coupled together can be provided within the interior of the port defining body 4046. For example, as shown at FIG. 70, a cylindrical ferrule alignment sleeve 4058 can be provided within the port defining body 4046. When the fiber optic connectors 4028, 4030 are inserted within the inboard and outboard connector ports 4048, 4050, their corresponding ferrules are received within the ferrule alignment sleeve 4058 and coaxially aligned with one another. In certain examples, the ferrule alignment sleeve 4058 can be made of a material having elastic characteristics and can be in the form of a split-sleeve. Thus, the ferrule alignment sleeve 4058 can be configured to flex open to receive the ferrules of the fiber optic connectors 4028, 4030.

Figure 73:
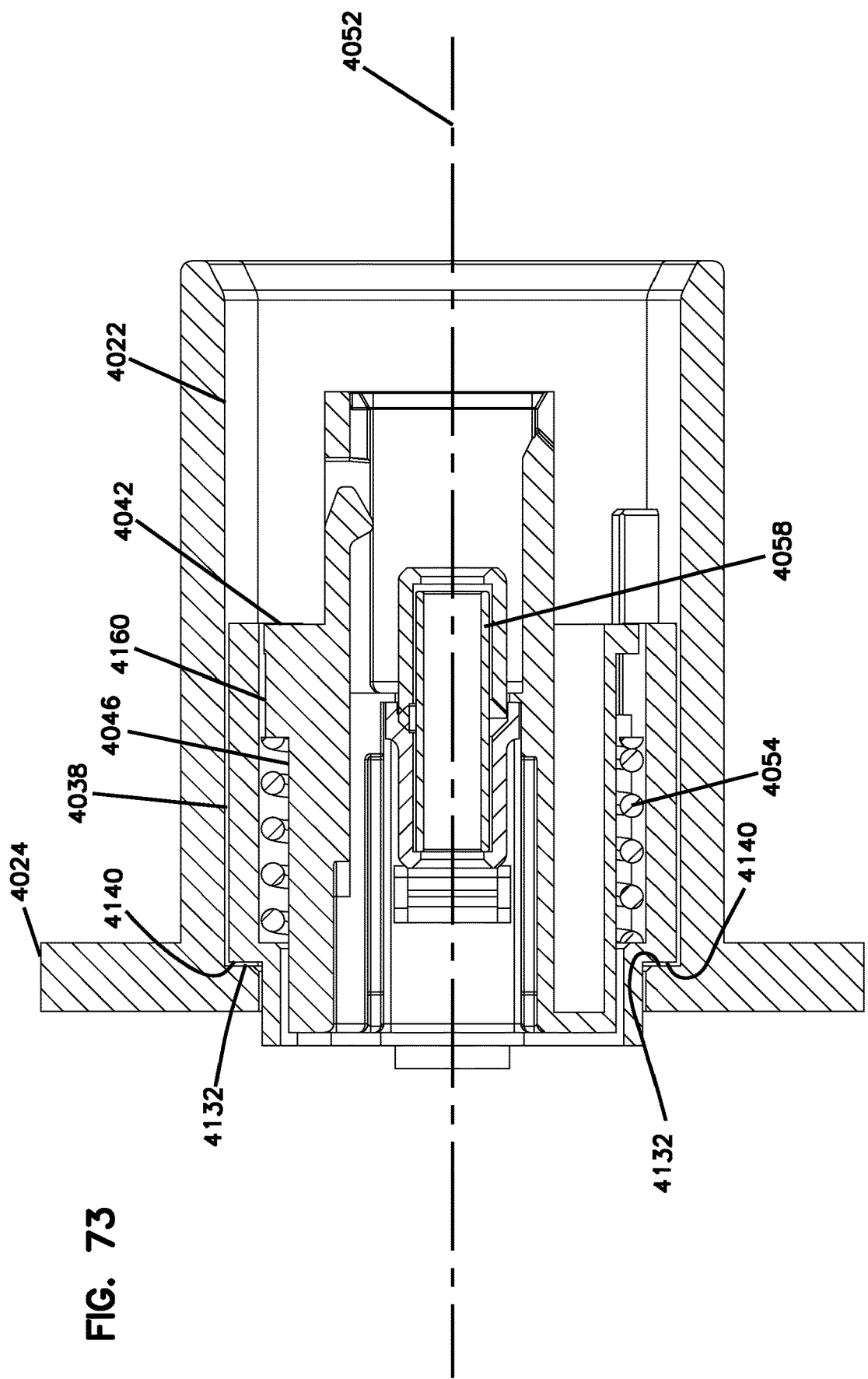
FIG. 73 is a cross-sectional view taken along section line 8-8 of FIG. 71.
Figure 74:
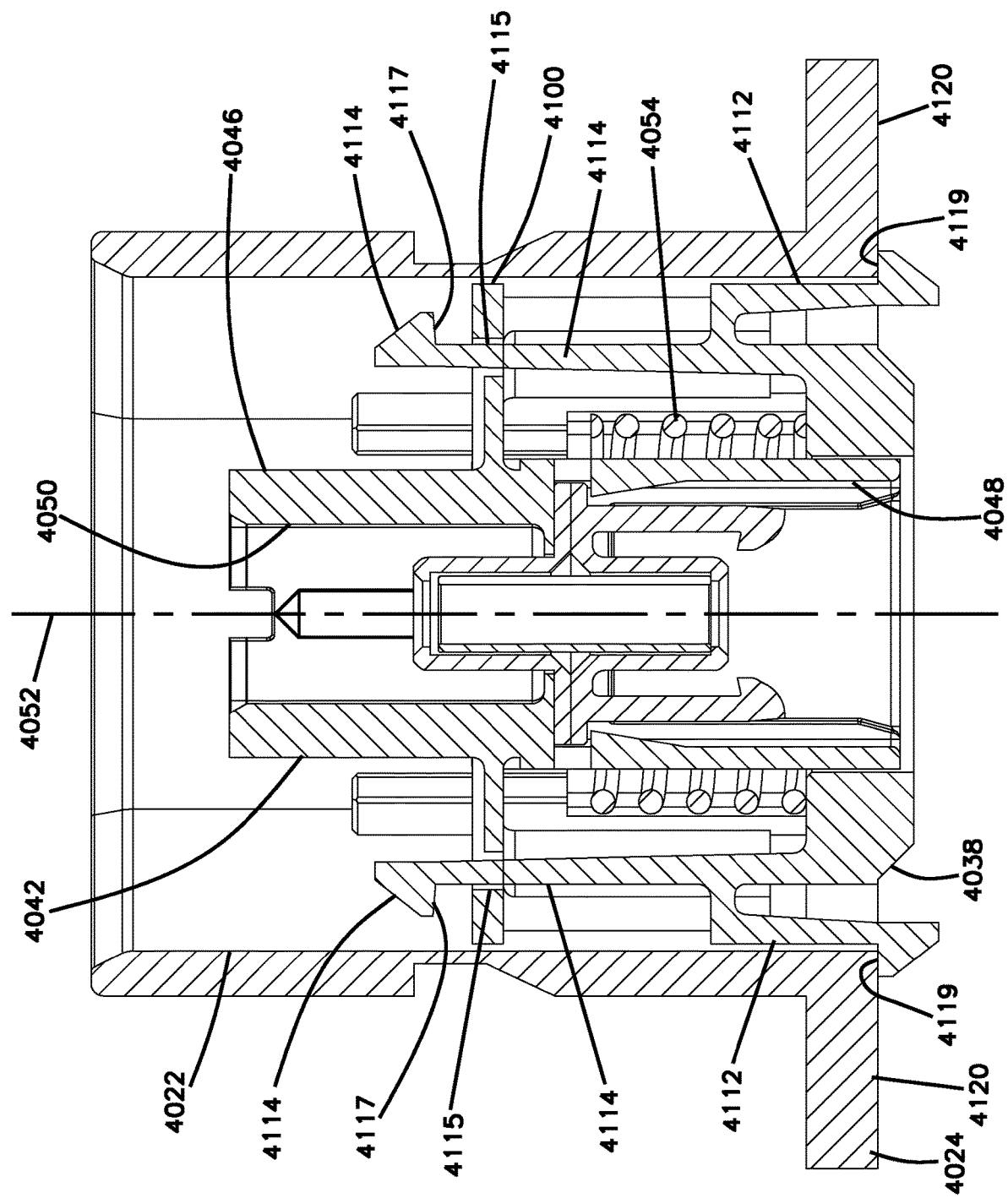
FIG. 74 is a cross-sectional view taken along section line 74-74 of FIG. 71.

Referring to FIG. 68-70, the ferrule alignment sleeve 4058 can be mounted within a barrel portion 4060 of an alignment sleeve housing 4062 that snap-fits within the port defining body 4046. In certain examples, the alignment sleeve housing 4062 can load into the port defining body 4046 through the inboard connector port 48. In certain examples, the alignment sleeve housing 4062 can include a flange 4064 that is integral with the barrel portion 4060 of the alignment sleeve housing 4062. The port defining body 4046 can include retention latches 4066 (e.g., cantilever-style flexible latches as shown at FIGS. 68 and 69) that engage the flange 4064 when the alignment sleeve housing 4062 is inserted into the port defining body 4046 so as to retain the alignment sleeve housing 4062 within the port defining body 4046 by a snap-fit connection. In certain examples, the alignment sleeve housing 4062 can also include connector latches 4068 that correspond to the inboard connector port 4048 and that are configured for interlocking with the first fiber optic connector 4028 to retain the first fiber optic connector 4028 within the inboard connector port 4048. FIGS. 73 and 74 show the alignment sleeve housing 4062 secured within the port defining body 4046 and also show the inboard and outboard housing pieces 4038, 4042 coupled together with the spring 4054 captured there between.

In certain examples, the spring 4054 can be a single spring that is coaxially aligned with the connector insertion axis 4052. In certain examples, the spring 4054 can extend over the port defining body 4046 of the outboard housing piece 4042 (see FIGS. 73 and 74).

Referring back to FIGS. 66 and 67, an inner transverse cross-sectional profile of the enclosure port 4024 and an outer transverse cross-sectional profile of the fiber optic adapter assembly 4020 are not circular. Instead, the transverse cross-sectional profiles are longer along a major axis 4070 as compared to a minor axis 4072. Thus, the outer transverse cross-sectional profiles of the fiber optic adapter assembly 4020 and the enclosure port 4022 define major dimensions D1 along the major axis 4070 and minor dimensions D2 along the minor axis 4072. The major and minor axes 4070, 4072 are perpendicular to one another and are also perpendicular relative to the connector insertion axis 4052. In certain examples, the inner transverse profiles of the enclosure port 4022 and the fiber optic adapter assembly 4020 are generally elliptical in shape.

In certain examples of the present disclosure, the various latches are depicted as flexible cantilever latches having base ends and free ends. Such flexible cantilever latches are flexible on their lengths and can include retention surfaces (i.e., catches) and ramp surfaces adjacent the free ends.

Figure 71:
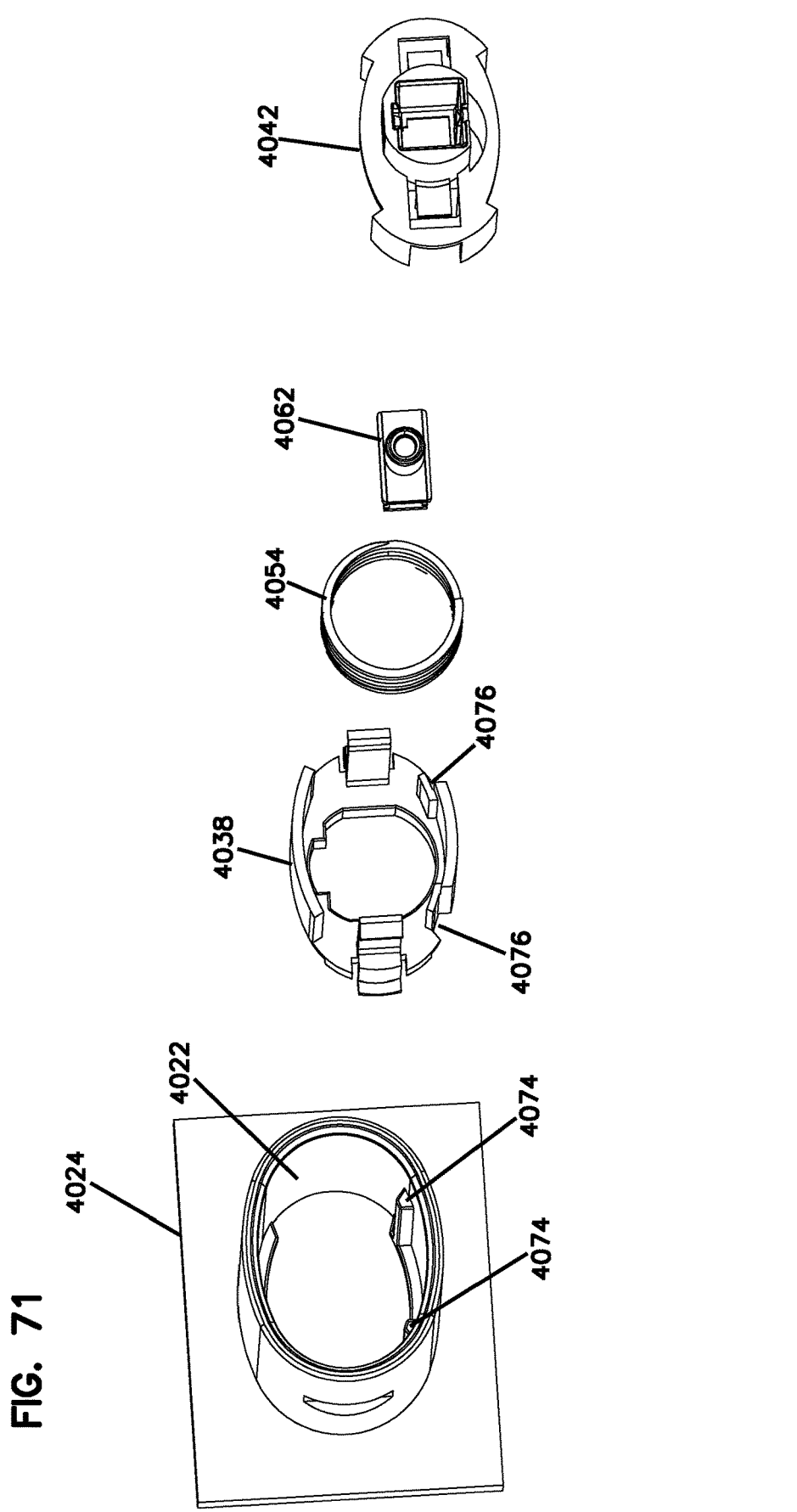
FIG. 71 is another perspective view of the fiber optic adapter assembly of FIGS. 66-70.

Referring to FIG. 71, the enclosure 4024 can include keying rails 4074 positioned within the enclosure port 4022. The keying rails 4074 can have lengths that extend parallel to the connector insertion axis 4052. The fiber optic adapter assembly 4020 can include keying notches 4076 that receive the keying rails 4074 when the fiber optic adapter assembly 4020 is inserted into the closure port 4022. The keying rails 4074 prevent the fiber optic adapter assembly 4020 from being inserted upside down within the enclosure port 4022.

Referring back to FIG. 66, the ruggedized interface component 4026 is adapted to mount within the enclosure port 4022 at a location outboard from the fiber optic adapter assembly 4020 after the fiber optic adapter assembly 4020 has been secured within the enclosure port 4022. The ruggedized interface component 4026 is adapted to be sealed with respect to the enclosure port 4022 and can include a ruggedized mechanical interface adapted to couple with a corresponding mechanical interface of a ruggedized fiber optic connector. In certain examples, the ruggedized interface component 4026 can carry one or more seals for forming a seal between the ruggedized interface component and the enclosure 4024. In certain examples, the seal 4078 can be radially compressed between the ruggedized interface component and the inner surface of the enclosure port 4022. In other examples, the seal can include a face seal that is axially compressed between the ruggedized interface component and the outboard end 4038 of the enclosure port 4022.

In certain examples, the ruggedized interface component 4026 can include a ruggedized mechanical interface such as internal threads, external threads, bayonet projections, bayonet slots or other types of mechanical interlock structures. As depicted, the ruggedized interface component 4026 is shown including a ruggedized mechanical interface in the form of internal threads 4080 provided within a port 4082 defined by the ruggedized interface component 4026. It will be appreciated that the threads 4080 are configured to mate with corresponding external threads 84 provided on a rotatable fastener of the second fiber optic connector 4030. The second fiber optic connector 4030 can also include one or more seals 4088 that may engage sealing surfaces provided on the ruggedized interface component 4026. It will be appreciated that radial seals or axial seals can be utilized. In the depicted example, the ruggedized interface component 4026 includes a first portion 4089 that fits inside the enclosure port 4022 and can include a radial seal or seals mounted thereon. The ruggedized interface component 4026 can also include a mechanical attachment structure for axially locking the ruggedized interface component 4026 in place relative to the enclosure port 4022. As depicted, an example attachment structure can include latches 4090 adapted to engage notches 4092 provided at an exterior of the enclosure port 4022 to retain the ruggedized interface component 4026 at the enclosure port 4022.

Referring to FIGS. 68 and 69, the outboard housing piece 4042 includes a flange 4100 that projects radially outwardly from the port defining body 4046. The outboard housing piece 4042 also includes a first set of elongate guide members 4102a and a second set of elongate guide members 4102b. The guide members 4102a, 4102b project in an inboard direction from the flange 4100. The first and second sets of elongate guide members 4102a, 4102b are positioned on opposite sides of the minor axis 4072.

Referring still to FIGS. 68 and 69, the inboard housing piece 4038 includes an end plate 4104 defining a central opening 4106 that aligns with the inboard connector port 4048 of the port defining body 4046. The inboard housing piece 4038 also includes primary guide members 4108 that project in an outboard direction from the end plate 4104 and that are positioned on opposite sides of the major axis 4070. The primary guide members are configured to fit between the first and second sets of elongate guide members 4102a, 4102b when the inboard and outboard housing pieces 4038, 4042 are secured together. The inboard housing piece 4038 also including latching structures 4110 positioned on opposite sides of the minor axis 4072. The latching structures 4110 are separated by the major dimension D1 and intersected by the major axis 4070. The latching structures 4110 are coupled to (e.g., integrally or unitarily formed with) the end plate 4104. The latching structures 4110 each include an anchoring latch 4112 and a slide latch 4114. The anchoring latches 4112 are part of the anchor arrangement 4056 for securing the inboard housing piece 4038 at the fixed location along the connector insertion axis 4052 within the enclosure port 4022. The slide latches 4114 are part of the connection interface 4037 that interconnects the inboard and outboard housing pieces 4038, 4042 while concurrently allowing for relative sliding movement between the inboard and outboard housing pieces 4038, 4042 along the connector insertion axis 4052. The anchoring latches 4112 extend in an inboard direction from a base end to a free end. The slide latches 4114 extend in an outboard direction from a base end to a free end.

Figure 76:
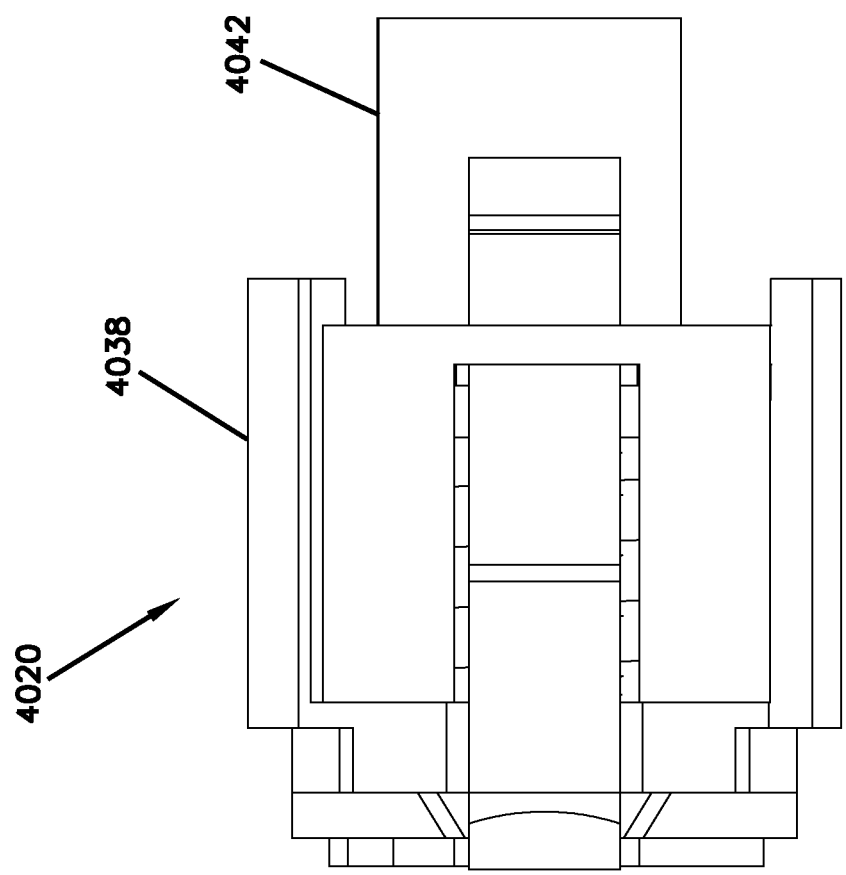
Figure 77:
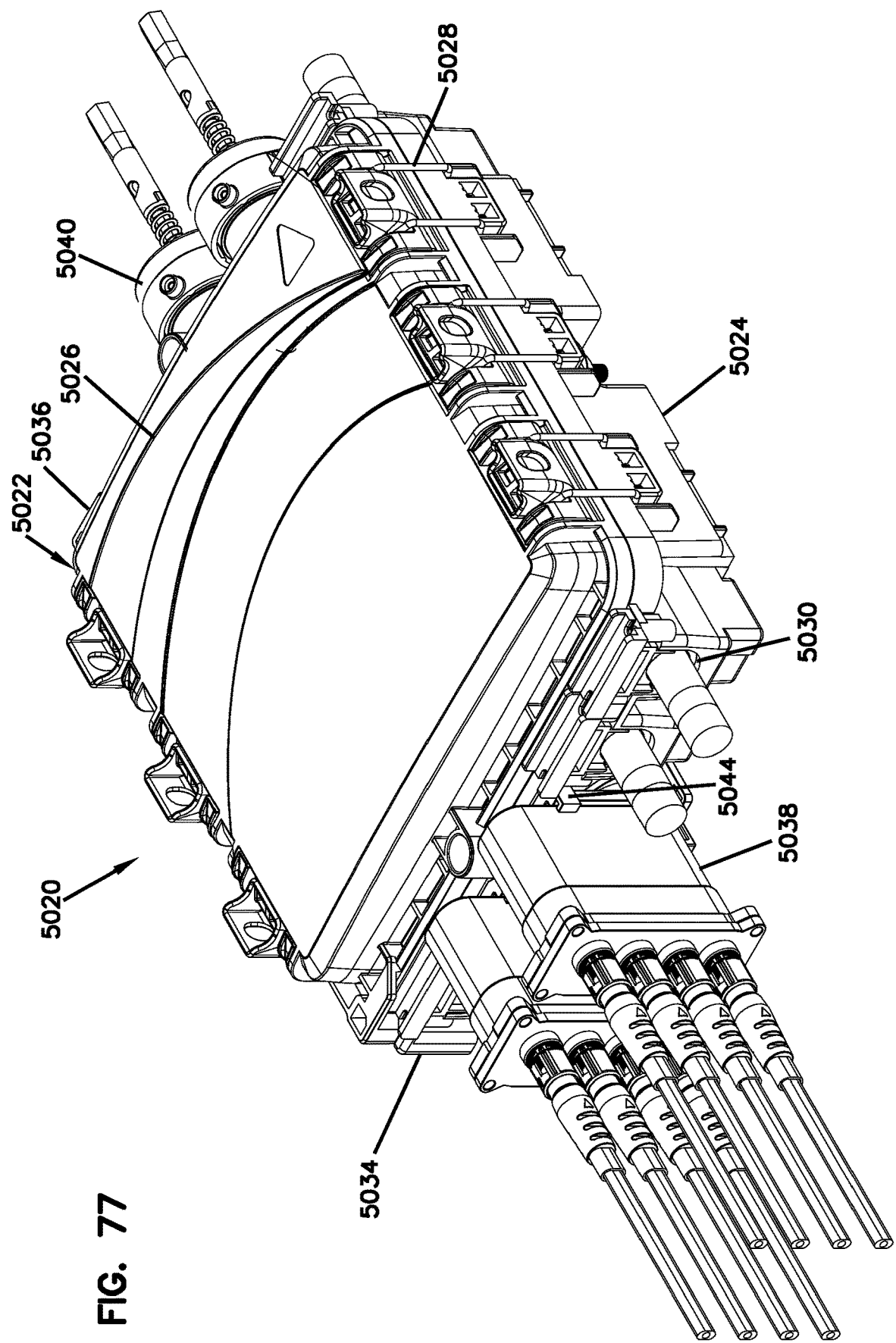
FIG. 77 depicts a modular interconnect system in accordance with the principles of the present disclosure.

When the inboard and outboard housing pieces 4038, 4042 are connected together, the free ends of the slide latches 4114 snap through openings 4115 defined by the flange 4100 so that retention surfaces 4117 of catches of the slide latches 4114 oppose an outboard side of the flange 4100 (see FIG. 74). The retention surfaces 4117 face in an inboard direction. Interference between the retention surfaces 4117 band the outboard side of the flange 4100 prevents the inboard and outboard pieces 4038, 4042 from disconnecting from one another. The openings 4115 are large enough to allow the outboard housing piece 4042 to slide along the slide latches in an inboard direction toward the inboard housing piece 4038. The spring 4054 biases the outboard housing piece 4042 in an outboard direction relative to the inboard housing piece 4038. FIGS. 76 and 77 show a range of permissible sliding movement that is possible between the inboard and outboard housing pieces 4038, 4042.

Figure 75:
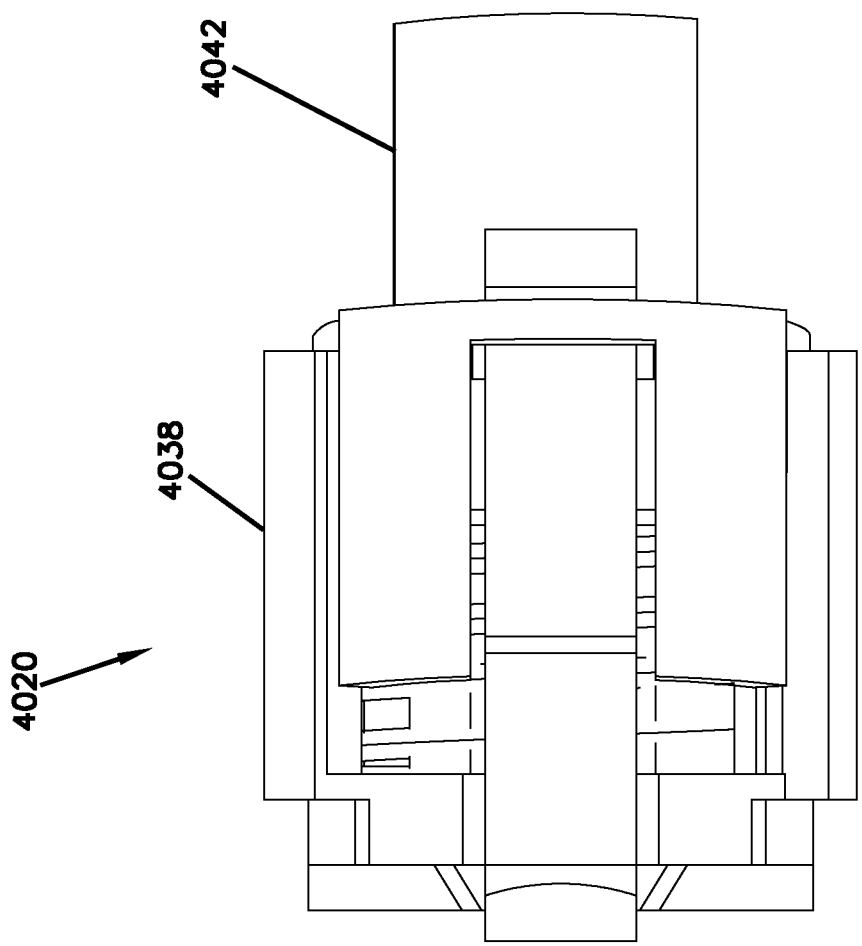
FIGS. 75 and 76 show a range of telescopic sliding movement permitted between the inboard and outboard housing pieces of the fiber optic adapter assembly of FIGS. 66-74.

When the fiber optic adapter assembly 4020 is fully inserted into the enclosure port 4022, the free ends of the anchoring latches 4112 snap through the inboard end 4032 of the enclosure port 4022 so that retention surfaces 4119 of catches of the anchoring latches 4112 oppose an inboard facing surface 4120 of the enclosure 4024 (see FIG. 75). In this way, the anchoring latches 4112 prevent the fiber optic adapter assembly 4020 from being withdrawing in an outboard direction from the enclosure port 4022. The retention surfaces 4119 and the inboard facing surfaces 4120 can be referred to as stop surfaces or as positive stop surfaces or as positive stops.

The base ends of the anchoring latches 4112 are offset in an outboard direction from end plate 4104 and the free ends of the anchoring latches 4112 are offset in an inboard direction from the end plate 4104. The end plate 4104 defines clearance notches 4120 for allowing the anchoring latches 4112 to flex toward the connector insertion axis 4052 as the anchoring latches 4112 pass through the inboard end 4032 of the enclosure port 4022.

Referring still to FIGS. 68 and 69, the primary guide members 4108 are wider that the elongate guide members 4102a, 4102b. In one example, the primary guide members 4108 have widths W that extend a majority of a distance along the major dimension D1 of the transverse cross-sectional profile. In one example, primary guide members 4108 curve about the connector insertion axis 4052 as the primary guide members 4108 extend along their widths W.

Figure 72:
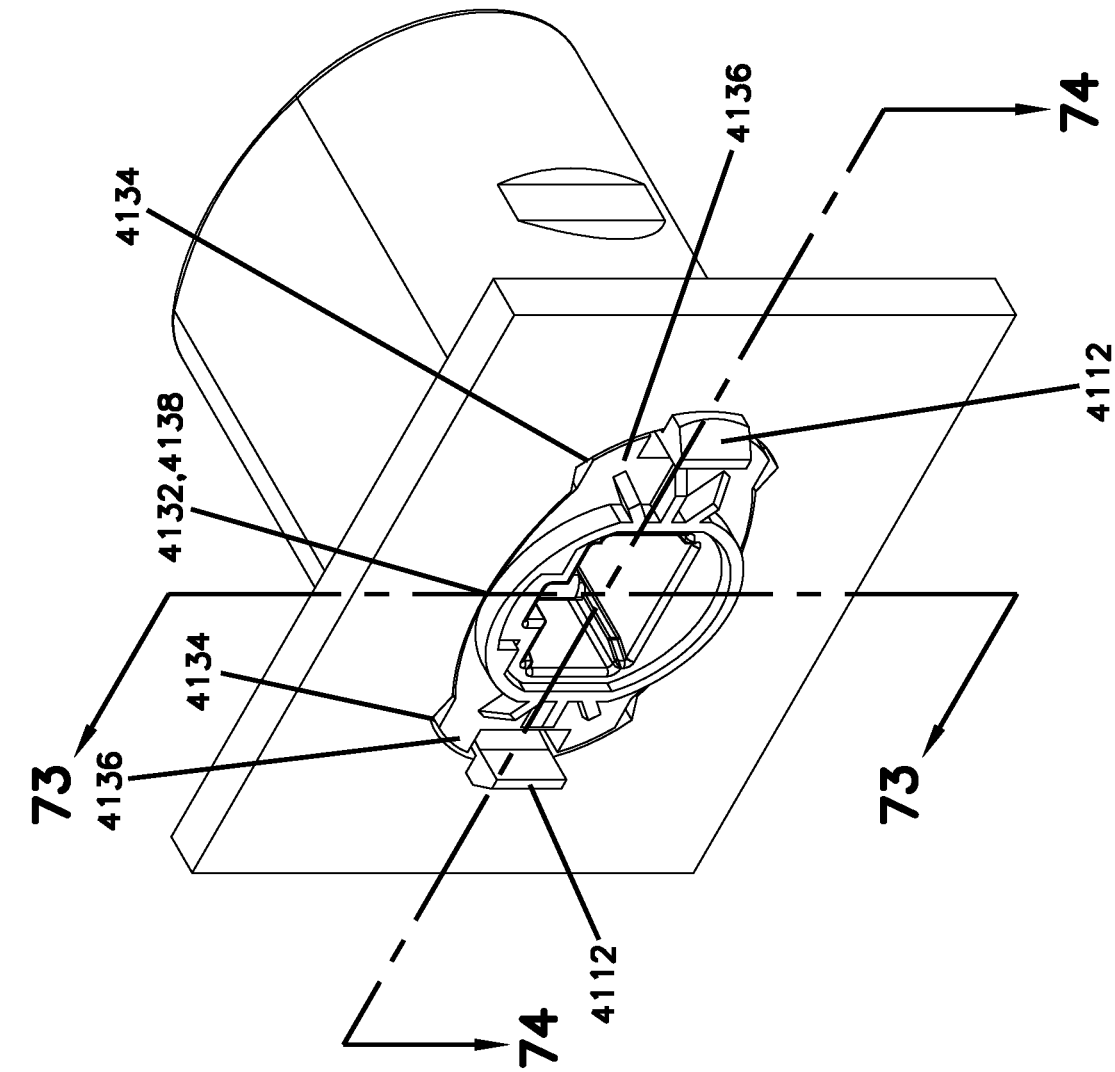
FIG. 72 shows the fiber optic adapter assembly of FIGS. 66-71 installed within the corresponding enclosure port.

Referring to FIGS. 68 and 72, the enclosure 4024 defines a shaped opening 4130 at the inboard end 4032 of the enclosure port 4022. The shaped opening 4130 defines a profile that complements an outer profile of the end plate 4104. The shaped opening 4130 is defined by retention lips 4132 on opposite sides of the major axis 4070 and ear-shaped receptacles 4134 on opposite sides of the minor axis 4072. The end plate 4104 has a cross-sectional profile with ear sections 4136 that fit within the ear-shaped receptacles 4134 and central portions 4138 that fit inside the retention lips 4132. As the fiber optic adapter assembly 4020 is loaded into the enclosure port 4022, the free ends of the anchoring latches 4112 snap through the shaped opening 4130 so that the catches oppose the inboard facing surface 4120 of the enclosure 4024. The end plate 4104 of the inboard housing piece 4038 includes shoulders 4140 positioned on opposite sides of the major axis D1 that define positive stops adapted to oppose the retention lips 4132 when the fiber optic adapter assembly 4020 is loaded into the enclosure port 4022. The shoulders 4140 include stop surfaces that face in an inboard direction and oppose stop surfaces of the retaining lips 4132 that face in an outboard direction. Interference between the shoulders 4140 and the retention lips 4132 positively stops inboard movement of the fiber optic adapter assembly within the enclosure port 4022.

Referring to FIGS. 73 and 74, the spring 4054 mounts over the port defining body 4046 and is positioned radially between the port defining body 4046 and the primary guide members 4108 when the fiber optic adapter assembly 4020 is assembled. The elongate guide members 4102a, 4102b and the latching structures 4110 are positioned radially outside the spring 4054 when the fiber optic adapter assembly 4020 is assembled. The slide latches 4114 are positioned between the elongated guide members of each set of elongated guide members 4102a, 4102b when the fiber optic adapter assembly 4020 is assembled. The outboard housing piece 4042 includes a plurality of spring stops 4160 positioned about an outer periphery of the port defining body 46 adjacent to the flange 4100.

In certain examples, the spring 4054 allows the outboard housing piece 4042 to slide, move, slightly-pivot, or otherwise adjust to better accommodate reception and alignment of the fiber optic connectors 4028, 4030. In other examples, the ruggedized interface component 4026 can be removed and an interface of a module such as a value added module (e.g., a splitter module, break-out module, indexing module, WDM module) can plug directly into the enclosure port 4022 and can interface directly with the adapter assembly. The floating nature of the adapter assembly assists in absorbing mechanical mismatches such that a reliable optical connection can be made.

One terminal in accordance with the principles of the present disclosure includes a terminal housing defining at least one terminal port, and/or a terminal housing defining a plurality of terminal ports, and/or a terminal housing including at least one gel-sealed cable pass-through location, and/or a plurality of cable pass-through locations, and/or a fiber management tray, and/or a splice tray, and/or a passive optical splitter, and/or a wavelength division multiplexer, and/or a fiber-loop fiber storage arrangement for storing optical fiber corresponding to a pass-through cable, and/or a terminal housing that is re-enterable, and/or a terminal housing having a base and a cover sealed with a gasket.

A module body as defined herein includes a frame, housing, support structure, mount, or other like component or components. A module body includes one piece configurations as well as multiple piece configurations. The phrase "module body" is intended to not include a tether portion of a module.

An example module in accordance with the principles of the present disclosure includes at least one ruggedized port, and/or a plurality of ruggedized ports, and/or a row of ruggedized ports, and/or a single row of ruggedized ports, and/or at least four ruggedized ports arranged in a row, and/or only four ruggedized ports arranged in a row, and/or multiple rows of ruggedized ports, and/or an interior adapter pack having adapter ports pre-positioned or pre-configured to correspond or align with corresponding ruggedized adapter ports of the module, and/or an interior adapter pack having a port-defining piece having a unitary construction that defines a plurality of adapter ports having a positioning or spacing that correspond to ruggedized ports of the adapter module, and/or a plug-and-play interface, and/or a tether, and/or a plug-and-play interface integrated with a module body and defining an interface form factor, and/or a connector for interfacing with a terminal port that is housed at least partially within a module body, and/or a module body piece having a unitary construction that defines a plurality of ruggedized connector ports each including an integrated, unitary connector-coupling feature adapted to couple with a corresponding ruggedized fiber optic connector, and/or an interior adapter pack body mounted inside a module body which defines a plurality of interior adapter ports adapted to align with ruggedized adapter ports of the module body and supporting a plurality of ferrule alignment sleeves, and/or a fastener for securing a module body to a terminal.

Figure 78:
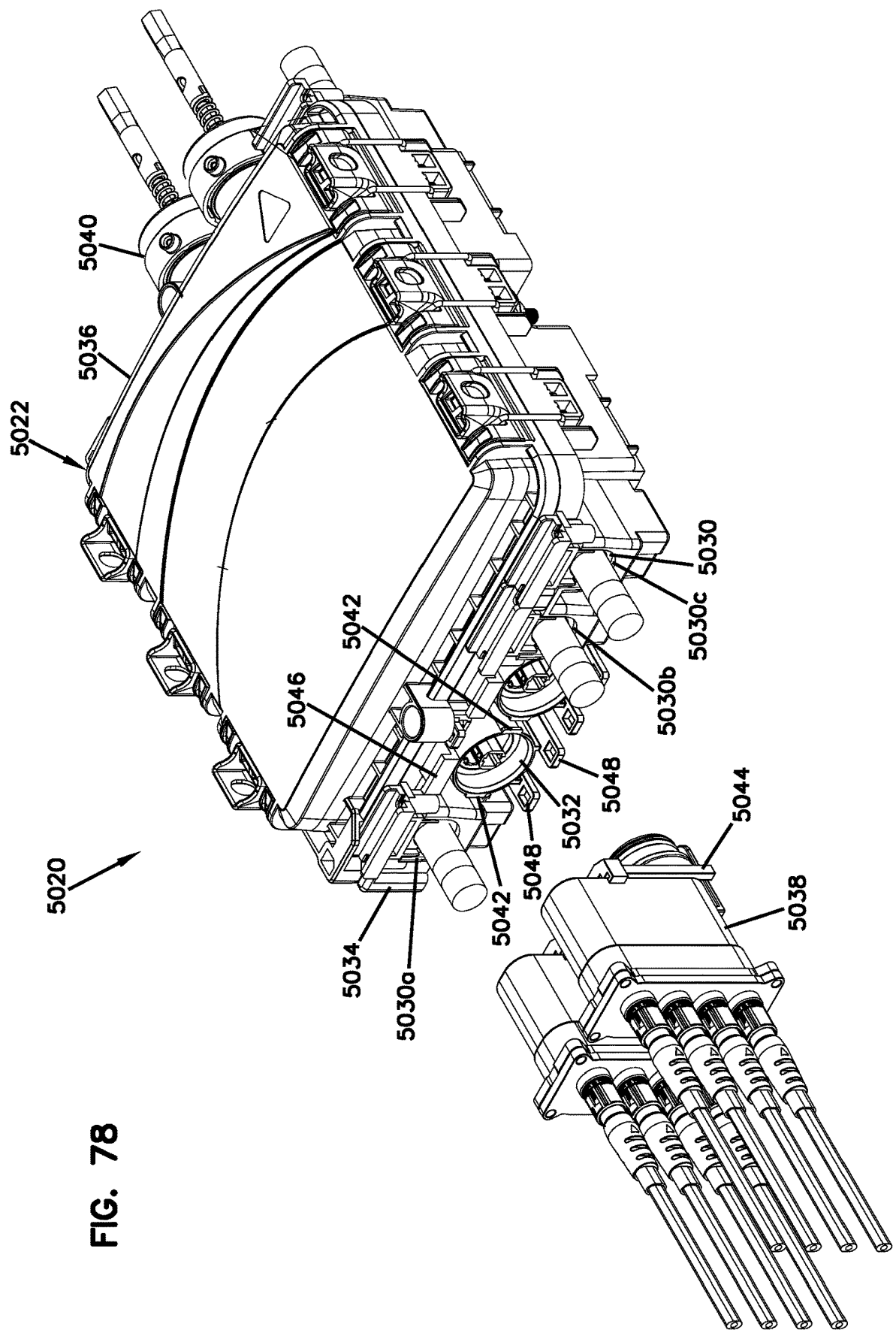
FIG. 78 shows the modular interconnect system of FIG. 77 with multi-port modules shown disconnected from a terminal housing of the interconnect system.
Figure 103:
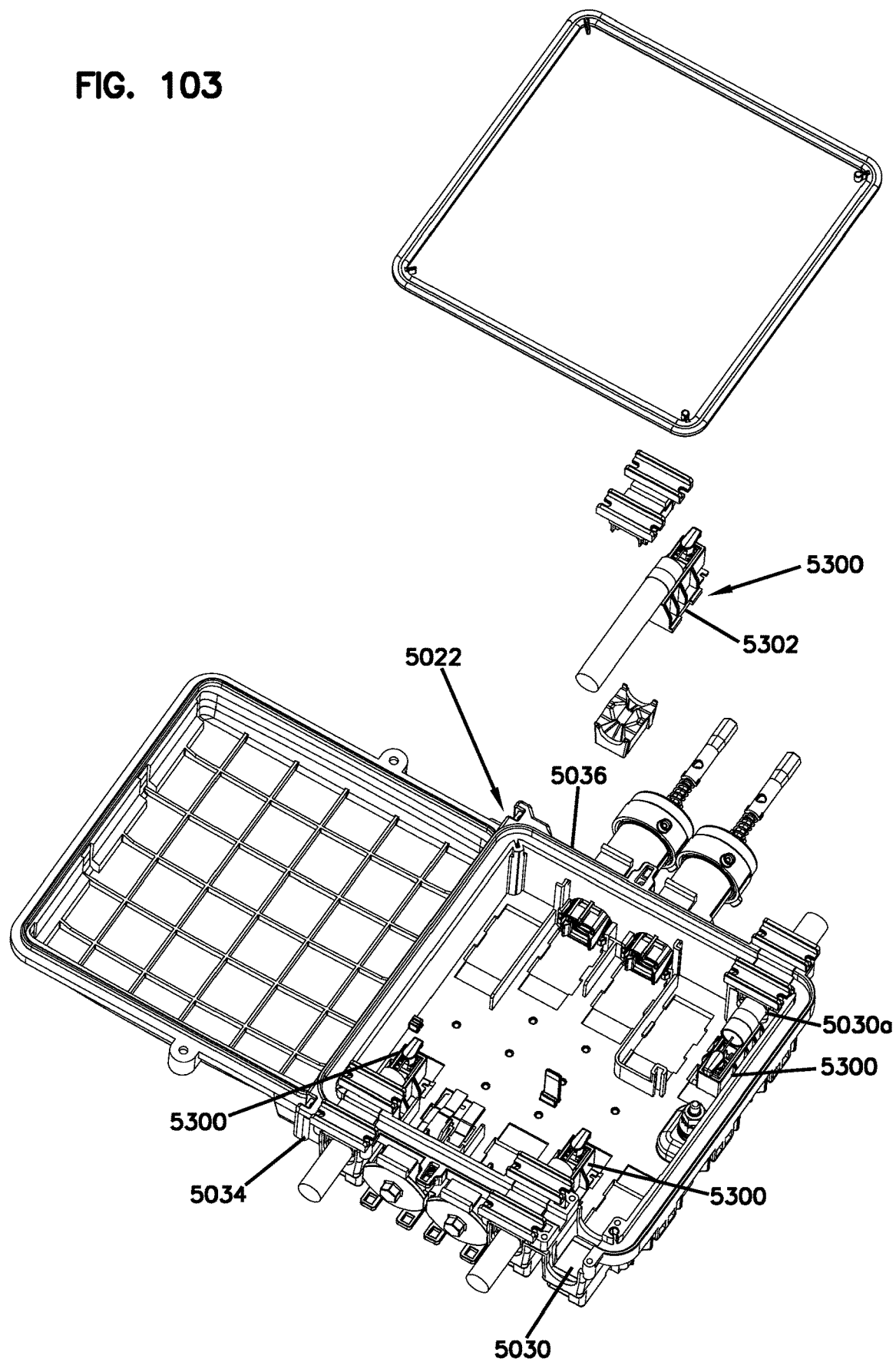
FIG. 103 is a partially exploded view of the terminal housing of the interconnect system of FIGS. 77 and 78 showing various internal components removed and showing an anchoring assembly exploded from the interior of the terminal housing.
Figure 104:
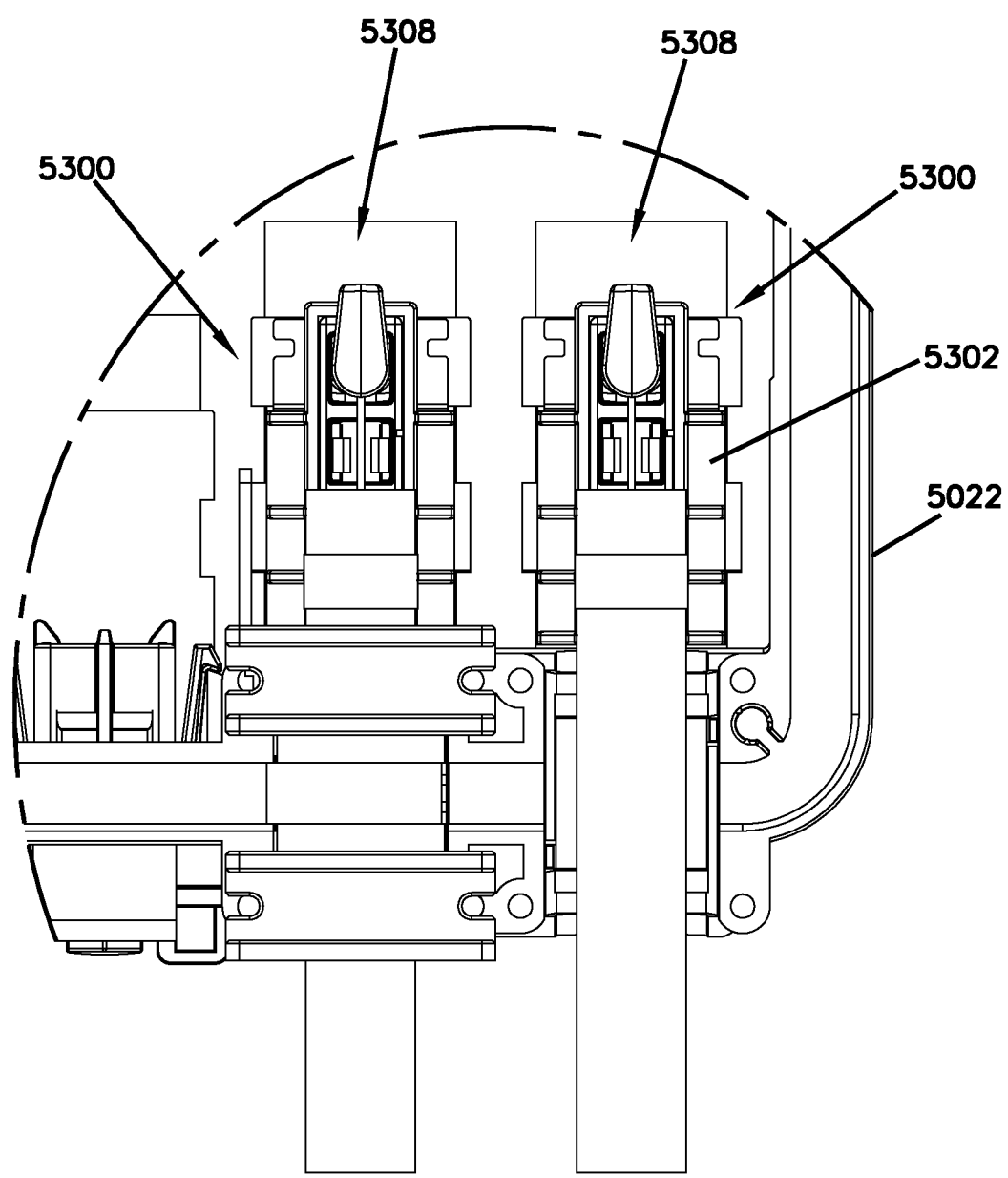
FIG. 104 is an enlarged view of locations within the terminal housing for mounting anchoring assemblies.
Figure 105:
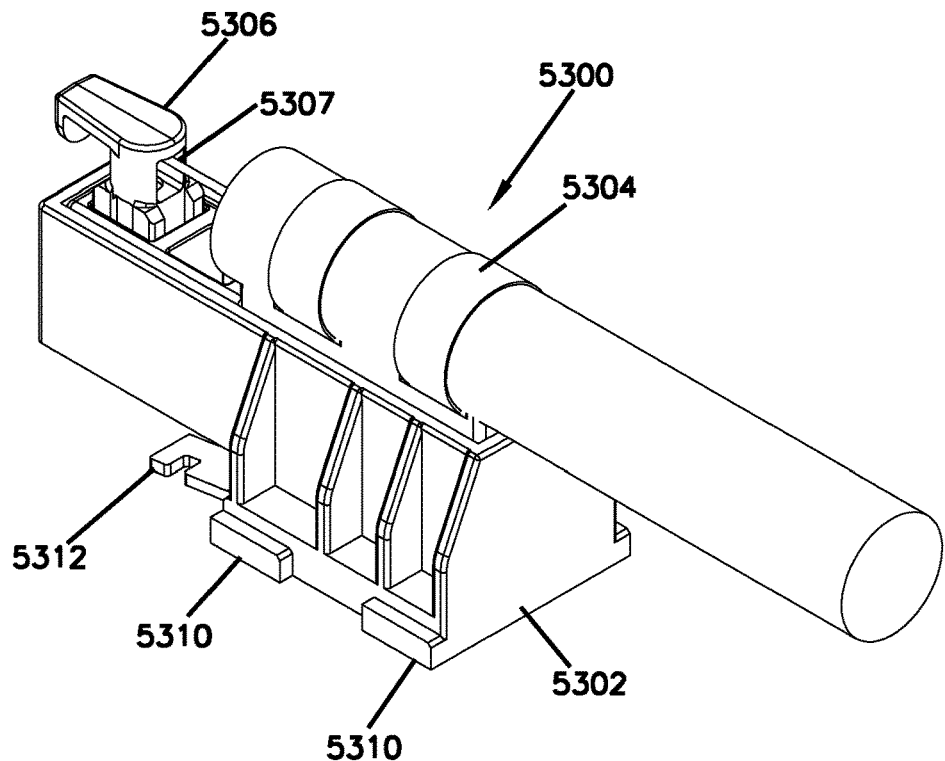
FIG. 105 is a perspective view of one of the anchoring assemblies that can be secured within the terminal housing.
Figure 106:
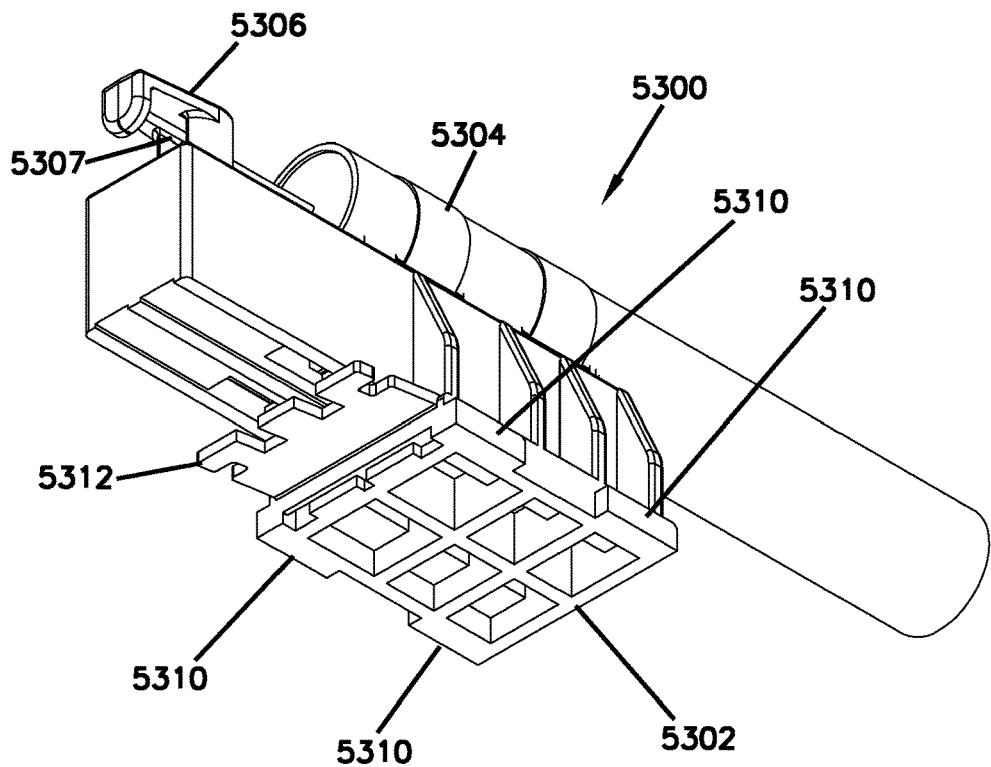
FIG. 106 is another view of the anchoring assembly of FIG. 105.

FIGS. 77 and 78 depict a modular fiber optic interconnect system 5020 in accordance with the principles of the present disclosure. The interconnect system 5020 includes a terminal system having a terminal housing 5022. In the depicted example, the terminal housing 5022 includes a base 5024 and a cover 5026. The cover 5026 can be secured to the base 5024 by latches 5028 or other means. The cover 5026 can be removed from the base 5024 to expose a primary access opening that provides primary access to an interior of the terminal housing 5022. A perimeter seal can be provided between the cover 5026 and the base 5024. The terminal housing 5022 defines at least one sealed cable pass-through location 5030 and at least one terminal port 5032. In the depicted example, the terminal housing 5022 includes a first end 5034 having three cable pass-through locations 5030a-c and a second opposite end 5036 having at least one cable pass-through location 5030d (see FIG. 103). Cable pass-through locations 5030a and 5030b can be used to accommodate pass-through cables arranged in a butt-style configuration with fiber loop storage provided within the terminal housing 5022. Cable pass-through locations 5030c and 5030d can be used to receive a pass-through cable in an inline configuration with fiber loop storage provided within the terminal housing 5022. Two terminal ports 5030 are provided between the cable pass-through locations 5030a, 5030b at the first end 5034 of the terminal housing 5022 and two terminal ports 5030 are provided at the second end 5036 of the terminal housing 5022. Two multi-port modules 5038 (e.g., splitter modules, WDM modules, break-out modules, indexing modules, etc.) are shown mounted at the terminal ports 5032 at the first end 5034 and two drop-cable sealing modules 5040 are shown mounted at the terminal ports 5032 at the second end 5036 of the terminal housing 5022.

It will be appreciated that the terminal port configuration as well as the cable pass-through configuration of the terminal housing 5022 can be varied in different examples of the present disclosure to vary the size and/or capacity and/or configuration of the terminal housing. For example, the number of terminal ports 5032 as well as the number of sealed cable pass-through locations can be increased or reduced. In certain examples, the cable pass-through locations 5030c and 5030d can be eliminated to reduce the size of the terminal housing. In other examples the cable pass-through locations 5030a and 5030b can be eliminated to reduce the size of the terminal housing. Additionally, different modules types and plugs can be used and/or interfaced with the terminal ports to provide different configurations, upgrades, expansions, customizations and other variations.

Referring to FIG. 78, the terminal ports 5030 include a port form factor that is generally circular. The terminal ports 5032 also include integrated fastening structures for mechanically interfacing with corresponding fastening structures of modules or inserts. In one example, the integrated fastening structures include mechanical interfaces 5042 which are depicted as bayonet interface tabs. In other examples, the integrated fastening structures can include threads, bayonet slots, snap fit structures, etc. The terminal ports 5032 can also be configured to interface with fastening clips 5044. Example structures for interfacing with the fastening clips 5044 can include lips, tabs, receptacles, or like structures. As depicted at FIG. 78, the terminal ports 5032 include clip interfacing structures such as an upper lip 5046 and lower clip receiving receptacles 5048.

Figure 79:
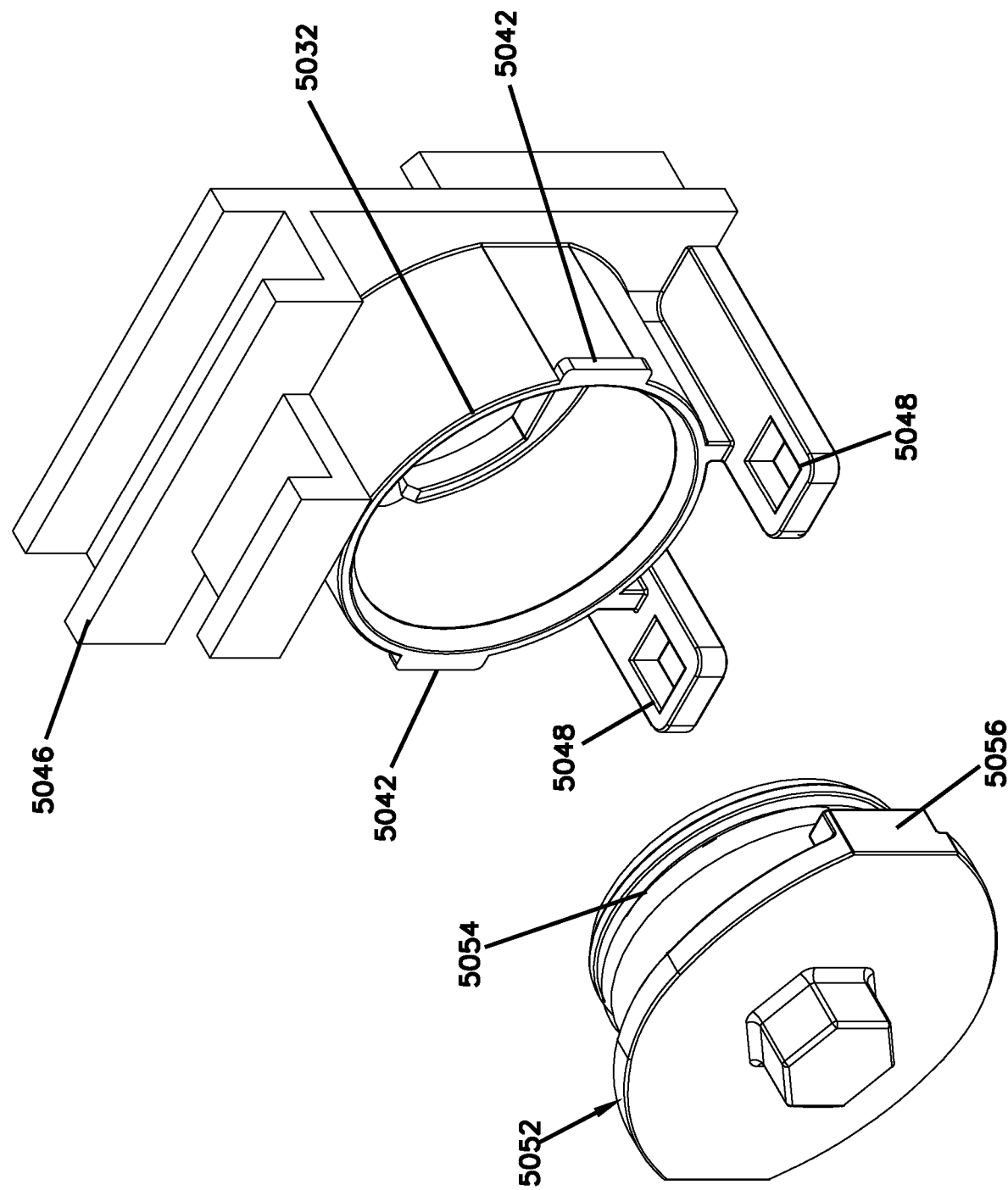
FIG. 79 depicts a plug that can be received within terminal ports of the terminal housing of the interconnect system of FIGS. 77 and 78.
Figure 80:
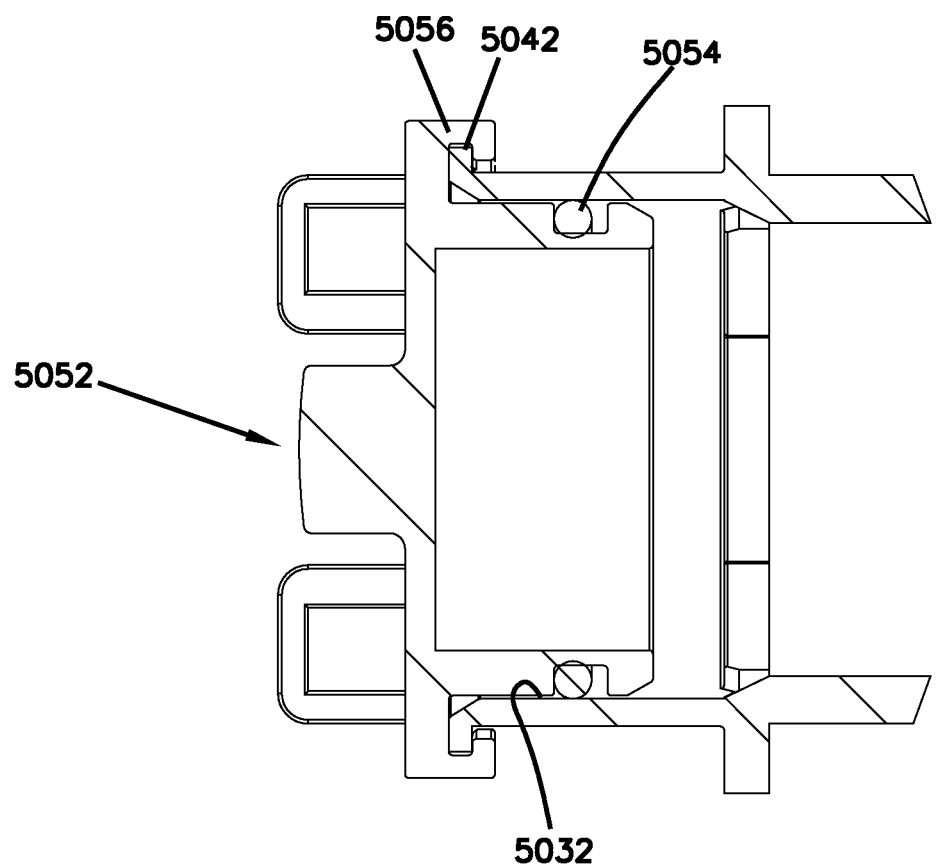
FIG. 80 is a cross-sectional view showing the plug of FIG. 79 mounted within a terminal port.

FIGS. 79 and 80 depict an example plug 5052 for closing and sealing the terminal ports 5032 when the terminal ports 5032 are not mated with modules. The plug 5052 includes a body having a form factor that matches the form factor of the terminal ports 5032. A seal 5054 can be mounted around the form factor of the body of the plug 5052. The plug body can also include a fastening structure for mechanically interfacing with the terminal ports 5032. For example, the plug 5052 can include a fastening arrangement 5056 configured to interlock with the mechanical interface 5042 of one of the terminal ports 5032 when the plug 5052 is secured therein. The fastening arrangements 5056 is preferably a twist-to-lock interface and is depicted as a bayonet-style interface, but could also include a threaded interface or a snap-fit interface. FIG. 80 shows the plug 5052 secured and sealed within one of the terminal ports 5032.

Figure 81:
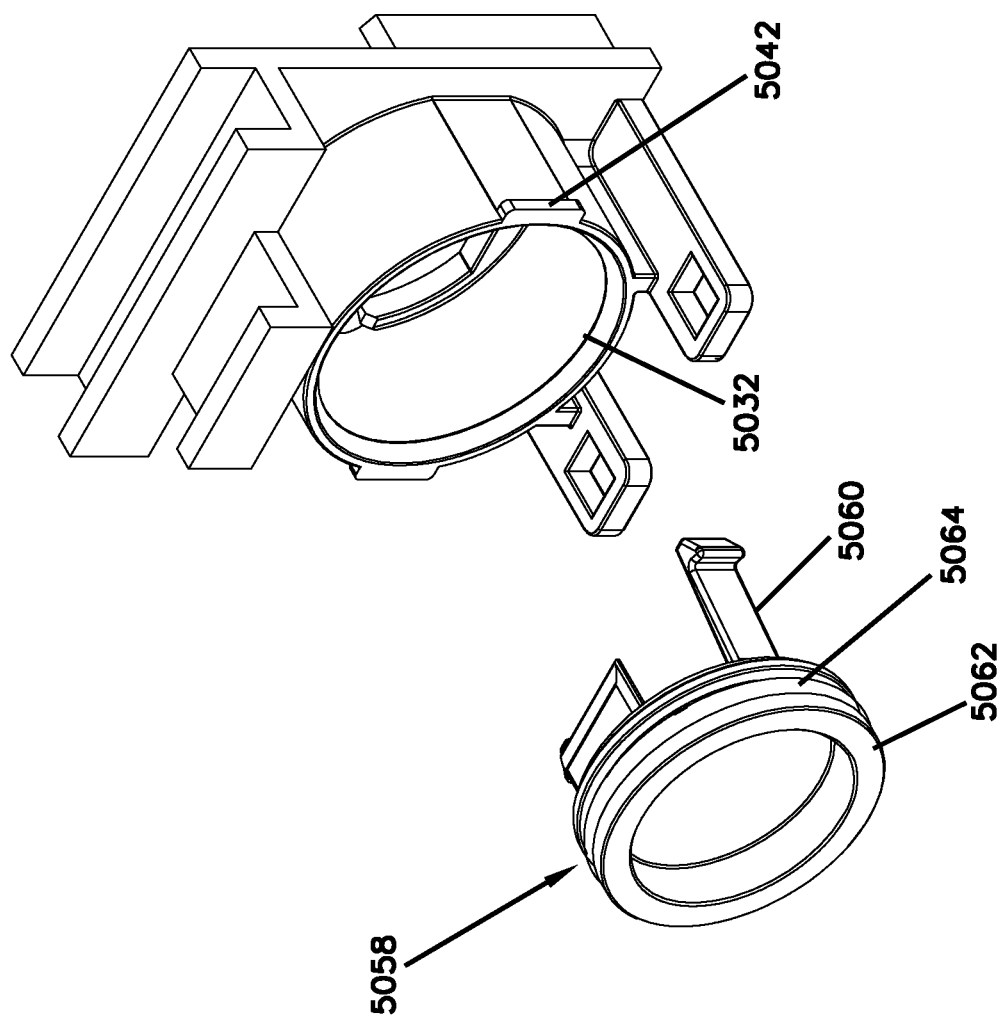
FIG. 81 shows another plug for closing a terminal port of the terminal housing of FIGS. 77 and 78.
Figure 82:
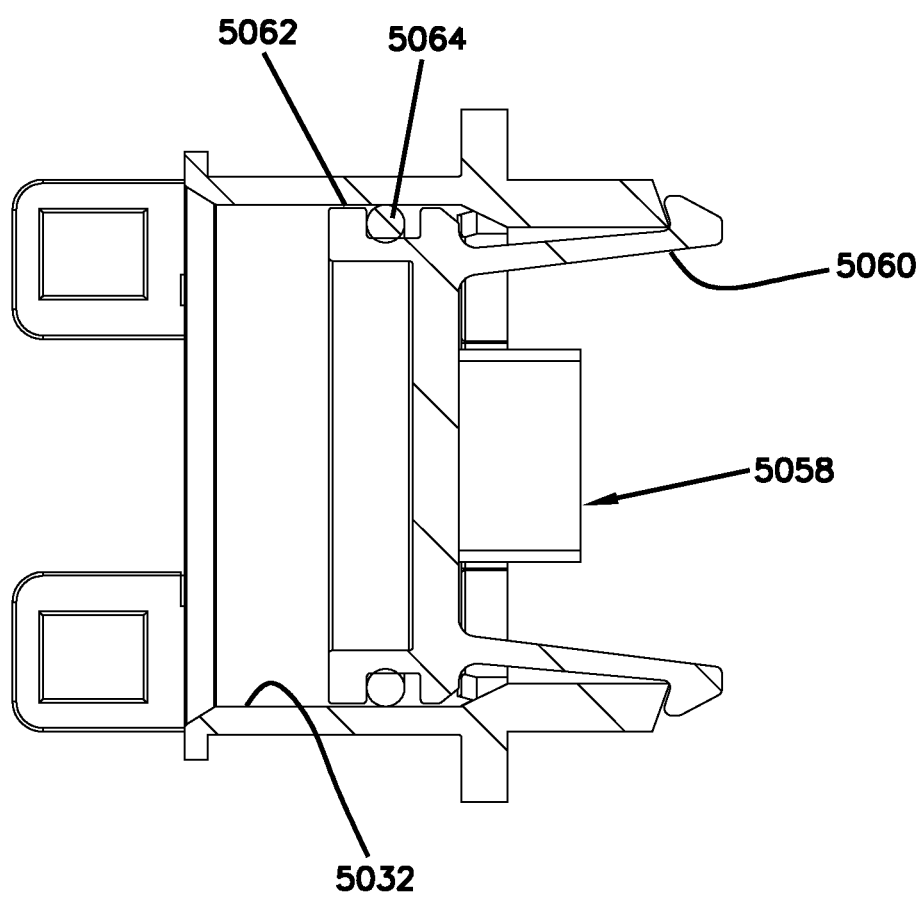
FIG. 82 is a cross-sectional view showing the plug of FIG. 81 mounted within a terminal port.

FIGS. 81 and 82 depict another plug 5058 for sealing the terminal ports 5032 when the terminal ports 5032 are not mated with modules. The plug 5058 is adapted to snap within the terminal ports 5032 and includes a snap-fit structure. In one example, the snap-fit structure includes one or more latches 5060. The plug 5058 includes a body 5062 defining a form factor that matches the form factor of the terminal ports 5032. A seal 5064 can be mounted on the body 5062. The plug 5058 can be configured to mount entirely within one of the terminal ports 5032 such that no portion of the plug 5058 projects outwardly from the terminal port 5032 when the plug 5058 is mounted therein. FIG. 82 shows the plug 5058 secured and sealed within one of the terminal ports 5032.

Figure 83:
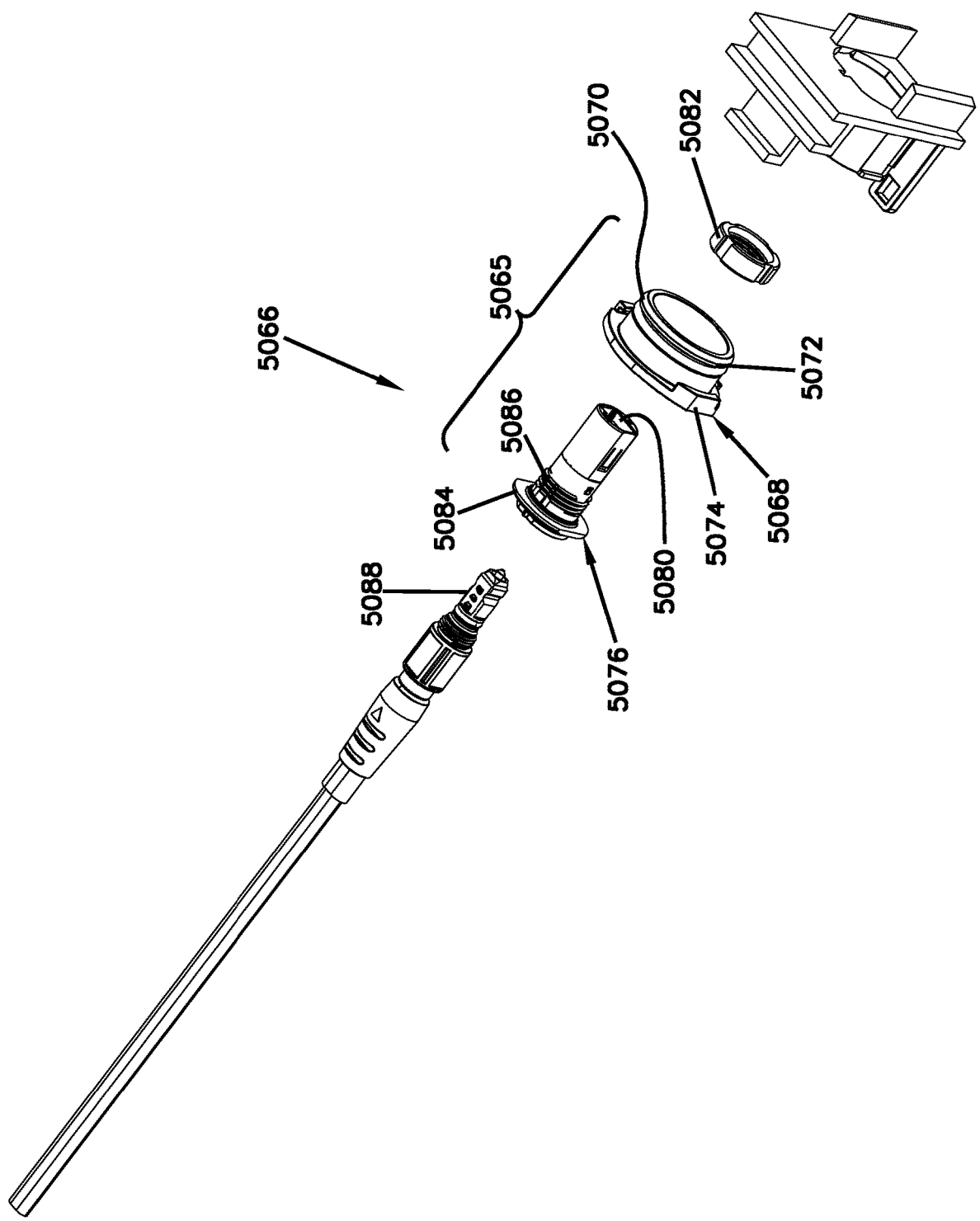
FIG. 83 shows a ruggedized port module that is matable with terminal ports of the terminal housing of the interconnect system of FIGS. 77 and 78.
Figure 84:
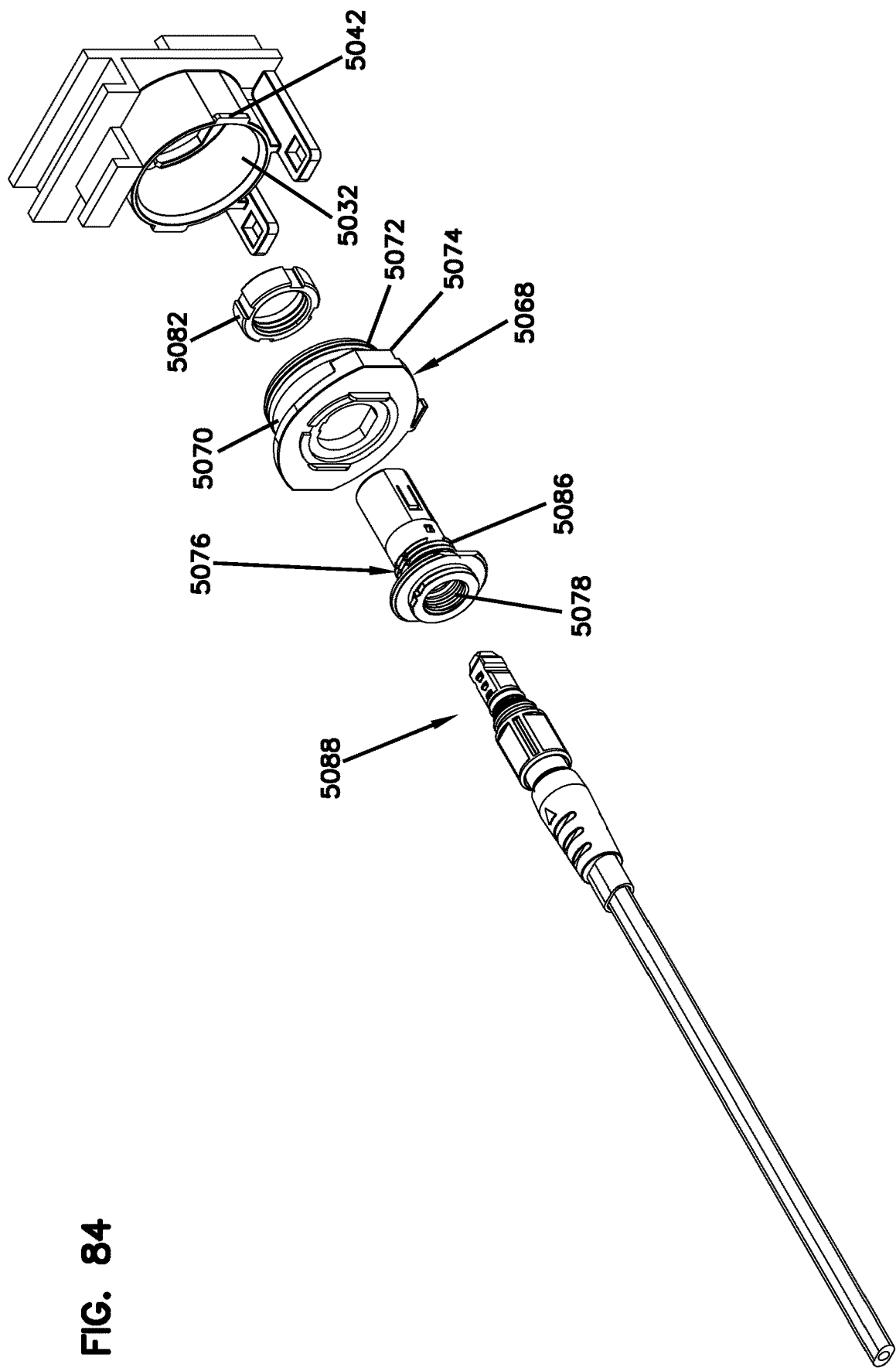
FIG. 84 is another view of the ruggedized port module of FIG. 83.

FIGS. 83 and 84 depict an example ruggedized connector port module 5066 adapted to interface with one of the terminal ports 5032. The ruggedized connector port module 5066 includes a module body 5065 having a mount 5068. The mount 5068 includes an integrated form-factor structure 5070 that defines a form factor configured to mate and match with the form factor of one of the terminal ports 5032. A seal 5072 is mounted around the form factor structure 5070 for forming a seal between the mount 5068 and the terminal port 5032 when the module 5066 is secured therein. The mount 5068 also includes twist-to-lock interface 5074 adapted to interlock with the interface 5042 of one of the terminal ports 5032. The interface 5074 is preferably a bayonet-style interface but could also include threads, a latch, a clip or a snap fit. The module body 5065 also includes a ruggedized fiber optic adapter 5076 that secures to the mount 5068. The ruggedized fiber optic adapter 5076 defines a ruggedized outer port 5078 and a non-ruggedized inner port 5080. The ruggedized fiber optic adapter 5076 is secured to the mount 5068 by a fastener such as a nut 5082. When the ruggedized fiber optic adapter 5076 is mounted to the mount 5068, a flange 5084 opposes an outer face of the mount 5068 and the nut 5082 opposes an inner surface of the mount 5068. A seal can be compressed between the flange 5084 and the outer surface of the mount 5068 to provide sealing between the ruggedized fiber optic adapter 5076 and the mount 5068. The nut 5082 can thread on threads 5086 defined by the ruggedized fiber optic adapter 5076. When the ruggedized connector port module 5066 is mounted within one of the terminal ports 5032, the ruggedized outer port 5078 is configured to receive a first type of ruggedized fiber optic connector 5088 from outside the terminal housing 5022 and the non-ruggedized inner port 5080 is adapted to receive a non-ruggedized fiber optic connector from inside the terminal housing 5022. The connector 5088 can include a robust coupler (e.g., an exteriorly threaded coupling nut or other type of twist to lock coupler of the type described herein) for engaging the fastening interface of the outer port 5078.

Figure 85:
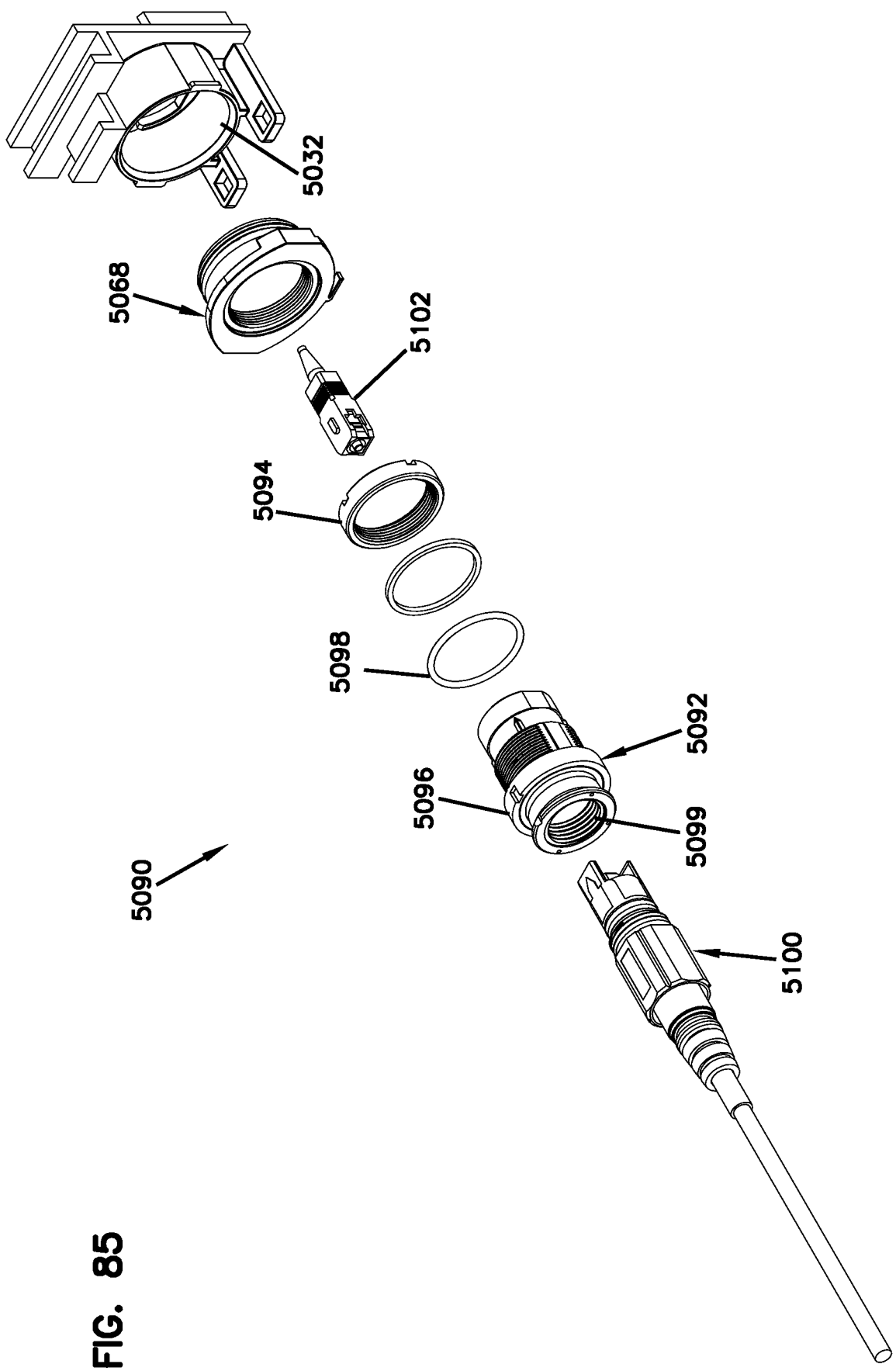
FIG. 85 shows another ruggedized port module that is matable with terminal ports of the terminal housing of the interconnect system of FIGS. 77 and 78.

FIG. 85 depicts another ruggedized connector port module 5090 adapted to interface with the terminal connector ports 5032. The ruggedized connector port module 5090 includes another type of ruggedized fiber optic adapter 5092 that mounts to the mount 5068. The ruggedized fiber optic adapter 5092 can be secured to the mount 5068 by a nut 5094. A flange 5096 of the ruggedized fiber optic adapter 5092 can oppose a front surface of the mount 5068 and the nut 5094 can oppose a back surface of the mount 5068. A seal 5098 can be compressed between the flange 5096 and the mount 5068 for sealing purposes. The ruggedized fiber optic adapter 5092 can define a ruggedized outer port 5099 for receiving a second style of ruggedized fiber optic connector 5100 and a non-ruggedized port for receiving a non-ruggedized fiber optic connector 5102 connected to an optical fiber routed from inside the terminal housing 5022.

The ruggedized connector port modules 5066 and 5090 include twist-to-unlock interfaces for coupling with the terminal ports 5032. In other examples, the ruggedized connector port modules 5066, 5090 can be secured within the terminal ports 5032 by other fixation configurations such as snap-fit configurations and slide-latch configurations.

Figure 86:
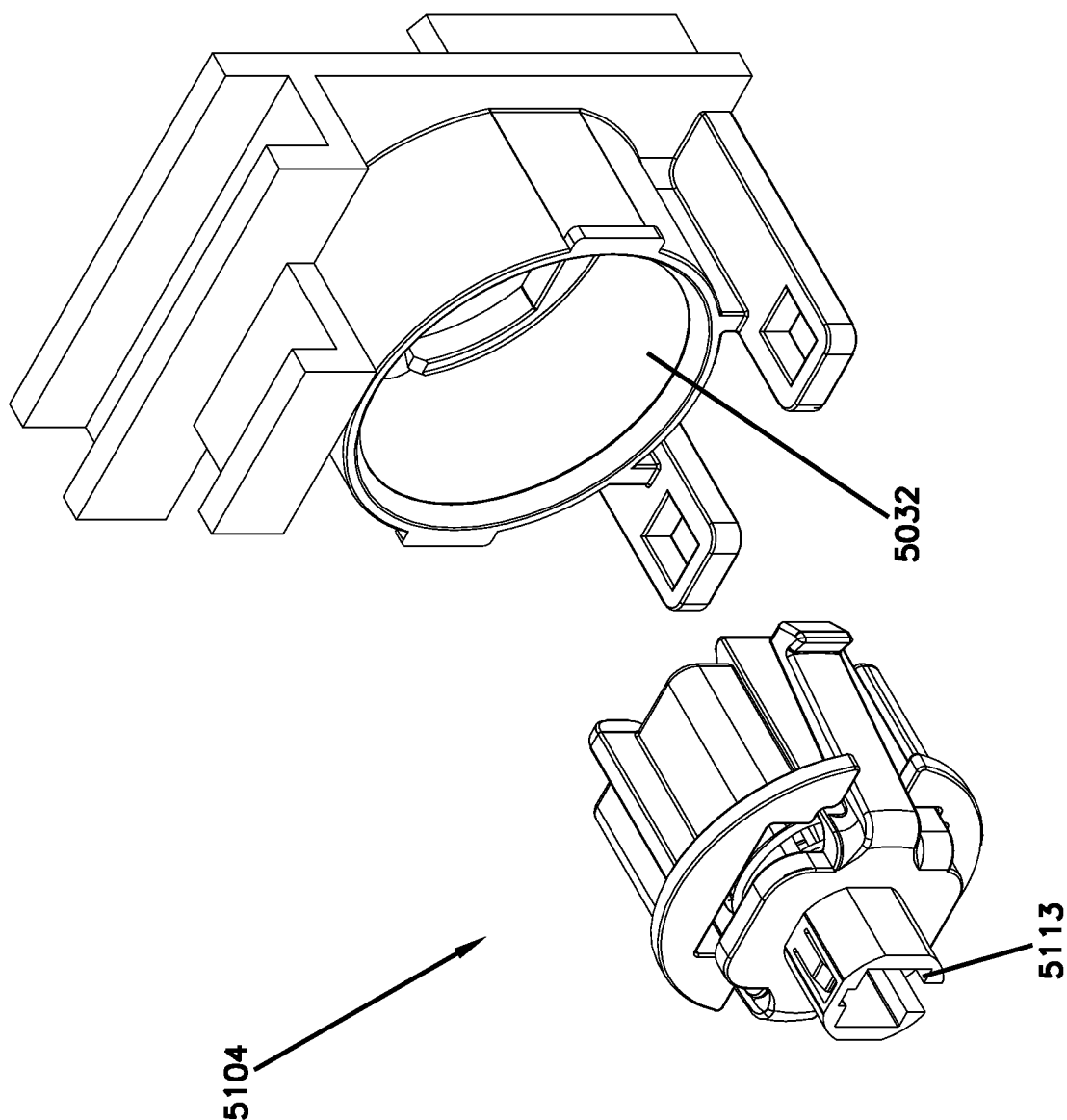
FIG. 86 illustrates a fiber optic adapter assembly that can be installed within terminal ports of the terminal housing of FIGS. 77 and 78.
Figure 87:
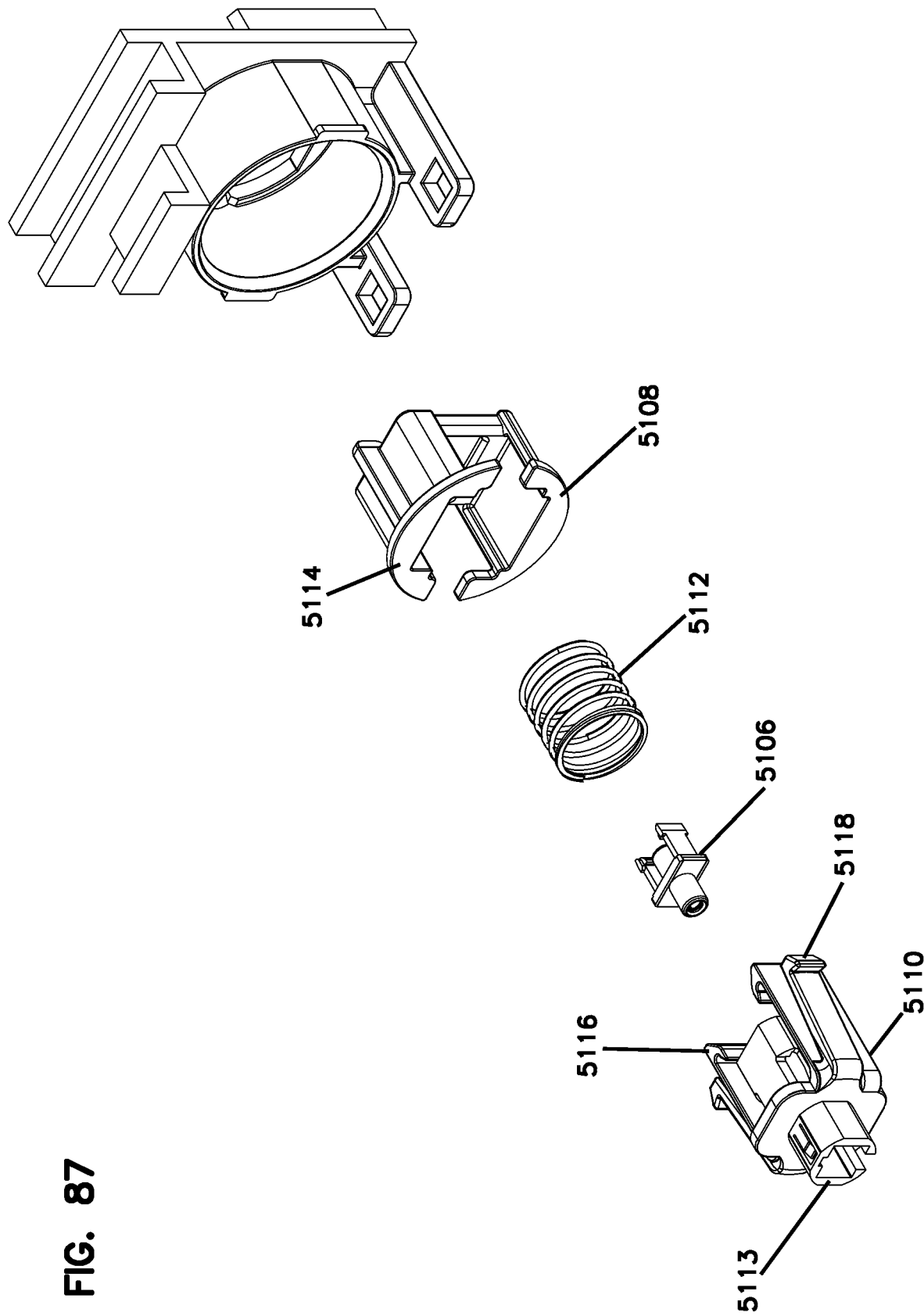
FIG. 87 is an exploded view of the fiber optic adapter assembly of FIG. 86.

FIGS. 86 and 87 show a fiber optic adapter assembly 5104 configured to be mounted within the terminal ports 5032. It will be appreciated that the fiber optic adapter assembly 5104 can operate in a similar or the same way as the fiber optic adapter assembly 4020 previously described with respect to FIG. 66. The fiber optic adapter assembly 5104 has a form factor that matches or is compatible with the form factor of the terminal ports 5032. The fiber optic adapter assembly 5104 is configured to be loaded into one of the terminal ports 5032 from outside the terminal housing 5022. In certain examples, the fiber optic adapter assembly 5104 is secured within the corresponding one of the terminal ports 5032 by a snap-fit mechanical coupling. The fiber optic adapter assembly 5104 includes an internal ferrule alignment structure 5106 that can float within the assembly. The ferrule alignment structure 5106 can include a ferrule alignment sleeve. The fiber optic adapter assembly 5104 includes an inboard housing 5108 and an outboard housing 5110 that couples to the inboard housing 5108 by a slidable connection. A spring 5112 mounts between the inboard and outboard housings 5108, 5110 and applies a bias to the outboard housing 5110. The spring compresses as the outboard housing 5110 slides in an inboard direction relative to the inboard housing 5118. The ferrule alignment structure 5106 mounts within the outboard housing 5110 in alignment with an outboard connector port 5113 of the outboard housing 5110. The inboard housing 5108 can include structure such as a positive stop for positioning the inboard housing 5108 within the terminal port 5032. In the depicted example, the positive stop can include a flange 5114 that engages a shoulder positioned within the terminal port 5032.

In certain examples, latching arrangements can be used to secure the fiber optic assembly 5104 within a terminal port 5032 and to secure the inboard and outboard housings 5108, 5110 together. For example, latches 5116 can secure the outboard housing 5110 to the inboard housing 5108. Also, latches 5118 can secure the fiber optic assembly 5104 within the terminal port 5032. The outboard connector port 5113 can be adapted to receive a connector (e.g., a connector corresponding to a module or a ruggedized connector) from outside the terminal housing 5022. Either of the inboard or outboard housings 5108, 5110 can also define an inboard connector port adapted for receiving a fiber optic connector terminated to an optical fiber routed from inside the terminal housing 5022. It will be appreciated that the ferrule alignment structure 5106 is adapted for aligning the ferrules of fiber optic connectors secured within the fiber optic assembly 5104.

Figure 88:
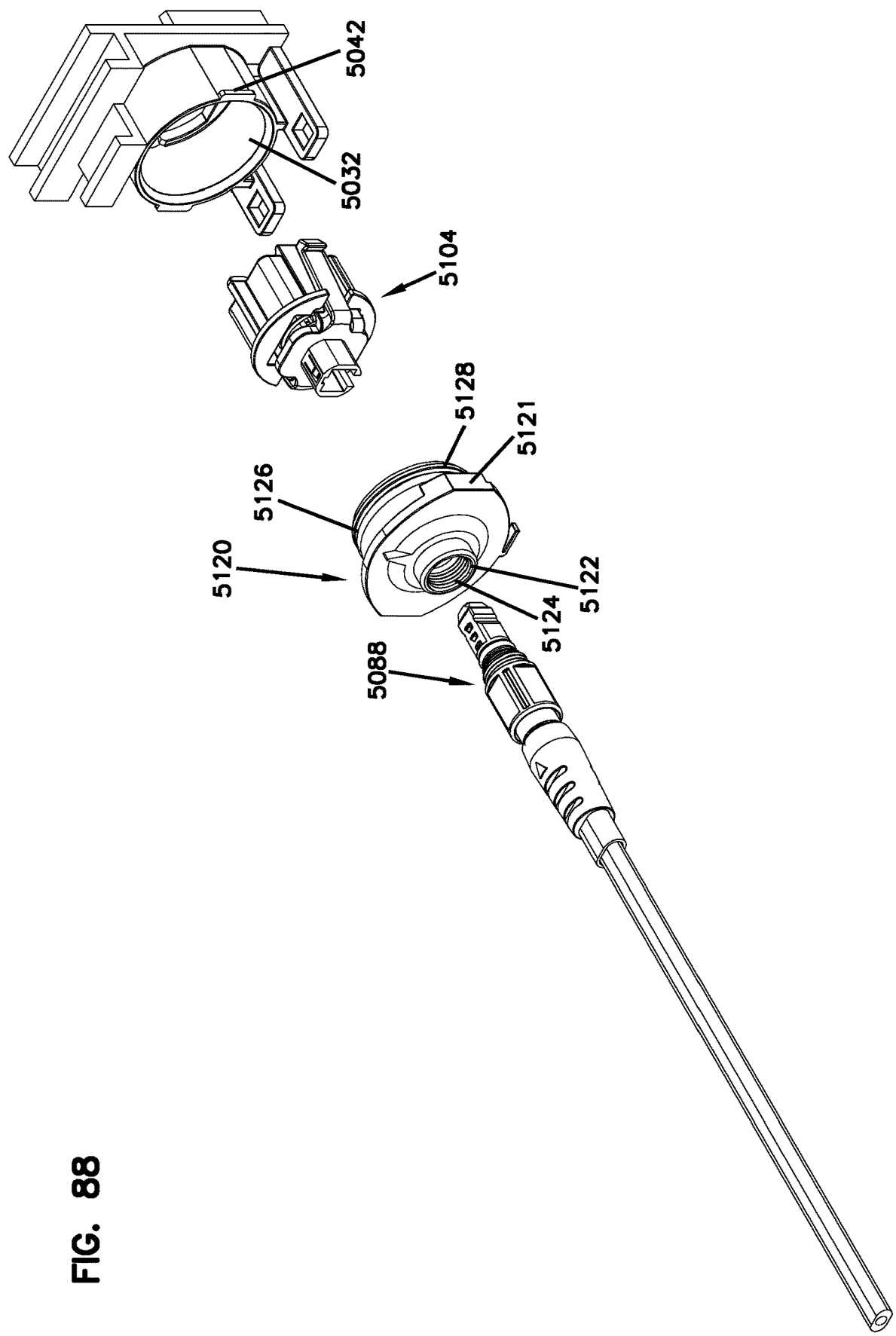
FIG. 88 shows the fiber optic adapter assembly of FIG. 86 in combination with a ruggedized port module for making the fiber optic adapter assembly compatible with a ruggedized fiber optic connector.

It will be appreciated that the fiber optic adapter assembly 5104 can be used to provide an optical interface with a connector of a module such as an interface connector of one of the multi-port modules 5038. Alternatively, a module such as module 5120 of FIG. 88 can be used to make the fiber optic adapter assembly 5104 compatible with a ruggedized fiber optic connector such as the ruggedized fiber optic connector 5088. The module 5120 includes an integrated ruggedized port 5122 that includes integrated twist-to-lock fastening elements 5124. As depicted, the twist-to-lock fastening elements 5124 include internal threads adapted to mate with corresponding external threads of a coupler of the ruggedized fiber optic connector 5088. In other examples, bayonet style fastening elements can be provided. The module 5120 also includes a form factor defining portion 5126 sized and shaped to match and mate within the terminal ports 5032. A seal 5128 can be provided around the form factor defining portion 5126 for forming a seal within the terminal port 5032 when the module 5120 is secured therein. The module 5120 also includes a fastening interface 5121 for interlocking with the mechanical interface 5042 of the terminal port 5032.

Figure 89:
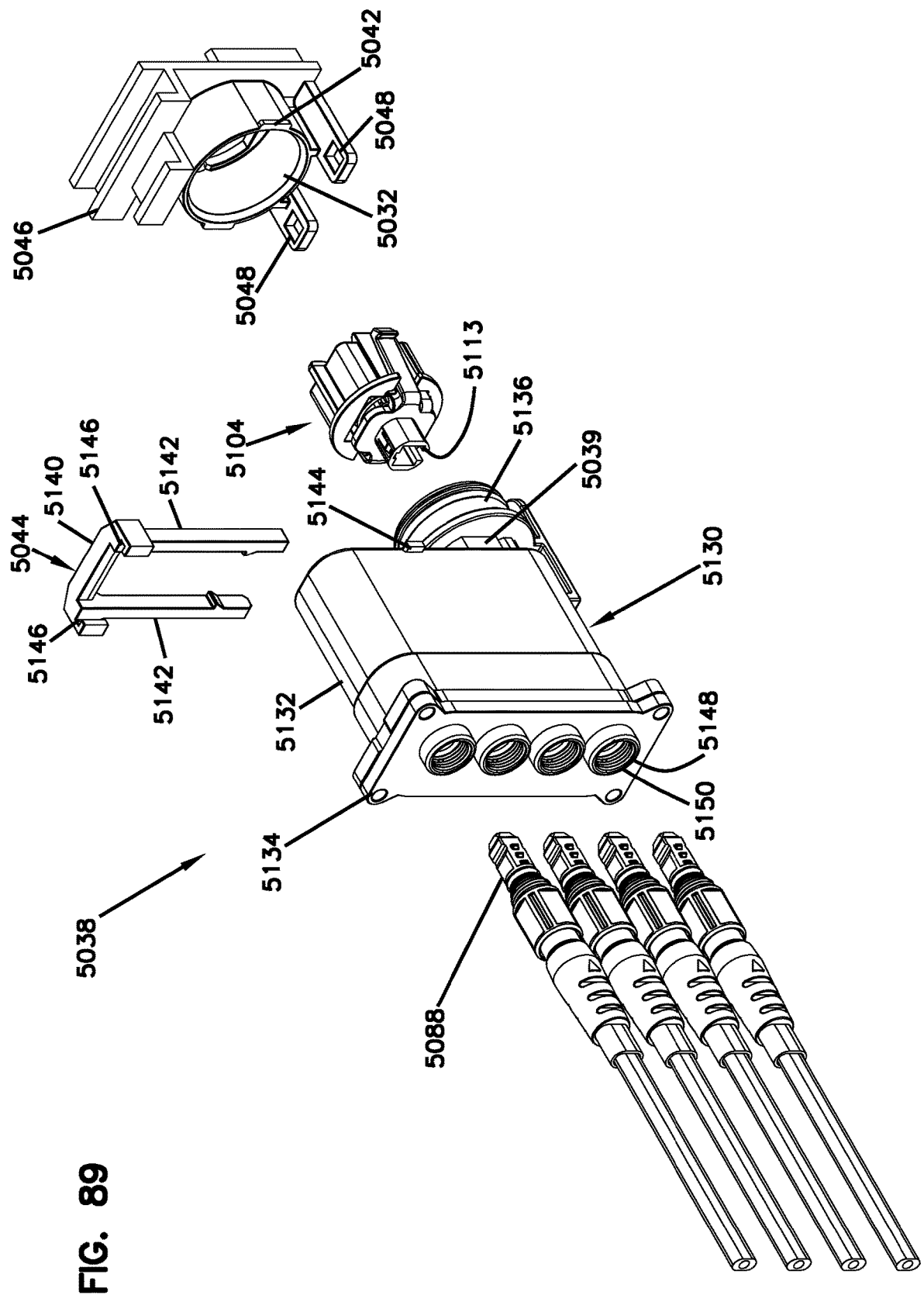
FIG. 89 illustrates one of the multi-port modules of the modular interconnect system of FIGS. 77 and 78.
Figure 90:
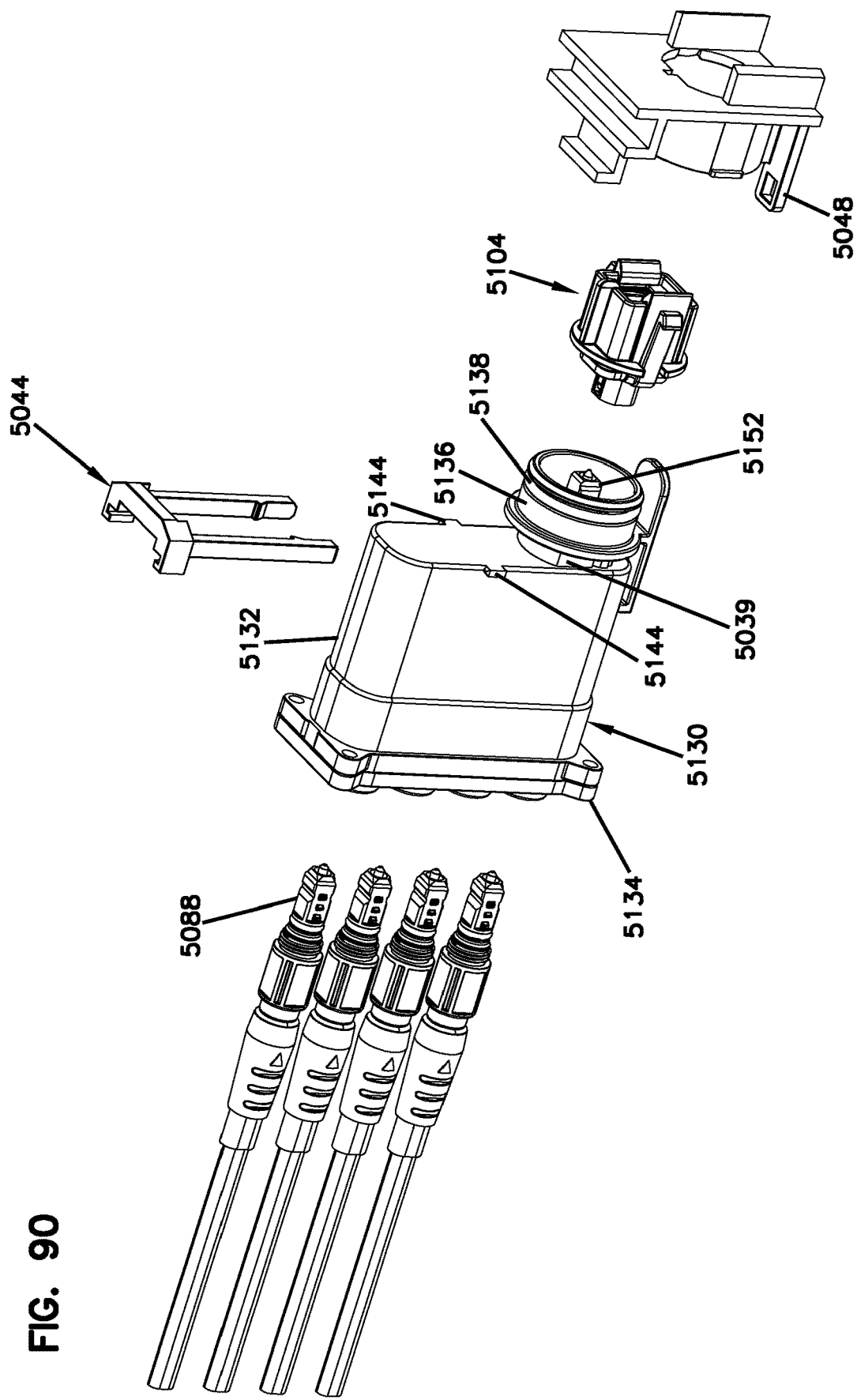
FIG. 90 is another view of the multi-port module of FIG. 89.

FIGS. 89 and 90 show one of the multi-port modules 5038 adapted to interface with the terminal housing 5022. The multi-port module 5038 includes a module body 5130. The module body 5130 includes a main housing portion 5132, a cover plate 5134, and an integrated interface portion 5136. The integrated interface portion 5136 is integrated with the main housing 5132 and defines a form factor that matches and mates within the terminal ports 5032. A seal 5138 can be provided around the integrated interface portion 5136 for sealing within the terminal ports 5032. One of the slidable fastening clips 5044 can be used to secure the multi-port module 5038 to the terminal housing 5022. The fastening clip 5044 can include an upper portion 5140 adapted to engage the upper lip 5046 of the terminal port 5032 to which the multi-port module 5038 is secured. The fastening clip 5044 also includes legs 5142 that fit within the clip receiving receptacles 5048 of the terminal port 5032 when the multi-port module 5038 is secured thereto. Additionally, the main housing 5132 includes tabs 5144 that fit within slots 5146 of the upper portion 5140 of the fastening clip 5044 when the fastening clip 5044 is moved to a fastening position in which the fastening clip 5044 secures the multi-port module 5038 to the terminal port 5032. Additionally, the clip 5044 can slide and fit within a necked region 5039 (see FIG. 89) of the module 5038 which is defined between the interface portion 5136 and the main housing 5132. It will be appreciated that the fastening clip 5044 can be slid up and down between a fastening position and a non-fastening position. In the non-fastening position, the multi-port module 5038 can be inserted into and removed from the terminal port 5032. With the multi-port module 5038 inserted within the terminal port 5032, the fastening clip 5044 can be slid to the fastening position in which the multi-port module 5038 is locked or fastened in position relative to the terminal port 5032.

The cover plate 5134 mounts to an open front end of the main housing 5132 so as to cover the open front end of the main housing 5132. The cover plate 5134 can have a unitary, one-piece construction and can define a plurality of ruggedized connector ports 5148. In one example, the ruggedized connector ports 5148 can be arranged in a row. In another example, the ruggedized connector ports 5148 can be arranged in a single row. In another example, the ruggedized connector ports 5148 can be arranged in a row (i.e., one row of a plurality of rows) or a single row (the module only includes one row) that includes at least three of the ruggedized connector ports 5148, or at least four of the ruggedized connector ports 5148 or only four of the ruggedized ports 5148. In the depicted example, each of the ruggedized connector ports 5148 defined by the unitary cover plate 5134 can include an integrated or unitary connector coupling structure (e.g., a fastening structure or coupling structure or mechanical interface structure) that is unitary with the cover plate 5134. In certain examples, a connector coupling structure can be compatible with a corresponding fastener of a twist-to-lock fastener. As depicted, the unitary coupling structure includes threads 5150 positioned within the ruggedized connector ports 5148. In other examples, the integrated fastener coupling structures include a bayonet type connection arrangement. In one example, the cover plate is plastic and preferably is a molded plastic part.

As depicted, ruggedized connector ports 5148 are adapted for receiving the ruggedized connectors 5088 having threaded couplers (e.g., nuts) adapted to engage with the threads 5150. In other examples, the ruggedized connector ports can include bayonet-style interfaces compatible with mating bayonet-style fasteners provided on ruggedized fiber optic connectors adapted to be received within the ruggedized connector ports. In certain examples, the cover plate 5134 can be fastened to the front end of the main housing 5132. In certain examples, a seal such as a gasket can be provided between the cover plate 5134 and the main housing 5132. In certain examples, the gasket is a single seal such that a single seal provides sealing with the main housing 5132 for all of the ruggedized connector ports 5148. The ruggedized connectors 5088 can include seals that seal within the ruggedized connector ports 5148. Alternatively, seals can be provided within the ruggedized connector ports 5148 for sealing with the ruggedized fiber optic connectors 5088.

As shown at FIG. 90, the integrated interface portion 5136 can at least partially house a fiber optic connector 5152 carried with the module body 5130. The fiber optic connector 5152 and the integrated interface portion 5136 provide an integrated plug-and-play arrangement that allow the multi-port module 5038 to optically connect with a corresponding optical fiber housed within the terminal housing 5022 when the multi-port module 5038 is mated with one of the terminal ports 5032. For example, one of the fiber optic adapter assemblies 5104 can be preloaded within a corresponding terminal port 5032, and the fiber optic connector 5152 can be received within the outboard connector port 5113 of the fiber optic adapter assembly 5104 when the multi-port module 5038 is mated with the terminal port 5032. The floating nature of the fiber optic adapter assembly 5104 facilitates effective insertion of the fiber optic connector 5152 within the fiber optic adapter assembly 5104.

As depicted at FIG. 92, the fiber optic connector 5152 is a single-fiber fiber optic connector. The fiber optic connector 5152 can be optically connected to internal fiber optic connectors 5153 corresponding to the ruggedized connector ports 5148 by an intermediate structure such as an optical splitter or a wavelength division multiplexer. In other examples, the fiber optic connector 5152 can include a multi-fiber connector that supports a plurality of optical fibers each corresponding to a different one of the ruggedized connector ports 5148. In one example, an optical fiber 5155 can be routed from the connector 5152 to a passive optical splitter (not shown) and optical fibers 5157 can be routed from the splitter to the fiber optic connectors 5153. The fibers and the splitter can be managed on a tray.

Figure 92A:
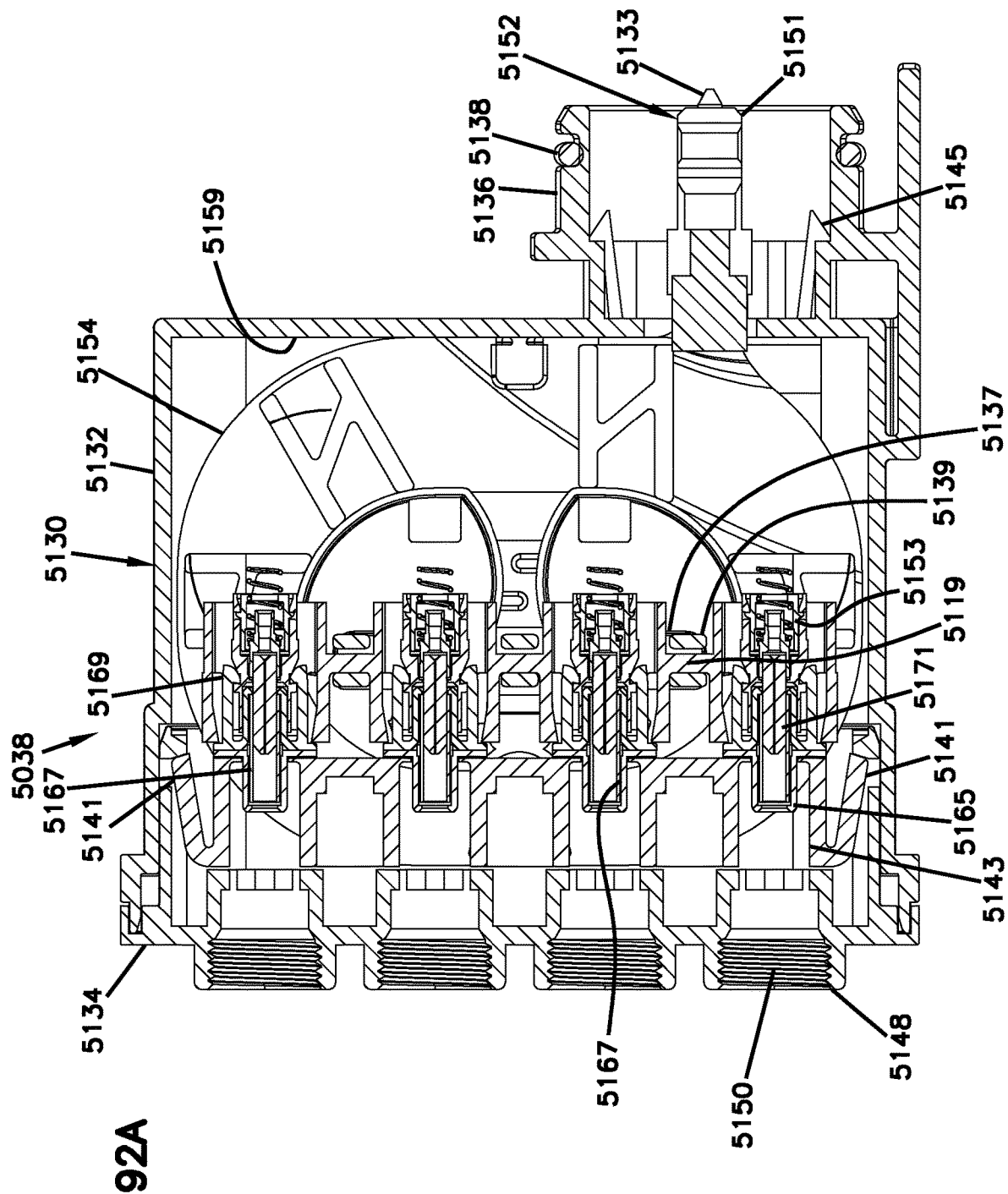
FIG. 92A is a cross-sectional view of the multi-port module of FIGS. 89 and 90 taken along a plane that bisects the ruggedized ports.

As shown at FIGS. 91, 92 and 92A, the fiber optic connector 5152 can be mounted on a fiber management tray 5154 housed within the module body 5130. The fiber management tray 5154 can be spring biased in a direction toward the integrated interface portion 5136 and can be slidably moveable relative to the module body 5130. The spring can be a separate spring mounted within the module or can be an integrated spring (e.g., a leaf spring) integrated with the tray or the module body. The spring bias ensures proper positioning of the fiber optic connector 5152 to account for variations in manufacturing tolerances. For example, the tray 5154 can be spring biased against a positive stop 5159 formed by a back wall of the module housing. With the tray abutting the positive stop 5159, the fiber optic connector 5152 is positioned at the appropriate axial position within the integrated interface portion 5136 of the module. It will be appreciated that the fiber optic connector 5152 can also include a spring 5131 for allowing axial movement of a ferrule 5133 relative to a body 5151 of the fiber optic connector 5152 that can be attached to or in contact with the fiber management tray 5154. The spring 5131 also allows the ferrule 5133 to move axially relative to the tray. The spring 5131 can be housed within a spring holder 5149 that attaches to the tray (e.g., via a snap-fit connection). The spring 5131 can be housed within the holder 5149 and captured between a hub of the ferrule 5133 and the tray. The ferrule 5133 can axially slide within the spring holder and the spring 5131 compresses as the ferrule 515 moves axially toward the tray 5154. The body 5151 of the fiber optic connector 5152 includes legs 5147 that seat against shoulders provided at or near the interface portion 5136 of the module. Latches 5145 (e.g., snap-fit latches) of the tray 5154 can engage with the module housing within the interface portion 5136. The engagement can be configured to allow the tray 5154 to slide a limited about relative to the module body in an axial orientation.

The fiber management tray 5154 can manage optical fibers routed within the module body 5130. In the depicted example, the tray can manage optical fibers 5155, 5157 and can support a passive optical splitter. The internal fiber optic connectors 5152 can correspond to each of the ruggedized connector ports 5148. The internal fiber optic connectors 5152 can be received within an adapter pack 5158. The adapter pack 5158 can define a plurality of adapter ports 5143. The adapter ports 5143 can be arranged in a row. The fiber optic adapter ports 5143 defined by the adapter pack can be positioned and spaced to correspond with the positioning and spacing of the ruggedized connector ports 5148. The adapter pack 5158 also is configured to hold the fiber optic connectors 5153 in alignment with their corresponding ruggedized connector ports 5148 when the adapter pack is installed within the module. In certain examples, the adapter pack 5158 can be secured to the cover plate 5134 by a snap-fit connection (e.g., see latches 5141) or other type of connection. In this way, all of the adapter ports of the adapter pack can be concurrently secured to the cover plate 5134 or another part of the module body in one step other than requiring each of the ports to be individually installed. The adapter pack 5158 also mounts on the tray 5154 or vice versa. In a preferred example, a mechanical interface between tray 5154 and the adapter pack 5158 is adapted to allow for a limited range of axial movement between the tray 5154 and the adapter pack 5158. In on example, this type of interface is provided by posts 5139 of the tray 5154 that fit within oversized openings 5137 of the adapter pack 5158. The adapter pack 5158 can include struts 5119 that fit between the posts 5139. The struts can have undersized widths as compared to a spacing between the posts.

In certain examples, the adapter pack 5158 can include a unitary piece 5135 that defines the plurality of adapter ports 5148 in a one piece construction. In one example, the unitary piece 5135 is a plastic part, preferably a molded plastic part. This type of arrangement can allow for the adapter ports 5148 to be positioned more densely. The unitary piece 5135 can also defines the oversized openings 5137 and struts 5119 for receiving the posts 5139 of the tray 5154. Additionally, the unitary piece 5135 can include mounting structures (e.g., snap fit structures) for securing ferrule alignment arrangements 5161 in axial alignment with corresponding ones of the adapter ports 5148. The ferrule alignment arrangements 5161 include housings 5163 including barrel portions 5165 that house ferrule alignment sleeves 5167. The ferrule alignment arrangements 5161 also include latches 5169 for retaining the connectors 5153 with their ferrules 5171 received within the ferrule alignment sleeves 5167. With the module assembled, a ruggedized fiber optic connector 5088 can be inserted into one of the ruggedized ports 5148 and optically connected to one of the optical fibers 5157. Specifically, when the ruggedized connector 5088 is inserted into the ruggedized port 5148, the plug end of the ruggedized connector 5088 fits into a corresponding one of the adapter ports 5148 of the adapter pack and the ferrule of the ruggedized connector 5088 fits into the alignment sleeve 5167 of the fiber alignment arrangement 5161 corresponding to the adapter port 5148. Thus, via the ferrule alignment sleeve 5167, the ferrule of the ruggedized connector 5088 is co-axially aligned with the ferrule 5171 of the corresponding fiber optic connector 5153 so that an optical connection is made between the fiber held by the ferrule of the ruggedized connector and the fiber 5157 held by the ferrule 5171 of the connector 5153.

Figure 93:
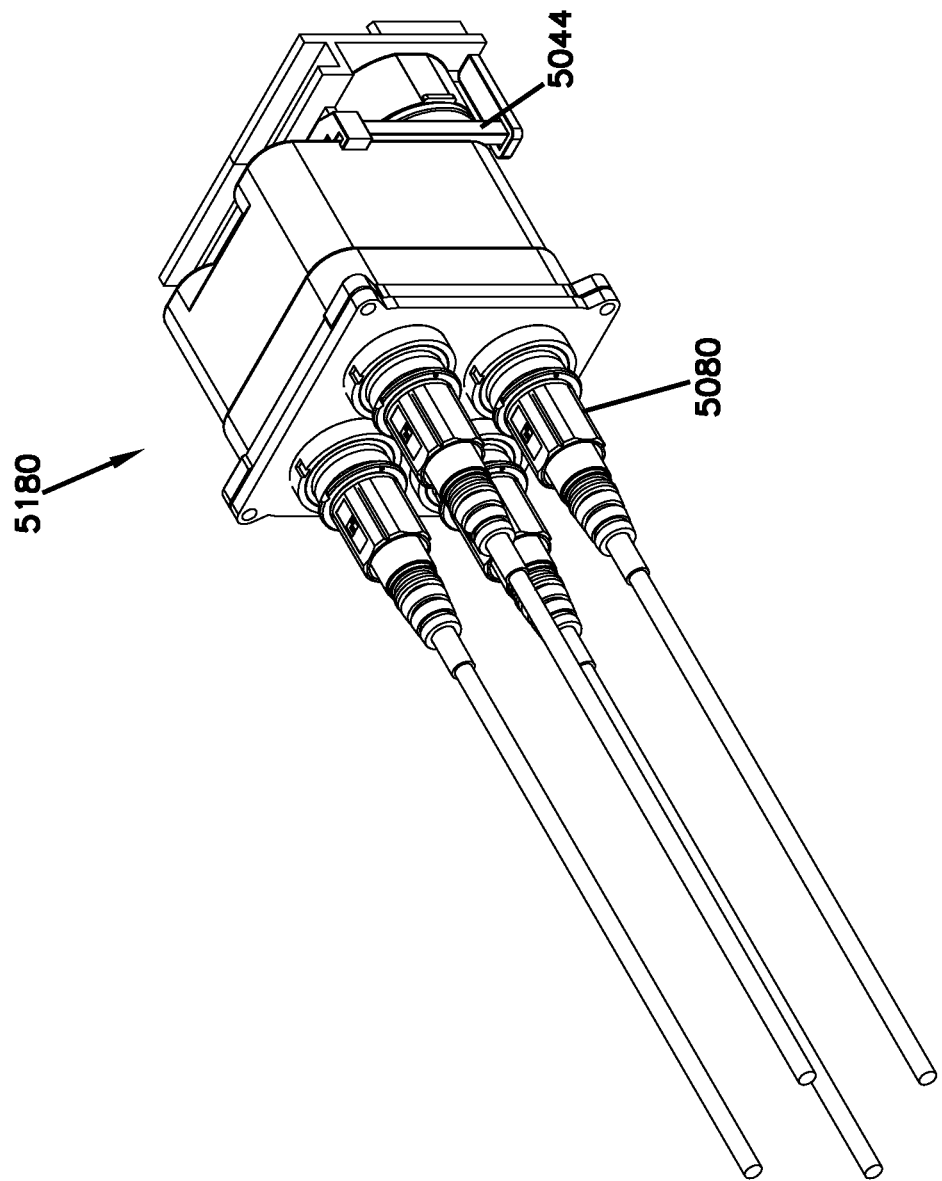
FIG. 93 illustrates a multi-row, multi-port, module that can interface with a terminal port of the terminal housing of FIGS. 77 and 78.
Figure 94:
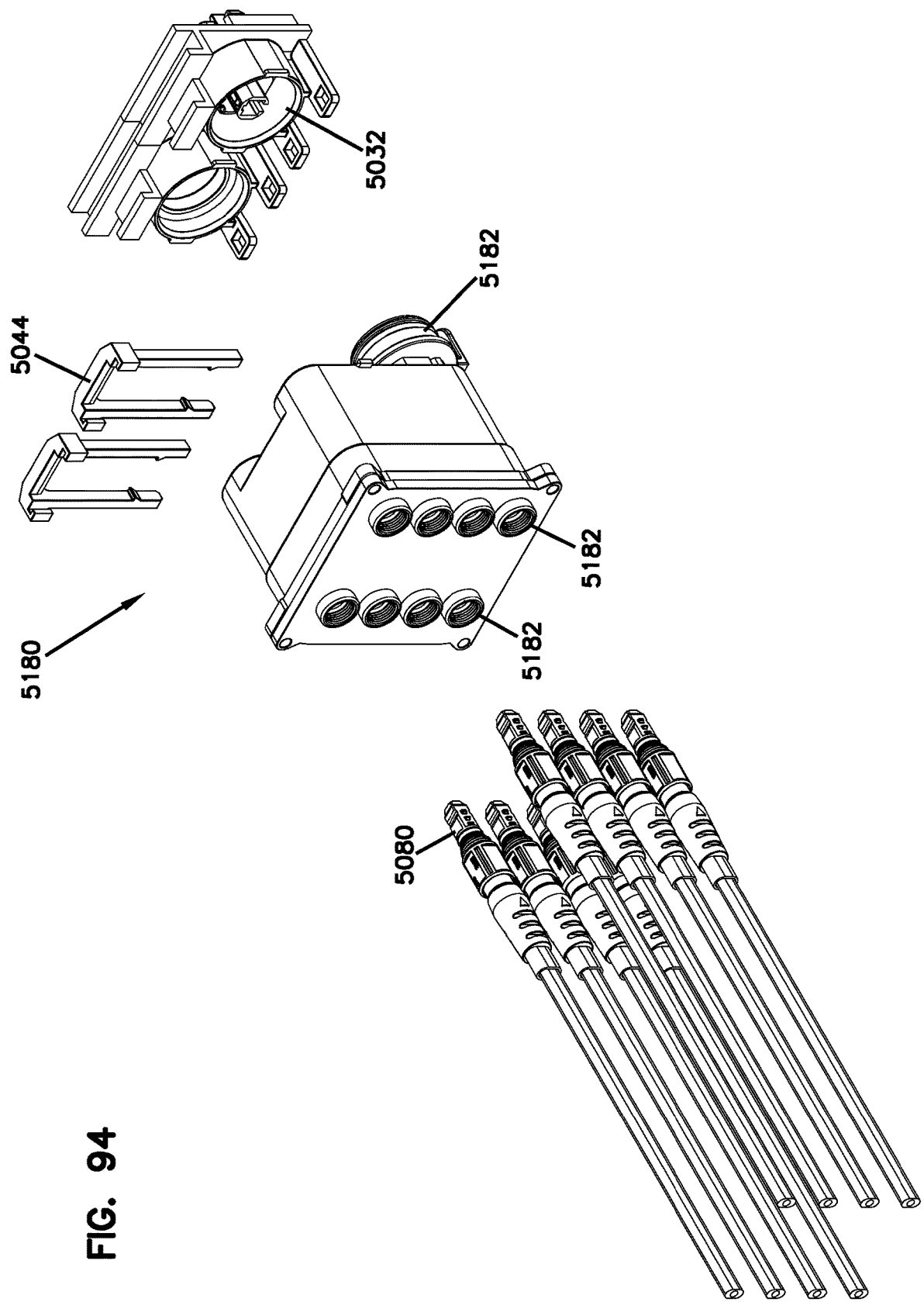
FIG. 94 illustrates the multi-port module of FIG. 93 with ruggedized connectors shown disconnected from the ruggedized ports of the multi-port module.
Figure 95:
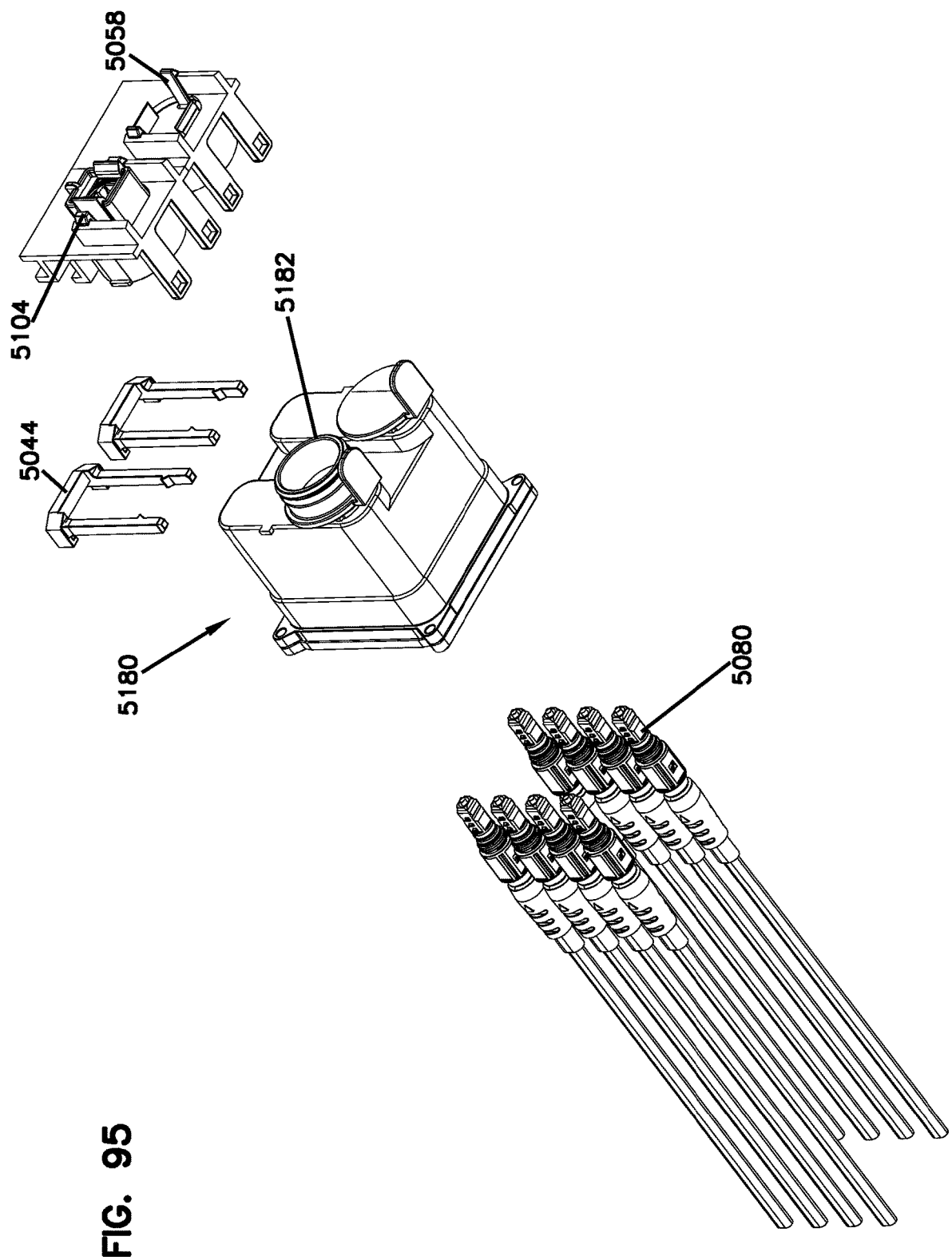
FIG. 95 is another view of the multi-port module of FIG. 93 with the ruggedized connectors disconnected from the module.

FIGS. 93-95 show another multi-port module 5180 that is compatible with the terminal ports 5032 of the terminal housing 5022. The multi-port module 5180 includes two rows of ruggedized ports 5182 for receiving ruggedized fiber optic connectors such as fiber optic connectors 5088. Multiple fastening clips 5044 can be used to secure the multi-port module 5180 to the terminal housing 5022. The multi-port module 5180 can include a single integrated interface portion 5182 for interfacing with one of the terminal ports 5032. When the multi-port module 5182 is mated with one of the terminal ports 5032, adjacent terminal port 5032 can be sealed and enclosed by a low profile plug such as one of the plugs 5058.

Figure 96:
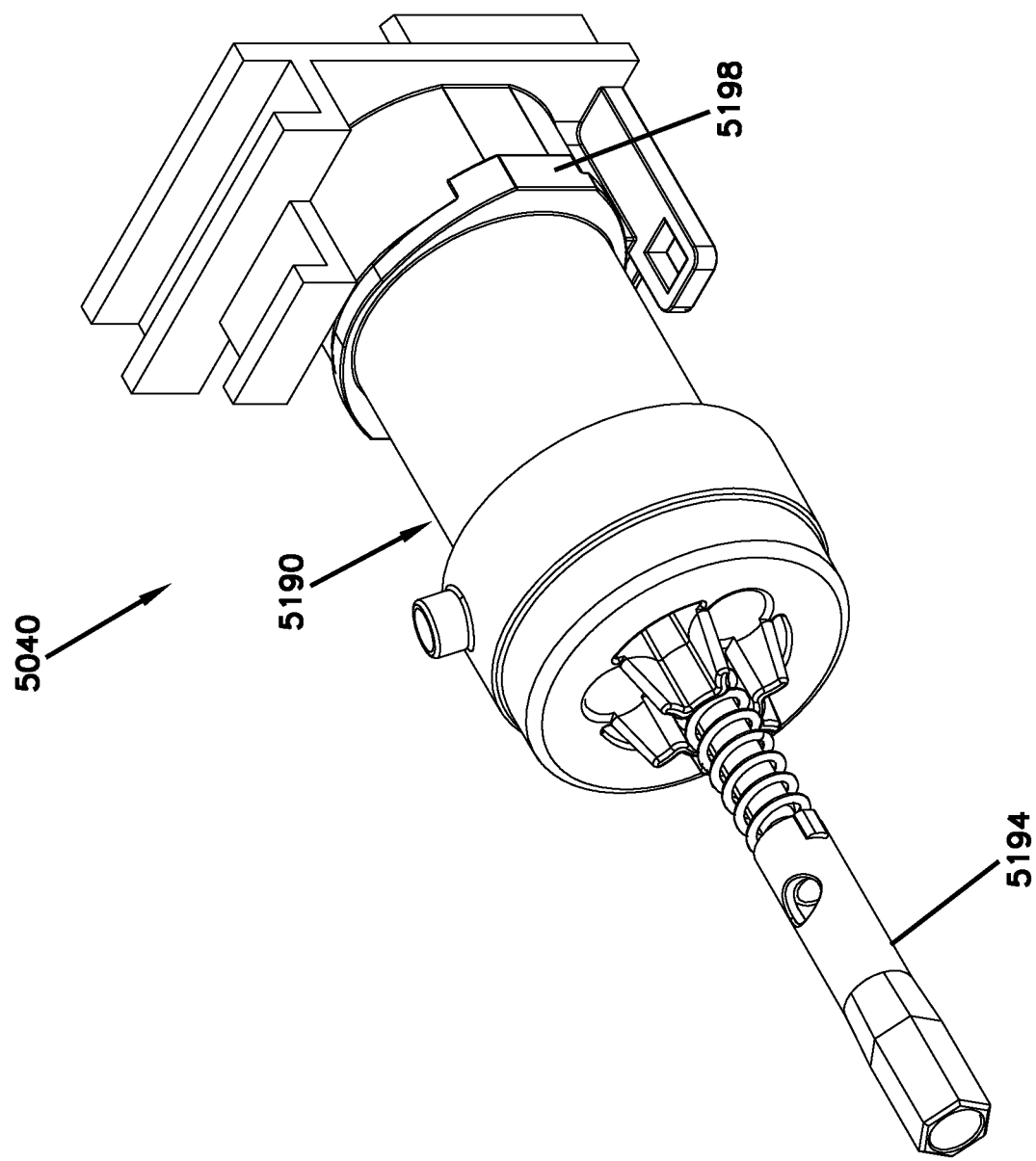
FIG. 96 illustrates a multi-port drop-cable sealing module configured to mate with a terminal port of the terminal housing of FIGS. 77 and 78.
Figure 97:
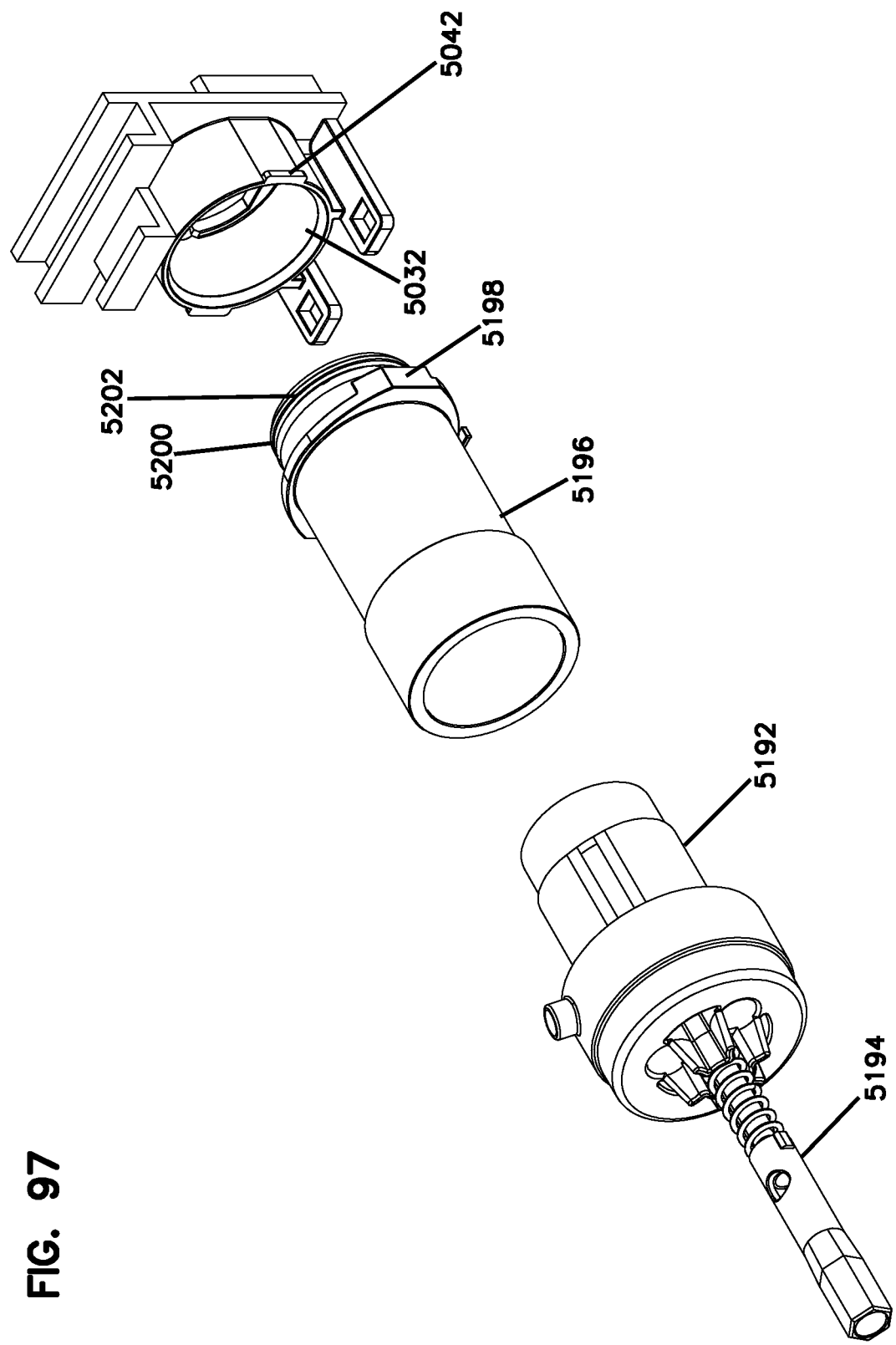
FIG. 97 is an exploded view of the multi-port drop-cable sealing module of FIG. 96.
Figure 98:
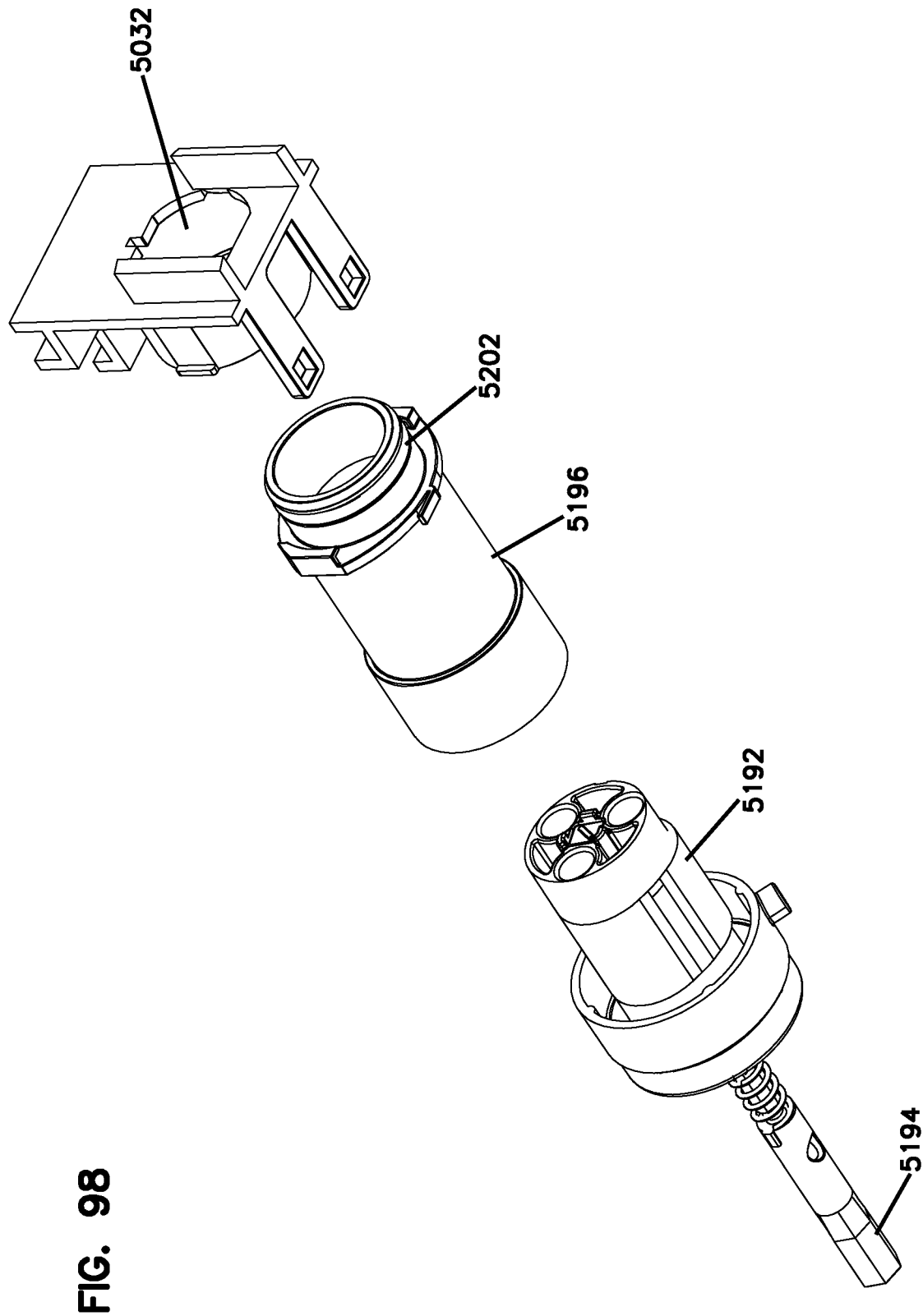
FIG. 98 is another exploded view of the multi-port drop-cable sealing module of FIG. 96.

FIGS. 96-98 depict one of the drop-cable sealing modules 5040 that is compatible with the terminal ports 5032. The drop-cable sealing module 5040 includes a module body 5190 which houses a multi-port gel seal arrangement 5192. An actuator 5194 can be used to pressurize the multi-port gel seal arrangement 5192 within the module body 5190. The module body 5190 includes a housing portion 5196 for housing the multi-port gel seal arrangement 5192. The module body 5190 also includes a coupling structure 5198 (e.g., a twist-to-lock coupling structure) for interfacing with the coupling structure 5042 corresponding to the terminal ports 5032. The module body 5190 further includes an integrated form-factor defining structure 5200 defining a form-factor configured to be mated within one of the terminal ports 5032. In certain examples, a seal 5201 can be provided around the form factor defining structure 5200. In other examples, the module body 5190 can be configured such that a fastener clip 5044 can be used to secure the module body 5190 relative to one of the terminal ports 5032.

Figure 99:
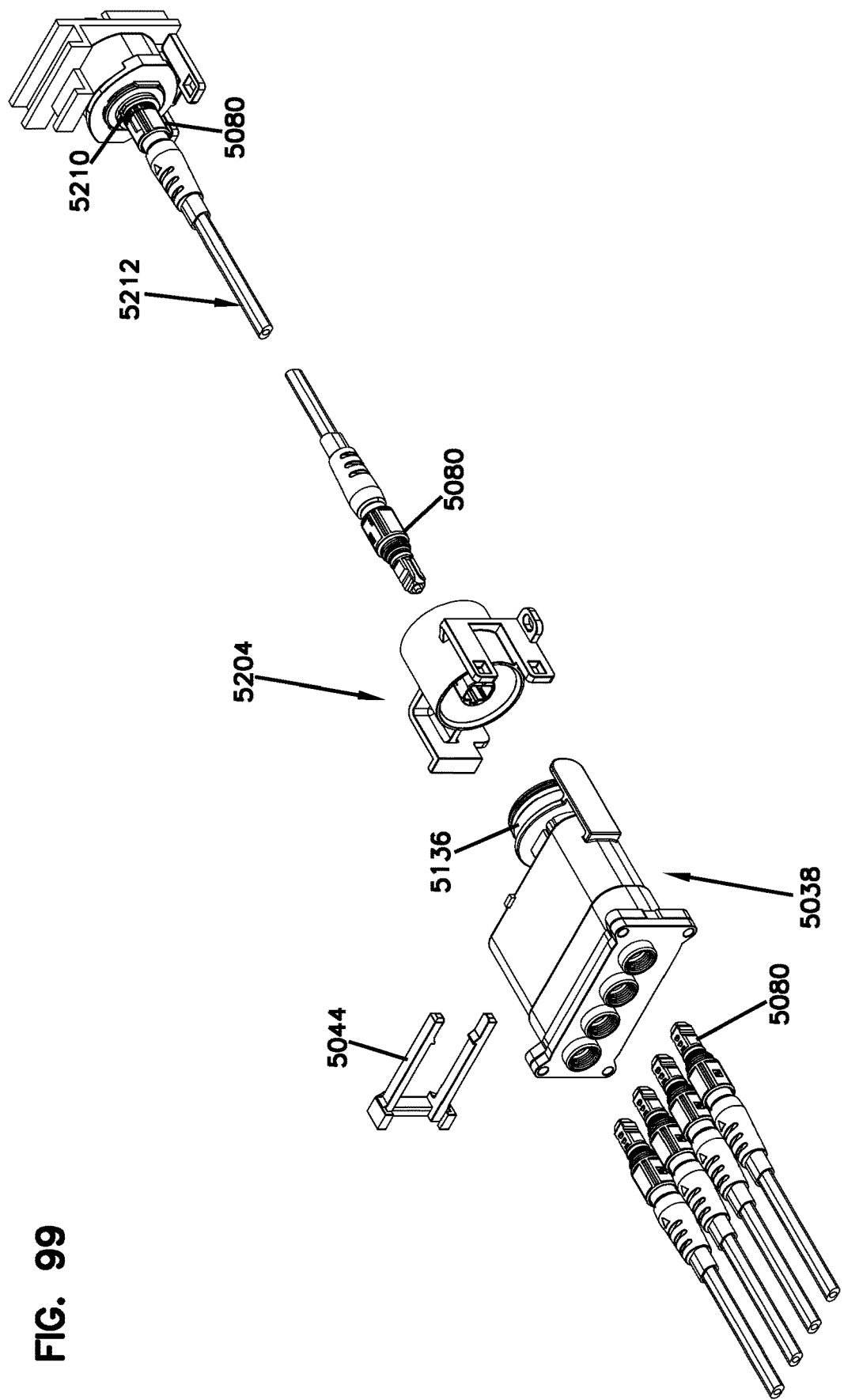
FIG. 99 is an exploded view showing a converter for converting the multi-port module of FIG. 89 from a plug-and-play configuration to a configuration suitable for receiving a ruggedized fiber optic connector.
Figure 100:
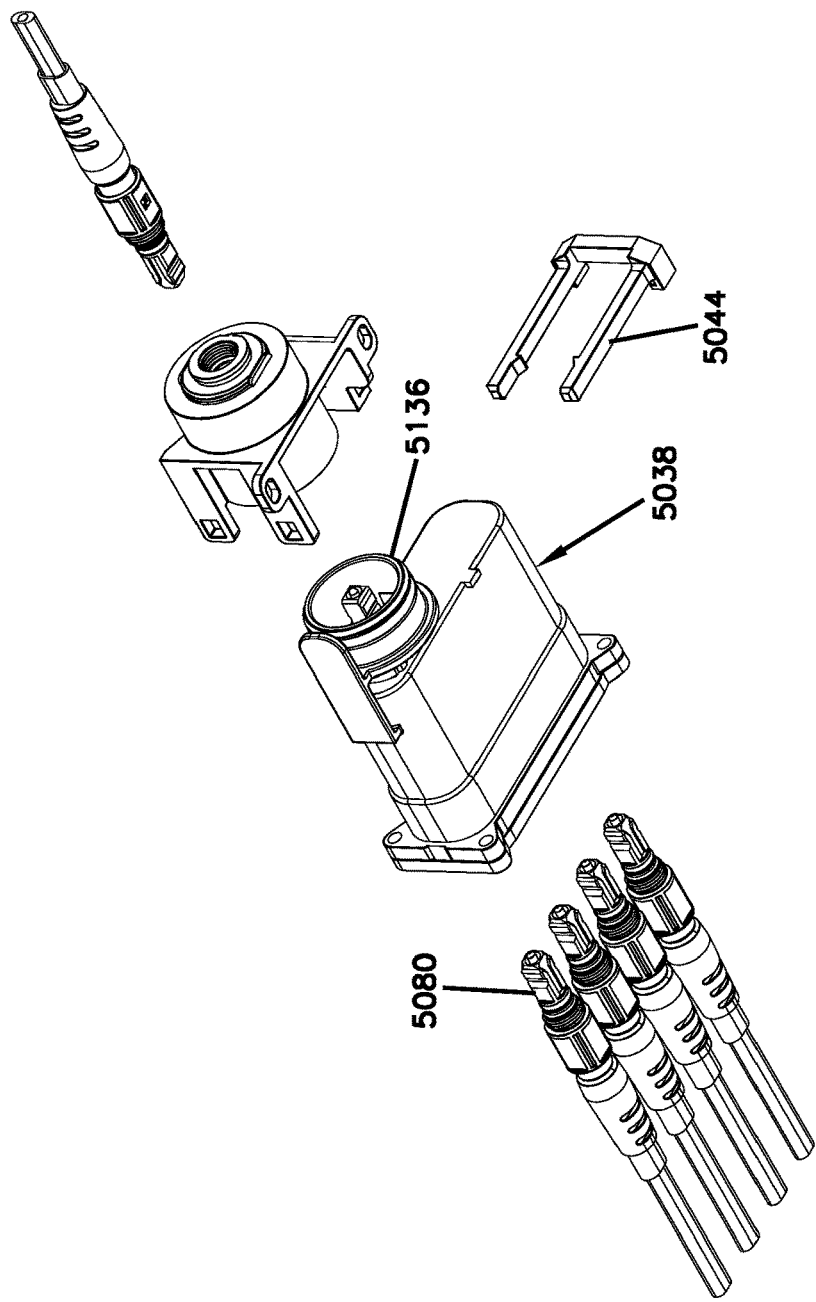
FIG. 100 is another exploded view showing the converter of FIG. 99 positioned in relation to the multi-port module.
Figure 101:
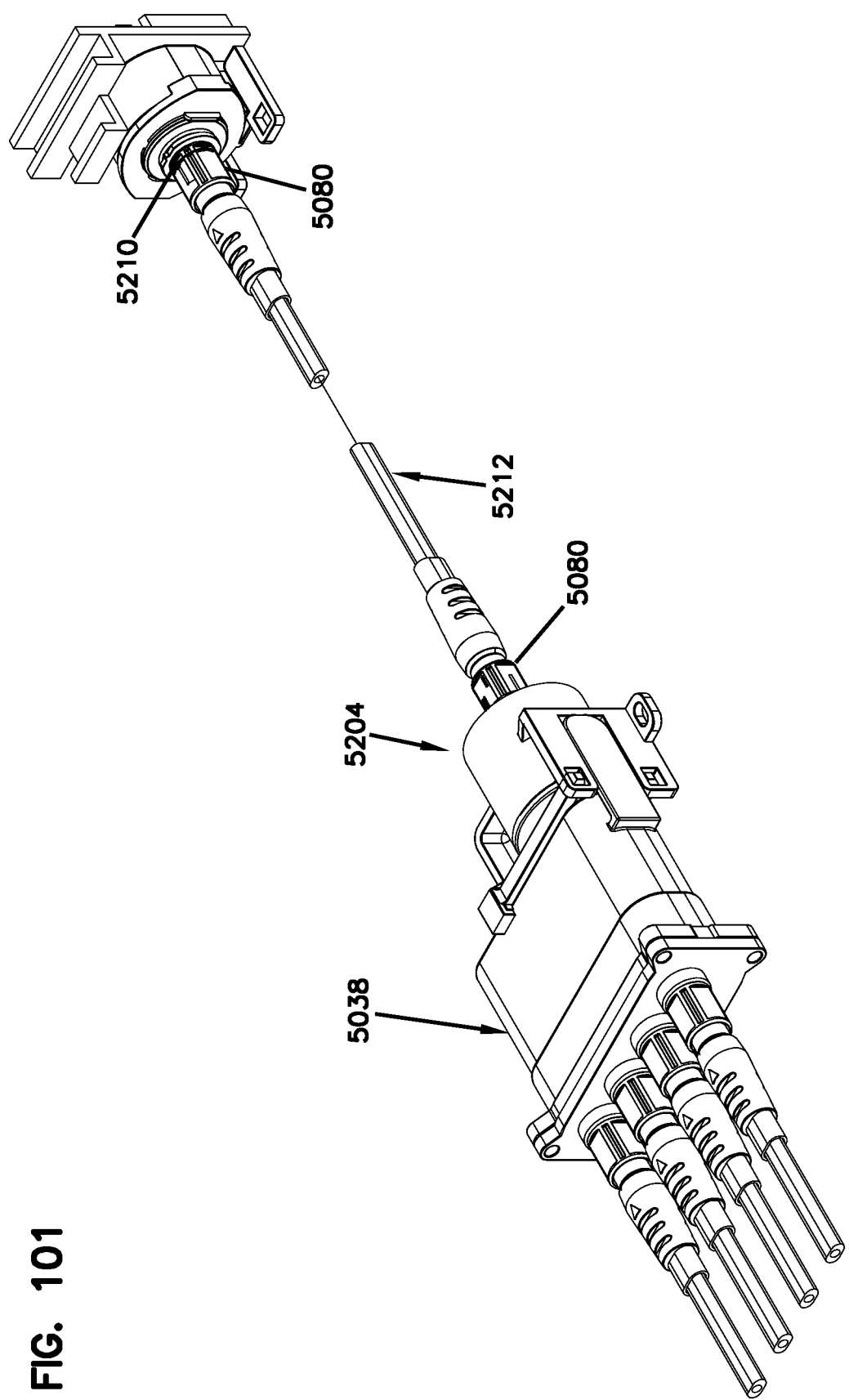
FIG. 101 shows the converter of FIGS. 99 and 100 installed on the multi-port module.
Figure 102:
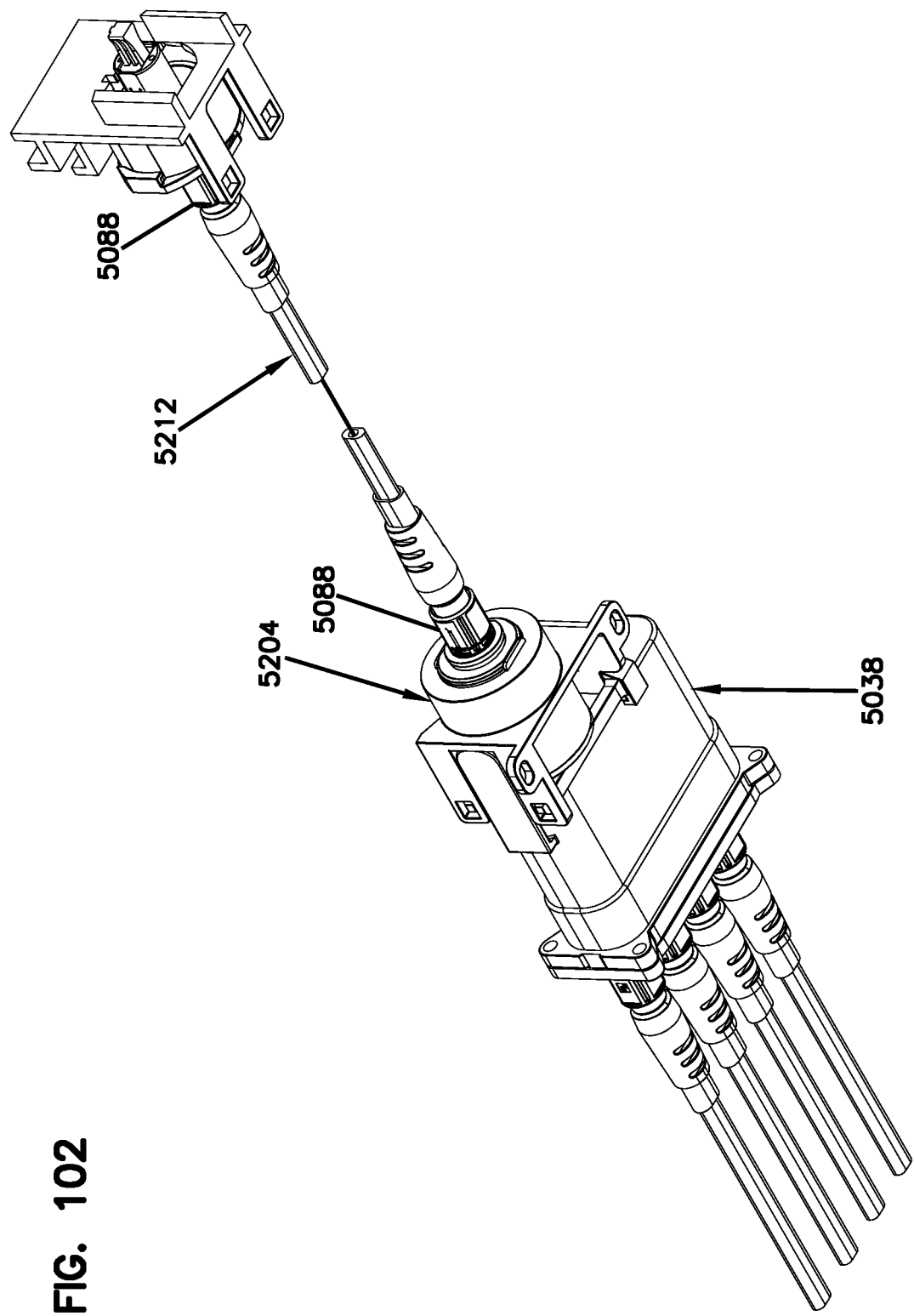
FIG. 102 is another view showing the converter of FIGS. 99 and 100 installed on the multi-port module.

FIGS. 99 and 100 depict a converter assembly 5204 adapted to convert the plug-and-play interface of the multi-port module 5038 to a ruggedized connector port. The converter assembly 5204 can include an internal form factor that matches the form factor of the integrated interface portion 5136. In this way, the integrated interface portion 5136 can be received and sealed within the converter assembly 5204. The converter assembly 5204 can include a ruggedized port 5206 for receiving a ruggedized connector such as one of the ruggedized connectors 5088. In certain examples, the converter assembly 5204 can be secured to the module body 5130 by a mechanical fastening arrangement such as a snap-fit configuration, one or more separate fasteners, or one of the fastening clips 5044. By converting the plug-and-play interface of the multi-port module 5038 to a ruggedized port, the multi-port module 5038 can be connected to a corresponding ruggedized port 5210 provided at the terminal housing 5022 by a patch cord 5212. FIGS. 101 and 102 show the converted multi-port module 5038 coupled to the ruggedized port 5210 of the terminal housing 5022 by the patch cord 5212.

FIGS. 103-108 depict a plurality of anchoring arrangements 5300 for anchoring pass-through cables to the terminal housing 5022. In certain examples, one of the anchoring arrangements 5300 is provided for each of the sealed cable-pass-through locations 5030. Each of the anchoring arrangements 5300 includes an anchoring body 5302 to which a pass-through cable can be secured (e.g., via cable ties, cable clamps, wraps, or other structures). In the depicted examples, cable clamps 5304 are shown securing the cables to the anchoring bodies 5302. The anchoring bodies 5302 also include cable strength-member anchors 5306 to which strength members of the fiber optic cables can be secured. For example, aramid style strength members can be wrapped around the strength member anchors 5306, clamped to the strength member anchors 5306 or fastened to the strength member anchors 5306. Cable strength members such as fiber reinforced plastic rods can be clamped within openings 5307 defined by the strength member anchors 5306. The anchoring bodies 5302 are shown including body tabs 5310.

Figure 107:
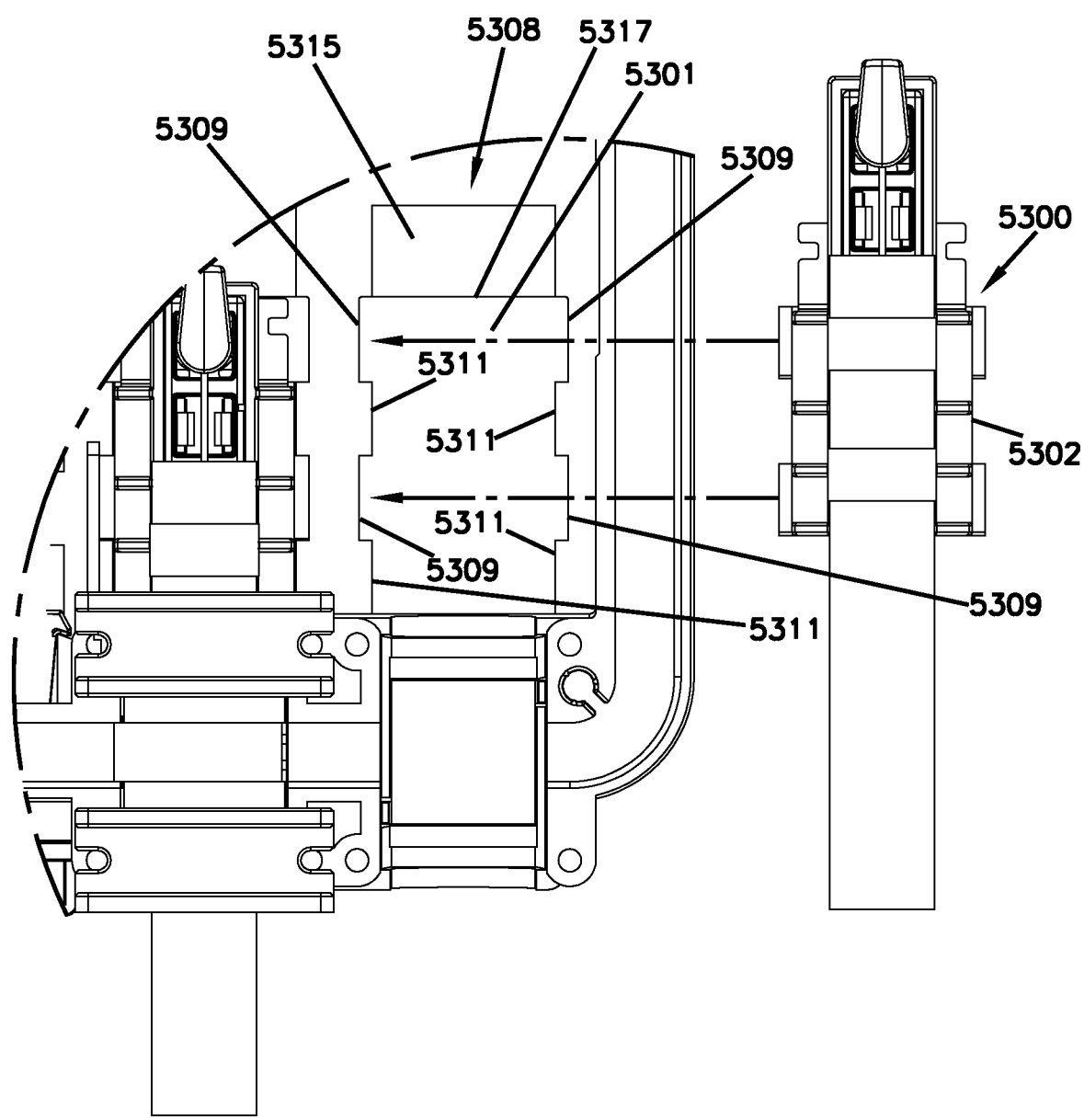
FIG. 107 the anchoring assembly of FIGS. 105 and 106 aligned with a corresponding mounting location defined by the terminal housing.
Figure 108:
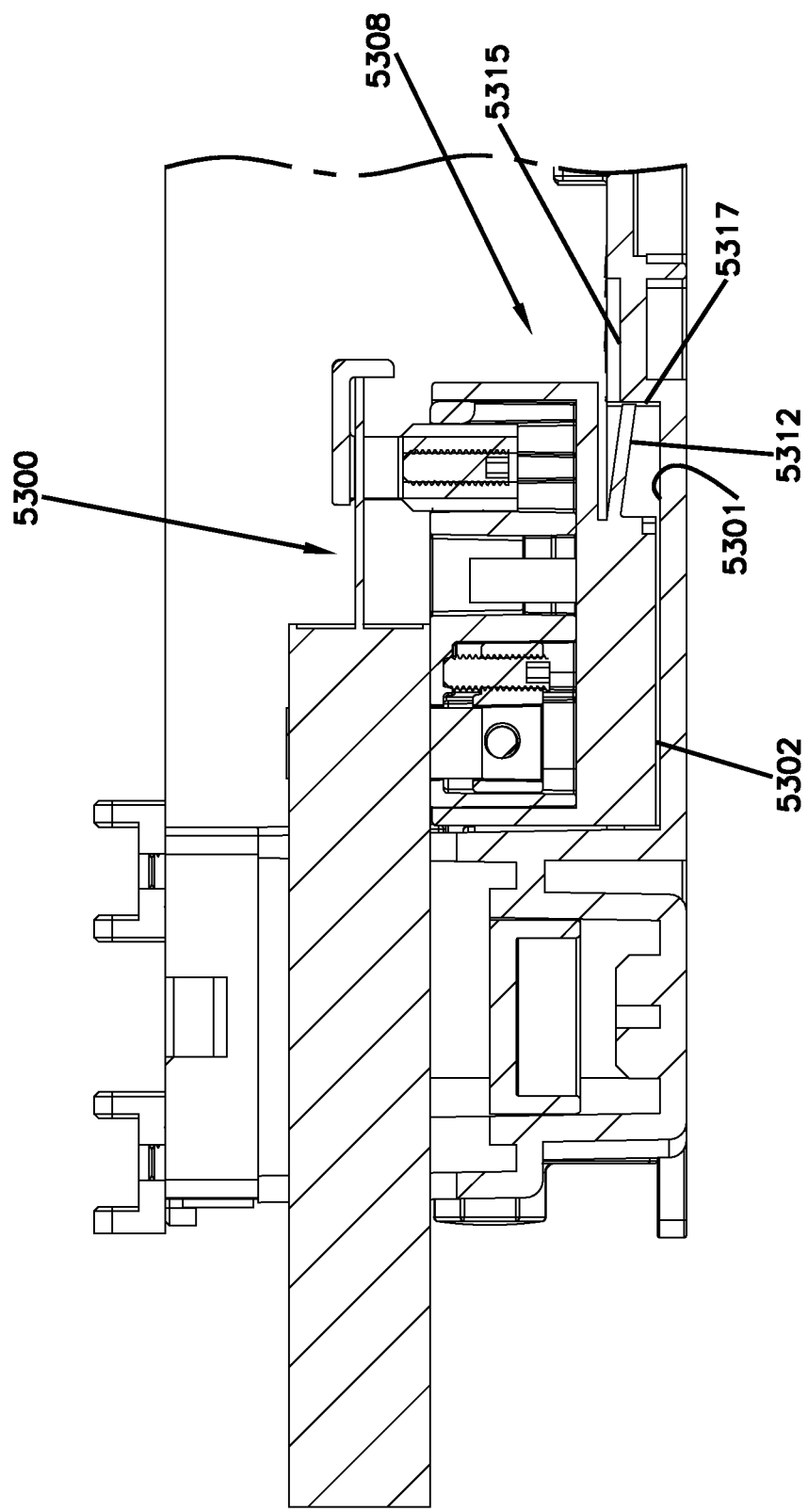
FIG. 108 is a cross-sectional view showing one of the anchoring assemblies secured at one of the cable anchor mounting location the terminal housing.

In certain examples, the fiber optic cables can be secured to the anchoring bodies 5302 before the anchoring bodies 5302 are secured to the terminal housing 5022. In certain examples, the anchoring bodies 5302 can be secured to the terminal housing 5022 by a snap-fit connection. In one example, the terminal housing 5022 includes mounting locations 5308. The mounting locations 5308 include pockets 5301 in which the anchoring bodies 5302 can be received. The mounting locations 5308 include insertion openings 5309 at sides of the pockets 5301 for allowing the body tabs 5310 to be received into the mounting locations 5308. The mounting locations 5308 also include retaining tabs 5311 adjacent the insertion openings 5309. To mount the anchoring body 5302, the anchoring body 5302 is manipulated such that the body tabs 5310 align with the insertion openings 5309 (alignment is shown at FIG. 107). Next, the anchoring body 5302 is pressed into the pocket such that the body tabs 5310 fit within the insertion openings 5309. Then, the anchoring body 5302 is slid along the mounting location to a secured position where the body tabs 5310 are located beneath the retaining tabs 5311 (FIG. 108 shows the anchoring body in the secured position).

The anchoring body 5302 includes a resilient or elastic style latch or cantilever 5312 for retaining the anchoring components 5302 in the secured position. When the anchoring body 5302 is pushed down into the pocket 5301, the cantilever 5312 engages a contact surface 5315 (see FIGS. 107 and 108) at the mounting location and is elastically flexed upwardly. When the anchoring body 5302 is slid toward the secured position, the cantilever 5312 moves past the contact surface 5315 and snaps down into the pocket 5301 with an end of the cantilever 5312 abutting a wall 5317 defining an end of the pocket 5301. Interference between the wall 5317 and the cantilever 5312 prevents the anchoring body 5302 from being slid from the secured position. By flexing the cantilever 5312 upwardly, the anchoring body 5302 can be slid from the secured position back to a position where the body tabs align with insertion openings of the mounting location. In this way, the anchoring body 5302 can be removed from the terminal housing.

In most of the examples disclosed herein, sealing and latching functionality have been provided on the add-on modules. In other examples, this type of arrangement can be reversed such that latching and/or sealing can be mounted on or carried with the terminal housing instead of the add-on modules.

In certain examples, the ports provided by an add-on module (e.g., a breakout module unit, a splitter module unit, an indexing module, a wavelength division multiplexing module, etc.) remain in generally close proximity with respect to the terminal housing. In certain examples, the module housing of the add-on modules couple directly to the terminal housing so as to be integrated with the terminal housing. In other examples, the module housings may be separated from the terminal housing by the length of a short tether. In certain examples, short tethers can have a length less than or equal to six meters. In certain embodiments, the housings of the add-on modules can be positioned within two, three, four, five or six meters of the terminal housing.

Add-on modules in accordance with the principles of the present disclosure can mechanically interface with the terminal in a variety of ways. In certain examples, an add-on module can include a module housing that mechanically couples to the terminal housing via a mechanical coupling interface (i.e., a mechanical connection interface) provided on or at the module housing. Example mechanical coupling/connection interfaces can include latches, flexible latches, threaded couplers, fasteners (e.g., bolt, screws, etc.), threaded collars, bayonet-style couplers, slide latches, snap-fit arrangements, etc. The mechanical coupling interface can be configured to attach the module housing at fixed mounting locations relative to the terminal housing. In certain examples, the module housing can be fixed in place relative to the terminal housing. In this way, the module housing essentially becomes an integrated extension of the terminal housing. In certain examples, when a module housing is attached to the terminal housing, the module housing is retained in a fixed positioned relative to the terminal housing and the mechanical interface prevents the module housing from moving relative to the terminal housing while the mechanical interface is interlocked, mated or otherwise engaged with the terminal housing. In certain examples, the module housing can be directly mechanically coupled to the terminal housing. In some examples, the add-on module housings can include integrated latches (e.g., snap-fit latches). In certain examples, the module housings form integrated extensions of the terminal housing when coupled to the terminal housing. In certain examples, the term "insert" includes an add-on module. In certain examples, an insert can be a module and a module can be an insert. In certain examples, multiple modules or inserts can be linked, coupled, stacked or otherwise connected together to provide additional capacity and to provide different connection interface arrangements and port counts.

In some examples, an add-on module can include a tether that mechanically couples the add-on module to the terminal housing. The tether can include a ruggedized fiber optic connector that mechanically couples the add-on module to the terminal housing. In certain examples, the tether can be mechanically coupled to the terminal housing and the corresponding module housing can be moveable relative to the terminal housing within a range of movement permitted by the tether. In other examples, the tether can be mechanically coupled to the terminal housing by a first mechanical connection (e.g., be a threaded coupler, a bayonet style coupler, a snap-fit coupler, a latch or latch arrangement or other means) and the module housing can be mechanically coupled to the terminal housing by a separate second mechanical connection (e.g., latches, flexible latches, threaded couplers, fasteners (e.g., bolt, screws, etc.), threaded collars, bayonet-style couplers, slide latches, snap-fit arrangements, etc.). In certain examples, the second mechanical connection can prevent the module housing from moving relative to the terminal housing when the second mechanical connection is engaged; but the module housing can be moved relative to the terminal housing by disengaging the second mechanical connection. In other examples, the module housing can be mechanically coupled to the terminal housing by a mechanical connection and a patch cord (i.e., a jumper cord with fiber optic connectors at each end) can be used to provide an optical connection between the add-on module and the terminal housing.

In certain examples, a single fiber or multi-fiber ferrule can be carried with the module housing and can interconnect with a corresponding ferrule of the terminal housing in a plug-and-play fashion as the module housing is mechanically coupled to the terminal housing. In certain examples, the single fiber ferrule or multi-fiber ferrule can be mounted on, in or at the module housing. In certain examples, the single fiber ferrule or multi-fiber ferule can be incorporated as part of or housed within a fiber optic connector housing integrated as part of the module housing (e.g., mounted at the end of or within an extension of the module housing) or otherwise included with the module housing. In certain examples, the integrated fiber optic connector housing can house a single fiber ferrule alone or in combination with other fiber optic connector components (e.g., additional housing pieces, bodies, sleeves, plugs, mating interfaces, etc.). In certain examples, the integrated fiber optic connector housing can house a multi-fiber ferrule alone or in combination with other fiber optic connector components (e.g., additional housing pieces, bodies, sleeves, plugs, mating interfaces, etc.). In certain examples, the add-on modules can be optically coupled to optical fibers within the terminal housing by ferrule-less connections such as ferrule-less connectors. In certain examples, fiber optic adapters of the type previously described can mounted at the terminal ports. The fiber optic adapters can be configured for aligning multi-fiber ferrules, single fiber ferrules, or optical fibers of ferrule-less fiber optic connectors.

In certain examples, the terminal housing includes at least 2, 3, 4, 5, 6, 7, 8, 9, 10 or more separate mounting locations for mounting add-on modules. In certain examples, at least 2, 3, 4, 5, 6, 7, 8, 9, 10 or more add-on modules can be added on to the terminal housing. In certain examples, the module housings include at least 2, 3, 4, 5, 6, 7, 8, 12, 16 or more ruggedized connector ports. In certain examples, the terminal housing defines an enclosed volume and the add-on module housings define separate enclosed volumes. In certain examples, the enclosed volumes of the add-on module housings are in fluid communication with the enclosed volume of the terminal housing when the add-on module housings are attached to the terminal housing. In certain examples, an add-on module housing can define an enclosed internal volume that is less than 30, 20, 15, 10 or 5 percent of the enclosed internal volume of the terminal housing. In certain examples, the add-on module has no more than 10 ruggedized connector ports. In certain examples, the add-on module can be coupled to and integrated with the terminal housing without accessing an interior of the terminal housing. In certain examples, the add-on module can be coupled to and integrated with the terminal housing without disassembling or otherwise fully opening the terminal housing. By "disassembling", it is meant that major components of the terminal housing (e.g., a base end and a cover or two major housing pieces) are disconnected from one another so as to provide full access to the interior of the terminal housing. As defined herein, merely opening a terminal port does not constitute "disassembling the terminal housing", "fully opening the terminal housing" or "accessing the interior of the terminal housing". In certain examples, the add-on module can optically interface with an interior of the terminal housing via a pre-defined terminal port defined by the terminal housing. In certain examples, the terminal housing defines a plurality of terminal ports or other exterior module mounting locations that allow add-on modules to be serially added to the terminal housing over time.

A variety of optical connections can be used between an add-on module and the terminal housing. The optical connection can be plug-and-play connections integrated with the module housing, tethered connections (exterior or interior) or patch cord style connections. The connections can be made by ruggedized fiber optic connectors, non-ruggedized fiber optic connectors, ruggedized single fiber optical connectors, non-ruggedized single fiber connectors, ruggedized multi-fiber optical connectors, non-ruggedized multi-fiber optical connectors, ferrule-less fiber optic connectors or optical splices. In the case of an optical splice, a cable from the add-on module can be routed in sealed fashion into the terminal housing where optical splicing can be protected by a splice tray, splice protector or other structure. The cable can be routed through a terminal port located at a module mounting location of the terminal housing or a terminal port offset from the module mounting location of the terminal housing.

What is claimed is:

1. A telecommunications apparatus comprising:
    a terminal housing environmentally sealed and adapted for outdoor use, the terminal housing defining an enclosed interior and an exterior, the terminal housing including at least one exterior module mounting location including a first mechanical connection interface;
    an add-on module adapted to be integrated with the terminal housing at the exterior module mounting location, the add-on module including a module housing carrying a second mechanical connection interface that interlocks with the first mechanical connection interface to fix the module housing in place relative to the terminal housing; and
    a seal being carried with the first mechanical connection interface, the seal being adapted to provide an environmental sealed relationship between the add-on module and the terminal housing when the add-on module is coupled with the terminal housing;
    wherein the first and second mechanical connection interfaces are configured such that the first and second mechanical interfaces can be interlocked without requiring the terminal housing to be disassembled, the module housing including at least one exterior ruggedized connector port for receiving an exterior ruggedized fiber optic connector, the ruggedized exterior connector port being capable of receiving the exterior ruggedized fiber optic connector from outside the module housing and the terminal housing when the add-on module is integrated with the terminal housing, the add-on module also including an optical connection structure for providing an optical connection between at least one optical fiber of the terminal housing and the at least one exterior connector port.

2. The telecommunications apparatus of claim 1, wherein the terminal housing forms a main terminal that is substantially larger in volume than the add-on module.

3. The telecommunications apparatus of claim 2, wherein the main terminal is configured to receive a pass-through cable, and wherein optical fibers of the pass-through cable are accessed within the main terminal.

4. The telecommunications apparatus of claim 3, wherein the main terminal houses one or more splice trays.

5. The telecommunications apparatus of claim 1, wherein the terminal housing functions as an indexing terminal at which optical fibers are indexed in fiber position from one multi-fiber ferrule to another multi-fiber ferrule and at least one optical fiber is dropped, and wherein the at least one dropped optical fiber is optically coupled to the exterior connector port.

6. The telecommunications apparatus of claim 5, wherein the add-on module includes an optical component selected from a passive optical power splitter or a wavelength division multiplexer, wherein the optical component has an input coupled to the dropped optical fiber, wherein the add-on module includes a plurality of the exterior connector ports, and wherein outputs of the optical component are connected to the exterior connector ports.

7. The telecommunications apparatus of claim 1, wherein the add-on module functions as an indexing module at which optical fibers are indexed in fiber position from one multi-fiber ferrule to another multi-fiber ferrule and at least one optical fiber is dropped.

8. The telecommunications apparatus of claim 1, wherein the add-on module includes an optical component selected from a passive optical power splitter or a wavelength division multiplexer, wherein the add-on module includes a plurality of the exterior connector ports, and wherein outputs of the optical component are connected to the exterior connector ports.

9. The telecommunications apparatus of claim 1, wherein the terminal housing includes a plurality of the exterior module mounting locations.

10. The telecommunications apparatus of claim 1, wherein the terminal housing defines a terminal port at the exterior module mounting locations for allowing the add-on module to optically interface with the at least one optical fiber of the terminal housing.

11. The telecommunications apparatus of claim 10, wherein the module housing includes a connection interface portion that mates with the terminal port when the add-on module is integrated with the terminal housing.

12. The telecommunications apparatus of claim 11, wherein the connection interface portion is an extension having a form-factor that matches a form factor of the terminal port.

13. The telecommunications apparatus of claim 1, wherein the optical connection structure includes a fiber optic connector carried with and mounted to the module housing.

14. The telecommunications apparatus of claim 1, wherein the optical connection structure includes a single fiber ferrule or a multi-fiber ferule carried with and mounted to the module housing.

15. The telecommunications apparatus of claim 1, wherein the optical connection structure automatically couples to the at least one optical fiber of the terminal housing when the first and second mechanical connection interfaces are interlocked.

16. The telecommunications apparatus of claim 12, wherein the optical connection structure includes a single fiber ferrule or a multi-fiber ferrule mounted within the extension.

17. The telecommunications apparatus of claim 12, wherein the optical connection structure includes an interior tether that extends from the module housing through the extension and into the terminal housing.

18. The telecommunications apparatus of claim 1, wherein the optical connection structure includes a fiber optic connector housing integrated with the module housing.

19. The telecommunications apparatus of claim 18, wherein the fiber optic connector housing houses a single fiber ferrule or a multi-fiber ferrule.

20. The telecommunications apparatus of claim 1, wherein the terminal housing includes a terminal port offset from the exterior module mounting location, and wherein the optical connection structure includes a tether or a patch cord that extends outside the terminal housing from the module housing to the terminal port.

* * * * *